United States Patent
Li

(10) Patent No.: US 9,734,694 B2
(45) Date of Patent: Aug. 15, 2017

(54) SYSTEMS AND METHODS FOR PROGRAMMING, CONTROLLING AND MONITORING WIRELESS NETWORKS

(71) Applicant: Sol Mingso Li, Elk Grove, CA (US)

(72) Inventor: Sol Mingso Li, Elk Grove, CA (US)

( * ) Notice: Subject to any disclaimer, the term of this patent is extended or adjusted under 35 U.S.C. 154(b) by 92 days.

(21) Appl. No.: 14/497,248

(22) Filed: Sep. 25, 2014

(65) Prior Publication Data

US 2015/0097669 A1     Apr. 9, 2015

Related U.S. Application Data

(60) Provisional application No. 61/887,321, filed on Oct. 4, 2013.

(51) Int. Cl.
| | |
|---|---|
| *G08B 21/24* | (2006.01) |
| *G08B 5/22* | (2006.01) |
| *H04W 8/20* | (2009.01) |
| *H04W 8/18* | (2009.01) |

(52) U.S. Cl.
CPC .............. *G08B 21/24* (2013.01); *G08B 5/222* (2013.01); *H04W 8/20* (2013.01); *H04W 8/18* (2013.01)

(58) Field of Classification Search
CPC ............... H04L 29/06027; H04L 65/80; H04L 29/0602; H04N 21/4126; H04W 88/16; H04W 92/02; H04W 8/18–8/20; H04W 88/04; H04W 8/183; H04W 8/186; G08B 21/24; G08B 5/222

See application file for complete search history.

(56) References Cited

U.S. PATENT DOCUMENTS

| | | | |
|---|---|---|---|
| 5,850,180 A * | 12/1998 | Hess | G08B 7/06 340/539.1 |
| 5,966,654 A | 10/1999 | Croughwell et al. | |
| 6,049,273 A * | 4/2000 | Hess | G08B 7/06 340/331 |
| 6,441,731 B1 * | 8/2002 | Hess | G08B 7/06 340/331 |
| 6,564,056 B1 * | 5/2003 | Fitzgerald | H04L 12/2803 340/5.1 |
| 7,412,231 B1 * | 8/2008 | Kelleher | H04L 12/581 455/412.1 |
| 8,131,281 B1 * | 3/2012 | Hildner | H04L 41/0806 455/418 |
| 8,140,062 B1 * | 3/2012 | Hildner | H04L 41/0806 455/418 |
| 8,331,990 B2 | 12/2012 | Larsson | |

(Continued)

OTHER PUBLICATIONS

ISA/US, "International Search Report and Written Opinion" corresponding PCT Application No. PCT/US2014/57880, mailed on Jan. 9, 2015, 16 pages.

*Primary Examiner* — Orlando Bousono
(74) *Attorney, Agent, or Firm* — Kang S. Lim

(57) ABSTRACT

A system for programming, controlling and monitoring wireless networks enabling a wireless device (Dev) being utilized and integrated into car electronic control module or home (or business) alarm/security system. This system also presents a general control (robotic) device, which controls general input and output functions, where plurality of cellular handsets, internet devices can co-control, monitor, share and exchange information through the cellular, the internet networks and other wire/wireless network.

53 Claims, 68 Drawing Sheets

(56) References Cited

U.S. PATENT DOCUMENTS

| | | | |
|---|---|---|---|
| 8,373,538 B1* | 2/2013 | Hildner | H04L 41/0806 340/3.1 |
| 2003/0162533 A1* | 8/2003 | Moles | H04M 3/42178 455/419 |
| 2003/0171111 A1* | 9/2003 | Clark | H04L 69/329 455/414.1 |
| 2004/0242209 A1 | 12/2004 | Kruis et al. | |
| 2005/0068938 A1* | 3/2005 | Wang | H04M 1/72502 370/352 |
| 2005/0113113 A1* | 5/2005 | Reed | H04L 12/5895 455/456.3 |
| 2005/0232186 A1* | 10/2005 | Karaoguz | H04L 29/06027 370/328 |
| 2005/0232210 A1* | 10/2005 | Karaoguz | G06F 17/30038 370/338 |
| 2005/0232242 A1* | 10/2005 | Karaoguz | H04L 12/2805 370/352 |
| 2005/0232284 A1* | 10/2005 | Karaoguz | H04L 12/66 370/401 |
| 2005/0233693 A1* | 10/2005 | Karaoguz | H04H 20/57 455/3.06 |
| 2005/0233735 A1* | 10/2005 | Karaoguz | H04L 29/06027 455/415 |
| 2005/0233744 A1* | 10/2005 | Karaoguz | H04W 12/08 455/432.3 |
| 2005/0239445 A1* | 10/2005 | Karaoguz | H04L 12/2803 455/414.1 |
| 2005/0277431 A1* | 12/2005 | White | H04W 8/04 455/466 |
| 2006/0025132 A1* | 2/2006 | Karaoguz | H04L 12/2803 455/433 |
| 2006/0030339 A1* | 2/2006 | Zhovnirovsky | H04W 4/02 455/456.6 |
| 2006/0073808 A1* | 4/2006 | Buchert | H04M 15/00 455/406 |
| 2006/0140350 A1* | 6/2006 | Jorasch | H04M 1/2535 379/32.01 |
| 2006/0154642 A1 | 7/2006 | Scannell, Jr. | |
| 2006/0203969 A1* | 9/2006 | Jorasch | H04M 1/2535 379/32.01 |
| 2006/0203970 A1* | 9/2006 | Jorasch | H04M 1/2535 379/32.01 |
| 2007/0086579 A1* | 4/2007 | Lorello | H04M 3/42263 379/45 |
| 2007/0111756 A1* | 5/2007 | Reed | H04L 12/5895 455/556.1 |
| 2007/0207795 A1* | 9/2007 | Roundtree | G06Q 30/02 455/419 |
| 2007/0291683 A1* | 12/2007 | Bonner | H04L 67/06 370/328 |
| 2009/0022129 A1* | 1/2009 | Karaoguz | G06F 17/30038 370/338 |
| 2009/0163140 A1* | 6/2009 | Packham | H04L 67/02 455/41.2 |
| 2009/0209241 A1* | 8/2009 | Karaoguz | H04L 29/06027 455/415 |
| 2009/0215388 A1* | 8/2009 | Karaoguz | H04L 12/2805 455/3.06 |
| 2009/0273438 A1* | 11/2009 | Sultan | G07C 9/00103 340/5.7 |
| 2010/0075657 A1* | 3/2010 | Gonsalves | H04W 8/22 455/420 |
| 2010/0279669 A1* | 11/2010 | Roundtree | G06Q 30/02 455/414.2 |
| 2011/0021234 A1 | 1/2011 | Tibbitts et al. | |
| 2011/0026436 A1* | 2/2011 | Karaoguz | H04L 12/2803 370/254 |
| 2011/0092197 A1* | 4/2011 | Gonsalves | H04W 8/22 455/419 |
| 2011/0112969 A1* | 5/2011 | Zaid | G06Q 10/02 705/50 |
| 2011/0197266 A1 | 8/2011 | Chu et al. | |
| 2011/0310806 A1* | 12/2011 | Karaoguz | H04W 12/08 370/328 |
| 2012/0069799 A1* | 3/2012 | Karaoguz | H04L 29/06027 370/328 |
| 2012/0329431 A1* | 12/2012 | Dossas | H04L 67/08 455/414.1 |
| 2013/0006775 A1 | 1/2013 | Jordan et al. | |
| 2013/0012207 A1 | 1/2013 | Chatterjee et al. | |
| 2013/0046691 A1 | 2/2013 | Culton | |
| 2013/0057695 A1 | 3/2013 | Huisking | |
| 2013/0109341 A1* | 5/2013 | Haywood | G08B 13/19658 455/404.1 |
| 2013/0144486 A1 | 6/2013 | Ricci | |
| 2013/0290522 A1* | 10/2013 | Behm, Jr. | H04L 43/10 709/224 |
| 2014/0073291 A1* | 3/2014 | Hildner | H04L 41/0806 455/411 |
| 2014/0121890 A1* | 5/2014 | Gercekci | G08C 17/02 701/33.2 |

* cited by examiner

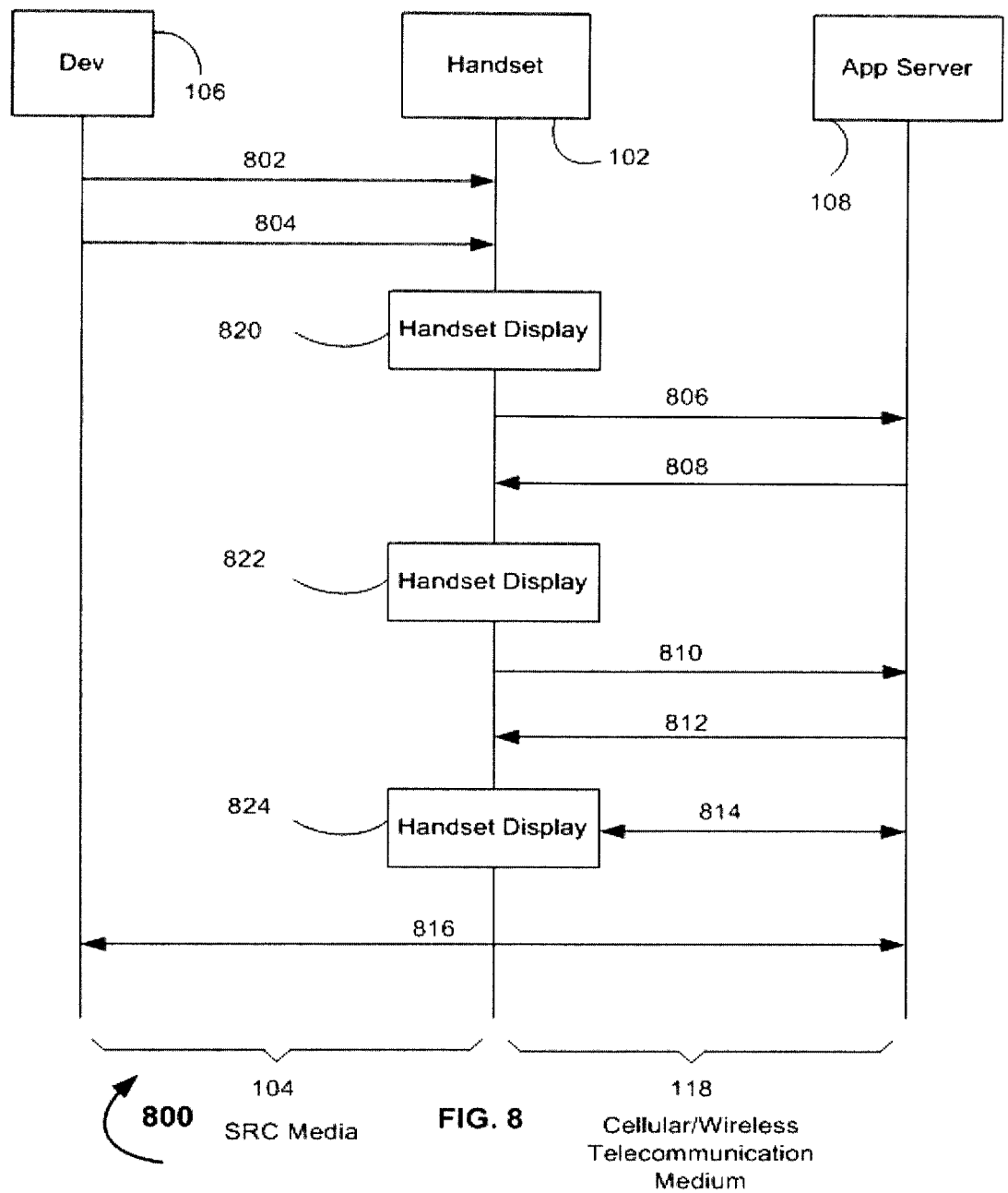

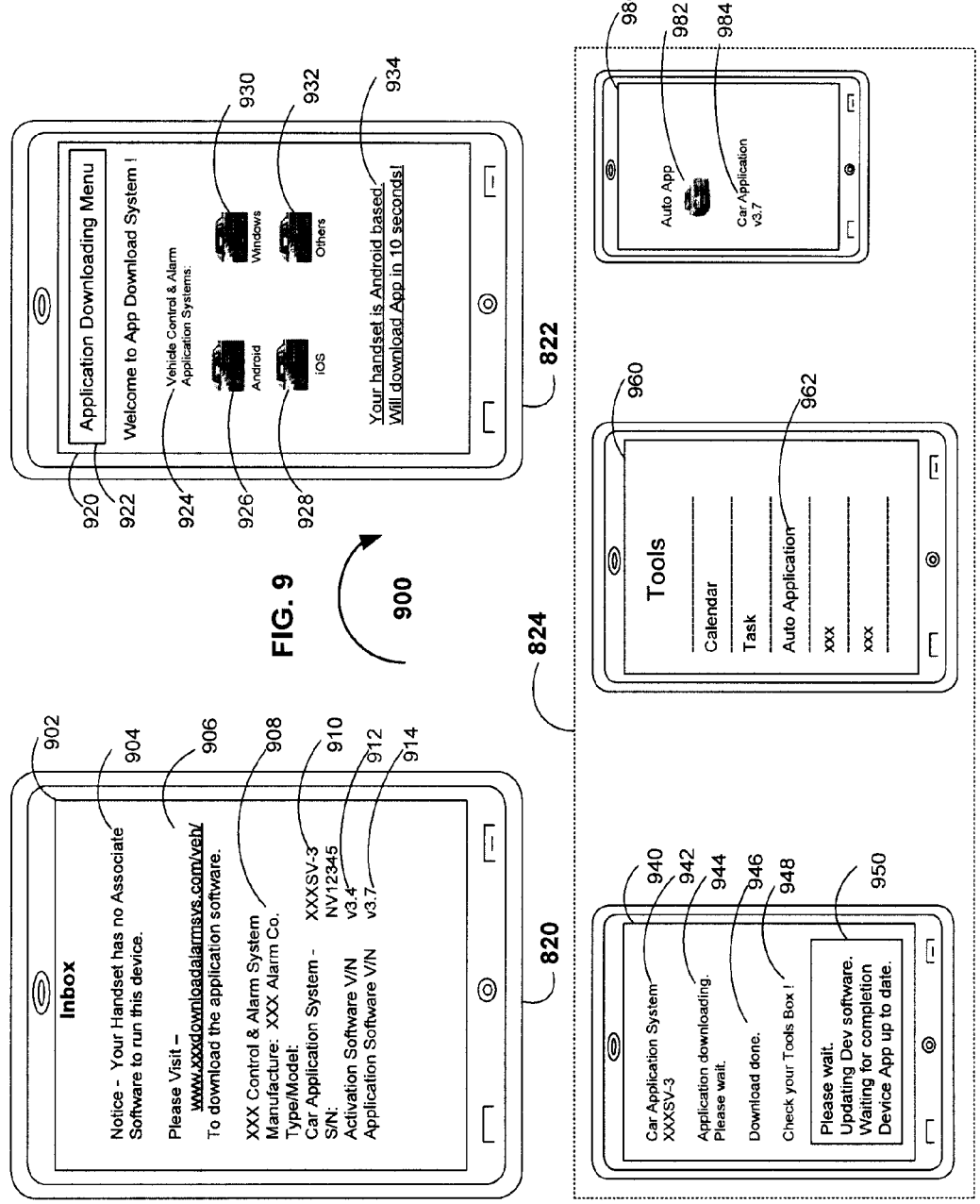

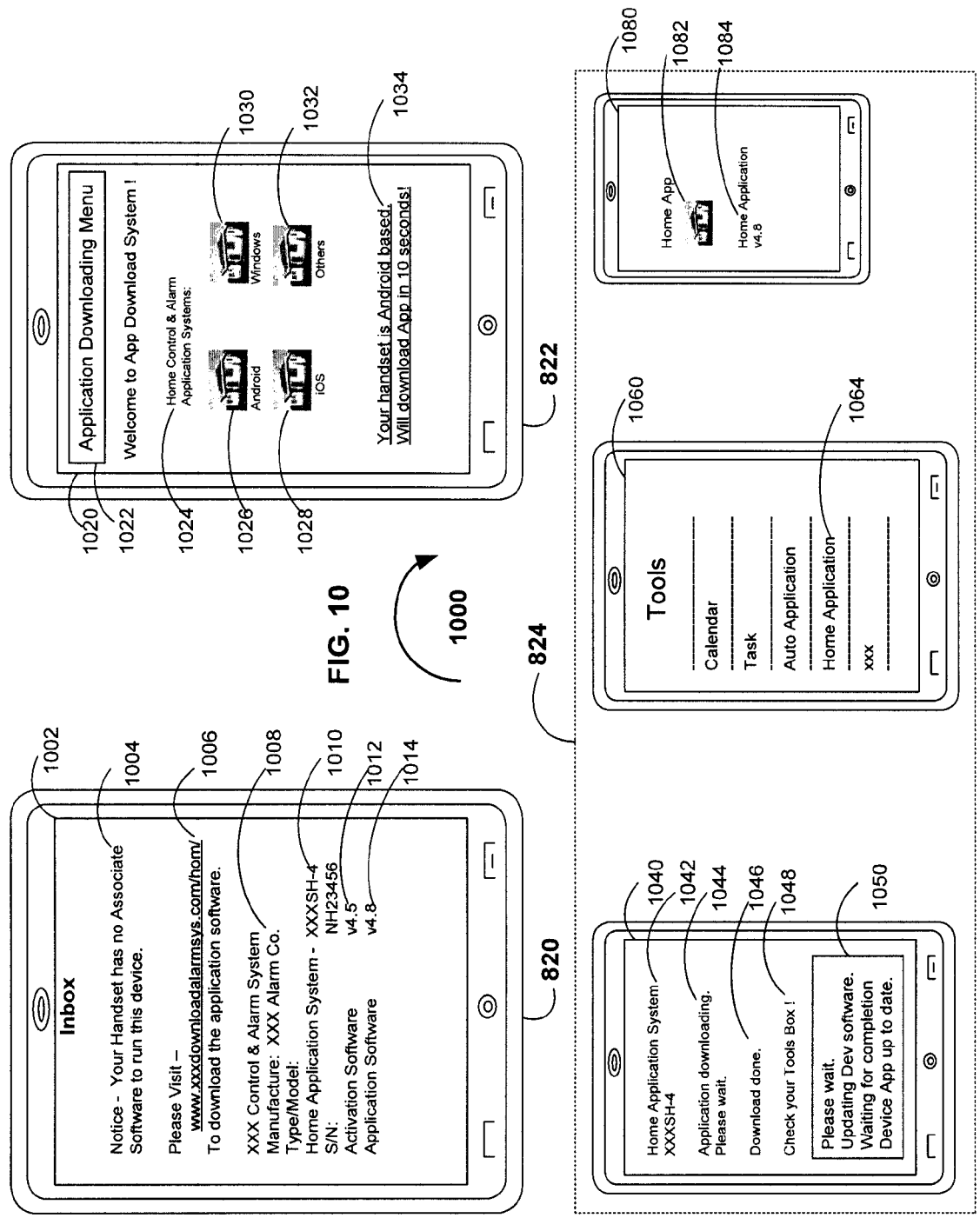

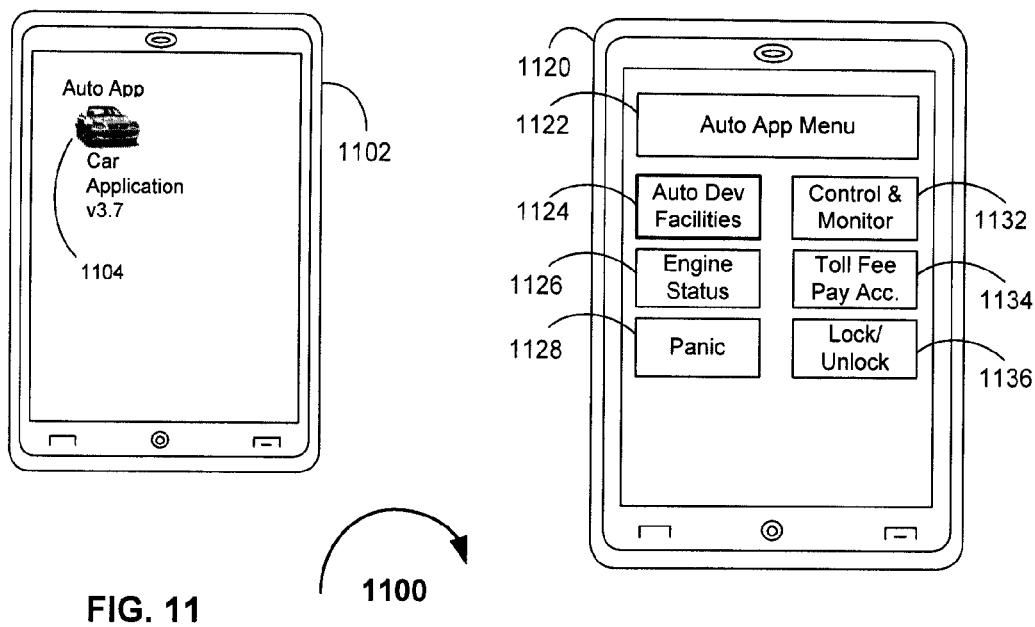
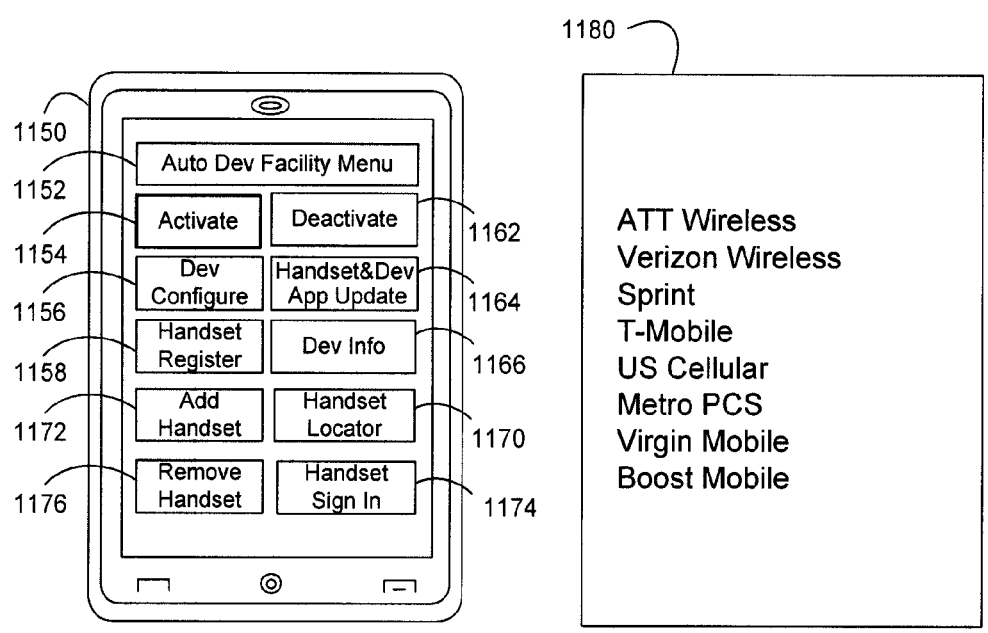
FIG. 11

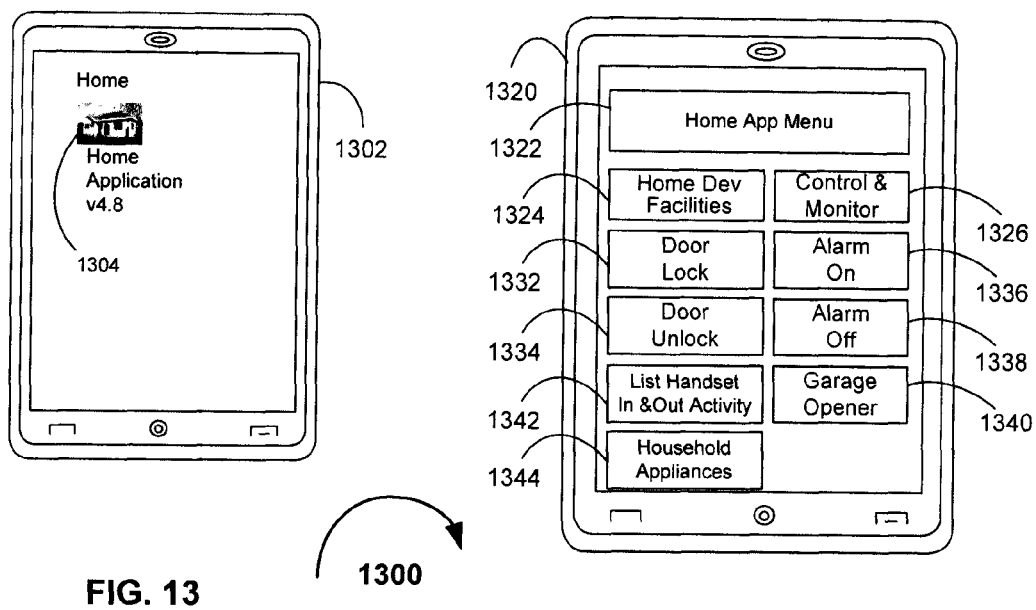
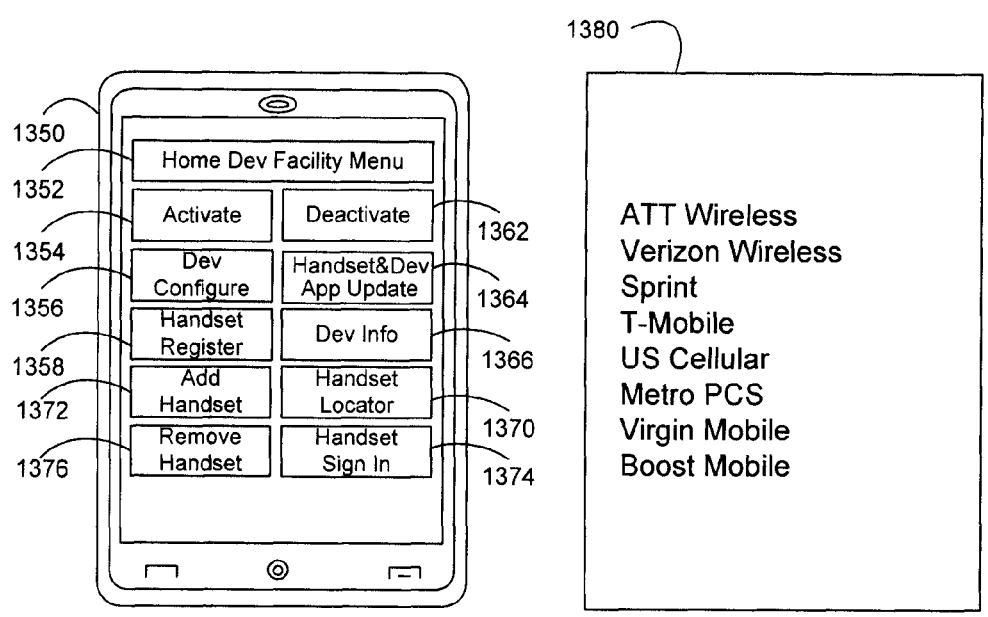
FIG. 13

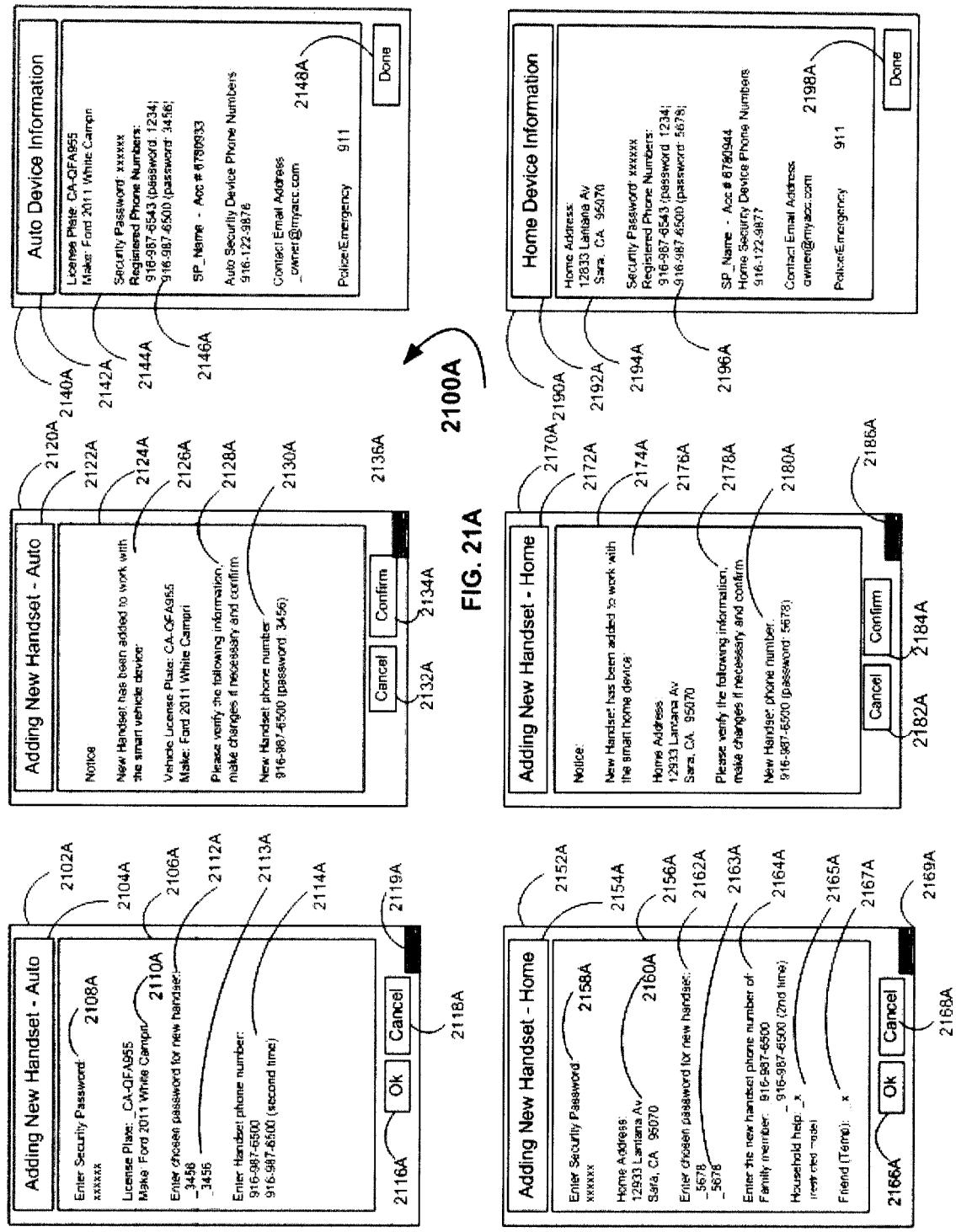

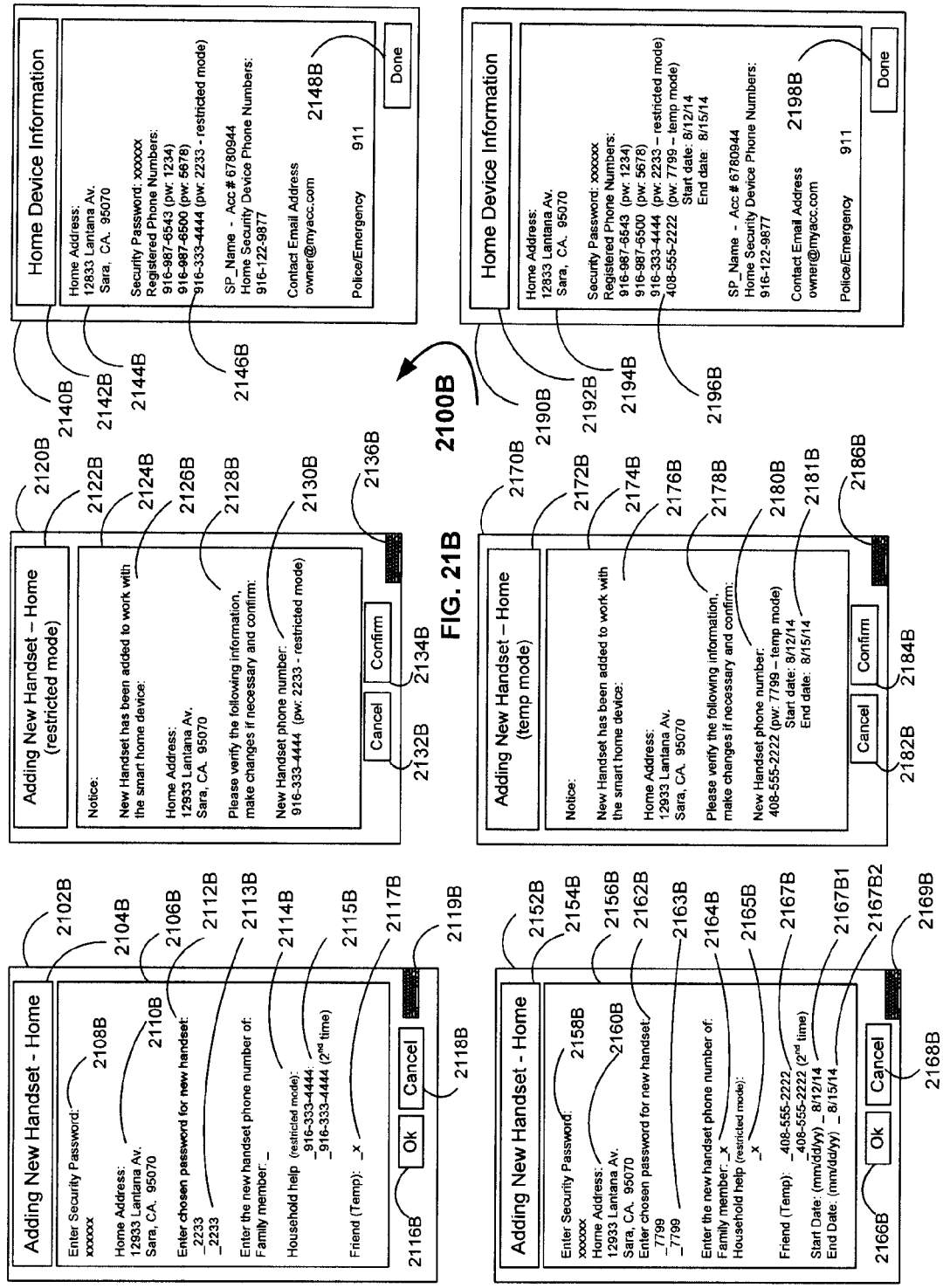

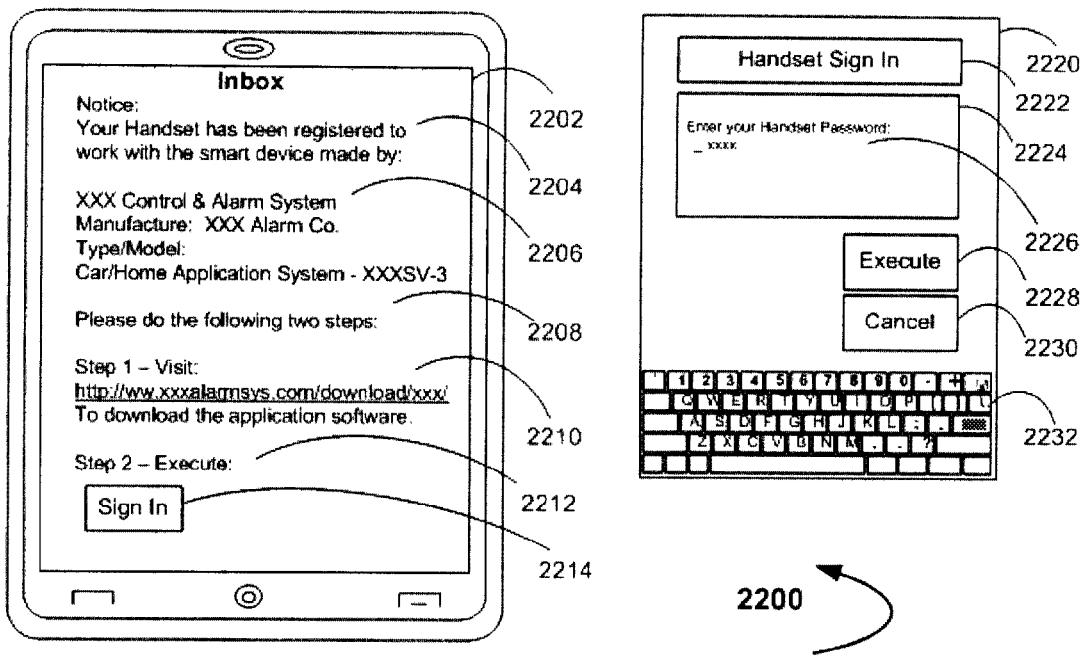
FIG. 22
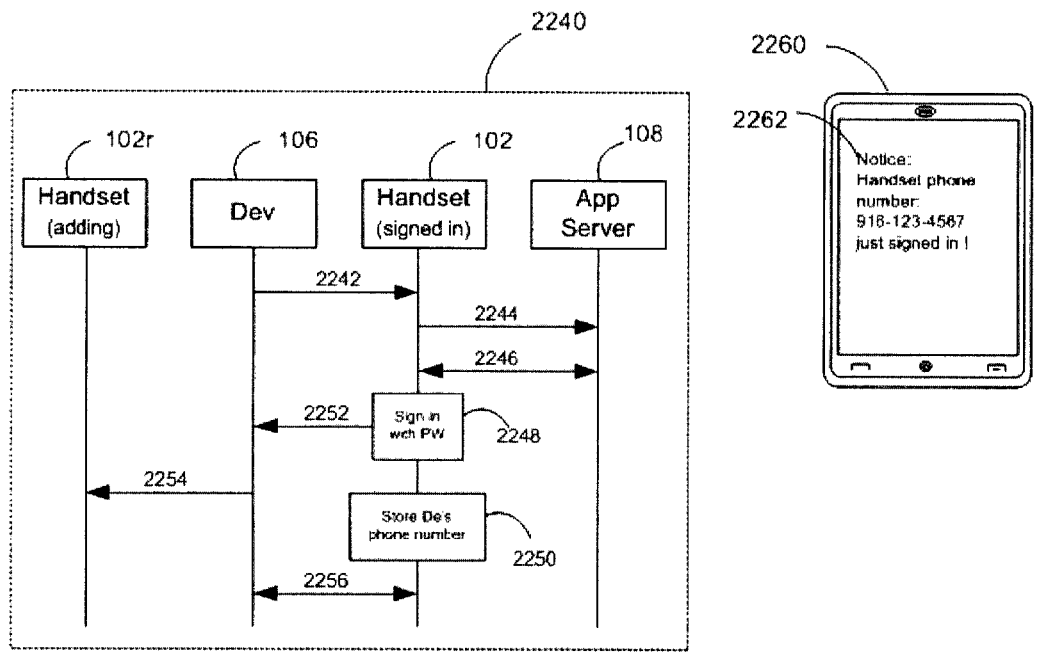

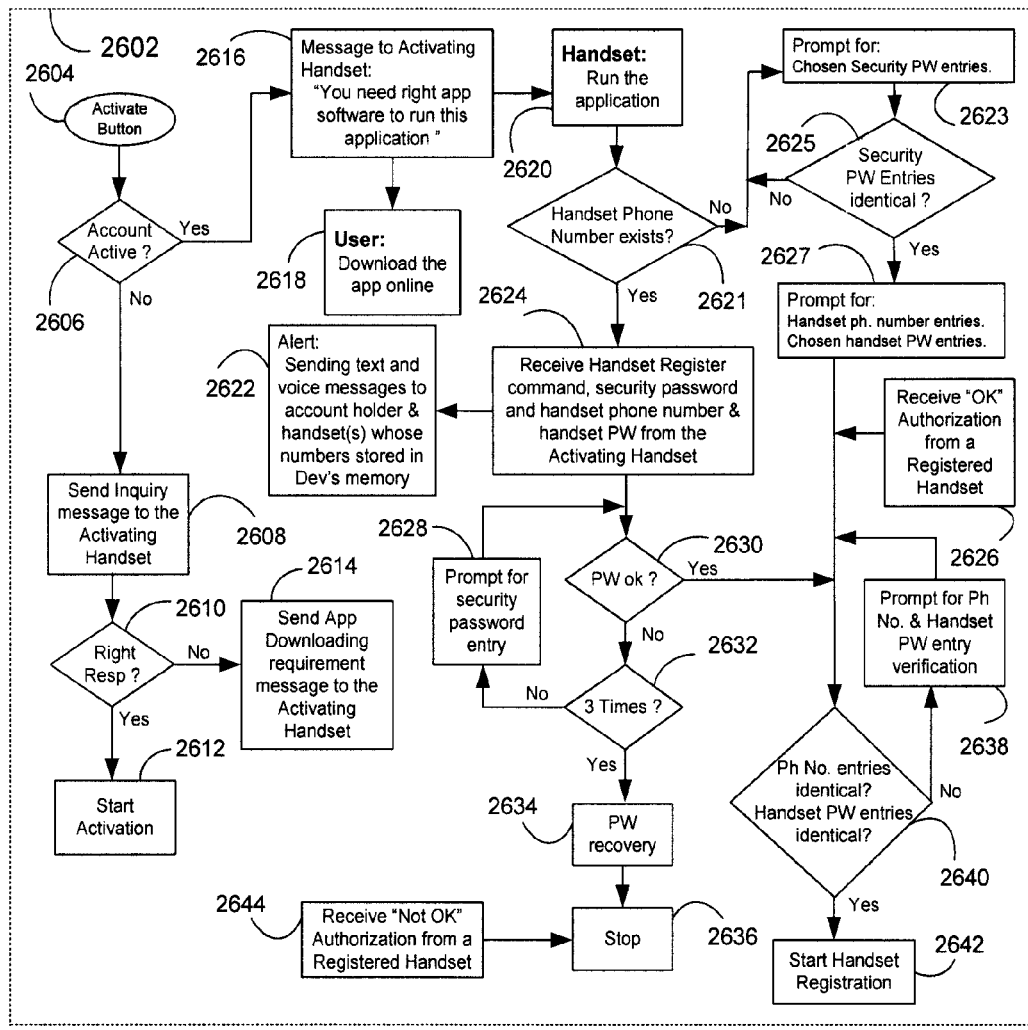
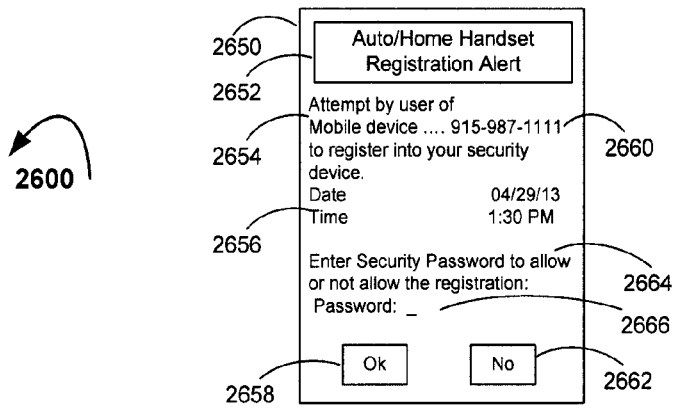
FIG. 26

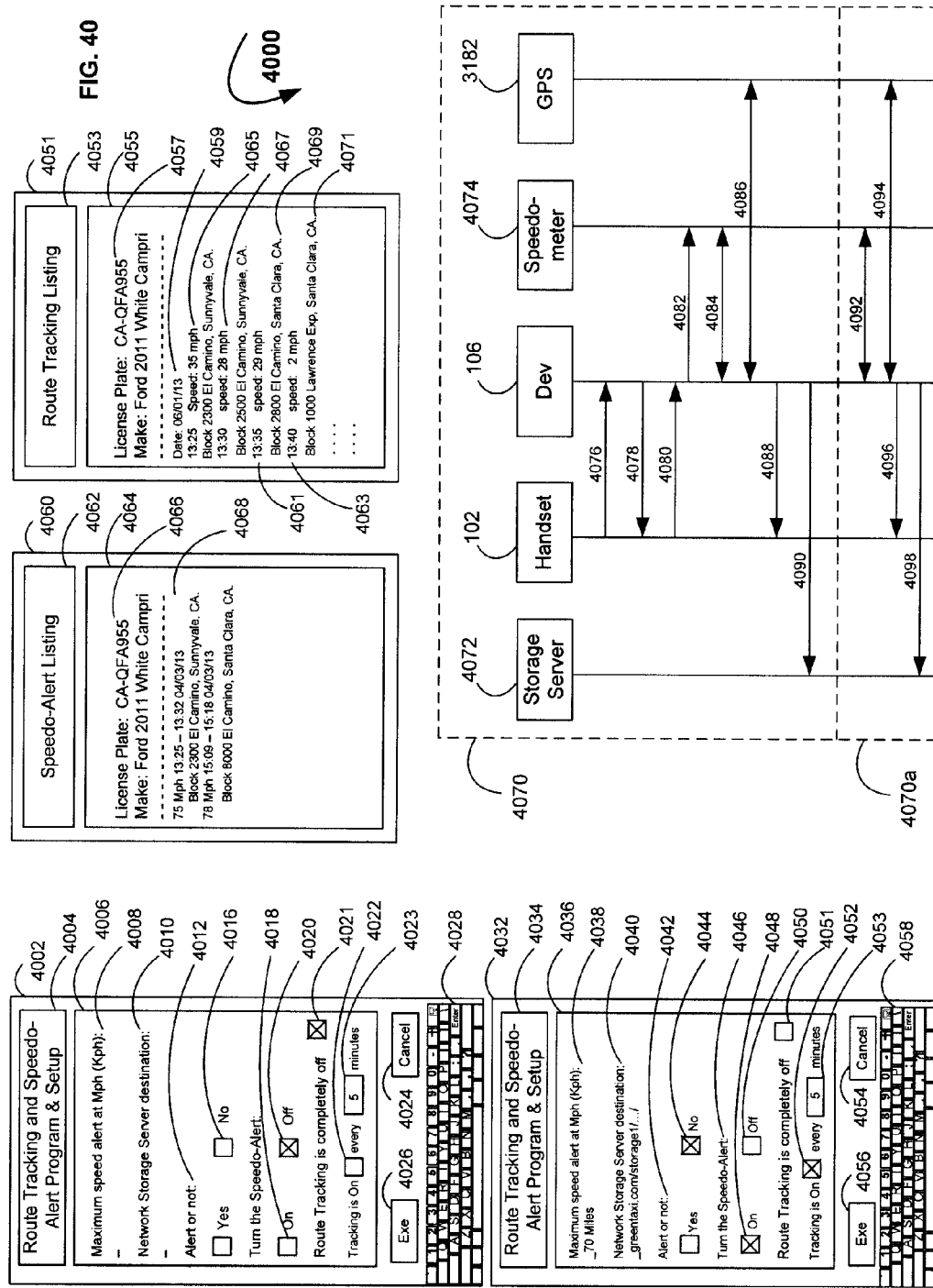

New Text Message in your inbox

4104B

4110B — Inbox
4102B — Urgent!
Your Child might be in your car !
4112B
4114B — Video 0 | Video 1
4116B
4118B — Confirm
4120B — Ignore 4130B — Please take these actions !
4132B — Unlock the car doors
4134B — Lower down car windows
4136B — Sound the horn
4138B — Turn on the car alarm
4140B — Turn the heater on
4142B — Turn the A/C on
4144B — Flash a light
4146B — Call Emergency
4148B — I am on my way 4150B — Actions being taken:
4152B — Unlock the car doors
4154B — Lower down car windows
4156B — Sound the horn
4158B — Turn on the car alarm
4160B — Turn the heater on
4162B — Turn the A/C on
4164B — Flash a light
4166B — Call Emergency
4168B — I am on my way 4180B 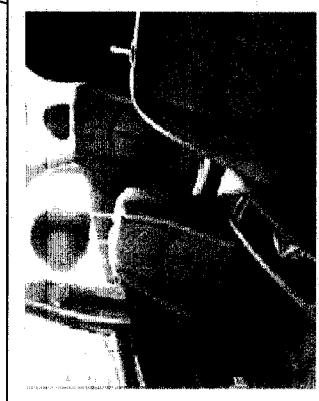

4190B 

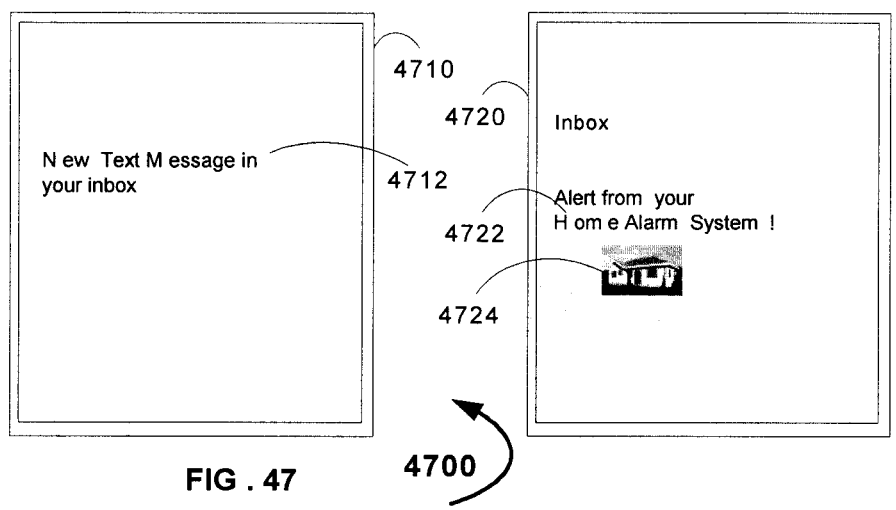
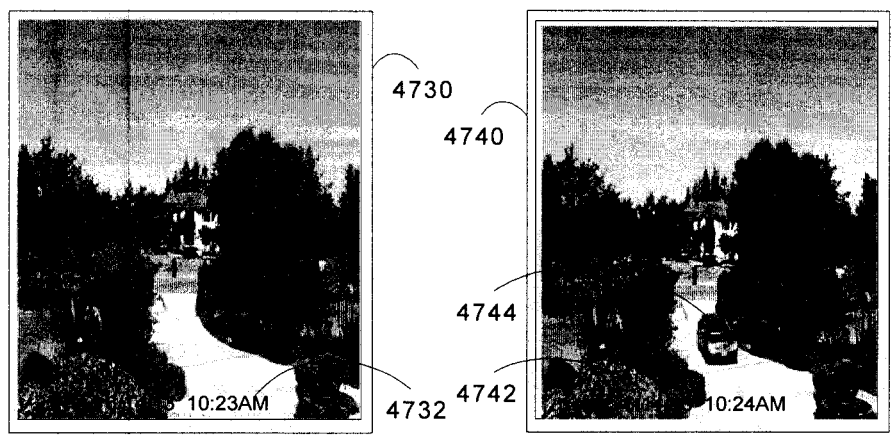
FIG. 47

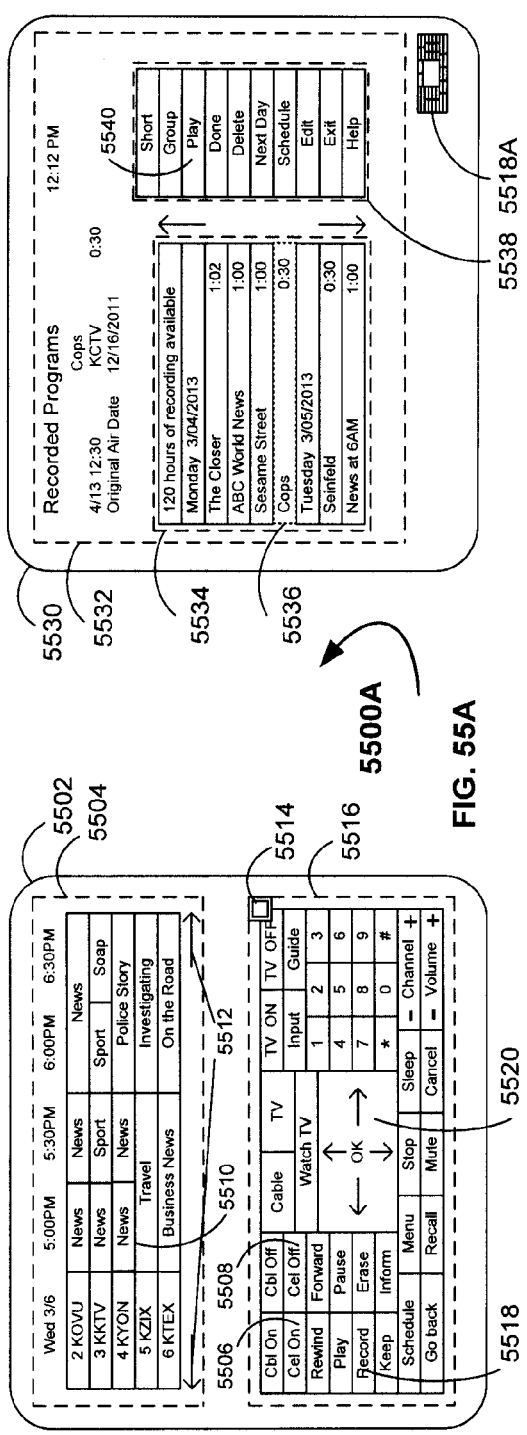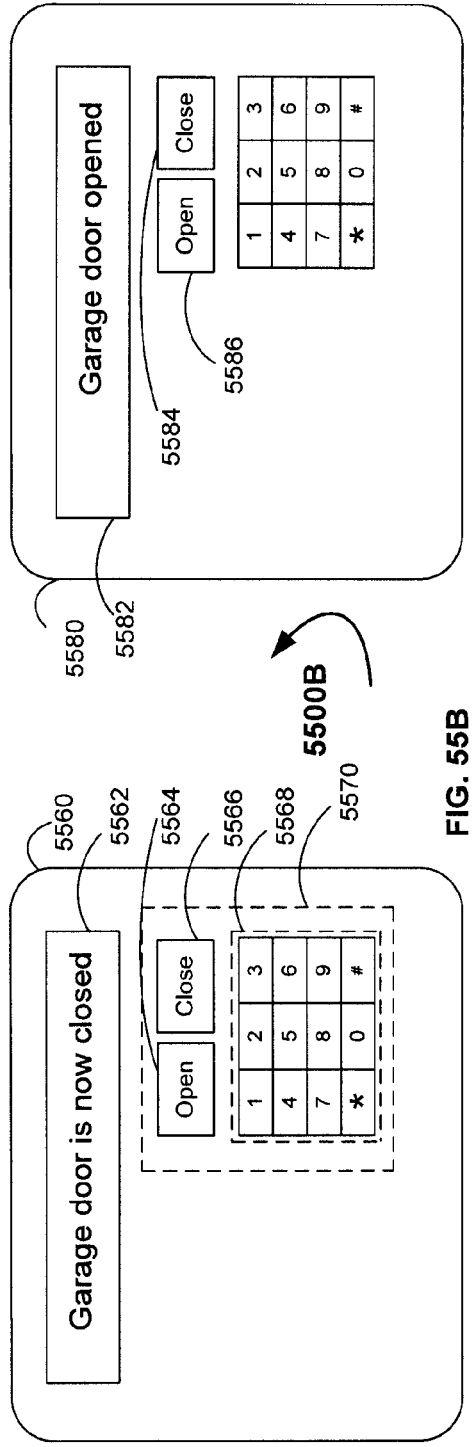
FIG. 55A
FIG. 55B

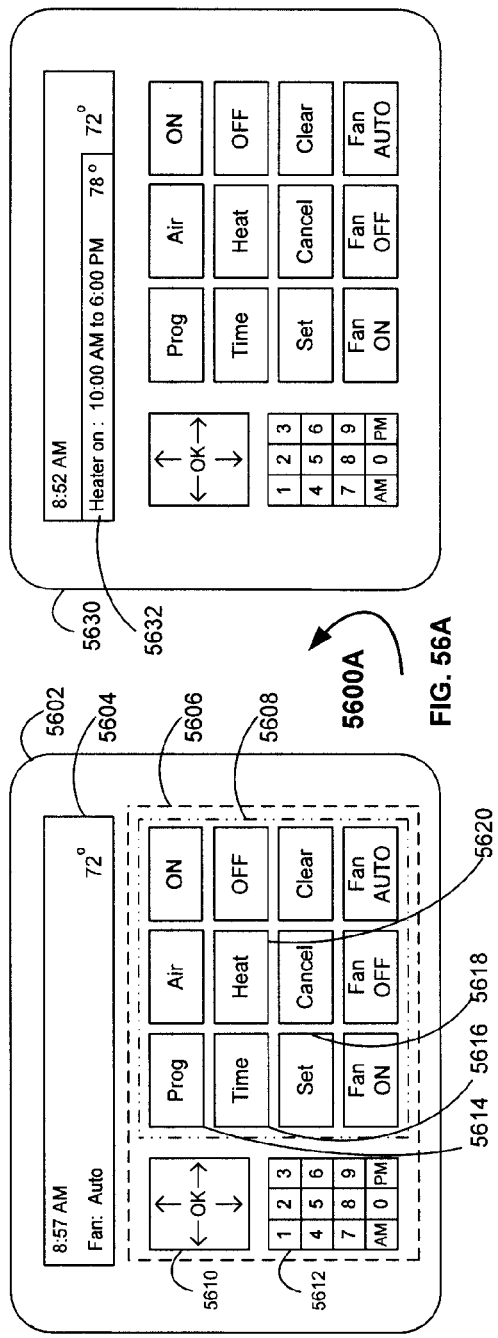
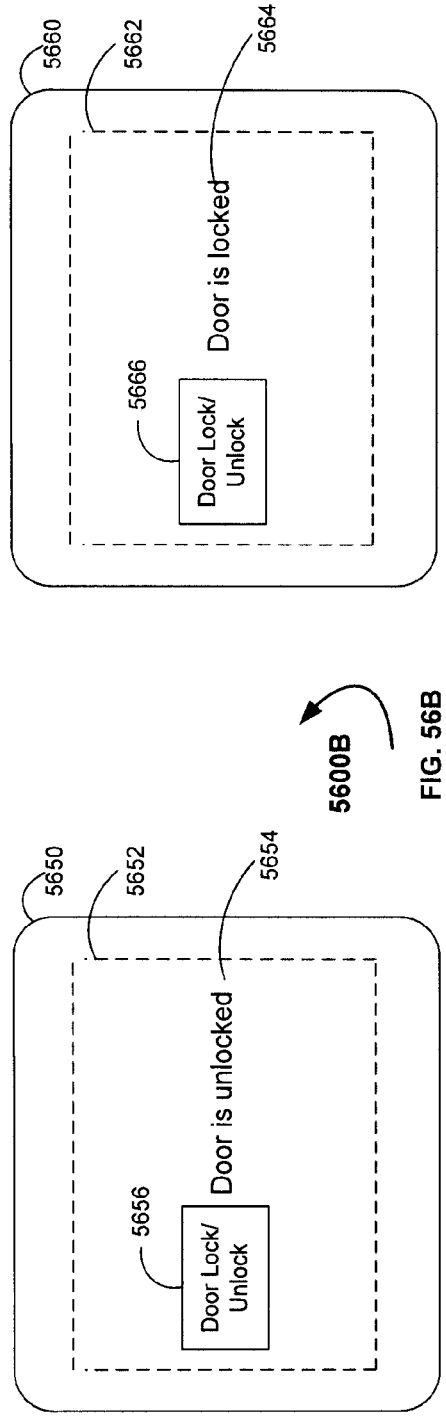
FIG. 56A
FIG. 56B

SYSTEMS AND METHODS FOR PROGRAMMING, CONTROLLING AND MONITORING WIRELESS NETWORKS

CROSS REFERENCE TO RELATED APPLICATIONS

This non-provisional application claims the benefit of and is a continuation-in-part of co-pending U.S. provisional application No. 61/887,321 filed on Oct. 4, 2013, by the same title, which application is hereby fully incorporated in its entirety by this reference.

BACKGROUND

The present invention is in the field of wireless communication, in particular cellular communication where a wireless or wired device or Dev (e.g., appliance) can communicate wirelessly in the wireless network, particularly cellular network, wireless internet network and short range communication (SRC) network. The PCMD (Program Control & Monitor Device) or Dev (e.g., appliance: —the inventor uses the term "Dev" for the description of this invention in the rest of this text, while the term "appliance" will be used in the claims that follow at the end of this text) communicates with a handset (e.g., cellular handset) or plurality of cellular handset, and the Dev can also be directed by any one of the handsets (e.g., mobile devices), which also can be a smart phone, tablet, tablet PC, laptop PC, iPad-like device, PDA (Personal Digital Assistant), any portable electronic device or mobile device, so that the Dev can be used to monitor and control its environment, associated equipment, or plurality of associated equipment, and alert when any unauthorized or unsafe events take place, so its owner(s) can take appropriate measure to deal with the situation.

The Dev can also allow the user to add (register) another handset, so the owner of said handset can have the same access to the vehicle/home control and monitor system, as the original user. The Dev also lets the user remove (deregister) a missing, stolen or no longer used handset.

The Dev can also allow the user hundreds or thousands of miles (kilometers) away from home, to program the handset of a friend or a relative to have access to the home security and monitor system, so said friend or relative can stay at his/her home for a programmable period of time.

The Dev can also allow the user to program the handset of the household help personnel (i.e., cleaning person) to have access only to a certain limited function of the home security and monitor system, such as: entry and exit on certain day(s) of the week and certain time. And such the entry and exit record can be created, stored and viewed by the user.

The Dev can also alert the user when someone attempts to register his/her handset into its control and monitor system so the user can be aware of such attempt and has the option to allow or not allow it to take place.

The Dev can also let the user locate the GPS location of another missing registered handset via his/her handset.

The Dev can also allow the user to have the liberty of choosing another cellular service provider by providing a fairly simple mechanism to which it can be easily activated and registered into the new network.

The Dev can also allow the user remotely to enter and retrieve data to and from the GPS, and inquire the vehicle current location through said GPS.

The Dev can also allow the driver to pay the toll collector (i.e., bridges, highways) electronically and the transaction account is stored in memory for later review.

The Dev can also allow the user to record and view remotely the driving habit of other drivers, such as: driving speed, and optionally alerts the user when such maximum speed limit happens: where, when and the duration. It also allows car rental, taxi, truck companies, and the like, to have the driving record of each vehicle transmitted and stored into the company's storage servers for later review.

The Dev can also alert the car owner when an authorized moving or entry in of his/her vehicle. It lets the owner know the location and time of where and when the event took place.

The Dev can also alert the driver who might be leaving a child or pet inside his/her parked vehicle, which is extremely dangerous, when the temperature is either very warm or very cold outside.

The Dev can also allow the user to program, control, and monitor his/her vehicle and its accessories remotely through his/her handset.

The Dev can also alert the emergency center in case of an accident such as: a sudden impact happens to the vehicle and/or its airbag is inflated. It also lets the driver communicate via the hands-free speaker and microphone with the emergency operator. The driver can also talk to a family member of his/hers (another registered handset), with the aid of the vehicle "dial and talk" button, in case his/her phone does not work or is not in his/her possession.

The Dev can also allow the user to use its control and monitor system to program, control and monitor his/her home security system, such as: turning on or off the alarm, monitoring and viewing the house entries and exits, viewing its motion sensing devices, and observing its interior and exterior surroundings remotely, through his/her handset.

The Dev can also alert the home owner when an authorized or illegal entry takes place in his/her own house or business premises. It lets the owner know the exact location within the house or business premises, and time when it happened.

The Dev can also alert the home owner when the monitor camera detects changes in its inputs, then transmits the video images to the owner for his/her viewing and decision.

The Dev can also communicate wired/wirelessly with one or plurality of wireless handsets/terminals, computers, servers, and the like so account information can be exchanged between the Dev and one or plurality of device, such as: handsets/terminals, servers/computers (wire/wireless) to facilitate the financial (or non-finance) transaction or any other needed financial (or non-finance) exchanges.

The Dev can also communicate wired/wirelessly with one or plurality of household appliance/equipment at home or on business premises, with the assistance of the software application downloaded from a plurality of server on the internet, or transferred from said appliances/equipments to the Dev, then from Dev passed to the handset; therefore allow the user(s) through the handset to control, program, monitor, view, record, play back, said appliances/equipments via the Dev.

The Dev can also be programmed, controlled, and then communicates wired/wirelessly with institutions, such as: a utility company to pass monthly user's utility usage information (i.e., electric/water/[heating & cooking gas] meter reading) so said company's computers can process and calculate the charges. The utility company then completes the payment automatically, or transmits said information to user's handset, so he/she using said handset is able to complete the transaction by paying online.

The Dev can also let the user speak to a visitor who rings the door bell by alerting him/her via his/her handset (wherever he/she might be), thus allowing their communication through the intercom (front door speaker and microphone). The uninvited visitor is not aware that the owner might not be at home, at the present moment.

The Dev can also let the home owner monitor the well-being of his/her pets (dogs), by communicating with the Integrated Smart Pet Door (its door, speakers and cameras), to let them out to the backyard multiple times a day and for specified times, such as: opening its door and playing the owner voice on its speakers, and enticing/commanding them back into the house by replaying the same speaker, then closing and locking the pet door.

The Dev can also be embedded into robotic device, which can be programmed and controlled remotely by the handset via the cellular network. Cellular communication is more ubiquitous, practical, in real-time and anywhere than the internet. The robotic device can be used in situations, such as: long distance medical surgery, remote rescue mission, remote firefighting and rescue, package delivering flying drones and the like.

The Dev can also be embedded into black boxes, shipping containers, and the like which can be programmed and controlled by the handset or a computer via the cellular network or satellite network (or a hybrid network consisting of cellular, wireless, wire, terrestrial and satellite) to communicate its locations to said handset or said computer.

Since the Dev is a wireless device and particularly a cellular device, it needs to be registered and activated into a cellular network, so the network computers/servers can recognize it, and allow it into their network, in order for it to communicate with other mobile devices. Unlike cellular phone handsets, tablets, personal assistants, and the like, it communicates with other handsets or wireless devices, when programmed to do so by one or more of its registered handsets. It does not communicate with everybody's cellular device, nor does it respond, when others try to communicate with it. In other words, it will ignore or will not answer uninvited calls/messages (with the exception is that during its activation/registration). The Dev receives, decodes and executes commands and data from registered handset(s), and does its tasks/functions as intended/programmed, and transmits back information and/or status to handset(s)/devices. Commands and data from the handset can be in packet(s), in binary or combination of binary and ASCII text format. Commands from the handset also preferably contain encoded handset phone number, and encrypted password, so the Dev can differentiate them from unwanted sources. If the phone number and the password match with the stored ones in the Dev's memory, the Dev will execute the commands accordingly. Data can also be in video and audio text format. Information and/or status from the Dev can be in packet(s), and in binary or combination of binary, ASCII, video, streaming video and audio, or streaming audio text format. The Dev also sends messages (messages in the present invention, besides being text messages can also in the form data messaging: IM, MMS "Multimedia Message Service", iMessages) to the handset(s), to alert the owner(s) when an event happens, or sends commands to App Server or Email Server to email owner's password to his/her email address for password recovery; as are known to those of ordinary skill in the art.

The Dev's function is to monitor and control its environment, communicate with other intended wireless devices; and in such a case where it functions as a security device, it has to be installed in a position, where it is not easily removed or disabled by any un-wanted person. It preferably is in the form of an embedded electronic module consisting of a microcontroller or CPU, IC (integrated chipset), EPLD, volatile and non-volatile memory (i.e., flash, RAM, SDRAM, EEPROM, ROM, SSD, storage media, . . . ) storages (for software code, application programs, cellular account information, OS, . . . ), antenna(s), cellular phone/wireless LAN chipset, SRC (Short Range Communication) interfaces, components (NFC, WI-FI, Bluetooth, USB, wireless radio frequency (RF) technology), and general I/Os. The module can be part of the automobile controlling circuitry when applies to a vehicle, or part of the home security system, when applies to the house, and part of the electronic circuitry when applies to a robotic device or a shipping container.

The Dev can obtain, store and run software applications from other devices/servers wirelessly. In the case of a vehicle, it also contains finance account application to facilitate the toll fee transaction, when bridge toll or road toll requires. It also contains features, which allow user to locate the GPS location of other registered handset(s). It also allows user to control devices/appliances at home or on remote premises by having automatic add and remove functions, which it uses to discover/find out other controlled devices, so it can add in their functionality, or later on to remove them as commanded by user via the handset.

It also offers a general purpose control system where the main handset can register other handsets, which then together can communicate with the Dev to coordinate in monitoring and controlling what is going on within the Dev's environment, such as: a robotic/surgery/search-rescue robot, and monitoring what's going through the cameras and sensors and display the real time image on the terminal screen. Or the general purpose control system can be embedded into black boxes, shipping containers and the likes so they will be programmed by the handset or computer and their positions can then be tracked and monitored by said handset or said computer.

These three applications—car, home, and robotic/surgery/search-rescue operations/shipping containers/black boxes are for cited examples and do not mean that the Dev is restricted for these applications only.

In its lifetime, it most likely has several ownership changing hands, and thus it has to be easily activated and registered by its new owner, when change of ownership takes place. It also prevents an unauthorized one from activating or registering, and also alerts its owner(s) when such event happens. This makes it very easy for owner to switch to another service provider while still being active with the current provider by having the owner (through the handset) activated the Dev into the new service provider's network. After the activation to the new service provider is successfully done, the Dev deactivates itself from the previous network, and also transmits commands to other registered handset(s) which will update the Dev's new phone number.

Cellular phones/devices already exist in automobiles but their functions are quite limited. The main function of the current system is to take over the call, when the driver's cellular phone rings, and thus allows him/her to answer it, and communicate hands-free with the outside caller. Some other applications allow the owner of the car to remotely lock/unlock the car or start up its engine. Part of the reason, the car manufacturers have not yet provided the complete solution, as presented herein by the present invention, is how to come up with a mechanism, so that the cellular phone system (which is already inside the vehicle cellular embedded phone module, as in the case, where it takes over the function of the driver's cellular handset) can be programmed, controlled, monitored, and thus be able to communicate with the owner's handset, and execute its functions as cited herein in the present invention. Extending the hardware (microcontroller and cellular chipset) so it can interface with other devices in the car, such as: its GPS, its engine oil/fuel level, speedometer reading, door locks, car alarm, ignition system and the like, will not do much, if a clear and straight forward mechanism by which the car owner can monitor, program, and have it activated easily with his/her chosen cellular service provider so it can communicate with his/her cellular phone, has not been implemented as presented herein by the present invention.

House monitoring security system presents less of a challenge, since it is a stationary device and can be wired and monitored by a home security company. The house monitoring system also requires a phone line (expensive and prone to being disabled because the phone line can be cut) and comes with a pretty high price tag such as monthly service fee. The monitoring can only be as good as the system and the security personnel who have the responsibility of overseeing so many stations. The system has to be installed by the home security company, and they do not provide much except calling and/or alerting the owner, when something happened or the house has been breached. The owner has no idea what happened, and neither does the alarm company until the police arrives, or the owner gets home or to the business office. Often, this can be due to a false alarm, such as: a curtain falling and causing the motion sensor to trip. There are also home installed security cameras connected online to the manufacturer's website, where an owner can create, and later logs into his/her account, and sees what the cameras see, and observes what is going on. It is a passive system, in other words, the user cannot program it in order of for him/her to be alerted when a certain condition happens.

The present invention allows owner 24 hour monitoring system. It goes straight to the user's handset (and his/her family members'), instead of to a third party not having the capacity to fully monitor all activity, due to the multiple terminals they need to monitor. It alerts when something happens and owner(s) can see, in real-time, what happens in his/her handset (where the Dev already transmitted the related information). Programming, controlling, and monitoring are all done through the handset, while the current paid system requires keypad located inside the house, plus a remote hand-held device just to turn the system on/off, when user is near the house within a close proximity. The present invention also extends beyond providing security of home alarm system. It allows its owner(s) means to control and monitor other household appliances/equipments, such as: heating/AC, cable/satellite TV, Garage opener, entry door lock, help-alert wearer, sprinkler control system, door bell and intercom, pet's daily needs, electric meter reading and transmitting the information to utility company, and plurality of others.

There exist already on the market kits offered, by companies such as: AutoAlarm Pro at autoalarmpro.com and Viper Start at viper.com to car owners, so they can either assemble themselves or by professional installers into their vehicles, so they can remotely program, monitor, and be alerted, when a certain event or condition happens to their vehicles. The above solutions are not very practical since they require the owner to pay for the extra equipment, its installation cost, and it requires modification to the vehicle structure which could void certain parts of the car manufacturer's warranty. It also would be costly, since it is not part of the complete package when the car was built, and has to be installed later.

US Patent Application US20110244846A1 and US20080057929A1 by Min: "Cell Phone with Remote Control System" mentioned a remote Automobile and Home Control System by a mobile phone, within a mobile communication network, a plurality of remote systems and a server. Min described the interconnection and integration of the plurality of systems of his invention, in terms of hardware, but never mentioned how the device in vehicle/home gets registered and activated so it can be connected to the network, and how it obtained its owner's phone number and the numbers of all other handsets, so it could alert the owner and family about the unexpected events.

It is therefore apparent that an urgent need exists for improved systems and methods for programming, controlling, and monitoring wireless networks.

SUMMARY

This present invention presents mechanism involving a wireless device (Dev) being utilized and integrated into car and home (or business) electronic control and alarm/security monitor systems. This present invention also presents a general control (robotic) device, which controls general input, and output functions, where plurality of cellular handsets, internet devices can co-control, monitor, share and exchange information through the cellular, the internet networks, and other wire/wireless networks. These three cited examples should not be restricted as the only applications, since there are many applications already exist, or have yet to be invented, which can benefit from the present invention's application.

Before activation of the Dev, the owner should preferably get in touch with his/her chosen cellular service provider, to obtain the wireless service plan for the Dev and receives activation parameters (activation data), such as: activation password and user ID, account number, and/or any required information (so the service provider can associate it/them with the subscriber), in order for the Dev to be successfully activated into the service provider's network. The owner can go to one of the service provider's sales office, get in touch by phone, or go online to obtain the required information.

Activation is getting easier as cellular handsets are becoming more common devices. But even for a cellular phone user, when choosing or switching to a different service provider, he/she needs to be present in person at one of the service provider's sales office, since he/she has to choose a new handset, while at the same time having it activated and registered by the service provider sales personnel. To cut down time, manpower and improve efficiency and minimize user's waiting and frustration, service providers find ways to simplify and speed up the activation processes, by providing automatic activation of the device, such as: over the air (OTA) and on demand activation (ODA). OTA means the Dev can temporarily connect to the network during activation, and ODA means the cellular service provider can allocate any available phone number to the Dev during activation (thus Dev and its SIM, or U/SIM, or ModSIM (define by the inventor as Modified SIM) like storage area does not have to be pre-programmed with any phone number). If the user chooses the same service provider, as the one of his/her handset, the same account number can be used as a group account, as commonly practiced by service providers. The first thing the user/owner needs to do is to activate the Dev and register his/her handset phone number (along with his/her account information) to the Dev, so the Dev can communicate with the handset after it has been successfully activated.

Before or during the activation, the user also has to pass a certain activation data to the Dev, (using the handset); meaning the handset has to contain associated software for it to do so (communication between the Dev and handset). Normal handset does not contain software application to run the Dev, so during the start of the activation process (after the Dev's activation button is pushed or voice activated command is excited), the Dev tries to communicates to the handset via SRC. If no response or wrong response coming back from the handset, the Dev sends a message or messages to the handset, informing the user of the website, from which to download the needed software. After the software has been downloaded to the handset, the Dev and handset can communicate properly via SRC, so information can be exchanged, and the activation data required by the Dev can also be passed from the handset to the Dev. During this time, the Dev's software can also be updated if necessary, and at the pleasure of the user since the website might inform user through the handset of the choice.

The Dev activation request can be in the form of SMS, USSD string or any other means, as are known to those of ordinary skill in the art. During and before activation, the Dev and the handset communicate with each other via near distance communication, such as: Bluetooth, wire/wireless USB, NFC, WI-FI, wireless radio frequency (RF) technology or any as defined by this inventor as SRC (Short Range Communication), as are known to those of ordinary skill in the art.

The Dev activation can be started by pushing a button by the side of enclosure (in the case of the home control and monitor system) or the push button located by the interior rear mirror similar to one to program the garage opener (in the case for the car control and monitor system). Most would refer to this as syncing devices, device sync, etc. Activating the Dev into a cellular network is quite similar to programming the garage opener, except the former requires several more steps.

The Dev's activation is carried out by the service provider's equipment(s) known by various names, such as: service provider servers/computers, Authentication Center, Home Location Registry, activation server/computer, provision server/computer, or any other systems associated with or provided by the service provider; and is mentioned in the present invention, as the Provision Application Storage Computer/Server (PASC) or Provision Server 114. The provision server can be part of the Service Provider internal network system, or it can reside separately on the internet/cellular network, as are known to those of ordinary skill in the art.

Note that the various features of the present invention described above may be practiced alone or in combination. These and other features of the present invention will be described in more detail below, in the detailed description of the invention, and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 1 shows the preferred exemplary networks the present invention where Dev 106 is operating in.

FIG. 8 shows a preferred example of the flow diagram of present invention, in the downloading of required activation and application program into handset 102.

FIG. 9/10 shows a preferred example of handset's screen displays of present invention, in the downloading of required activation and application program into handset 102, in the automobile/home application.

FIG. 11/13 shows a preferred example of handset's screen displays of present invention, in running/executing the just downloaded auto/home application software.

FIG. 21A shows a preferred example of handset's screen displays of a registered handset 102, adding (e.g., registering) a new handset into the Dev 106. After being added, the new handset 102 signs in, and thus registered into the Dev 106, and is able to control the Dev as much as the registered handset 102, relating to the present invention.

FIG. 21B shows preferred examples of handset's screen displays of a registered handset 102, adding 2 new handsets one after another into the Dev 106. After being added, the first new handset 102 signs in, thus registered into the Dev 106, and is restricted into controlling a limited function of the Dev 106. Similarly, the second handset 102 also signs in temporarily and its ability to control the Dev 106 terminates on a certain programmable date, relating to the present invention.

FIG. 22 shows a preferred example of handset's screen displays and a flow diagram, presenting the interaction between the registered handset 102, the Dev 106, added handset 102 and the App Server 108 during the sign-in of the added handset, relating to the present invention.

FIG. 26 shows a preferred example of a flow diagram of the Dev 106 during the Handset Registration process of a new handset, and the notified Handset's screen displaying the Dev's notification messages to a registered handset 102, relating to the present invention.

FIG. 40 shows a preferred example of handset's screen displays and flow diagram, presenting the Route Tracking and Speedo-Alert Program and Setup, the interaction of various devices. The displays also show the Route Tracking and Speedo-Alert listings of the Dev 106, relating to the present invention in the automobile application.

FIG. 41B shows a preferred example of handset's screen displays, presenting an alert from Dev 106 to handset 102, when an unusual event occurs, relating to the present invention in the automobile application.

FIG. 47 shows a preferred example of handset's screen displays, presenting an alert from Dev 106 to handset 102, when a camera event takes place, relating to the present invention in the home application.

FIG. 55A shows preferred example of handset's screen displays, presenting the communication between handset 102 and Dev 106, when user uses his/her handset 102 to control and program (via the Dev 106) the entertainment system, relating to the present invention in the home application.

FIG. 55B shows preferred example of handset's screen displays, presenting the communication between handset 102 and Dev 106, when user uses his/her handset 102 to open or close (via the Dev 106) the garage opener(s), relating to the present invention in the home application.

FIG. 56A shows preferred example of handset's screen displays, presenting the communication between handset 102 and Dev 106, when user uses his/her handset 102 to control and program (via the Dev 106) the heating and air conditioning system, relating to the present invention in the home application.

FIG. 56B shows preferred examples of handset's screen displays, presenting the communication between handset 102 and Dev 106, when user uses his/her handset 102 to lock or unlock (via the Dev 106) the entry door, relating to the present invention in the home application.

DETAILED DESCRIPTION

Figure 1:
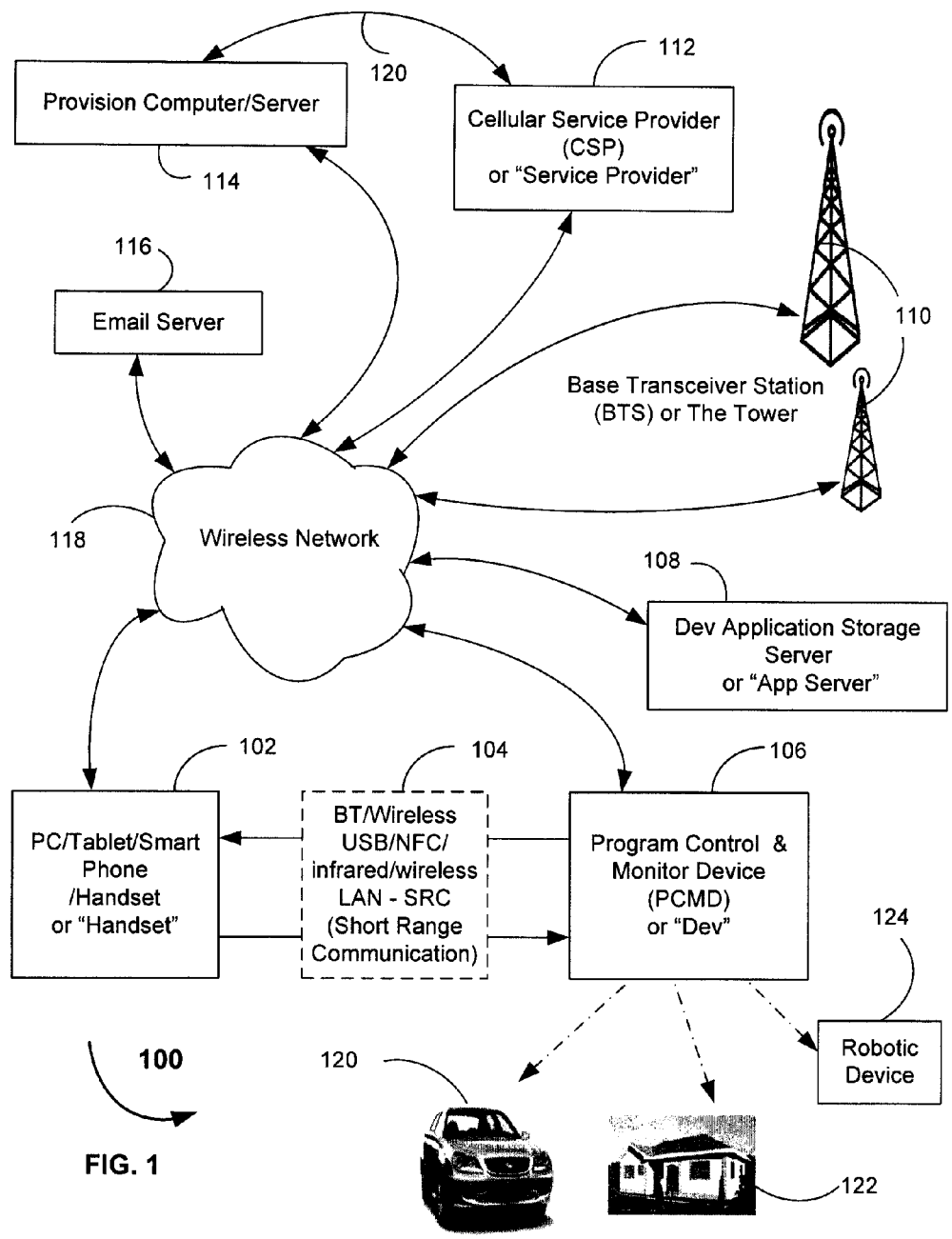

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention and all changes and modifications that come within the spirit of the invention are desired to be protected. The features and advantages of embodiments may be better understood with reference to the drawings and discussions that follow. Further, the "present invention" or "invention" is intended to refer to "embodiment(s) of the present invention".

Aspects, features, and advantages of exemplary embodiments of the present invention will become better understood with regard to the following description, in connection with the accompanying drawing(s). It should be apparent to those skilled in the art, that the described embodiments of the present invention provided herein, are illustrative only and not limiting, having been presented by way of example only. Alternative features serving the same or similar purpose may replace all features disclosed in this description, unless expressly stated otherwise. Therefore, numerous other embodiments of the modifications thereof are contemplated as falling within the scope of the present invention as defined herein and equivalents thereto. Hence, use of absolute terms, such as: for example, "will", "will not", "shall", "shall not", "must", and "must not", are not meant to limit the scope of the present invention, as the embodiments disclosed herein are merely exemplary.

It is also understood that when using terms, such as: handset/Dev making, calling, talking, answering, alerting, letting, allowing, using, programming, controlling, monitoring, activating, downloading, detecting, obtaining, containing, assuming, fetching, transferring, updating, configuring, adding, registering, removing, deregistering, comparing, operating, sending, selecting, starting, locking, unlocking, recording, turning on, turning off, playing back, transmitting, translating, passing, bypassing, receiving, displaying, executing, communicating, encoding, encapsulating, encrypting, decrypting, extracting, decoding, processing, verifying, navigating, exchanging, running, informing, copying, refer to actions and processes of the application programs in either handset 102 or Dev 106 (program code, OS, I/O drivers and the like and their interprocess-communication) residing in the micro-computer system's memory and executed by the CPU, in association with its supporting components i.e., cellular chipset, memory devices, peripheral I/O, transceivers, amplifiers, analog front-end, discrete/integrated ICs.

It is also understood that unless expressly stated otherwise (such as: "new handset", "non-registered handset", "normal handset", "regular handset"); "handset" and "registered handset" are used interchangeably herein, for ease of presentation by the inventor, since a handset has to be registered into the Dev, in order for both to communicate with each other, as principal goal of this invention.

The present invention is about a wireless device "Dev or appliance". In particular, Dev is a cellular device, which resides or is part of a module controlling and monitoring its surrounding environment. In the following examples, three are cited and it does not mean that the Dev is restricted for these applications only. Controlling and programming means the Dev needs to be commanded or programmed to do so and its communication is restricted to a selected number of devices (their phone numbers are stored in the Dev's memory). There exists a need for a system and method of how the Dev is to be activated to a network with the companionship of the user's handset (or similar device cited previously), thus allowing the Dev to be registered and recognized by the network (at a later time); the way how the Dev is configured, programmed, controlled by the user/handset; the way additional handset(s) is(are) added/registered into Dev's memory, thus allowing additional users to program and utilize the Dev; the way a no longer used (an obsolete) handset is removed (deregistered) from Dev's memory; the way the Dev monitors and reports status and events from its I/O; the way the Dev knows which selected handsets/devices to exchange the information; the way the Dev knows which email addresses so it can request App Server to send information to; the manner how the Dev is programmed by one or more handsets (or wireless/mobile devices) for its many functions; the way the Dev alerts one or more handsets (or wireless/mobile devices) when an un-expected or potentially catastrophic event occurs; the way the Dev switches to SRC network in communication with a registered handset, when the said handset is within its SRC network range; the way additional house-hold appliances/equipments is discovered and connected, and their applications are copied or downloaded (via download links) and run, so that said appliances can be programmed and controlled by user's handset via the Dev itself through the cellular network, or directly to said appliances via SRC network when the handset is within said medium range; and the way household appliances/equipments is removed from the Dev and from a handset when said appliance/equipment is no longer in use.

In order for the above summaries come into realization, these following steps preferably are to be taken:

The network it operates in: The present invention is in the field of wireless communication, in particular cellular communication or a long distance wired/wireless network or GSM network, CDMA network, WCDMA network, TD-SCDMA network, NAMPS network and/or networks operating in accordance with any derivatives—GPRS, EDGE, CDMA2000, LTE, TD-LTE—based on GSM/EDGE and UMTS/HSPA, 3GPP, 4G LTE, among other similar and future medium, such as: satellite network or a hybrid network consisting many types of media—wire, wireless, terrestrial and satellite as are known to those of ordinary skill in the art). It also involves "Short Range Communication" SRC (Short Range Communication), such as: Bluetooth, wireless USB, NFC, WI-FI, wireless LAN, or any wireless radio frequency (RF) technology as are known to those of ordinary skill in the art.

During activation process the Dev communicates with the handset through SRC (Bluetooth, wireless USB and the like) since cellular communication to the Dev has not yet been established or has been discontinued. The handset on the other hand has both the cellular and internet connections and thus can download activation and application software from the App Server into its memory if needed and be also used to pass needed activation information from the server to the Dev through SRC media before and during the Dev activation process.

With activation and application software resident in their memory (after successful download to the handset or update to the Dev), the Dev starts the activation process through Over The Air Activation (OTA). During this process, the Dev can temporarily connect to the service provider or service provider's equipment known as provision server or activation server/computer in order to be activated. The activation process can be summarized in three phases: First, —activation key and pre-activation data from the service provider and user's phone number along with user account information (i.e., vehicle make/home address, account name, account number) to the activated device. Second, —activation request, activation key, device identifier(s) and/or activation data from the activated device to the cellular provider. Finally, —the activation/registration data and acknowledgement from the cellular provider sent back to the activated device.

The exchange of messages for the activation of the Dev with the provision server does not necessarily mean it is a direct communication. The messages can go through many nodes and each one of them transmits these messages to each other or one another, and finally to the provision server. For instance, the messages first go to one or a series of towers or Base Transceiver Stations (BTS), which transmit(s) the messages to the service provider or MSC/VLR (Mobile Switching Center/Visitor Location Register). Because these messages are activation messages, the MSC/VLR then transmits them to HLR/AuC (Home Location Register/Authentication Center) and DBS (Database Server for data verification and the Provision Server or OTA (Over The Air) Activation Processor for being processed/acknowledged/approved (FIG. 1 of US patent application Publication by Chatterjee et at US 2013/0012207 A1 Jan. 10, 2013 and FIG. 1 of US patent by Larsson U.S. Pat. No. 8,331,990 B2 Dec. 11, 2012). The numbers of transmission the activation messages go through, how, where, and by which equipment(s) they are being processed and routed, are up to the service provider's internal layout and design architecture, and are outside the scope of the present invention. During the Dev Activation, the present invention just says data sent/received by the Provision Server, processed by the Provision Server and acknowledged by the Provision Server as are known to those of ordinary skill in the art.

The present invention also supports plugged-in SIM card 270 (FIG. 2) preferably already activated; otherwise if the user has to activate it, then the SIM storage module is already available. Also, the benefit of the SIM card for the user is the convenience of continue usage when he/she gets a new handset without having to have reactivate it and allowing it to retain all the personal information, such as: phone directory, personal messages and the like while such information is not needed in the Dev, and the Dev functions much differently from a smart handset. The Dev only communicates with a limited numbers of handsets or mobile devices as directed by the registered phone, or one of the registered phones, and unlike the handset, the Dev is not easy for the user to have access to its SIM card. Its task is to allow users to program, control and monitor what users want it to do. It also can observe and inform of what is going in its surroundings, thus providing the option to alert the users as programmed/instructed.

Choosing the service provider—The user should have in possession preferably a smart phone in order to maximize the use of the present invention. The present invention protocol utilizes a mechanism in having Dev activated and then provisioned into the network (and it thus can register and be recognized/authenticated by the network); configured, programmed, controlled, and monitored its security tasks; set up account for paying tolls; discovered house-hold device for remote control and usage and all the various functions, which make it into a real, useful and very powerful device; also registers/removes (de-registers) other handsets or no longer used handsets into/from the Dev so they can/cannot control, program, monitor and will not be/(no longer be) alerted by the Dev just as the main handset.

The user applies and obtains the network service to the Dev with the service provider either in person, through phone call, or online. The user provides information or personal data (Name, address, employer's name and address, credit card [for payment deposit], handset phone number to the service provider for approval) and the service provider in turn provides user a set of information such account number (service plan, service rate . . . ), user ID, activation password and activation phone number or activation internet link (address). The service provider then generates a one-time and time limited ticket (one-time limited ticket), token or identifier UTAID (Unique Temporary Activation Identifier preferably consists of: activation type/methodology, security/encryption key, activation key) based on user's account and personal information, and transmits it to user's handset. The handset in turn, passes the UTAID to the Dev, which separates out the activation key, and transmits it along with the Dev's own identifier(s) and other parameters to the service provider during activation. Through this activation key, the service provider/provision server verifies against the one stored in its database server, and thus can associate it with the subscriber ('s account) during activation. The UTAID also preferably contains a byte, indicating activation methodologies (activation types) of NAM, SIM (or USIM or ModSIM) or any customized activation type/methodology, which when received by the Dev, will allow the Dev to activate itself into the service provider network accordingly (either using NAM, SIM, USIM, ModSIM or any customized activation type/methodology). The UTAID also preferably contains a mathematically algorithm or security/encryption key; and thus when it is received, decoded, stored and executed by the Dev, will encrypt said Dev's voice and data transmission in total privacy. The UTAID can also optionally contain an IMSI, which the Dev uses to transmit during activation instead of using its dummy IMSI, as are known to those of ordinary skill in the art.

Other parameters which the Dev preferably provides during activation such as: —ESN/MEID/IMEI (Electronic Serial Number/Mobile Equipment Identifier/International Mobile Equipment Identifier), which the service provider associates with the device as in the case for NAM activation, have been pre-programmed into the Dev's NAM while the Dev will store its assigned phone number and the user's account information during the activation. —The dummy IMSI or IMSI (International Mobile Subscriber Identity decoded from the UTAID if it is provided) which the service provider associates with the subscriber (subscriber identification) and IMEI (International Mobile Station Equipment Identity) which the service provider associates with the device (device identification), as in the case for SIM activation, along with the user's account information, can be stored into the Dev's SIM memory storage module areas during the activation.

Preferably, the service provider can also associate the Dev ID Parameter (542/642 of FIG. 5/6), such as: Dev's SN (serial number), model number, manufacturer name with the device, which are already reside in the Dev's memory, while the user's account information, the Dev's assigned phone number, and the TMSI can be stored into the Dev's memory storage module during the activation, as in the case for ModSIM activation.

Pre-activation—Un-registered handset: A regular handset normally does not contain activation and application software. When the activation button is pushed (preferably located similar to where built-in garage door openers are in vehicles near the rear-view mirror, in case for vehicle application, or by the side of the enclosure in case of home system application), the Dev sends activation query via SRC media to the handset (un-registered to the Dev) and waits for the appropriate response. When no or incorrect response comes back from handset, the Dev assumes the handset does not contain appropriate application software, and sends a text message providing the link to the server location to the handset, informing user that he/she needs to download the activation and application software from the application server (App Sever) into the handset, in order to activate the Dev and run application software to communicate to the Dev. The user then proceeds to download the activation and application software. Before or during the downloading, the App Server preferably checks to see if the requested download version is up to date and if necessary (besides downloading the latest version of the software to the handset), the Dev also needs to be updated (downloaded) with the newest revision. If this is the case, the handset not only downloads its own activation and application software from the App Server, but also the Dev's application of the latest version to its memory storage, and then transmits it to the Dev; or the handset transmits to the Dev the App Update command with the download web link, making said Dev download said app update. Each cellular service provider in conjunction with the manufacturer of the Dev supplies their own activation and application software, and preferably the service provider also supports OTA (Over The Air) activation and ODA (On Demand Activation) activation.

Dev Activation: before the user puts the Dev into usage, the Dev needs to be activated so it can be recognized (when it registers into the network), and thus allowed into the service provider network; and can therefore call/send messages or receive calls/messages from other devices. A user uses his/her handset in activating the Dev—the pre-activation data (activation User ID 1226/1426, activation password 1228/1428) to obtain UTAID from the service provider can be inputted by the user from the handset's touch screen and keyboard 1235/1435. The user also provides separate information to the Dev, such as: the handset's phone number 1229/1429 (along with the account information) since the handset phone is the very first device the Dev will send message to, after it has been recognized and connected into the service provider's network. After activation, the Dev does a power-on reset 249 (FIG. 2/3/4) and then is registered and recognized by the network (in 1519A/1519B, 1619A/1619B, and 1719/1819 of FIGS. 15A/15B, 16A/16B and 17/19) as are known to those of ordinary skill in the art. Preferably the user has to acknowledge back with an Ok message so the Dev knows its communication link to the handset has been accomplished and user can start the Dev's initialization/configuration process right after.

During its communication with the Dev, the handset's own phone number (in 1229/1429 of FIG. 12/14) is preferably encapsulated and its data encrypted (with the same security/encryption key provide in UTAID as mentioned earlier) in its command packet(s), since not all handset voice/message carries (or is preceded with) its phone number (also known as caller ID); and therefore the Dev, when it receives said packet(s), preferably decrypts the data, decapsulates (reverses the encapsulation) or separates the handset's phone number from the command packet(s). Next the Dev compares it with its stored handset numbers and only responds if there is a match. From then on, the Dev will communicate with the handset via cellular network 118 or cellular and internet networks. (The Dev can preferably automatically switch to communicate with the handset via SRC network 104 when the handset is within its near distance vicinity or SRC network range, as is known to those of ordinary skill in the art). The Dev then can be initialized or configured by the user via the handset with information, such as: password (for added security), user's email address (for password recovery) and stores them into its memory. The user then can program, control and monitor the Dev, from then on, for its intended tasks.

The user can also command using his/her handset preferably with account security password (for added protection) to add in additional handsets, which the Dev will be allowed to communicate and directed by these handsets to do its tasks in the service of said handset user(s).

Dev activation can be either
Using NAM (Number Assignment Module)
NAM principal parameters are assigned phone number, MIN/IMSI, System ID (ESN/MEID/IMEI), Access Overload Class, Group ID Mark, Initial Paging Channel, Lock Code, local use flag, A/B system selection and MIN mark flag.

Using SIM (Subscriber Identification Module)
SIM principal parameters are IMSI, TMSI (temporary IMSI), MSISDN, and Authentication key (Ki) and possibly ICCID and IMEI.
Using ModSIM (Modified SIM)
ModSIM principal parameters are assigned phone number, TMSI, Dev ID parameters and Authentication key (Ki).

The method and system will be explained in detail later in the figures that follow. In no way it implies that these are the only three ways for the Dev to be activated as are known to those of ordinary skill in the art. When there is a need for new and better ways of activation, the Dev will be able to accommodate the requirement with appropriate software, which can be downloaded as discussed in the present invention as technology changes and improves.

Activation and Application software resides both in the handset and in the Dev.
  Activation software is used and executed by both of them during Dev activation and between each one of them or of both of them with the provision server.
  Application software is used and executed when the handset and the Dev communicate with each other. The software is downloaded over the wireless network (cellular, internet) or updated software can also be downloaded to run newer and improved version. (These software programs are stored in servers which the present invention refers as Device Application Storage Server—App Server 108)

During the activation period, communication between the handset and the Dev is via SRC (Short Range Communication) which is either Bluetooth, wireless USB, NFC, WI-FI, wireless LAN, or any wireless radio frequency (RF) technology as are known to those of ordinary skill in the art.

After the Dev has been successfully activated, it then runs the initialization reset (or self-power recycle), and then registers into the network (and thus will be recognized by the service provider's network). From then on, the Dev runs and executes its application software to communicate with user's handset (as mentioned previously, the handset can also be a smart phone, tablet, tablet PC, laptop PC, iPad-like device, PDA (Personal Digital Assistant), any portable electronic device or mobile device). Correspondingly, the user uses his/her handset (which had its application software downloaded) to communicate with the Dev, by going and scrolling through the handset's respected screens and related icons, to program the Dev 106 and thus control, command, monitor and view its programmed tasks. The user will also be informed (alerted) through his/her handset by the Dev when certain unauthorized events take place.

Methods and systems for programming, controlling and monitoring the Dev are described below.

According to one aspect of the invention (FIGS. 8-10), the Dev starts out (after its activation button has been pushed) by transmitting (via SRC media) to user's handset, a text message with the App Server's URL instructing him/her to download the required activation and application software, from said site into the handset in order to activate the Dev, then runs and executes the downloaded application, in order for the handset to communicate with the Dev.

Figure 12:
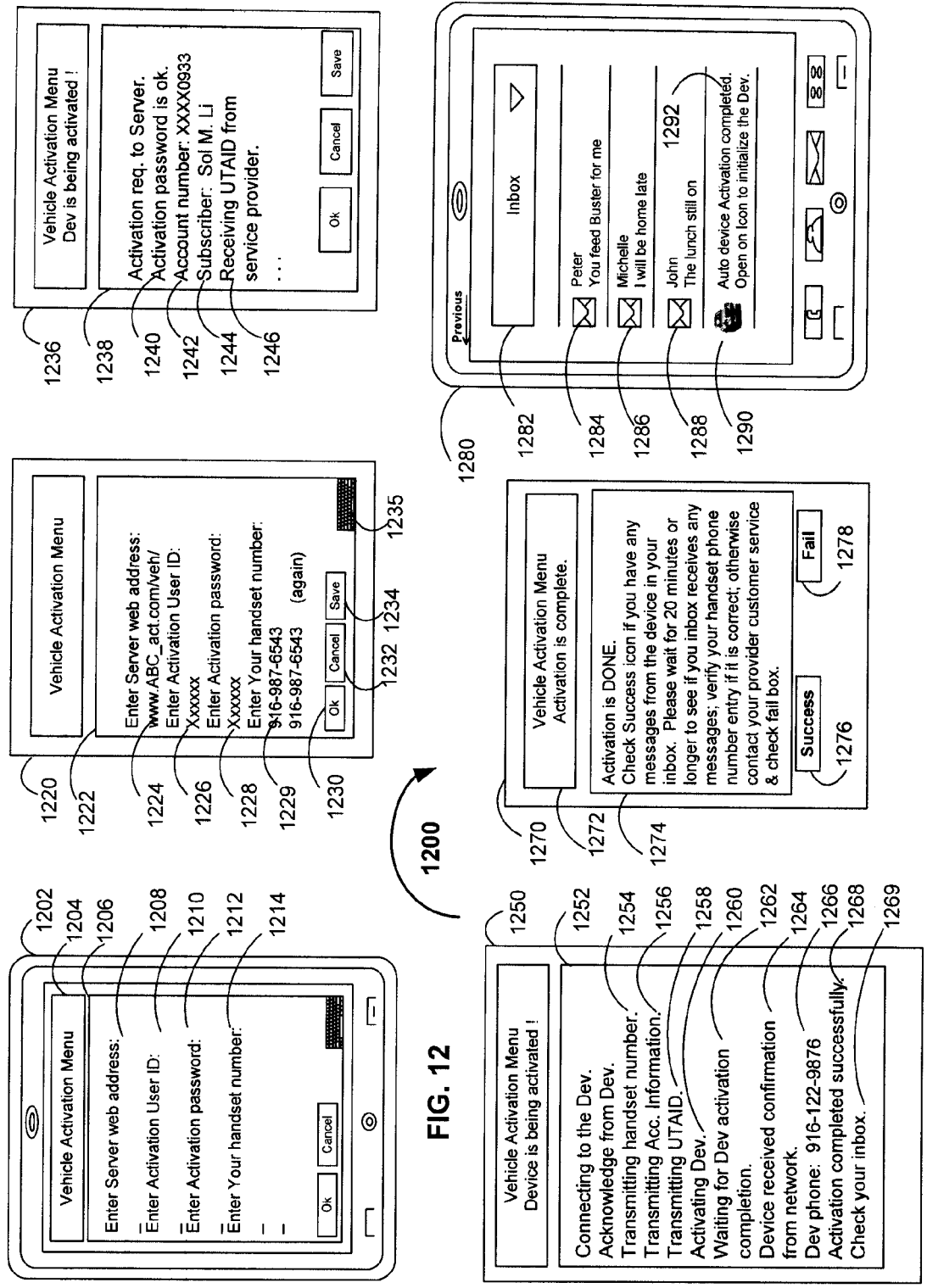
FIG. 12/14 shows a preferred example of handset's screen displays of present invention, in having Dev 106 activated into a network in auto/home application.

According to one aspect of the invention (FIGS. 11/13, 12/14, 15A-18), the user then starts the Dev activation process, after having applied and obtained the service account for the Dev from his/her cellular provider, by executing the Activate icon in Dev Facility Menu (FIG. 11/13). During or before the activation process which can be either NAM (FIG. 15A/15B), SIM (FIG. 16A/16B), Mod-SIM (FIG. 17/18) or any new or improved activation methodology, the handset receives from the service provider or provision server an UTAID (Unique Temporary Activation Identifier which contains activation key and other parameters), which it then passes (via SRC media) to the Dev. The Dev derives from UTAID, the activation key and transmits it along with its identifier(s) and other activation parameters to the provision server in order to complete the activation process (FIGS. 12/14, 15A-18). The Dev then registers and is thus recognized by the network, and from then on it is able to communicate with the handset and other registered mobile devices. During the activation process, the handset also transmits its phone number (automatically or entered by user) to the Dev, which later will send back (via cellular) to said handset, a confirmation message after it has been able to connect to the network. The handset (or any mobile device) phone number is preferably encoded, as part of the cellular (or other wireless long distance network) transmit packet(s) during the communication with the Dev, which only responds back if said phone number has been stored/recorded in its memory. As soon as the Dev receives the confirmation acknowledgement from the handset, it sends back an Initialization icon (1290/1490 in screen 1280/1480 of FIG. 12/14, containing its assigned phone number), which the user will execute to start his/her handset and the Dev initialization process (FIG. 19/20), allowing said handset to use said Dev's phone number in its communication with said Dev.

According to one aspect of the invention (FIG. 19/20), the user executes the just received Initialization icon (1290/1490 of FIG. 12/14) in his/her handset's inbox (screen 1280/1480 of FIG. 12/14) from the Dev 106, after said Dev 106 received a confirmation (executed by the Success icon 1276/1476 in screen 1270/1470 of FIG. 12/14) from the user. The handset 102 then navigates to screen 1902/2002 where the user can enter the required information. He/she then enters requested parameters, such as: the user's chosen account security password 1914/2014 and 1916/2016 (for added security), his/her handset own chosen password 1918/2018, email address (for password recovery), vehicle identification, home address, and emergency phone numbers (such as 911 in North America or other numbers depending on geographical and national locations), which all will be transmitted by the handset to the Dev for processing and storage. During the initialization, the handset also obtains and stores the Dev's phone number (1226) which is used by its application in their communication, as is known to those of ordinary skill in the art.

According to one aspect of the invention (FIG. 21A), a new handset 102 can be added (registered) into the Dev 106, by a registered handset 102; and will be able to control said Dev 106 just as said registered handset without any limitation.

According to one aspect of the invention (FIG. 21B), a new handset 102 can be added (registered) into the Dev 106, by a registered handset 102; and will have limited function in controlling said Dev 106.

According to one aspect of the invention (FIG. 22), the just newly added handset 102 receives from the Dev, the application download link and messages, instructing its owner to follow its instruction, in order for said handset to operate and communicate with the Dev, which will also notify the owner of the registering handset 102 when said newly handset completes its task.

According to one aspect of the invention (FIG. 23), a registered handset can be removed (deregistered) from the Dev by another registered handset.

According to one aspect of the invention (FIG. 24A), the Dev executes the password recovery process after the user failed to enter a matching password after three attempts. The Dev transmits the password recovery command to the Email Server, which will email the recovered password to said user.

According to one aspect of the invention (FIG. 24B), the user uses the handset to configure the Dev, in order to change, remove and/or update certain information, such as: vehicle license plate(s), house address, passwords, account number(s), email addresses, and emergency center phone numbers and the like.

According to one aspect of the invention (FIG. 24C), the user uses the handset to retrieve the device information from the Dev.

According to one aspect of the invention (FIG. 25), the user uses the new handset to register said handset into the Dev. The registration command requires the user to enter information, such as: the correct account security password, new handset's phone numbers (twice), handset passwords (twice), and Dev's phone number (which the new handset uses to transmit the command to, and will save Dev's phone number into its memory, when it receives the confirmation response to its registration from said Dev). The Dev verifies the account security password, it then checks to see both the handset phone number entries and its chosen password entries, each entered twice, are identical. If all the information is correct, the Dev will send the confirmation response and its device information to the handset; and from then on, they both can communicate with each other. During the registration process, the Dev will also transmit alert messages to other registered handset(s), if there are any in its memory, to inform the user(s) of such registration.

Figure 2:
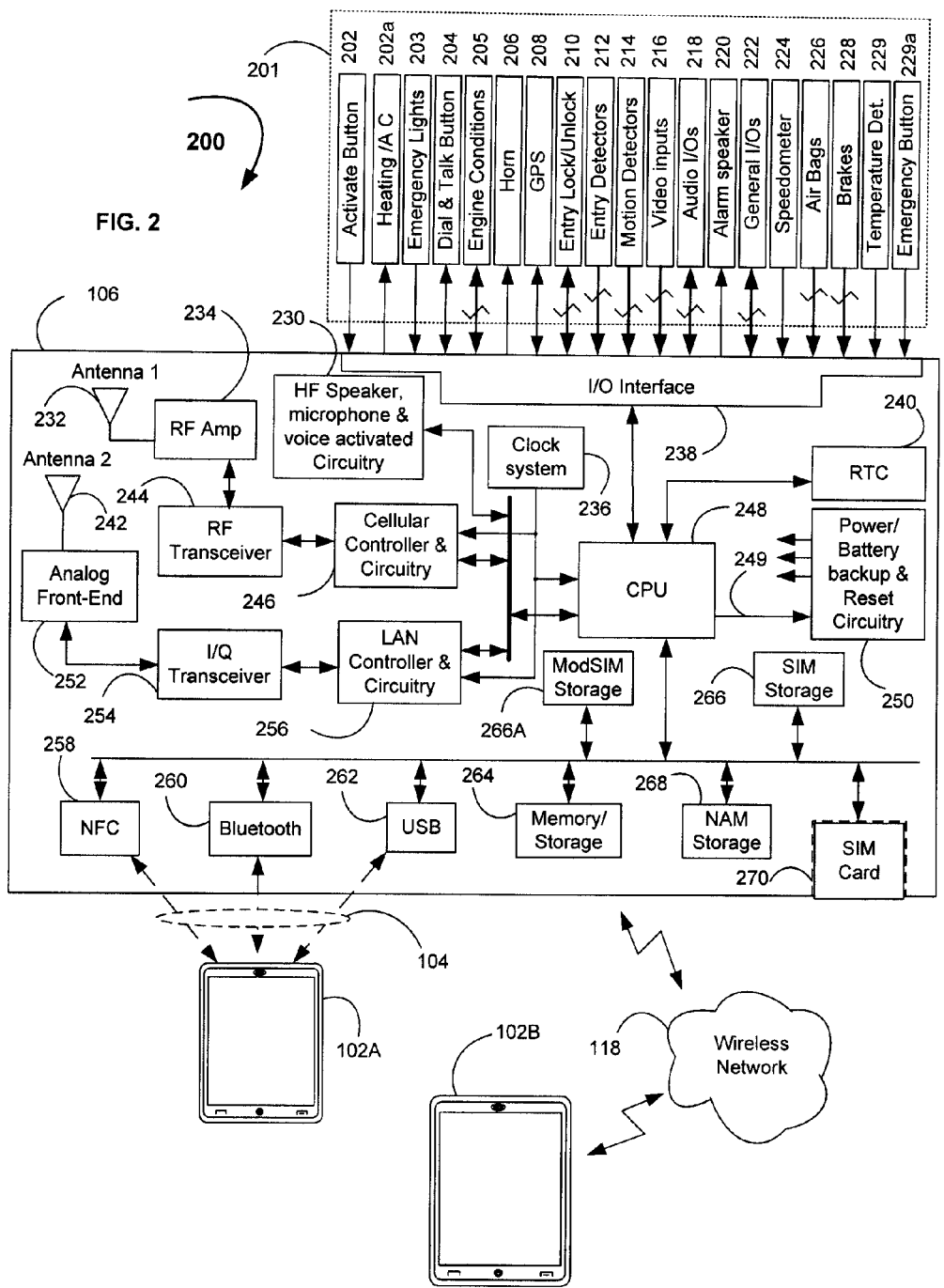
FIG. 2 shows a preferred example of one hardware functional block diagram of the present invention of Dev 106 in the automobile application.

According to one aspect of the invention (FIG. 26), the user attempts to activate or register a new handset into the Dev, using the activation button 202 (of FIG. 2/3/4). If the Dev does not have any cellular service at the time, it will start the activation process as described previously. Otherwise the Dev will inform the registering handset user that the right application is needed to run the process. The user then either downloads the application online (if the handset does not contain the application), or run the application (if the handset contains said software). (The Dev also checks to see if it has any registered handset's phone number in its memory. If it does not contain any [meaning it has not been activated with the aid of a handset], a SIM card must be plugged into its slot [270 in FIG. 2/3/4], it will allow the user to initialize by letting him/her to enter the security password for the account, the phone number of his/her registering handset and the chosen password for said handset). When the Dev receives the registration command and its data from the handset, as illustrated previously (in screen 2502 of FIG. 25), it verifies and processes the command and the data; it also alerts the other handset(s) of the attempted action (if there is any). During the registration process, if any alerted handset sends back a "Not Ok" message 2662, the registration is immediately aborted; or if the Dev receives an OK 2658, then the registration can start immediately without the account security password entries or verification. For added protection, the account security password is required for the user of the alerted handset before he/she is able to allow or not allow such process to take place.

According to one aspect of the invention (FIG. 27), the user uses the handset to update to the latest version of the application of the handset 102, and of the Dev 106. The handset obtains the Dev's current version app information from said Dev, and its latest version and the Dev's latest version from the App Server 108. When the user decides to update to the latest version, he/she just executes the update icon allowing the handset to receive the copy of the latest version app from the App Sever. The handset then sends the Dev's app update URL (or Dev's latest version app) along with update command to the Dev, and then the handset and the Dev, each updates its own latest version app (or alternatively, the handset 102 receives the Dev's update app from the App Server 108 and then transmits it to the Dev 106).

According to one aspect of the invention (FIG. 28/29), when it is time for the user to switch to another service provider, he/she goes through a similar activation process again, in order for the Dev 106 to be able to connect to the network of the new service provider. The user signs up and obtains a new UTAID from the new service provider, and preferably should (via his/her handset) activate the Dev 106 while it is still connecting to the current service provider network. The user therefore can do the activation anywhere (instead of having to be in the vicinity of the Dev 106 in order to communicate with it using the SRC media as the case in previous activation process in FIGS. 11/13 and 12/14)) since the handset still can communicate with the Dev 106 via the cellular network. As soon as the Dev 106 is activated and able to register, and then connected into the new network, its service to the previous network can be disconnected, and from then on the Dev 106 communicates with other handsets (mobile devices) in the new network. The Dev's device information file contains the same programmed data; in other words, there is no need for the user to reinitialize or reconfigure the Dev. Preferably the only difference is the new account number and possibly the Dev 106 has been assigned a different number. The handset 102 updates the Dev's phone number (regardless of it being a different number or not), and uses it from now on in its communication with the Dev 106. The Dev 106 also preferably sends command(s) to the other handset(s) so the user(s) of said handset(s) can also update the Dev's phone number.

According to one aspect of the invention (FIG. 30), the user uses the handset's Auto Control and Monitor menu to communicate with the Dev 106, in order to control the vehicle's electrical-mechanical components, such as: starting its ignition, locking/unlocking its doors, turning the alarm on/off, and the like, or to check the vehicle accessory status.

According to one aspect of the invention (FIGS. 31 and 32), the user uses the handset's GPS icon in the Auto Control and Monitor menu to communicate with the Dev 106, in order to enter the location address inputs into the vehicle GPS device, or retrieve the stored entries from GPS memory.

According to one aspect of the invention (FIGS. 33-37), the user uses the handset's Toll Fee Pay Account menu to communicate with the Dev 106, in order to set up the toll fee payment account on said Dev which will process, pay the required fee when demanded and record the transaction in its memory. The Dev 106 also transmits the transaction activities to the handset when the corresponding icon is executed on said handset 102.

According to one aspect of the invention (FIG. 38), the user uses the handset's vehicle Locator icon in the Control and Monitor menu to communicate with the Dev 106, in order to locate the current location of the vehicle. The Dev 106 then translates and transmits the current location command to the GPS, and passes the current GPS location information back to the handset 102.

According to one aspect of the invention (FIG. 39), the user uses his/her handset' Handset Locator icon in the Control and Monitor menu to communicate with the Dev 106, in locating a missing registered handset. The Dev 106 transmits back its listed registered handsets 102, which the user can choose from, in order for the Dev 106 to locate said handset 102.

According to one aspect of the invention (FIG. 40), the user uses the handset's Route Tracking and Speedo-Alert Program/Status icons in the Auto Control and Monitor menu to communicate with the Dev 106, in order to set up a certain speed limit recording history with the alert option and/or vehicle's route tracking history. The Dev 106 then interacts with the speedometer and the GPS to build up the history of when and where, the speed limit takes place, or just plain route tracking (where its track sampling time is programmable in minute time) which user can review later on with said handset. The user can also fill in, if needed, the network server destination for the off-Dev storage.

According to one aspect of the invention (FIG. 41A), the Dev 106 transmits a message preferably with video (or streaming video) data to the user's handset informing him/her that a certain event has happened to his/her vehicle, such as: a break-in. The user will be able to know the nature of the event, time and date and location, the event took place, and the registered handset phone numbers which have been alerted.

According to one aspect of the invention (FIG. 41B), the Dev 106 transmits a message preferably with video (or streaming video) data to the user's handset informing him/her that a certain event has happened to his/her vehicle, such as: a child or pet might have been left inside said parked vehicle. The user will be able to view the accompanied videos, and then takes appropriate actions with the handset, which transmits them to the Dev 106, such as: ignoring because of false alarm or confirming it by either taking one of a combination of these immediate and temporary measures: unlock the car door, lower down car windows, sound the horn, turn on the car alarm, turn heat or air on, flash a light, call emergency center, or that the driver in on his/her way to the car.

According to one aspect of the invention (FIG. 42), the user uses the handset's Engine Status icon in the Auto App menu to communicate with the Dev 106, in order to view the vehicle engine status remotely.

According to one aspect of the invention (FIG. 43), the user uses the handset's Alarm Configure icon in the Home Control and Monitor menu to communicate with the Dev 106, in order to configure the alarm I/O, such as: door and window entries, motion detectors, alarm speakers and horns, and cameras in more descriptive terms (instead of plain numeric values), such as: Door/Window Entry #1 into BR2 (bedroom #2 window), Motion input #1 into Hall (motion detector), Camera #5 into Back yard (camera), when he/she is at home, away, or far away from home.

According to one aspect of the invention (FIG. 44), the user uses the handset's Status/Monitor icon in the Home Control and Monitor menu to communicate with the Dev 106, in order to monitor and view various windows, motion detectors and cameras in the house, when he/she is at home, away, or far away from home.

According to one aspect of the invention (FIG. 45), the user uses the handset's Program/Control icon in the Home Security menu to communicate with the Dev 106, in order to program and arm the house alarm system, when he/she is at home, away, or far away from home.

According to one aspect of the invention (FIG. 46), the Dev 106 transmits a message, preferably with video (or streaming video) data, to the user's handset informing him/her a certain event has happened to his/her house, such as: a break-in. The user then can view and find out through the handset where and when (which entries and time) the event took place, when he/she is away, or far away from home.

According to one aspect of the invention (FIG. 47), the Dev 106 transmits a message, preferably with video (or streaming video) data, to the user's handset informing him/her a certain event has happened in the camera monitoring device, such as: detection of a moving object outside his/her house, when the owner is at home, away, or far away from home.

According to one aspect of the invention (FIGS. 48-51), the user uses the handset's Appliance Add icon in the Home Appliances menu to communicate with the Dev 106, in order to discover or find out the presence of house-hold devices. The handset then has them connected and transferred their software applications to the Dev 106, and then to the handset; or have them provided the URLs (web links), which allow the user to download the software applications to his/her handset which also transmit them to the Dev, or the Dev can download automatically the app from said URLs. The user can then run these apps to control these said devices remotely, when he/she is at home, away, or far away from home.

According to one aspect of the invention (FIG. 52), the user uses the handset's Appliance Remove icon in the Home Appliances menu to communicate with the Dev 106, in order to remove a certain house-hold device or devices which are no longer in use, when he/she is at home, away, or far away from home.

According to one aspect of the invention (FIG. 53), both the user's handset 102 and the Dev 106 communicate with household devices via the SRC networks, while he/she is at home.

According to one aspect of the invention (FIG. 54), the user's handset 102 communicates with both the Dev 106 and the household devices via the SRC network, while he/she is at home (the communication between the Dev and the household appliances is maintained but not active because of the presence of the handset, meaning the Dev will not pass the handset's commands to said household appliances).

According to one aspect of the invention (FIG. 55A), the user uses the handset's Cable Box/TV icon in the Home Appliances menu to communicate with the Dev 106, in order to program, record, and view the cable and television programs, when he/she is at home, away, or far away from home.

According to one aspect of the invention (FIG. 55B), the user uses the handset's Garage Opener icon in the Home Appliances menu or in the Home App menu to communicate with the Dev 106, in order to open or close the garage door(s). The Dev also lets user know if the garage is closed or opened, when he/she is at home, away, or far away from home.

According to one aspect of the invention (FIG. 56A), the user uses the handset's Heat/AC icon in the Home Appliances menu to communicate with the Dev 106, in order to program the central air unit, such as: when and at what degree to turn it on and at what degree to turn it off, to control in real-time, and view its status at any moment, when he/she is at home, away, or far away from home.

According to one aspect of the invention (FIG. 56B), the user uses the handset's Door Lock icon in the Home Appliances menu or in the Home App menu to communicate with the Dev 106, in order to lock or unlock the main door entry, when he/she is at home, away, or far away from home.

According to one aspect of the invention (FIG. 57), the user uses the handset's Sprinkler icon in the Home Appliances menu to communicate with the Dev 106, in order to program the landscape sprinkler, such as: on which day(s) of the week, at what time and for how long, and which station(s) to turn the sprinkler system on to water the landscape (garden, and house plants and the like). The sprinkler can also be turned on or off at any moment by the user via the handset at home, away, or far away from home.

According to one aspect of the invention (FIGS. 58 and 59), the user uses the handset's Electric Meter icon in the Home Appliances menu to communicate with the Dev 106, in order to set up the monthly electricity payment account, so the Dev 106 will acquire the electricity meter reading every month, and then transmits it to the utility company which will receive the payment automatically or bill the user who will then pay it via his/her handset, when he/she is at home, away, or far away from home.

Figure 60:
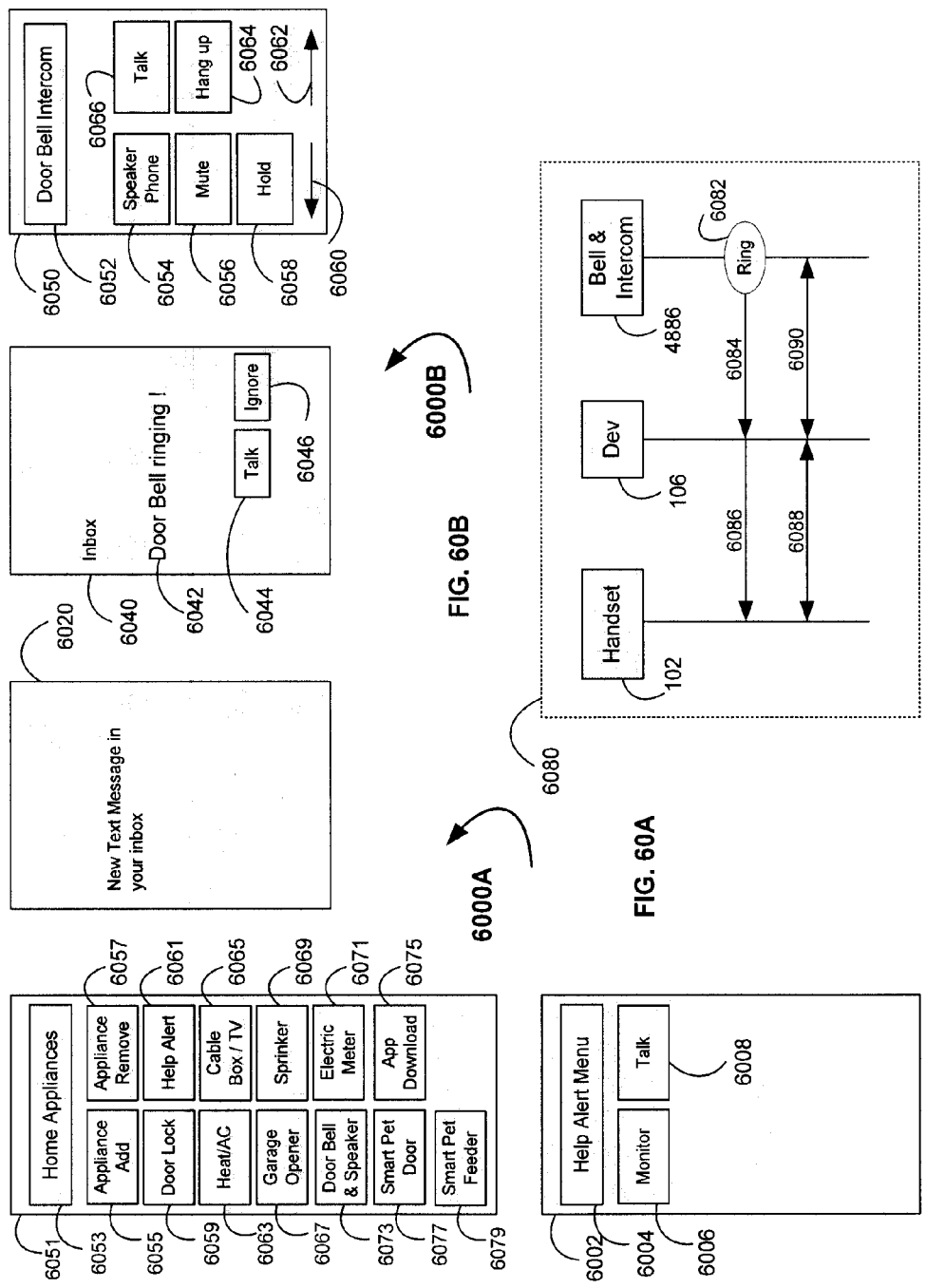
FIG. 60A shows a preferred example of handset's screen displays and a flow diagram, presenting the communication of handset 102 and Dev 106, in the monitoring and talking to the wearer of Help Alert device 4874, relating to the present invention in the home application.
FIG. 60B shows a preferred example of handset's screens and flow diagram, presenting the communication of user using the handset 102 to communicate to intercom 4886 via Dev 106, in answering the door bell that is rang by a visitor, relating to the present invention in the home application.

According to one aspect of the invention (FIG. 60A), the user uses the handset's Help Alert icon in the Home Appliances menu to communicate with the Dev 106, in order to monitor and communicate with the wearer of the Help Alert device via his/her handset, when he/she is far away from the premises.

According to one aspect of the invention (FIG. 60B), the user uses the handset's Door Bell & Intercom icon in the Home Appliances menu to communicate with the Dev 106, which connects to the intercom letting the user answer (via the handset) when someone rings the door bell. This feature allows the owner away from home to answer the door just like being at home.

According to one aspect of the invention (FIG. 61), the user uses the handset's Smart Pet Door icon in the Home Appliances menu to communicate with the Dev 106, in order to program and set up the Smart Pet Door system for the pets' daily needs, and to control its components in real-time, when he/she is at home, away, or far away from home.

According to one aspect of the invention (FIG. 62), Dev 106 integrating in the robotic application, allows a plurality of users to program, control, direct, command, and monitor its functions in its surrounding environment, while at the same time, be informed of any expected and unexpected events relating to its application.

FIG. 1 illustrates a preferred example of embodiment 100 of the present invention. It presents the wireless network 118 where all devices have access to and use to communicate with one another. Network 118 is commonly known as a cellular network or the type of wireless network (such as wide area cellular network—GSM network, CDMA network, WCDMA network, TD-SCDMA network, NAMPS network and/or networks operating in accordance with any derivatives—GPRS, EDGE, CDMA2000, LTE, TD-LTE—based on GSM/EDGE and UMTS/HSPA, 3GPP, 4G LTE among other similar and future medium, such as: satellite network or a hybrid network consisting many types of media—wire, wireless, terrestrial and satellite) provided by the service provider(s). The invented device/appliance or Dev (for short) 106 is the present invention communicating with the handset 102 which also can be a smart phone, tablet PC, laptop PC, iPad-like device, PDA (Personal Digital Assistant), or any portable, mobile electronic device through SRC media 104 (Short Range Communication) which it uses during an activation process or when they are within said SRC network range. The Dev 106 is shown either residing in an automobile 120, a residential house (or business premises) 122 or a general robotic device (equipment) 124.

The Cellular Service Provider or Service Provider 112 is the provider of cellular communication service to the Dev 106 thus recognizing and allowing it to communicate with other cellular devices through wireless network 118. Before the Service Provider 112 can recognize the Dev 106, the Dev 106 has to be activated. The activation process involves the exchanges of pre-usage/pre-programmed and/or specific unique issued information between the Dev 106 and the Service Provider 112 itself or a combination of its network computers/servers [such as MSC (Message Switching Center), VLR (Visitor Location Register), HLR (Home Location Register), AuC (Authenticity Center), Activation Server, and other backend systems as are known to those of ordinary skill in the art], which are proprietary in nature to the service provider but known in this invention simply as Provision Server 114. The Dev 106 contains some of the parameters for activation in its internal memory storage. Some of them the Dev 106 obtained by downloading from the service provider 112 and/or the Provision Server 114 via the handset 102. The App Server 108 can be either provided by the Dev 106 manufacturer (not shown in FIG. 1) and/or by the Service Provider 112 operator (also not shown in FIG. 1 in cooperation with the Dev 106 manufacturer). The App Server 108 in latter case can be part of the Service Provider 112 intranet network just as shown in the backend connection 120 between the Provision Server 114 and the Service Provider 112.

FIG. 1 also shows BTS (Base Transceiver Stations) or The Towers 110 (as illustration herein, the communication between the various devices going to the Service Provider 112 but actually goes through one or more Towers 110 first). The information from one device goes through one or more towers 110 and then is transmitted to one of the regional Service Provider 112. The Service Provider 112 then again passes said information to one or more towers 110 where it finally reaches the destination server/computer.

All these components, such as: Towers 110, Service Provider 112, and Provision Server 114, and the like can also be referred to as Public Land Mobile Network (PLMN). So when Provision Server 114 or Service Provider 112 is referred to in the herein examples, it also involves the function of the whole PLMN with the main task falling into said mentioned component (Provision Server or Service Provider). The Email Server 116 acts as an email server to email password recovery to the user's email address, when requested by the Dev 106 in case the user has problems entering the required password.

Figure 3:
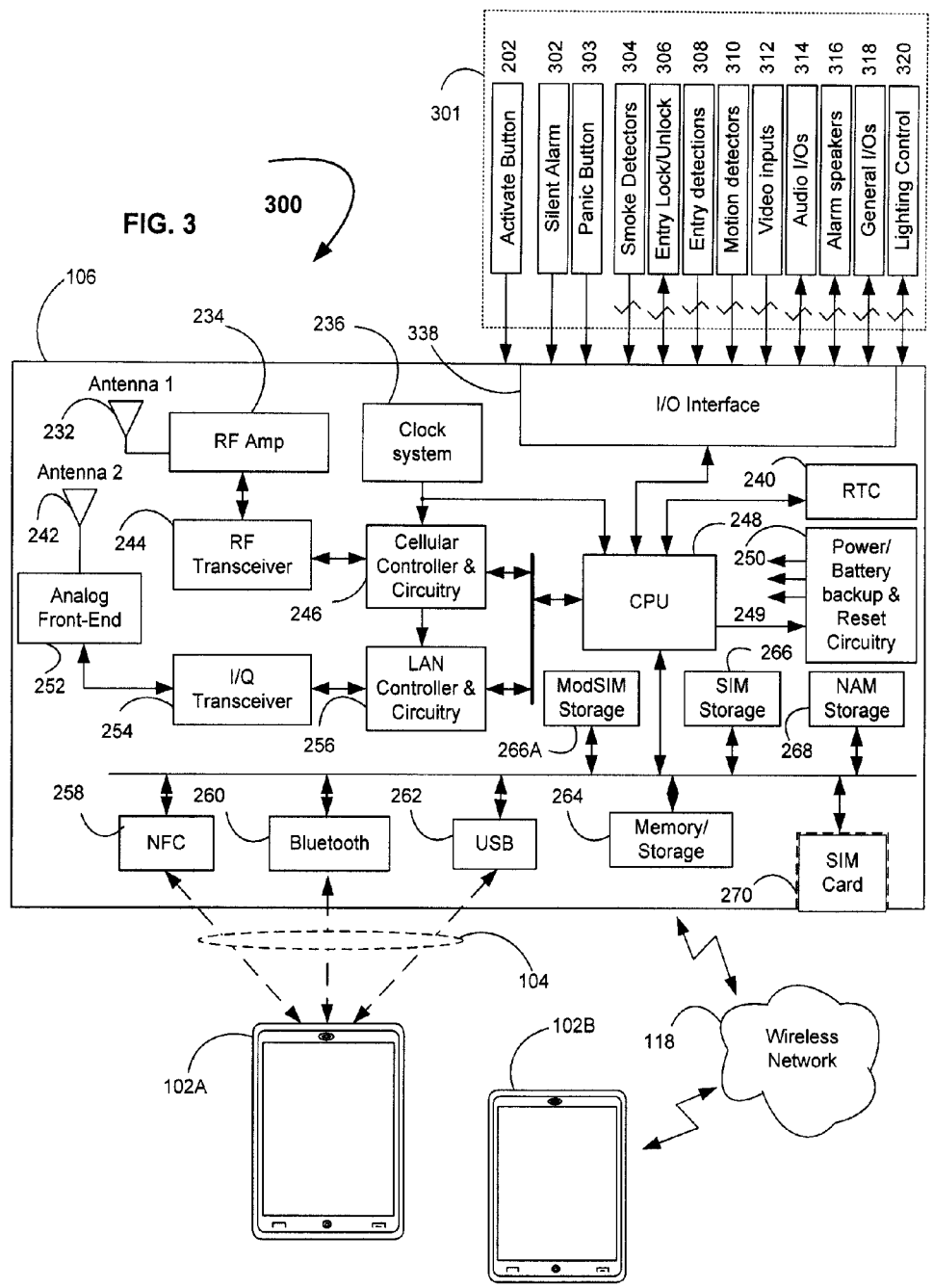
FIG. 3 shows a preferred example of second variation of hardware functional block diagram of the present invention of Dev 106 in the home application.
Figure 4:
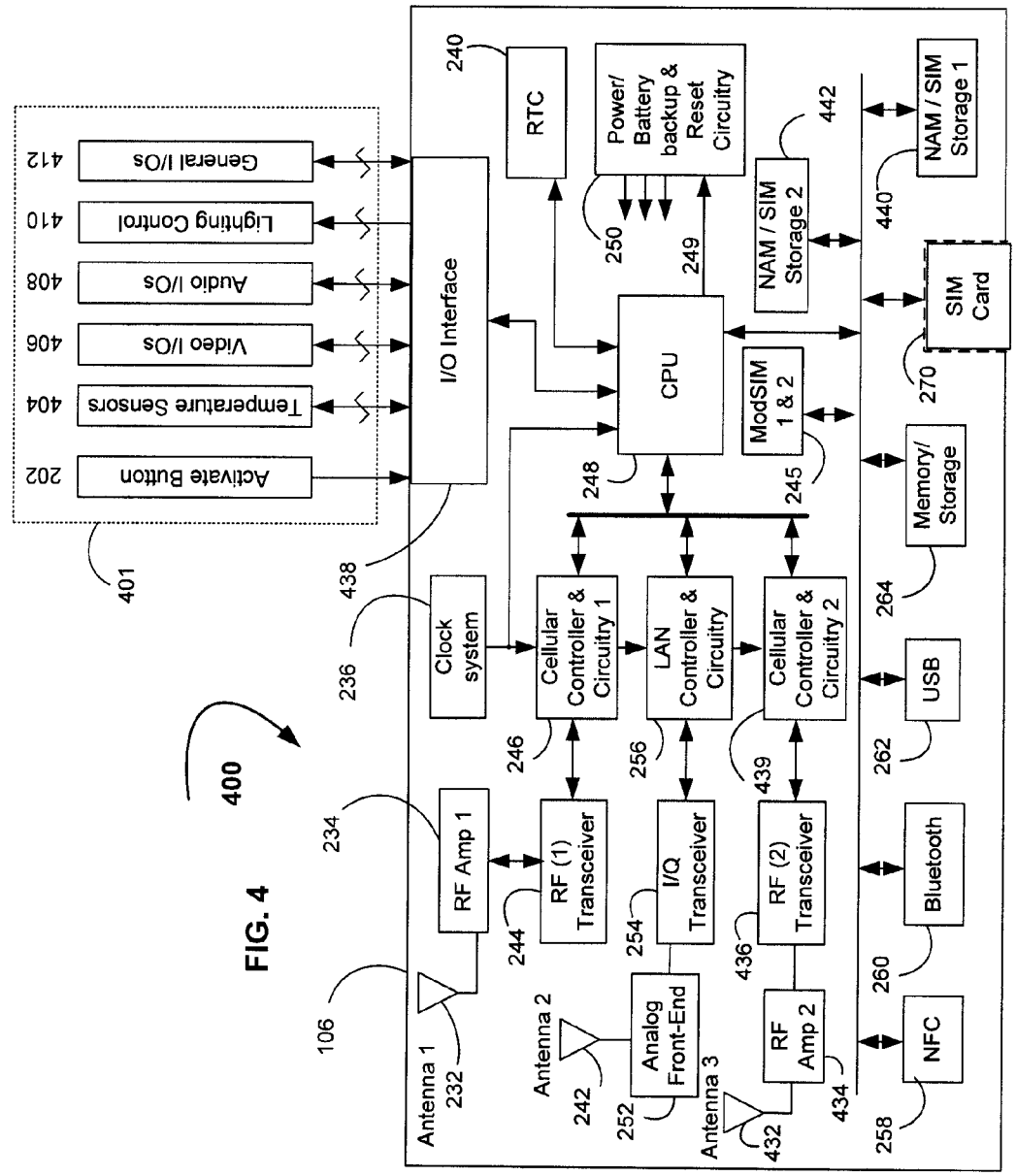
FIG. 4 shows a preferred example of third variation of hardware functional block diagram of the present invention of Dev 106 in robotic application.

FIGS. 2-4 illustrate preferred examples of embodiments 200, 300 and 400 of the present invention in terms of hardware block diagrams as are known to those of ordinary skill in the art. They present the Dev 106 integrating and interfacing into the car control and monitor system as represented by illustrations 200 in FIG. 2, the house control and monitor system 300 in FIG. 3, and the general robotic control and monitor system 400 in FIG. 4. The principle components of the Dev 106 are the CPU 248, its associated cellular phone circuitry 246, and its RF interface circuitry (RF Transceiver 244, RF Amp 234 and Antenna 232). An example of the CPU and its associated circuitry, or chipset is X-GOLD 101 single-chip by Intel Corp., NEON Cortex-A9 licensed by ARM, and others, such as: Qualcomm and many, as are known to those of ordinary skill in the art.

Block diagrams 200, 300 and 400 also include the wireless LAN controllers (which may also referred to as Wi-Fi or WIFI communication over one of more wireless local area network WLAN) and its associate circuitry 256, 254, 252 and 242, the volatile and non-volatile memory storage 264

(flash, SDRAM, RAM, EEPROM, . . . ), clock system 236, I/O interface 238/338/438, Real Time Clock 240 and power and battery backup 250. They also include one or more of the SRC (Short Range Communication) devices, such as: NFC 258, Bluetooth 260, wireless/wire USB 262, and other wireless radio frequency (RF) technology (not shown). It also contains non-volatile memory storage areas for NAM 268, SIM 266, ModSIM 266A parameter storage, and slot 270 for SIM card. The NAM 268, SIM 266 and ModSIM parameter storages preferably can be incorporated into the Memory Storage 264, which is also storage for program code, application software, data, and OS firmware as are known by those of ordinary skill in the art. Embodiment 200 includes the Hands-free Speaker, Microphone, and voice activated circuitry 230 which can also reside in embodiments 300 and 400. The Hands-free Speaker, Microphone, and voice activated circuitry application 532 can also reside in embodiment 600 while embodiment 400 offers a plurality of cellular handset interface circuitry 439, 436, 434, and 432.

FIG. 2 also includes some inputs and outputs (I/O) which are very useful and life-saving, such as when the driver runs into an accident, where he/she may not have the mental or physical capability to take immediate actions to deal with the circumstances. The Input Dial & Talk button 204 offers a convenient way, when the driver does not happen to have the handset in his/her possession, to get in touch with a family member (registered handset 102) when the occasion requires.

Air Bag (226): In the case when there is an accident, which caused big impact to the car and/or inflated its Air Bag (226 in FIG. 2), the Dev 106 transmits alert emergency messages with the vehicle location to the Emergency Center (not shown) and to registered handsets at least one time (i.e., 911 in US and Canada, China 110 or similarly depending on national and geographical locations as mentioned earlier in the text). The Dev 106 also dials Emergency Center, and turns on the Hands-Free Microphone and Speaker (230 in FIG. 2), so the driver can communicate with the Emergency Center operator. If no response comes back from the Emergency Center within a short period of time (i.e., one minute or two; in other words there is possibly no cellular service available at the accident location), the Dev 106 will transmit emergency messages with the vehicle location to the Emergency Center (not shown) via satellite network if programmed to do so (not shown) or via a hybrid network consisting many types of media—wire, wireless, terrestrial and satellite as are known to those of ordinary skill in the art. If the Dev 106 still gets no response, after its message transmission, from the Emergency Center, whatsoever, it will transmit a satellite emergency command to the GPS (3182 in FIG. 31), which in turn preferably transmits it to the Emergency Center, along with its GPS location (not shown) via satellite.

Emergency Button (229a): Preferably located inside the vehicle, when pushed (multiple times in a row) will transmit an electrical signal to the Dev 106 which will transmit the emergency messages with the current GPS location to the other registered handsets 102 and the Emergency Center (not shown). The Dev 106 also dials the Emergency Center and turns on the Hands-Free Microphone and Speaker (230) to allow the driver of the vehicle to communicate with the Emergency Center personnel. The Dev 106 also dials a registered handset and (if it answers) connects to the Hands-Free Microphone and Speaker (230) to allow the driver of the vehicle to communicate with the user (i.e.; family member) of said handset.

Dial & Talk Button (204): Also allows the driver of the vehicle to communicate with a registered handset 102 user in case he/she does not have the handset in his/her possession or said handset does not function properly at the time.

FIGS. 2 and 3 also illustrate the communication between the handset 102A and the Dev 106 via the SRC network 104, such as: during the activation process (FIGS. 8, 9, 11/13, 12/14), or when they are within their short range communication (SRC) medium, and via the cellular (or other wireless) network 118 during normal operation.

Figure 5:
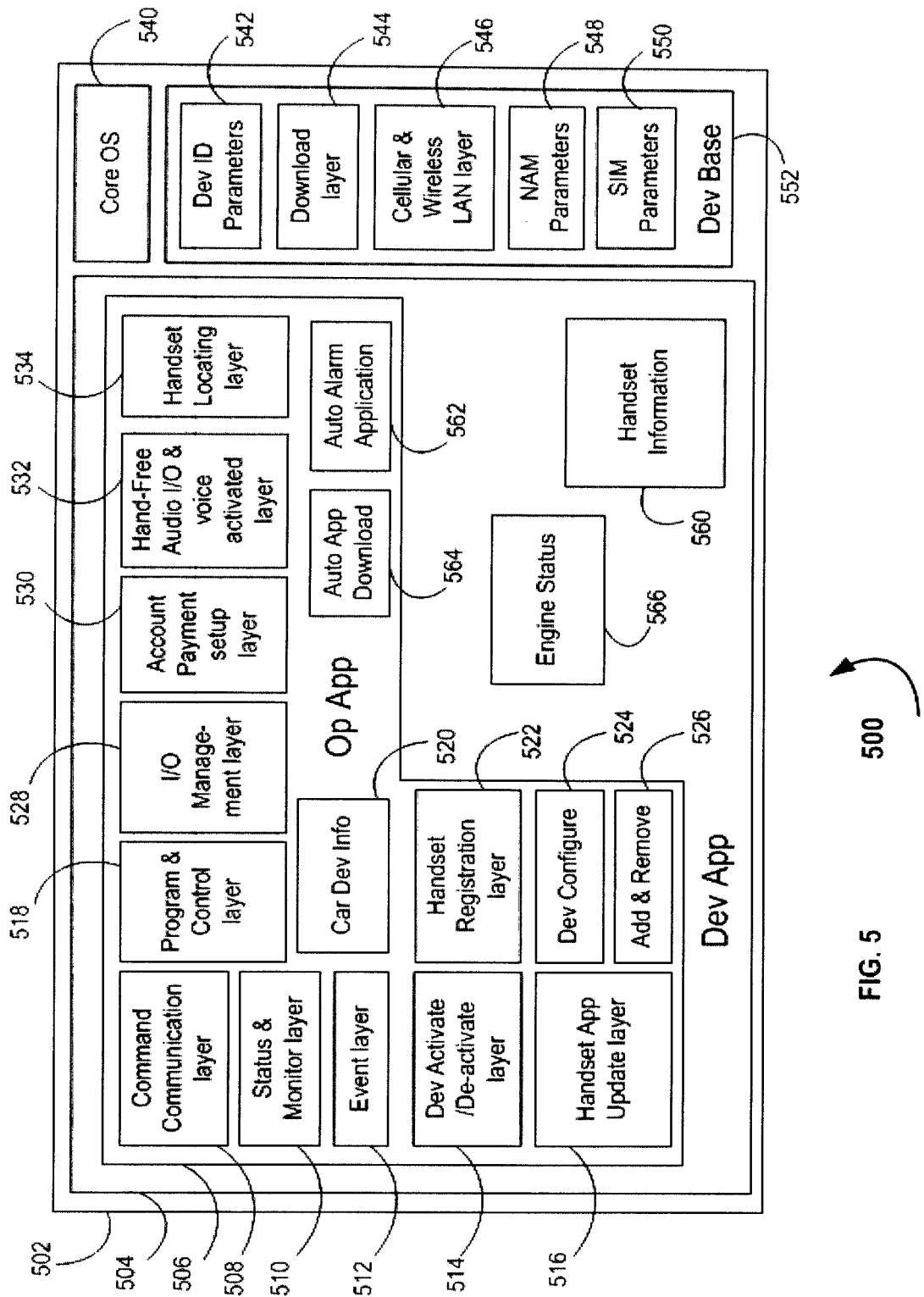
FIG. 5 shows a preferred example of one software block diagram of the present invention of Dev 106 in the auto application.
Figure 6:
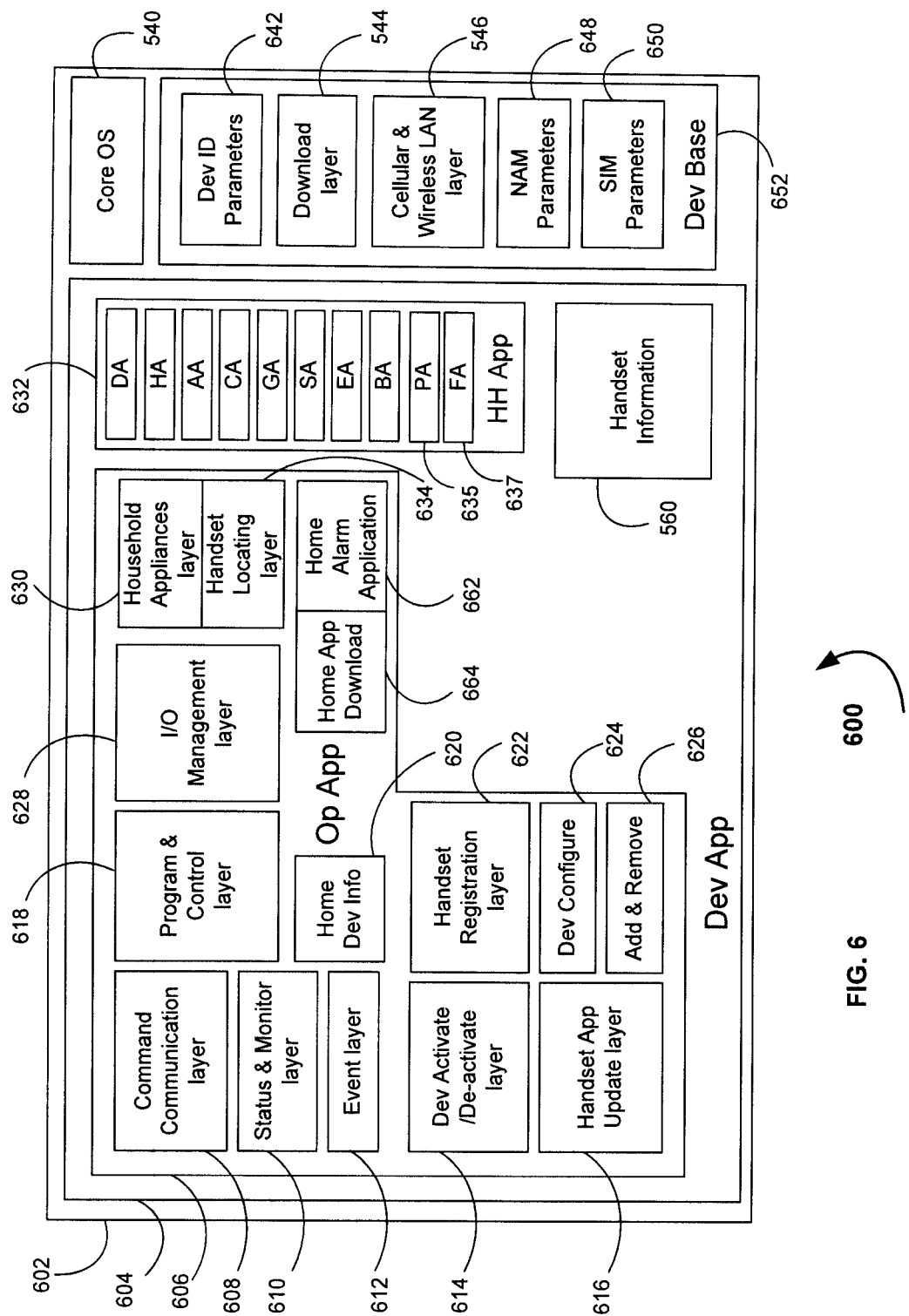
FIG. 6 shows a preferred example of second variation of software block diagram of the present invention of Dev 106 in the home application.

FIGS. 5 and 6 illustrate preferred examples of embodiments 500 and 600 of the present invention in terms of software block diagrams as are known to those of ordinary skill in the art. Illustration 502 represents the Auto Application and illustration 602 represents the Home Application. Each of these two preferably contains two principle software blocks:

Dev Base 552/652 along with core OS 540 (such as iOS, Google's Android mobile OS) forms the basic kernel. The Dev base 552/652 preferably consists of the Dev ID Parameter 542/642 (contains manufacturer name and production date, S/N number, model number, plant location), the Download layer/module 544 (used to download the updated version of Op App module 506/606 when the current version of its software application needs to be updated), the Cellular and Wireless LAN layer/module 546 (cellular and wireless LAN device driver and management module), the NAM (Name Assignment Module) 548/648 and the SIM (Subscriber Identity Module) 550/650 which contain all NAM and SIM related information parameters, such as: ESN, IMSI, etc.

Dev App 504/604 runs the application software allowing the Dev 106 to communicate with other wireless devices—decode and execute the program/control commands and the status/monitor commands received from the handset 102. The Dev App 504/604 preferably consists of two modules:

Handset Information module 560 (common for both automobile and home applications—consists of the handset 102 information such as: user's handset phone number, account number, passwords, other handsets' phone numbers, email addresses, etc.).

Op App module 506/606 preferably consists of the Command Communication layer/module 508/608 which receives the commands from and transmits the statuses to the handset 102, the Status and Monitor layer/module 510/610 which decodes and executes the status and monitor commands from the handset 102, the Event layer/module 512/612 which detects the changes in Dev's I/O and events, the Program and Control layer/module 518/618 which decodes and executes the program and control commands from the handset 102, the Dev Activate/De-activate layer/module 514/614 which decodes and executes the activation/de-activation commands from the handset 102, the Handset App Update layer/module 516/616 which decodes and executes the handset information update commands from the handset 102, the Handset Registration layer/module 522/622 which decodes and executes the handset registration commands from the handset 102, the Dev Configure layer/module 524/624 which decodes and executes the Dev configuration commands from the handset 102, the Add and Remove layer/module 526/626 which decodes and executes the add and remove handsets and parameters commands from the handset 102, the Car/Home (business) Dev Info 520/620 which fetches the Dev information to the handset 102, the Auto/Home Alarm Application module 562/662 which executes and runs the alarm application, the Auto/Home App Download 564/664 which decodes and executes the application download from the handset 102, the Handset Locating layer/module 534/634 which search for a missing registered handset, and the I/O Management layer/module 528/628 which allows the Dev 106 communicate with the I/O peripherals 201/301/401.

Car Op App module 506 and Home Op App module 606 preferably contain some other modules which are only applicable to each own functions. In the case of the car application, the Op App module 506 preferably contains the Account Payment setup layer/module 530, the Hands-free Audio I/O layer 532 (used for voice triggered Dev activation) that allows the Dev 106 to communicate in hands-free mode, with the driver during toll collector fee transaction or commands the Dev 106 to dial and connect to an emergency center, thus allowing the driver to communicate in hands-free with the emergency personnel. In the case of the home application, the module 606 preferably contains the Home Appliance layer/module 630 which discovers the household appliances/equipments, downloads their online applications or provides their download links to handset 102); then stores, executes the HH App 632 as commanded by the handset 102 (Household Appliances icon 1344 FIG. 13) in communication with a plurality of household appliances/equipments.

A pre-programmed version of Op App 506/606 already resides in the Dev's memory and an updated version of it can be downloaded during the activation 950/1050 (FIG. 9/10) if required or by the user executing the Handset and Dev App Update icon 1164/1364 (FIG. 11/13)

Dev App 504/604 preferably contains the communication and application functions interacting with the resident (or on-device) functions and the OS kernel which provides a uniform interface to the CPU and its environment. The kernel manages the CPU resource by allocating task (RTOS) for each function, such as: Command Communication layer/module, IPC (Inter-Process Communication between multiple tasks or Process-Cooperation), memory management, file system (FS), I/O device management, network management (cellular, LAN and other wireless networks), and associated drivers (all are not shown).

Figure 7A:
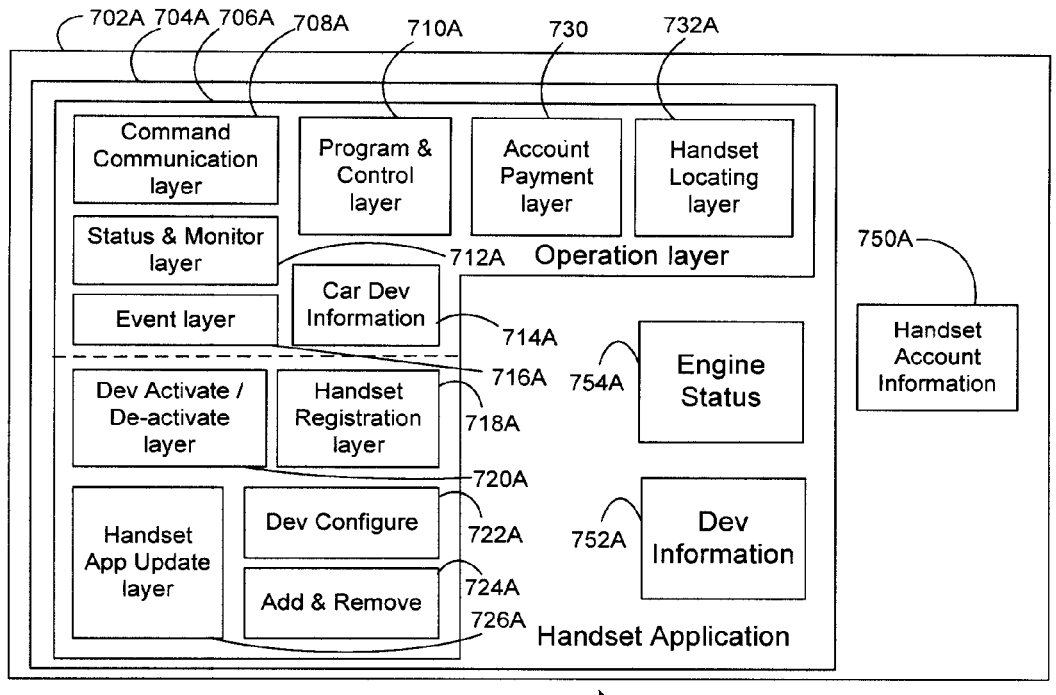
FIG. 7A/7B shows a preferred example of software block diagram on handset 102, related to the present invention in communication with Dev 106 in automobile/home application.
Figure 7B:
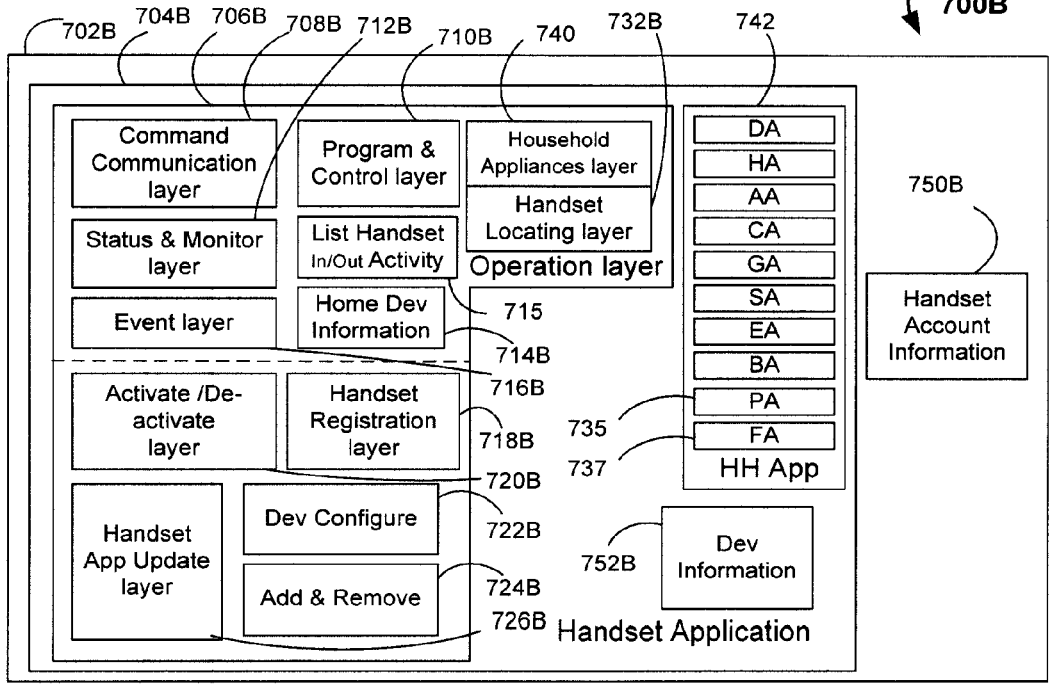

FIGS. 7A and 7B illustrate preferred examples of embodiments 700A and 700B of the present invention in terms of software block diagrams residing on the registered handset(s) 102. Illustration 702A is the counter part of 502 in FIG. 5 and illustration 702B is the counter part of 602 in FIG. 6 as are known to those of ordinary skill in the art.

Both the Handset Application 704A of the handset 102 in FIG. 7A and the Dev App 504 of the Dev 106 in FIG. 5 are used to communicate to each another. For each module in the Operation layer 706A of FIG. 7A, there is an equivalent counterpart module in the Op App 506 of FIG. 5. An example is when the user wants to see the car device information. The user browses through the handset 102 to the Auto Dev Facility Menu 1150 which preferably contains the Dev Info icon 1166, which when executed, makes the handset 102 navigate to the Auto Device Information screen 2410C (FIG. 24C). All the actions/functions have been preferably decoded and executed by the Command Communication layer/module 708A and the Car Dev Information module 714A; which also communicate with other resident (on-device) modules residing on the handset 102 including displaying screens by the "screen display module" (not shown) and sending messages/commands to the Dev 106, and receiving messages/responses from the Dev 106 through the "transceiver module" (not shown) as are known to those of ordinary skill in the art.

The handset 102 transmits the "car Dev information" message/command to the Dev 106. The command/message is then received and decoded by the Command Communication layer/module 508 and executed by the Car Dev Info module 520 of Dev 106 in FIG. 5. The Dev 106 then transmits the requested data back to the handset 102 which receives and displays the information as shown on the Auto Device Information screen 2410C (FIG. 24C).

Similarly, both the Handset Application 704B of the handset 102 in FIG. 7B and the Dev Application 604 of Dev 106 in FIG. 6 are used to communicate with each another. For each module in the Operation layer 706B of FIG. 7B, there is an equivalent counterpart module in the Op App 606 of FIG. 6.

Figure 46:
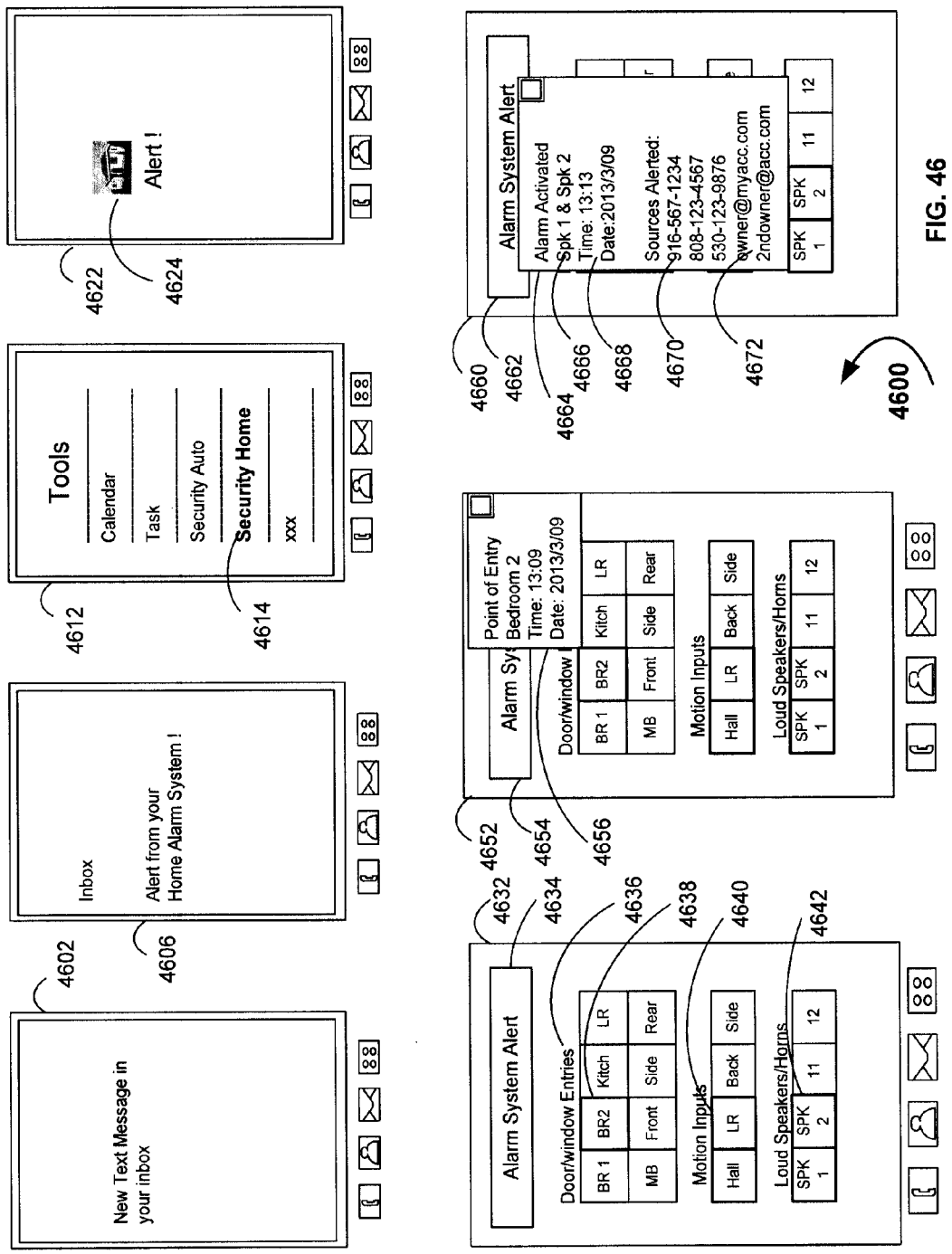
FIG. 46 shows a preferred example of handset's screen displays, presenting an alert from Dev 106 to handset 102, when an unauthorized event occurs, relating to the present invention in the home application.

An example is when an unauthorized entry/break-in to the house as indicated in illustration 4632 through Bedroom 2 (BR2 4638) in FIG. 46 (one of the inputs of the Entry detections 308 in FIG. 3) produces an alarm which sends a signal to the Dev 106 and is handled by the Event layer/module 612 in FIG. 6. The Event layer/module 612 decodes the break-in, which is one of the inputs of the Entry detections 308 FIG. 3 into BR2 (Bed Room 2) window and passes the information to the Command Communication layer/module 608 FIG. 6 which transmits it along with a message (or messages) to the handset 102 alerting its user of an break-in event. At handset 102, the Command Communication layer/module (708B in FIG. 7B) receives and decodes the message and passes it and its data to the Event layer/module 716B which executes and retains data in its memory ready to be displayed (as indicated by illustrations 4632, 4652 and 4660 in FIG. 46) when the user views the displayed message(s) after navigating through several display screens (as indicated by illustrations 4602, 4606, 4612 and 4622 in FIG. 46) as are known by those of skill in the art.

FIGS. 8, 9 and 10 illustrate preferred examples of embodiments 800, 900, and 1000 of the present invention in the handset 102 having the activation and application software downloaded into its memory storage from the App Server 108.

Before being able to communicate with the Dev 106, the handset 102 has to have compatible software application in its Memory/Storage area 264 FIG. 2/3/4. While the user attempts to have the Dev 106 activated by pushing the activation button (located somewhere near the garage button on the lower side of the interior rear view mirror, in the case of the automobile application; or using the voice activated circuitry (230 of FIG. 2) while inside the car; or an activation button inside the enclosure in the case of the home application), the newly Dev 106 (has not been activated nor registered) sends the activation software request message/command step 802 to the handset 102 via SRC (Short Range Communication) 104. When no response or unrecognized response comes back from the handset 102, the Dev 106 sends another message step 804 to the handset 102 inbox, indicating no associate software existing in the handset 102 (step 820 in FIG. 8, which is shown in more detail as in handset display screen 902/1002 in FIG. 9/10). The user then screen touches the web address link (URL) 906/1006 (FIG.

9/10), which makes the handset 102 send the application menu download request step 806 to the App Server 108 (FIG. 8). The App Server 108 then transmits back the requested information step 808 to the handset 102 as shown in the handset display 822 presented in more detail in screen 920/1020 (FIG. 9/10).

Screen 920/1020 presents the Vehicle/Home Control & Alarm application systems 924/1024 supporting some of the most popular OS (Operating System) based handsets 102, such as: Android (926/1026), iOS (928/1028), Windows (930/1030), and others (932/1032). These are some of the well-known OS in the U.S. and majority of the world, but the Dev 106 and its application software in the present invention will also support still being developed and yet to be invented OS anywhere in the world. The running software in Application Download Menu 922/1022 preferably auto-detects in this exemplary embodiment that handset 102 is Android based and presents the self-download link (URL) 934/1034 so the right OS based App download request (step 810 of FIG. 8) is self-transmitted by the handset 102 to the App Server 108 (when the timer expires—i.e., 10 seconds). The App Server 108 then transmits the requested application (step 812 of FIG. 8) to the handset 102 which displays it on screen 824 which is shown in more detail in several screens 940/1040, 960/1060 and 980/1080 (FIG. 9/10).

Screen 940/1040 shows the application being downloaded 944/1044, its model or serial number 942/1042, and message to the user to check the tool box 948/1048 for the presence of the software. The user then flips to screen 960/1060 and selects (e.g., executes) the Auto/Home Application 962/1064 which takes to screen 980/1080, which shows the icon 982/1082 representing the just downloaded software. During its own application download, the handset 102 also preferably displays the updating status of Dev application software 950/1050, if there is any update requirement from the App Server 108 to the Dev 106. During the handset's own application download (step 814), the Dev's application may need to be updated from the App Server to the Dev (step 816).

User can also preferably without receiving the message from the Dev 106 in his handset's inbox 902/102, goes online and types in the right address 906/1006 to download the activation and application into his/her handset 102.

FIG. 11/13 illustrates a preferred example of embodiment 1100/1300 of the present invention for auto/home application. It illustrates what first preferably needs to be done after the activation and application 1104/1304 has been downloaded into the handset 102. The handset 102 starts at screen 1102/1302 which shows the Auto/Home App 1104/1304 has been completely downloaded into the handset 102 after the user flips through screens 902/1002, 920/1020, 940/1040, 960/1060, and 980/1080 then executes the appropriate link and icons regarding the auto/home application download. Screen 980/1080 is repeated as screen 1102/1302 containing the Auto/Home App icon 1104/1304. When said icon 1104/1304 is executed by the user, it will make the handset 102 navigate to screen 1120/1320 showing the Auto/Home App Menu 1122/1322.

Now the user has the Dev application software in his/her handset 102, he/she will have to activate (Activate 1154/1354) the Dev 106 in order for his/her handset 102 to be able to communicate with said Dev 106; and he/she (and later additional user) can use the handset 102 to program, control, monitor the Dev 106, and be alerted by said Dev 106 of what happens. The activation of the Dev 106 preferably only needs to be done once (in the beginning when the user uses the Dev 106 for the first time) by the user with the first handset 102—unless the service is disconnected or the user switches to another service provider (then activation is needed again as described in FIGS. 28 and 29).

The Dev 106 will be able to communicate with the handset 102 (the one helping it to be activated into the network—handset #1) as soon as it is finished with the activation, since it contains the phone number of the said handset 102.

When the user selects the Auto/Home Dev Facilities icon 1124/1324 making the handset navigate to the Auto/Home Dev Facilities menu 1152/1352, where the user then selects the Activate icon 1154/1354 that starts the process of having the Dev 106 activated into the service provider network.

Illustration 1180/1380 shows some of the most popular cellular service providers in the USA—such AT&T Wireless, Verizon Wireless, Sprint, T-Mobile, US Cellular, Metro PCS, Virgin Mobile, and Boost.

If the user is in Mainland China, the cellular service providers would be China Mobile, China Unicom, China Telecom, China Tietong. (*)

(*) In Taiwan, the cellular service providers would be Far EasTone Telecommunications Co Ltd, Asia Pacific Telecom, LDTA/Chunghwa Telecom, VIBO Telecom, Taiwan Mobile Co. Ltd.

In Hong Kong, the cellular service providers would be CSL Limited, CITIC Telecom 1616, Truphone Limited, China Motion Telecom, and China-Hong Kong Telecom.

In Japan, the cellular service providers would be NTT DoCoMo, au, SoftBank Mobile, Willcom, EMOBILE, KDDI Corporation. In Korea, the cellular service providers would be KT, SK Telecom, LG Telecom and Korea Cable Telecom (t-plus), Eco-mobile.

In India, the cellular service providers would be Andhra Pradesh, Assam, Bihar, Chennai, Delhi & NCR, Gujarat, Haryana, Himachal, Himachal Pradesh, Jammu & Kashmir, Kerala, Maharashtra & Goa, Mumbai, North East, Orissa, Punjab, Tamil Nadu, Uttar Pradesh, West Bengal, In Canada, the cellular service providers would be Telus Mobility, Airtel Wireless, EastLink, Bell Mobility, ICE Wireless, Rogers Communications, SaskTel Mobility and Virgin Mobile Canada.

In Mexico, the cellular service providers would be Nextel Mexico, America Movil/Mextel, Movistar-Telefonica Moviles, Iusacell. In Brazil, the cellular service providers would be NII Holdings, Inc., Telecom Italia Mobile, Claro, Vivo S.A., Sercomtel Celular, Brasil Telecom GSM and CTBC Celular S.A.

In the EU, the cellular service providers would be France Telecom, Globalstar Europt, Vivendi, RFF, Iliad, Bouygues Telecom, Transatel, Omea Telecom, El Telecom (France), T-Mobile Deutschland GmbH, Vodafone D2 GmbH, E-Plus Mobilfunk, O2 GmbH & Co. OHG, Arcor AG & Co, sipgate Wireless, Mobilecom Multimedia, Group 3G UMTS, Siemens AG, . . . (Germany), Telcom Italia SpA, Vodafone Omnitel N.V., Rete Ferroviaria Italiana, Wind Telecomunicazioni SpA, Hutchison 3G (Italy), Vodafone Spain, France Telecom Espana SA, Xfera Moviles SA, Telefonica Moviles Espana, BT Group, . . . (Spain), BT Group, Mundio Mobile Limited, Telefonica Europe, Jersey Airtel Limited, Cable & Wireless Worldwide, Network Rail Infrastructure Ltd, Vodafone, . . . (UK).

In Russia, the cellular service providers would be Mobile TeleSystems, MegaFon OJSC, New Telephone Company, JSC Uralsvyazinform, Tele2, Central Telecommunication Company, SkyLink/MTS/the Moscow Cellular communication.

(Source Wikipedia)

FIG. 12/14 illustrates a preferred activation example of embodiment 1200/1400 of the present invention for auto/home application. It presents the Dev Vehicle/Home activation screen 1202/1402, where the handset 102 navigates to, after the Activate icon 1154/1354 (FIG. 11/13) is executed. This screen starts the activation process by letting user enter required information in order to have the Dev 106 activated into the service provider's network. Before the Dev 106 can connect to the network, so it can make calls and communicate data with other cellular and/or wireless devices, it needs to be recognized by the service provider, its user/owner subscribes to and thus activation is required.

The present invention takes advantage of the advance and progress made by the service provider, providing OTA (Over The Air) activation procedure where "not yet register mobile device (Dev 106)" can make one time connection to its network in order to be connected/logged in, exchange the activation/provision and registration information parameters between the mobile device (i.e., Dev 106), and the service provider equipments/servers. The service provider, after the successful activation process, recognizes the Dev 106 and from then on the Dev 106 is connected to the service provider's network where it can communicate voice, messages, video, and the like with other wireless devices.

The present invention illustrates the following preferred exemplary steps for the Dev 106 activation:

The user applies, signs up, and chooses a service plan with the service provider. The user, after being approved, preferably receives from the service provider an IP address, user ID, an activation password and through his/her handset 102 obtains an encrypted UTAID (Unique Temporary Activation Identifier) which as mentioned earlier also preferably contains an activation type/methodology (NAM, SIM, ModSIM or other) and the activation key. The handset 102 starts the activation process by transmitting the UTAID and the user account information to the Dev 106. The Dev 106 then processes the data and separates the activation type from the UTAID, decodes the activation type and begins the activation accordingly (either NAM, SIM, ModSIM or any other activation methodology). The Dev 106 then transmits the activation key, Dev ID parameters along with the accompanying activation data to the service provider 112 or the provision server 114 when it is temporarily allowed into the service provider's network. The activation key and data are then routed to the OTA activation processor (or responsible servers) by the service provider/provision server/computer which authenticates them for activation processing and finally registers the Dev 106 into its network. The Dev 106 also derives its security/encryption key from the UTAID for the encryption of its communication data to other devices.

Figure 14:
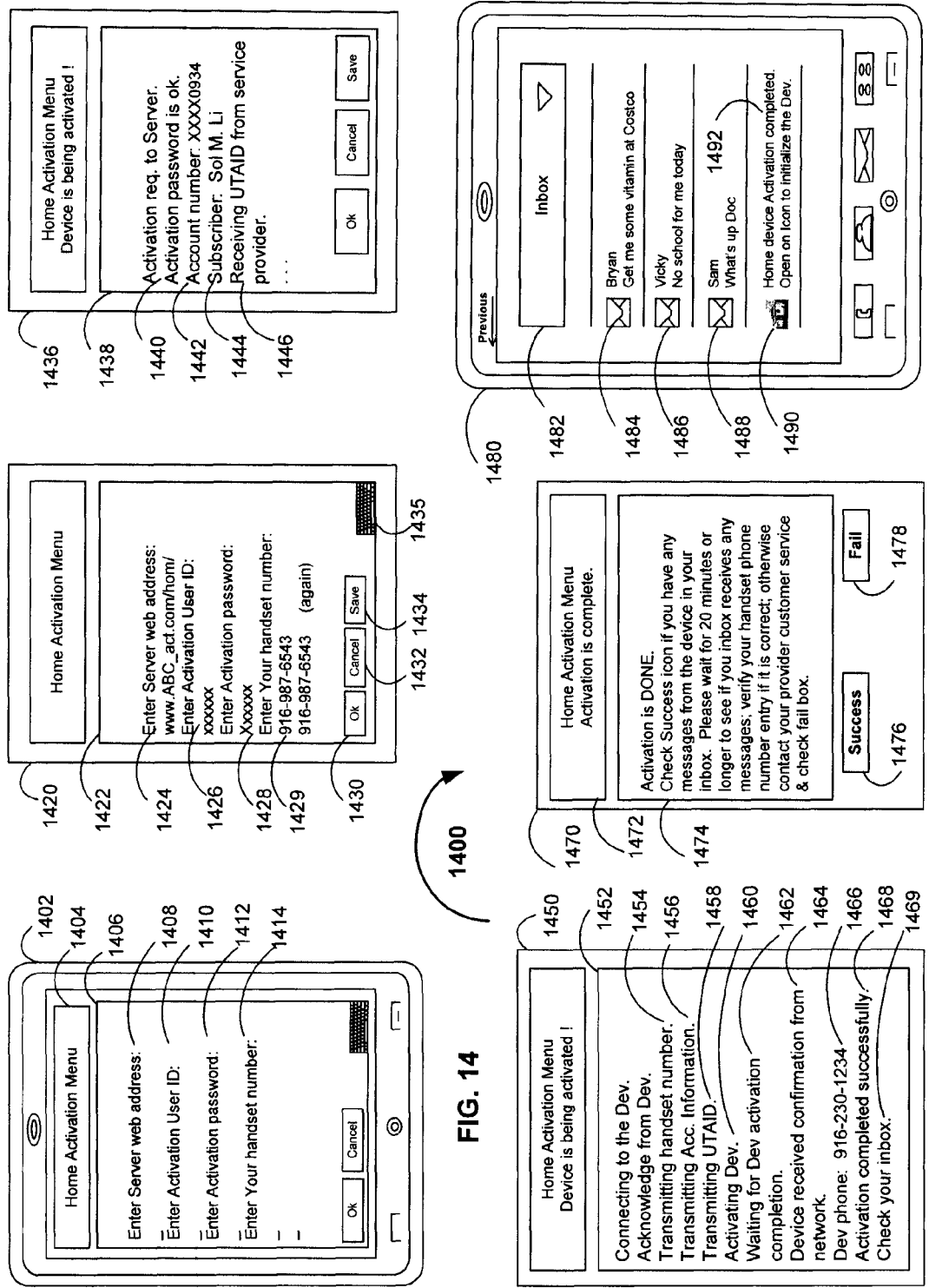

The above steps are illustrated in FIGS. 12 and 14:

The user enters the service provider's IP address 1208/1408 (as shown in 1224/1424), activation User ID 1210/1410 (as shown in 1226/1426), activation password 1212/1412 (as shown in 1228/1428), and his/her handset phone number 1214/1414 (as shown in 1229/1429), using screen keyboard 1235/1435; then executes Ok icon 1230/1430.

Handset 102 passes the information the user entered on screen 1220/1420 to the service provider/provision server 114, and in turn receives from the server, the subscriber's account information 1242/1442, name 1244/1444, along with UTAID 1246/1446 as shown in progress on screen 1236/1436.

Handset 102 then connects to the Dev 106 and communicates with it via SRC 104 (since Dev 106 has not been able to connect to the network 118 yet) transmitting its phone number 1254/1454, user account information 1256/1456, UTAID 1258/1458, the activation command 1260/1460, and it then waits for the Dev 106 to complete its activation 1262/1462. When the Dev 106 completes its activation, it recycles its power (or does a power-on reset 249 FIG. 2/3/4), and then registers into the network. The Dev 106 completes the activation successfully as soon as it receives the confirmation message from the service provider 1268/1468 within a predetermined time out period. The user is notified of the activation completion message from the Dev 106 in the inbox 1274/1474 and executes the Success icon 1276/1476 to complete the activation process. After the Dev 106 has been activated successfully into the network as mentioned above, it is preferably that the Dev 106 sends the confirmation message 1274/1474 to the handset 102 for the user to respond. After the Dev 106 receives the confirmation response from the user, (when he/she executes the Success icon 1276/1476,) it then transmits an Initialization icon 1290/1490 and messages 1292/1492 to his/her handset's inbox so he/she can start the initialization process in setting up all the user's information and the handset's parameters into Dev's memory.

FIGS. 15A-18 show more in detail of the handset screens 1220/1420, 1236/1436, 1250/1450 and 1270/1470, the interaction between the handset 102, Dev 106, and the Provision Server/Provider 114.

The present invention presents three methods of activation, such as: NAM (Name Assignment Module), SIM (Subscriber Identity Module) and ModSIM (Modified SIM). The present invention also supports the systems and methods of activation not yet known to the inventor, still under development and/or not yet developed as technology advances and keeps on improving, and the Dev 106 can be specifically designed to work with any cellular service providers to comply with their specification and requirement.

Figure 15A:
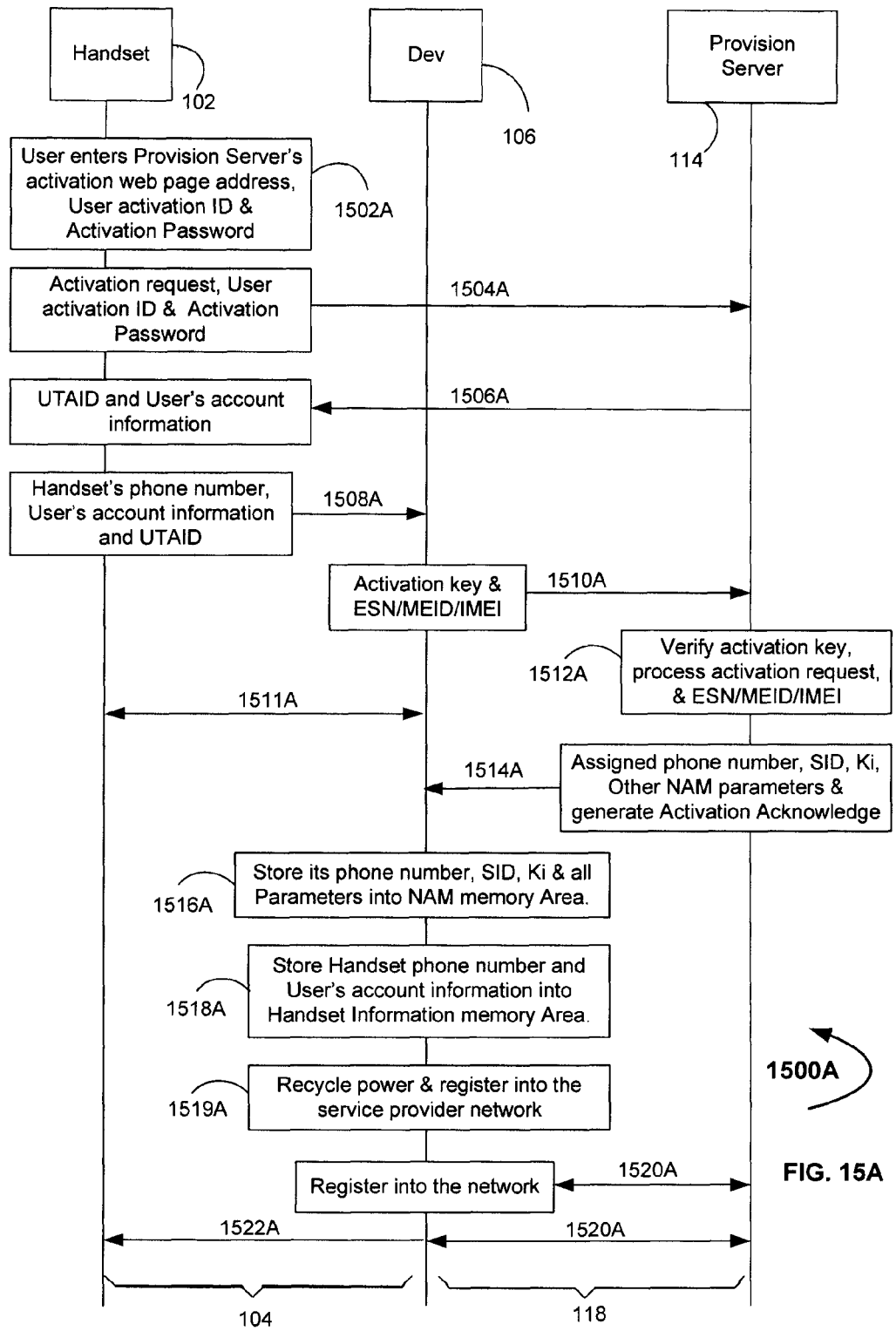
FIGS. 15A-18 show preferred examples of present invention, in having Dev 106 activated into a network.
Figure 15B:
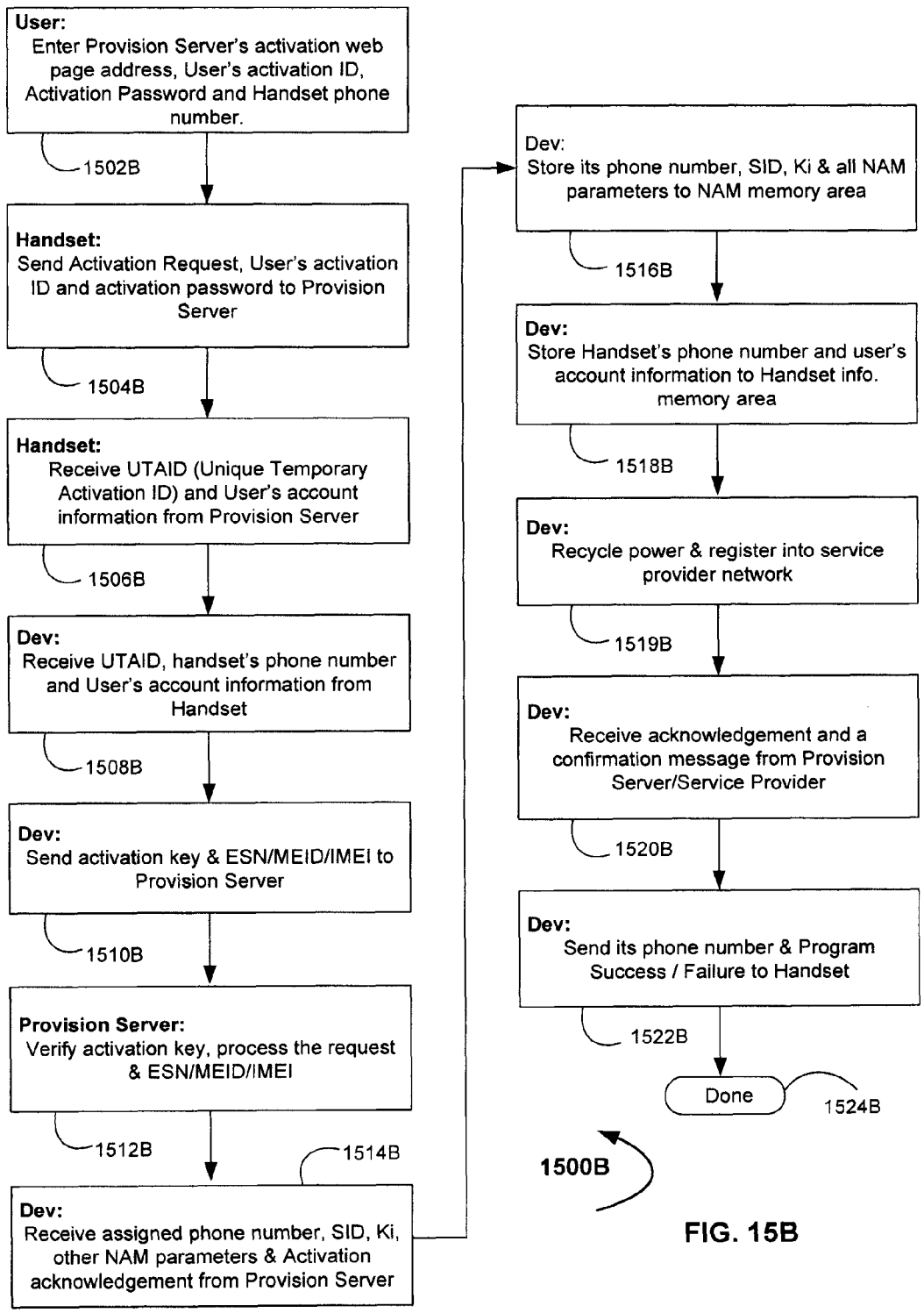

FIGS. 15A and 15B illustrate preferred activation examples of embodiment 1500A and 1500B of the present invention in having the Dev 106 activated in the Name Assignment Module (NAM) storage memory area which is already pre-programmed with an ESN/MEID/IMEI value.

It starts out at step 1502A/1502B (which is equivalent to screen 1220/1420 in FIG. 12/14), where the user enters the handset's phone number, the service provider/provision server IP address, user's activation ID, the activation password, and executes the command Ok icon 1230/1430. The handset 102 then transmits the activation request and activation password 1240/1440 (FIGS. 12/14) and 1504A/1504B, then receives the UTAID from the service provider/provision server 1246/1446 and 1506A/1506B. The handset 102 transmits its phone number, user's account information, and the UTAID to the Dev 106 in steps 1254/1454, 1256/1456, and 1508A/1508B.

The Dev 106 preferably starts the OTA activation by transmitting the activation key and ESN/MEID/EMEI (Electronic Serial Number/Mobile Equipment Identifier/International Mobile Equipment Identifier) 1510A/1510B. The Service Provider/Provision Server 112/114 receives, processes and verifies the activation key is correct and is able to associate the activation key with the user's account information in its server database 1512A/1512B. The Provision Server 114 then preferably transmits the assigned phone number, all other parameters**, and the activation acknowledgement 1514A/1514B to the Dev 106.

(**The remaining NAM parameter are the System ID, Access Overload Class, Group ID Mark, Initial Paging Channel, Lock Code, local use flag, A/B system selection, MIN mark flag . . . )

The Dev 106 then stores the NAM parameters into its NAM storage memory area 1516A/1516B and the handset 102 phone numbers and the user's account information into its Handset Information memory area 1518A/1518B. The Dev 106 then recycles its power (or does a power-on reset 249 in FIG. 2/3/4) and then registers into the network 1519A/1519B as are known to those of ordinary skill in the art. The activation is successful when it receives confirmation acknowledgement 1520A/1520B from the service provider 112; in other words it is able to connect to the network.

Figure 19:
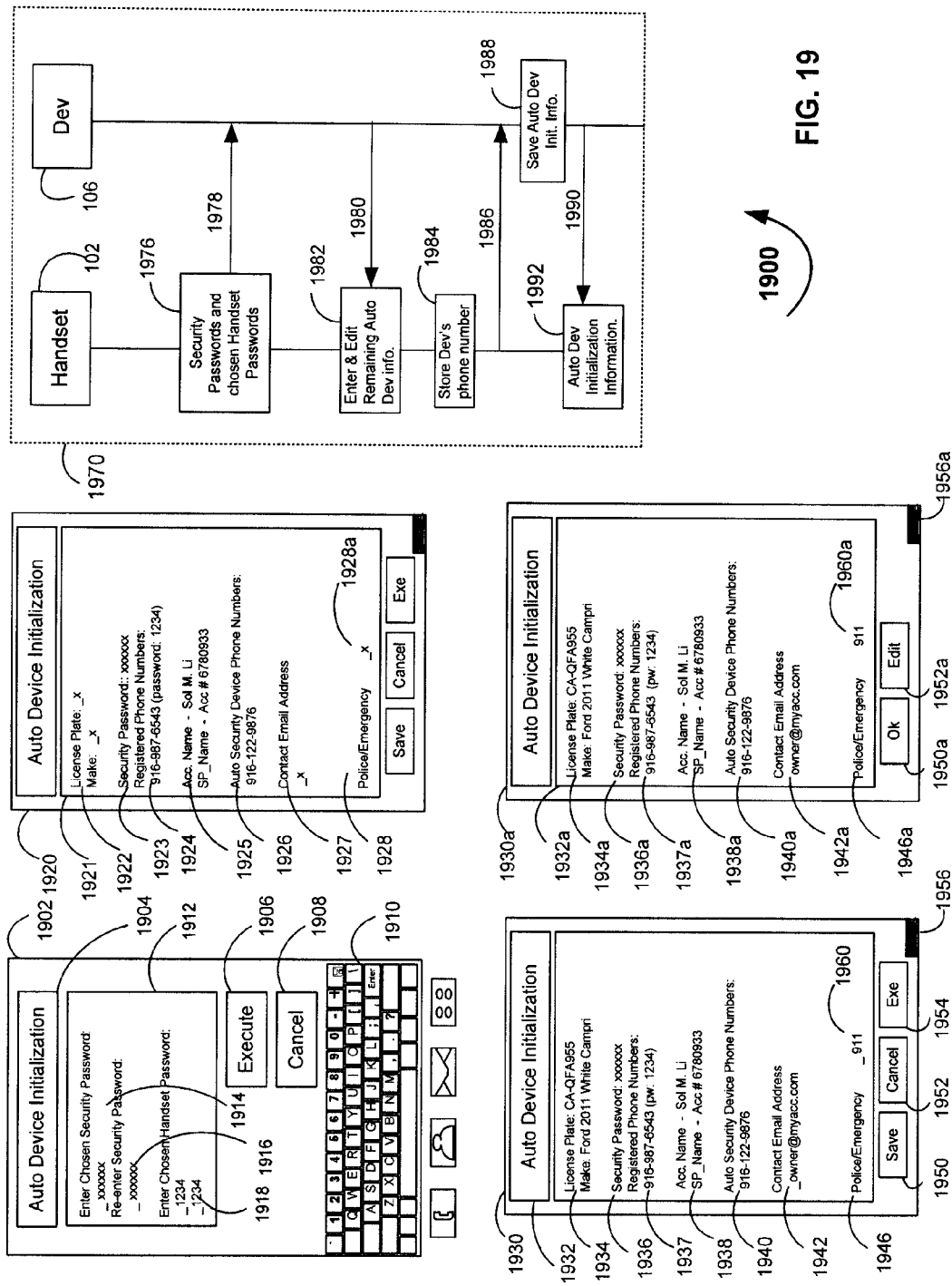
FIG. 19/20 shows a preferred example of handset's screen displays and a flow diagram, presenting the Dev 106's initial file with user information and the communication interaction of said handset and said Dev, relating to the present invention in the auto/home application.
Figure 20:
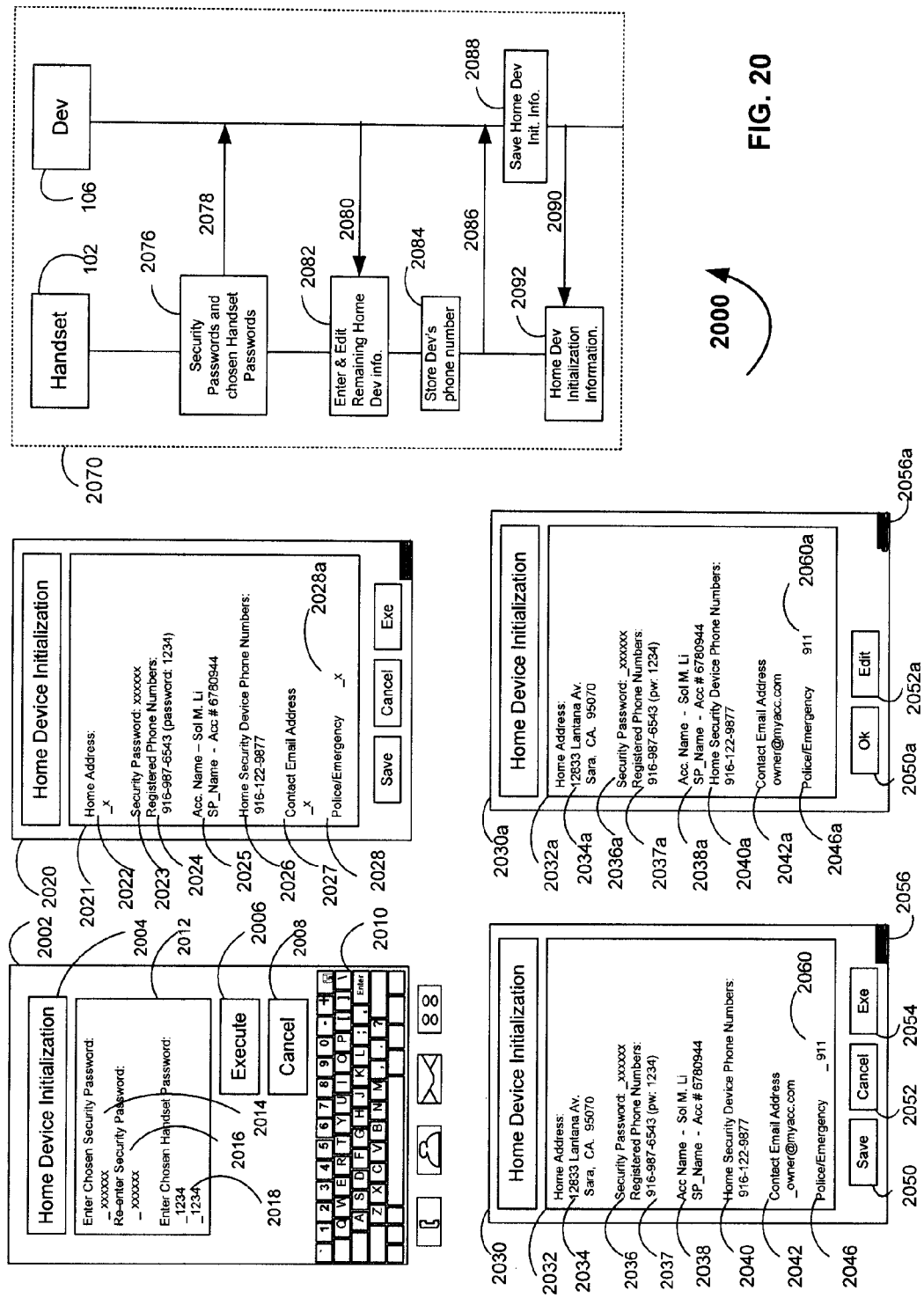

During the activation process, the Dev 106 preferably communicates (via SRC 104) its progress status with the handset 102 as shown previously on screen 1250/1450, step 1511A, and finally via the cellular network 118 the confirmation text message 1522A/1522B also as shown on screen 1292/1492 along with Dev Initialization icon 1290/1490. The user preferably then executes said icon to start the Dev initialization process on his/her handset 102 (as shown in FIGS. 19 and 20), in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

Figure 16A:
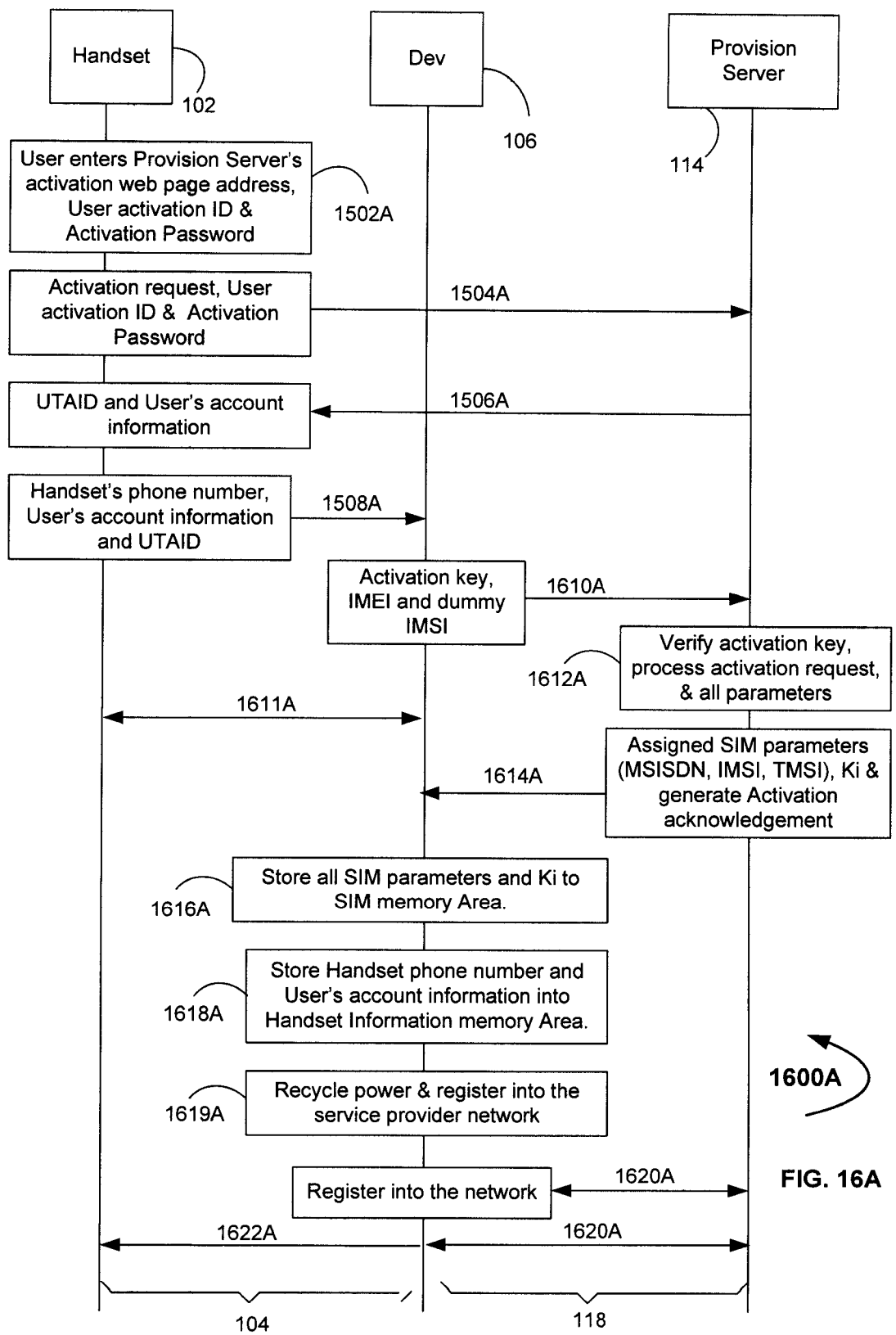
Figure 16B:
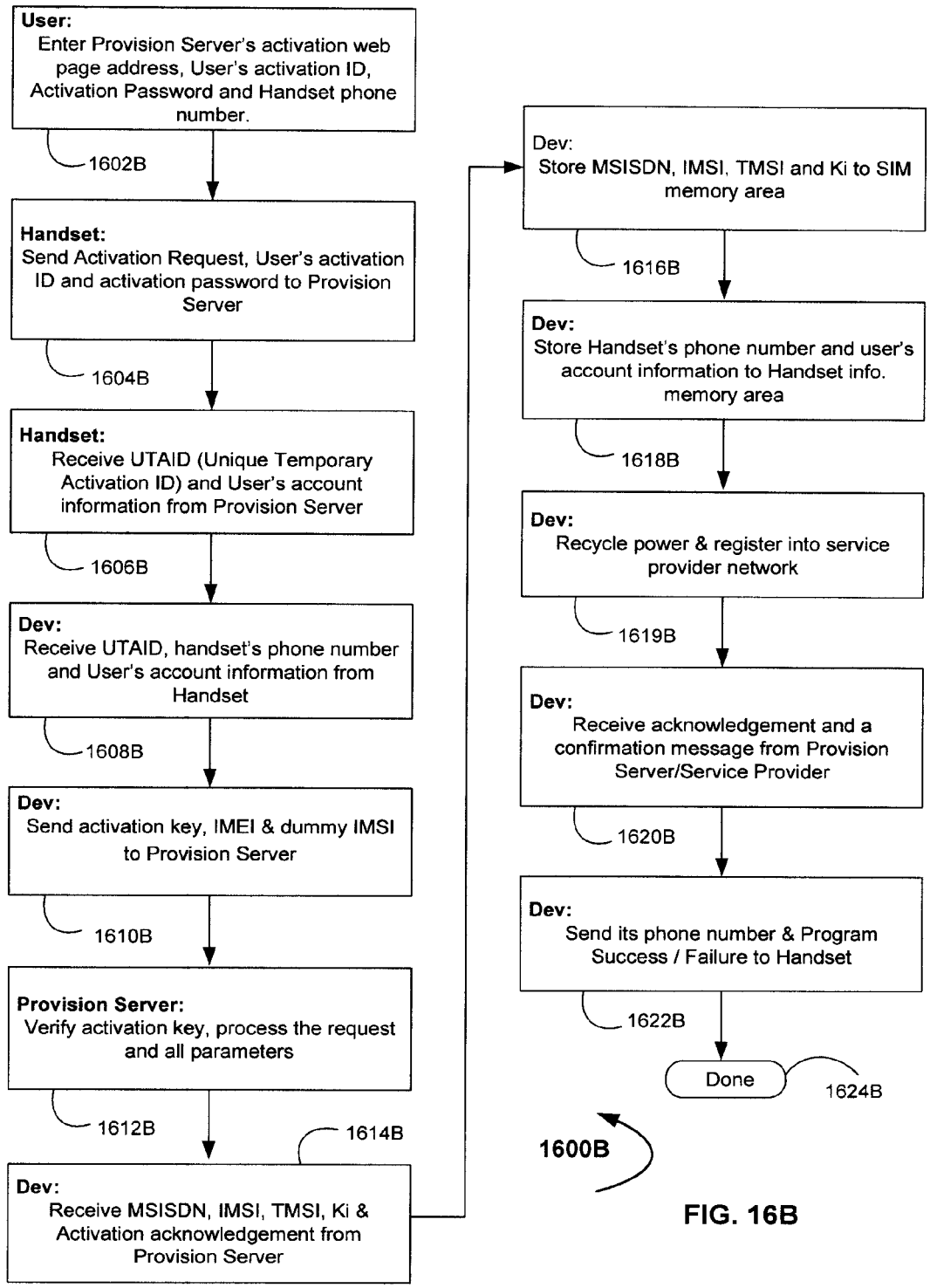

FIGS. 16A and 16B illustrate preferred activation examples of embodiment 1600A and 1600B of the present invention in having the Dev 106 activated in the Subscriber Identity Module (SIM) storage memory area.

The Dev 106 is not like the typical mobile handset which along with its SIM module is issued or manufactured by the cellular service provider or its affiliated third parties. These mobile handsets already have the IMEI (International Mobile Equipment Identity) recorded into the handsets' memory, IMSI (International Mobile Subscriber Identity) programmed into the SIM modules, a Ki (authentication key), encryption key, possibly an ICCID, and thus are associated with said cellular service provider; and therefore can be easily activated into the service provider network, at initial power-up. The SIM module also functions as a storage device and thus contains personal information, such as: user phone directory, text messages, pictures, etc.

The Dev 106 on the other hand is not tied to any cellular service provider and thus will be designed to support preferably by way of software downloading and/or updating in order to work with any cellular service provider.

The Dev 106 is designed each with its own unique IMEI and a SIM storage memory area containing a minimum amount of preprogrammed parameters such as a dummy IMSI (or optionally IMSI derived in the UTAID issued by the service provider during pre-activation). This would allow any service provider to supply the remaining parameters to store into its SIM memory during the activation process. The user therefore, can choose, pick, and change service provider at any moment. Thus the Dev's SIM contains a minimum amount of pre-activation parameters as in this exemplary embodiment, an IMEI or a SN (serial number so it can be associated with the Dev 106), an IMSI value which it uses during the activation for identification. And of course, the activation key as was mentioned earlier, so the service provider can associate it with the user/subscriber.

It starts out similarly as described in steps 1502A/1502B, 1504A/1504B, 1506A/1506B and 1508A/1508B in FIG. 15A/15B.

The Dev 106 then continues the OTA activation by transmitting the activation key, IMEI, and dummy IMSI 1610A/1610B. The service provider/provision server 112/114 receives, processes, and verifies that the activation key is valid and it is able to associate the activation key with the user's account information in its server database 1612A/1612B. The server then transmits the SIM parameters preferably, such as: the assigned phone number (or MSISDN—Mobile Subscriber ISDN number), IMSI, TMSI (Temporary IMSI), Ki (Authentication key), and the activation acknowledgement 1614A/1614B to the Dev 106.

The Dev 106 then stores the SIM parameters into its SIM storage memory area 1616A/1616B, the handset 102 phone numbers and the user's account information into its Handset Information memory area 1618A/1618B. The Dev 106 then recycles its power (or does a power-on reset in FIG. 2/3/4) and then registers into the network 1619A/1619B, as are known to those of ordinary skill in the art. The activation is successful when it receives a confirmation acknowledgement 1620A/1620B from the service provider 112; in other words it is able to connect to the network.

During the activation process, the Dev 106 preferably communicates via SRC 104 its progress status with the handset 102 as shown previously on screen 1250/1450 and step 1611A, and finally via the cellular network 118 the confirmation text message 1622A/1622B, (also as 1292/1492, shown on inbox screen 1280/1480) along with Dev Initialization icon 1290/1490. The user preferably then executes said icon 1290/1490 to start the Dev initialization process on his/her handset 102 (as shown in FIGS. 19 and 20) in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

Figure 17:
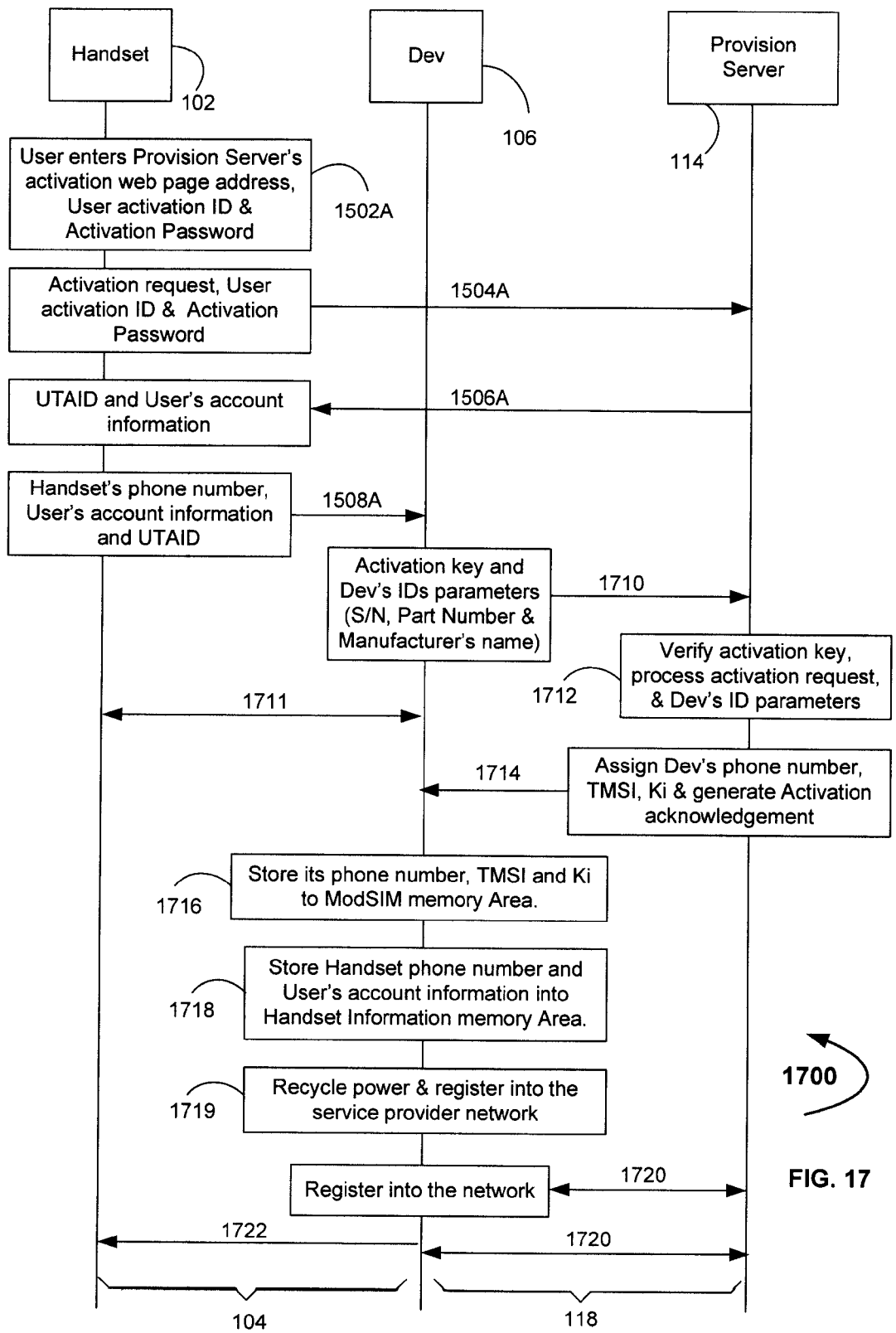
Figure 18:
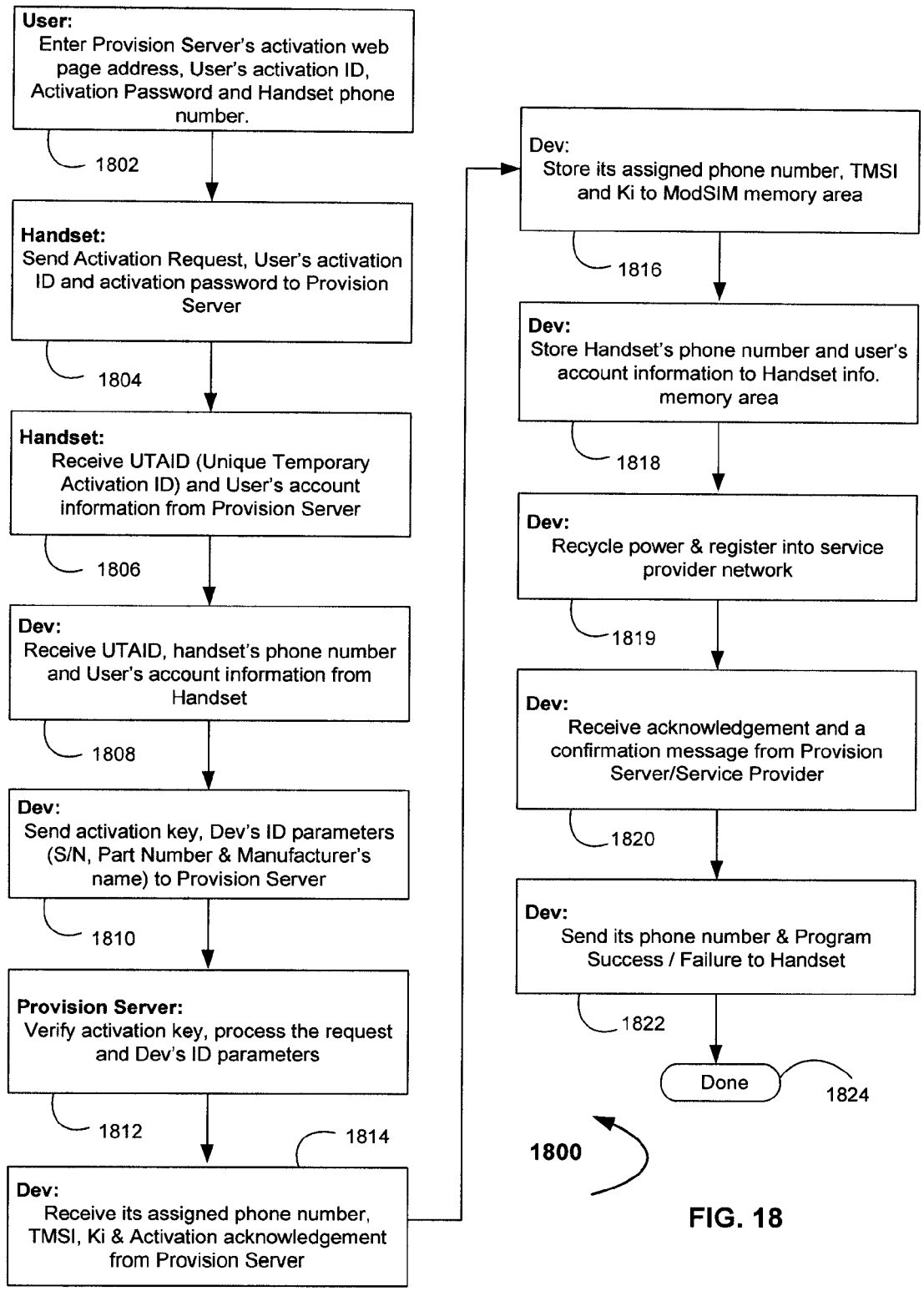

FIGS. 17 and 18 illustrate preferred activation examples of embodiment 1700 and 1800 of the present invention in having the Dev 106 activated in the Modified Subscriber Identity Module (ModSIM) storage memory area.

The ModSIM activation is similar to the SIM's but is simpler. The Dev 106 transmits only its ID parameters and the activation key (derived from the UTAID) to the Provision Server which receives, processes and associates said ID parameters with said Dev and said activation key with the subscriber. The Provision Server then generates the registration acknowledgement and sends back to the Dev, its (ODA) assigned telephone number, TMSI and the Ki.

The Dev 106 starts out similarly as described in steps 1502A/1502B, 1504A/1504B, 1506A/1506B and 1508A/1508B in FIG. 15A/15B.

The Dev 106 then continues the OTA activation by transmitting the activation key, its ID parameters (Dev's S/N, part number, manufacturer's name) 1710/1810. The service provider/provision server 112/114 receives, processes, and verifies that the activation key is valid, and it is able to associate said activation key with the user's account information in its server database 1712/1812. The server then transmits the ModSIM parameters preferably, such as: the assigned phone number, TMSI (Temporary IMSI), Ki (Authentication key), and the activation acknowledgement 1714/1814 to the Dev 106.

The Dev then stores the ModSIM parameters into its ModSIM storage memory area 1716/1816, the handset 102 phone numbers and the user's account information into its Handset Information memory area 1718/1818. The Dev 106 then recycles its power (or does a power-on reset in FIG. 2/3/4), and then registers into the network 1719/1819, as are known to those of ordinary skill in the art. The activation is successful when it receives a confirmation acknowledgement 1720/1820 from the service provider 112; in other words it is able to connect to the network.

During the activation process, the Dev 106 preferably communicates (via SRC 104) its progress status with the handset 102 as shown previously on screen 1250/1450 and step 1711; and finally via the cellular network 118 the confirmation text message 1722/1822; (also as 1292/1492 shown on inbox screen 1280/1480) along with Dev Initialization icon 1290/1490. The user preferably then executes said icon 1290/1490 to start the Dev initialization process on his/her handset 102 (as shown in FIGS. 19 and 20) in order for said handset 102 to communicate and utilize all the Dev's functions and capabilities. If the user fails to do the initialization right away, preferably the Dev 106 will periodically sends the same initialization message and icon to the user's handset until it receives the confirmation response from said user.

The Dev 106 in the home application (as represented by the hardware and software block diagrams in FIGS. 3 and 6) is a stationary device. In other words, it normally does not need to do roaming. There preferably exists a mechanism or a method such as a bit/flag in the subscriber account, so the service provider can distinguish it from a typical mobile device which does roaming; and therefore few service provider's resources are allocated to support it, which in turn can lower the service cost to users/customers in the home application. The Dev 106 (in home application unlike in vehicle and robotic applications), in turn, does not have to broadcast its presence periodically, as in this method, since its registration (identity data) stays (resides) with the same MSC/VLR in the service provider's network.

FIGS. 19 and 20 illustrate preferred application examples of embodiments 1900 and 2000 of the present invention. This exemplary embodiment presents preferred steps taken by a user in his/her handset to initialize his/her personal information and handset parameters into the Dev 106 after said Dev has been successfully activated and registered into a cellular network.

The user starts by executing the Initialization icon 1290/1490 (he/she received in the inbox, screen 1280/1480 of FIG. 12/14) that makes the handset 102 navigates to the handset's Auto/Home Device Initialization screen 1902/2002. Next, the user enters his/her chosen account security passwords (1914/2014 and 1916/2016), handset chosen passwords 1918/2018, then executes 1906/2006 that makes the handset 102 transmit the command and information (also in steps 1976/2076 and 1978/2078 of flow diagram 1970/2070) to the Dev 106 which processes the command and verifies that the two passwords, which each entered twice are identical (as routine practice for identification). The Dev 106 then sends back the requested information which the handset 102 displays on screen 1920/2020. It shows the handset's phone number 1924/2024 (that the handset passed to it previously during the activation process) and the handset password, service provider name and account information 1025/2025, Dev phone number 1926/2026, account security password 1923/2023 and user name (1925/2025). The user needs to fill out the remaining information and upon completion it is presented as shown in screen 1930/2030.

In screen 1930/2030 (also as shown in step 2082), the user enters car make and model, License Plate 1934 (for Auto Dev) or house address 2034 (for Home Dev), account security password 1936/2036, registered phone numbers 1937/2037 and its password, account name and service provider account number 1938/2038, Dev phone number 1940/2040, email address 1942/2042 for password recovery, emergency center phone number 1946/2046, and a plurality of other required information (not shown for clarity purpose and ease of presentation as are known to those of ordinary skill in the art). The user then executes the Exe icon 1954/2054 making the handset 102 store the Dev's phone number 1984/2084 into its memory and transmit the command and information (shown in step 1986/2086) to the Dev 106 which processes and saves them into its memory 1988/2088. The Dev 106 then transmits 1990/2090 back the information 1992/2092 as shown in screen 1930*a*/2030*a*, which the user can re-edit again 1952*a*/2052*a* or finishes the initialization process by executing 1950*a*/2050*a*.

The Police and Emergency phone number 1946/2046 (in US and Canada 911 step 1960/2060—Mainland China 110 and 119, Hong Kong 999—EU 112—Taiwan, Japan, South Korea, France 119, India 100 and 101, Mexico 066 and 068, Brazil 190 and 193) will be called and sent voice and text messages by the Dev 106 when the air bag 226 (FIG. 2) is inflated or its house is on fire (smoke alarm) 304 (FIG. 3), as well as to other registered handsets 102. The Email addresses 1942/2042 are for the password recovery when the user forgets the account security password. The Dev 106 then sends the password and email address to the Email Server 116 and has it emailed to the stored email address 1942*a*/2042*a* for the user to recover his/her password. The Dev phone number 1926/2026 (phone number 916-122-9876/916-122-9877) is used and stored (in step 1984/2084) by the handset application software into the handset memory so the handset application uses the number to communicate with the Dev 106.

FIG. 21A illustrates a preferred application example of embodiment 2100A of the present invention. This exemplary embodiment presents preferred steps taken by the user in his/her handset to add (register) a new handset 102 into the Dev 106.

The user can add a new handset 102, which will be registered into the Dev 106. After the addition (registration) the new handset 102 will have all the controlling, programming, and monitoring capability as the registered handset 102.

The user executes the Add Handset icon 1172/1372 in screen 1150/1350 (FIG. 11/13), making his/her handset navigate to the Adding New Handset menu as shown on its screen 2102A/2152A, which prompts the user for the account security password entry. The user enters the account security password 2108A or 2158A and executes the Ok icon, making the handset transmit the command and data to the Dev 106 which verifies and process the data. If the account security password matches, the Dev 106 then sends back the vehicle/home information 2110A/2160A and prompts the user for the new handset chosen password 2112A/2162A. The user then enters the new handset chosen password 2113A/2163A. For the auto application, a single handset category 2114A is required for user's new phone number input. While for the home application, three categories, such as: family member phone entry 2164A, household help (i.e., maid service) phone entry 2165A, and friend or temp member phone entry 2167A; out of which the user only chooses one to enter the new handset phone number. In this exemplary embodiment, let us assume the user enters his/her family member's handset phone number 2164A and then executes the Ok icon 2116A/2166A making the handset 102 transmit the command and data to the Dev 106. The Dev 106 verifies and processes then transmits back the data to the handset 102, which displays them in screen 2120A/2170A for the user's verification. The user then executes the Confirm icon 2134A/2184A which makes the handset 102 transmit the confirmation back to the Dev 106, which processes and updates its device information file in memory, and sends it back to the handset 102 which stores it in its own memory and displays it in its screen 2140A/2190A. The user can always retrieve and view or request the up-to-date device information as described later in FIG. 24C. The Dev 106 also sends instruction messages with the application download link and the Sign-In icon 2214 (which contains its phone number), as shown on screen 2202 of FIG. 22, to the added handset 102 whose user can start the signing-in as illustrated in FIG. 22.

FIG. 21B illustrates a preferred application example of embodiment 2100B of the present invention. This exemplary embodiment presents preferred steps taken by a user in his/her handset to add (register) in a new handset 102 into the Dev 106 in the restricted or temporary mode.

It presents a case where the user either has entered a household member handset's phone number 2165A (in screen 2152A of FIG. 21A), which takes his/her handset to screen 2102B, which contains the just entered handset's phone number for household help 2115B. Or the user has entered a friend (temp) handset's phone number 2167A (in screen 2152A of FIG. 21A) which takes his/her handset to screen 2152B, which contains the just entered handset's phone number for friend (temp) 2167B. The user then executes Ok icon 2116B/2166B making the handset 102 transmit the command and data to the Dev 106. The Dev 106 verifies and processes, then transmits back the data to the handset 102 which displays them in screen 2120B/2170B for user's verification. Screen 2120B presents the added handset is in restricted mode while screen 2170B presents the added handset is in temporary mode. The user then executes the Confirm icon 2134B/2184B, which makes the handset 102 transmit the confirmation back to the Dev 106, which processes and updates its device information file in the memory, and sends it back to the handset 102, which also preferably stores it in its own memory. The user can always retrieve, view, or request the up-to-date device information (as described later in FIG. 24C). The Dev 106 also sends the instruction messages with the application download link and the Sign-In icon 2214 (which contains its phone number), as shown on screen 2202 of FIG. 22, to the added handset 102 whose user can start the signing-in as illustrated in FIG. 22.

Temporary registered handset 102, such as: the one owned by a friend, a guest or a neighbor who has the temporary access to the house, is preferably programmed with a starting date (2167B1) and time (not shown), ending date (2167B2) and time (not shown), and its access privilege to the house is as a normal registered handset's 102. It has no capability of registering another handset 102 into said Dev 106 or no capability of activating the Dev 106 into a new network. It will be automatically removed (deregistered) from the Dev 106 on its expiration date (2167B2).

Household help member's handset 102 is preferably restricted in its functionality to only be able to turn on or turn off the house security alarm for entry or exit into the house or the premises, entering and exiting on a certain time and day of the week (not shown). It will not be able to command the Dev 106 to control, observe or monitor anything else; and to have no capability of registering another handset 102 into the Dev 106.

This embodiment preferably allows a user of the Dev 106, away from home (near or far), or on business trip or on vacation somewhere, to remotely add (register) his/her friend's handset 102, using his/her own registered handset 102, to the Dev 106. This allows the friend to use his/her own handset 102 to enter and exit to stay at the user's house, for any programmable duration. The user preferably can also even keep track of the time and date of the ins and outs of said friend (not shown), or a household help member (not shown) by executing the List Handset In & Out Activity icon 1342 in screen 1320 of FIG. 13. The household help member or the friend can preferably always remove from his/her handset 102, the software application associated with the Dev 106 when it is no longer needed.

FIG. 22 illustrates a preferred application example of embodiment 2200 of the present invention. This exemplary embodiment presents preferred steps taken by a user in his/her newly added handset 102 to sign in said handset 102 into the Dev 106.

The user of the recently added (registered) handset 102 receives (step 2242 in flow diagram 2240) in its inbox (screen 2202) a notification 2204 from the Dev 106 that he/she needs to download the application 2210, and then signs in 2212 in order for his/her handset 102 to work with the Dev 106. The user first executes the application URL (2210) for the app download, also is shown in step 2244 (download link 2210 whose app downloading steps were described previously in screens 920/1020, 940/1040, 960/1060, and 980/1080 of FIG. 9/10). After the application has been downloaded, in step 2246 (assuming his/her handset does not contain such app; otherwise the user just signs in), the user then executes the Sign In icon 2214 (also shown in step 2248) which navigates the handset 102 to screen 2220 where the user enters his/her correct handset password 2226 (which is the same password the user of the adding/registering handset had assigned 2113A/2163A on screen 2102A/2152A of FIG. 21A or 2113B/2163B on screen 2102B/2152B of FIG. 21B). The user finally executes (Execute icon 2228) allowing the handset 102 to store the Dev's phone number into its memory 2250 (in graph 2240) and transmit the acknowledgement to the Dev 106. The Dev receives the acknowledgement 2252 and then transmits (step 2254) the notification (2262) to the user of the registering handset 102r (in flow chart 2240) as shown in screen 2260. From now on, the sign-in handset 102 and the Dev 106 can communicate with each other (2256).

Figure 23:
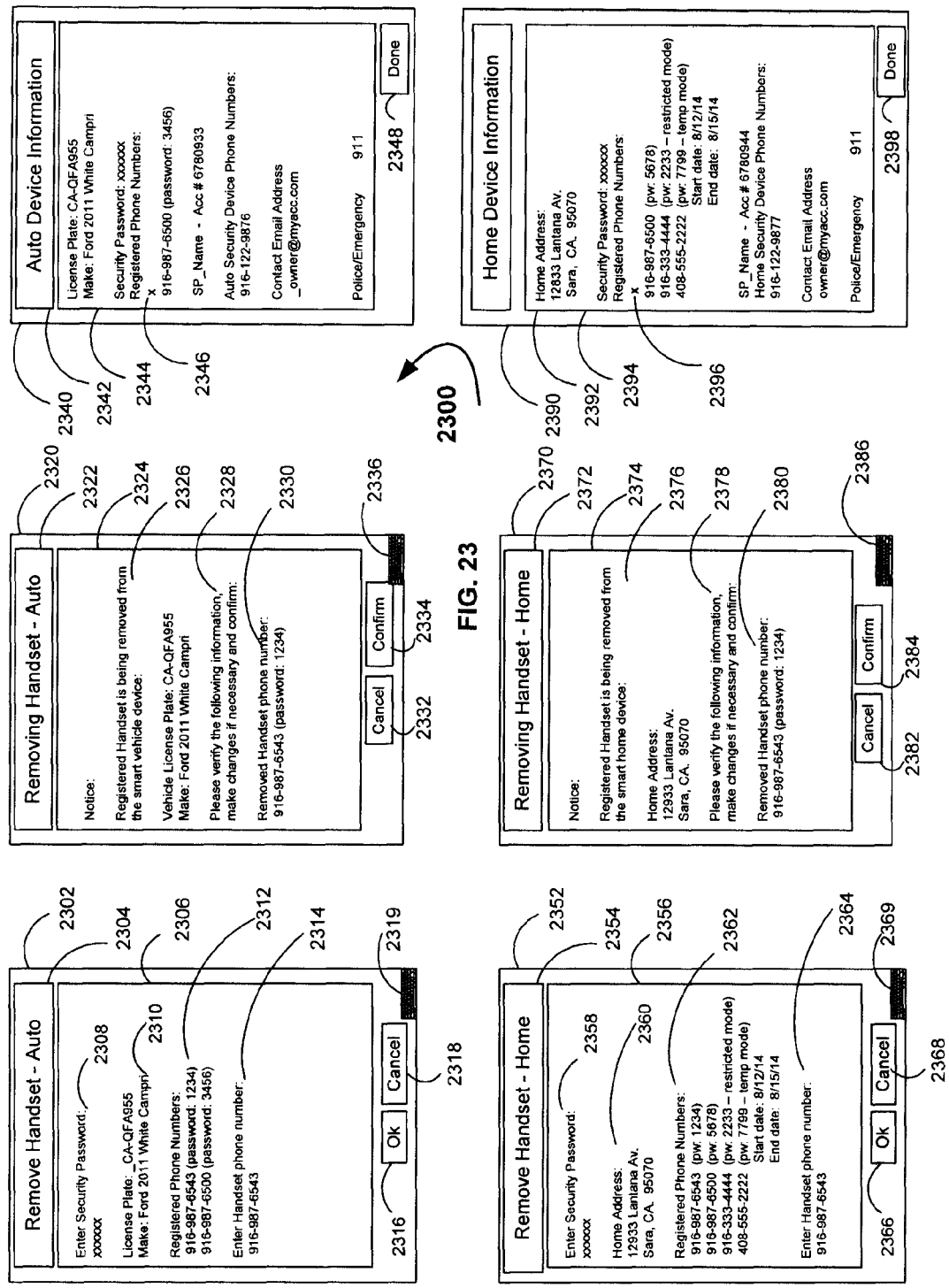
FIG. 23 shows a preferred example of handset's screen displays of a registered handset 102, in removing (e.g., deregistering) another registered handset from the Dev 106, relating to the present invention.

FIG. 23 illustrates a preferred application example of embodiment 2300 of the present invention. This exemplary embodiment presents preferred steps taken by a user in his/her handset 102 to remove a registered handset 102 from the Dev 106.

The user executes the Remove Handset icon 1176/1376 in screen 1150/1350 of FIG. 11/13, making his/her handset navigate to the Remove Handset menu as shown on its screen 2302/2352, which prompts the user for the account security password entry. The user enters the account security password 2308/2358 and then executes the Ok icon 2316/2366 making the handset 102 transmit the command and data to the Dev 106 which verifies and processes the data. If the account security password is correct, the Dev 106 transmits back the Dev's auto/home information 2310/2360 and its registered handset phone numbers 2312/2362, then prompts the user for the phone number of the handset 102 being removed 2314/2364. The user enters the being removed handset's phone number 2314/2364 then executes the Ok icon 2316/2366 making the handset 102 transmit the command and data to the Dev 106. The Dev 106 verifies and processes the data, then transmits them back to user's handset 102 (screen 2320/2370) for confirmation 2328/2378 and 2330/2380. The user then confirms 2334/2384, making the handset 102 transmit the confirmation to the Dev 106 which verifies, processes and update its device information, and sends it back to the handset 102 (2340/2390) showing that the handset 102 has been removed 2346/2396.

Figure 24A:
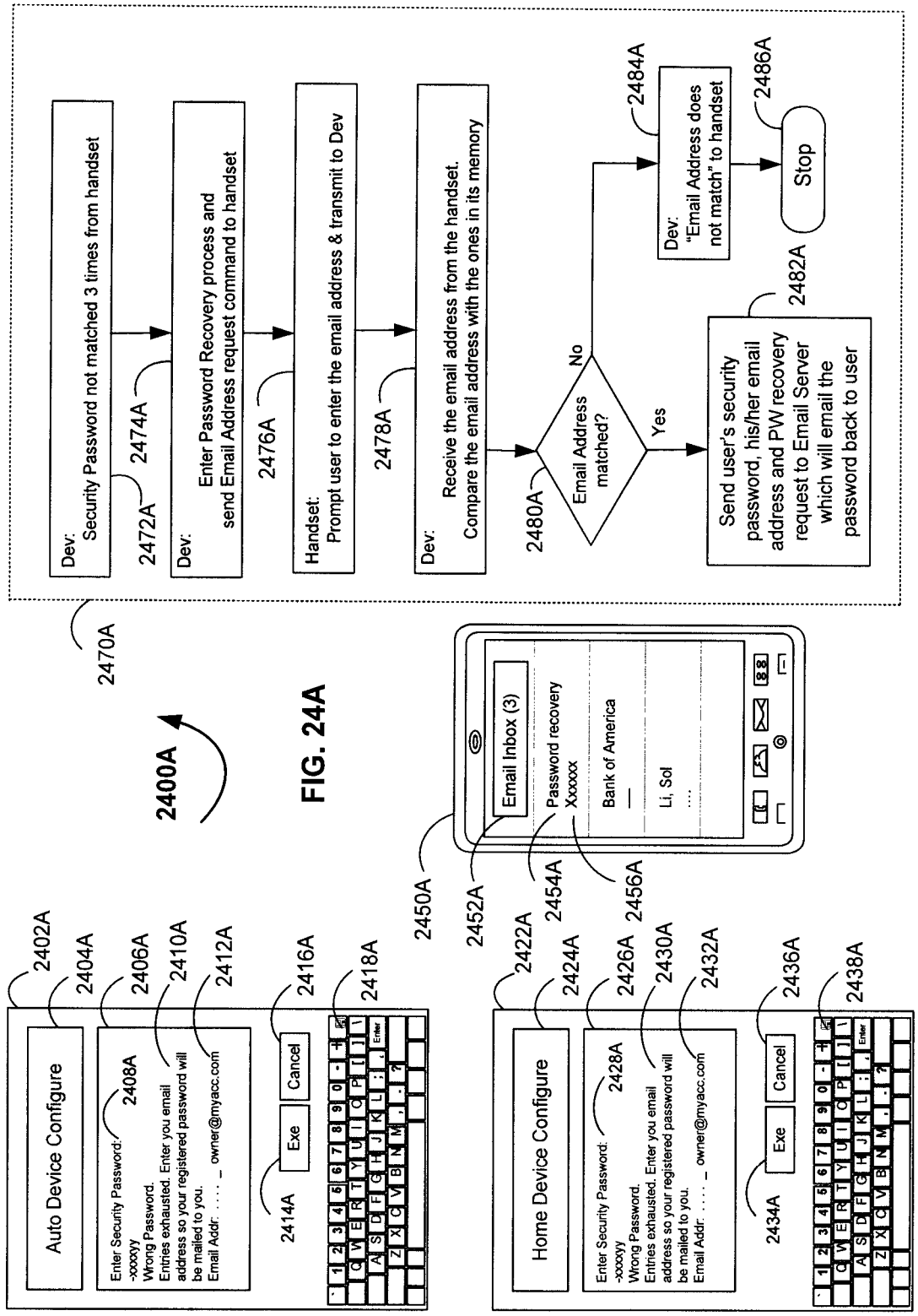
FIG. 24A shows a preferred example of handset's screen display and flow chart, presenting the user password recovery application of Dev 106, relating to the present invention.

FIG. 24A illustrates a preferred example of embodiment 2400A of the present invention. This exemplary embodiment presents preferred program flow of the Dev 106 password recovery when the user fails to enter to the correct password more than the allowed attempts (i.e., three attempts).

It illustrates a password recovery mechanism when the user fails to enter the correct password, and thus will be able to receive it back in his/her email account from the email server. An example where password recovery can happen is when a user wants to view or edit the Auto/Home Device Configuration command as represented by icon 1156/1356 of FIG. 11/13.

After the user executes the Auto/Home Device Configure icon (1156/1356 of FIG. 11/13), making his/her handset 102 transmit the command to the Dev 106 which processes said command and sends the response back to said handset 102 which displays the Auto/Home Device Configure command as shown on its screen 2402A/2422A. It requires the account security password entry 2408A/2428A from the user and if he/she fails after three times 2410A/2430A (also in step 2472A of flow diagram 2470A), the Dev 106 enters the email recovery process by sending the password request command 2474A to the handset 102, which prompts 2410A/2430A the user for his/her email address 2412A/2432A. The user enters the email address, and then executes the Exe icon 2414A/2434A, making the handset 102 transmit the command to the Dev 106 which receives and processes (step 2478A). If the email address is verified 2480A and does not match, the Dev 106 sends "Email address does not match" message 2484A to handset 102 and stop 2486A. If Email address matches, the Dev 106 transmits the password recovery command along with the user's email address 2482A, and the password to the mail Server 116 for password recovery. The user can then check his/her email (2452A of screen 2450A) and retrieve the password (2456A).

Figure 24B:
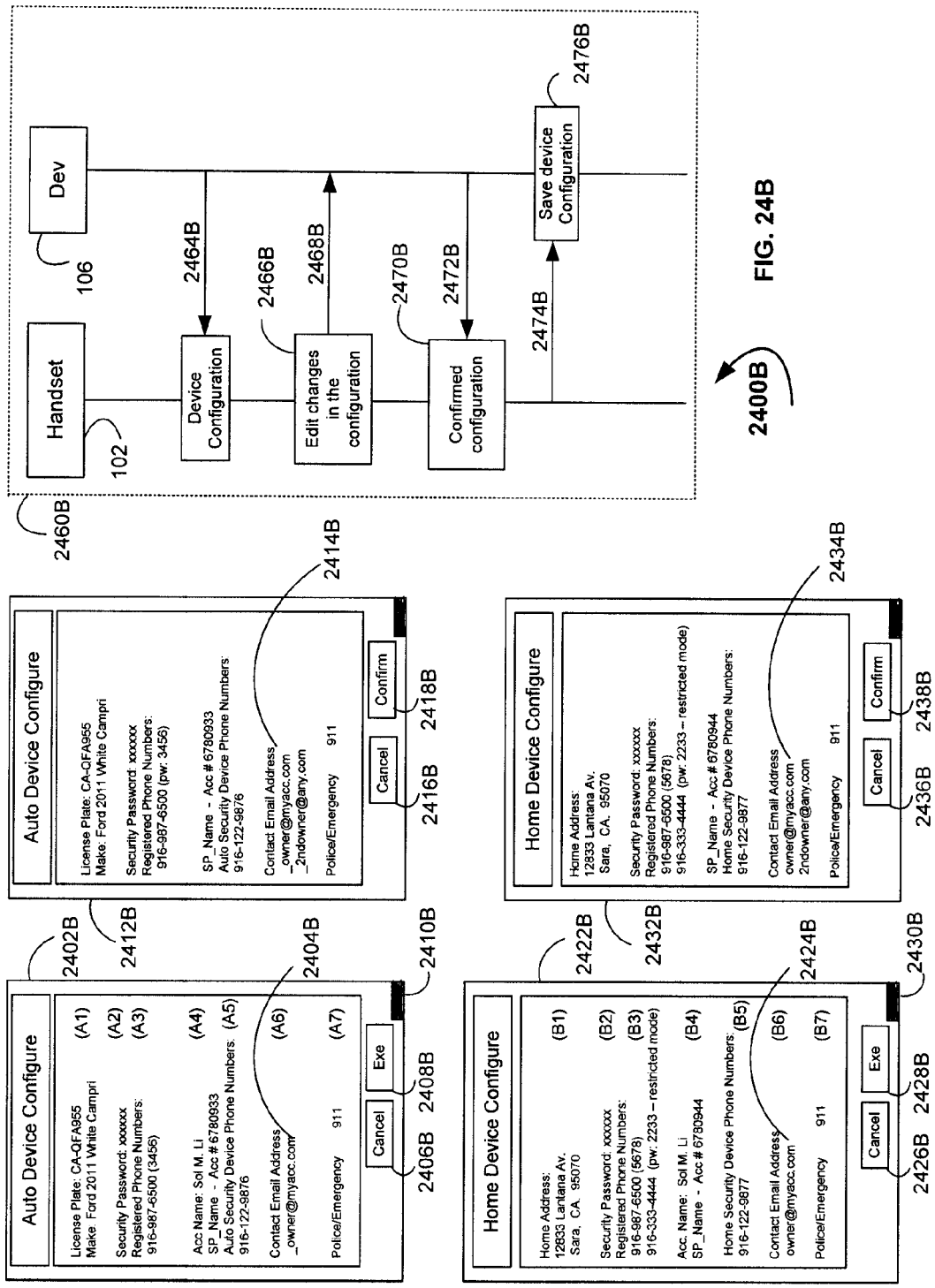
FIG. 24B shows a preferred example of handset's screen displays and a flow diagram, presenting the configuration (command) of Dev 106, relating to the present invention in the auto/home application.
Figure 24C:
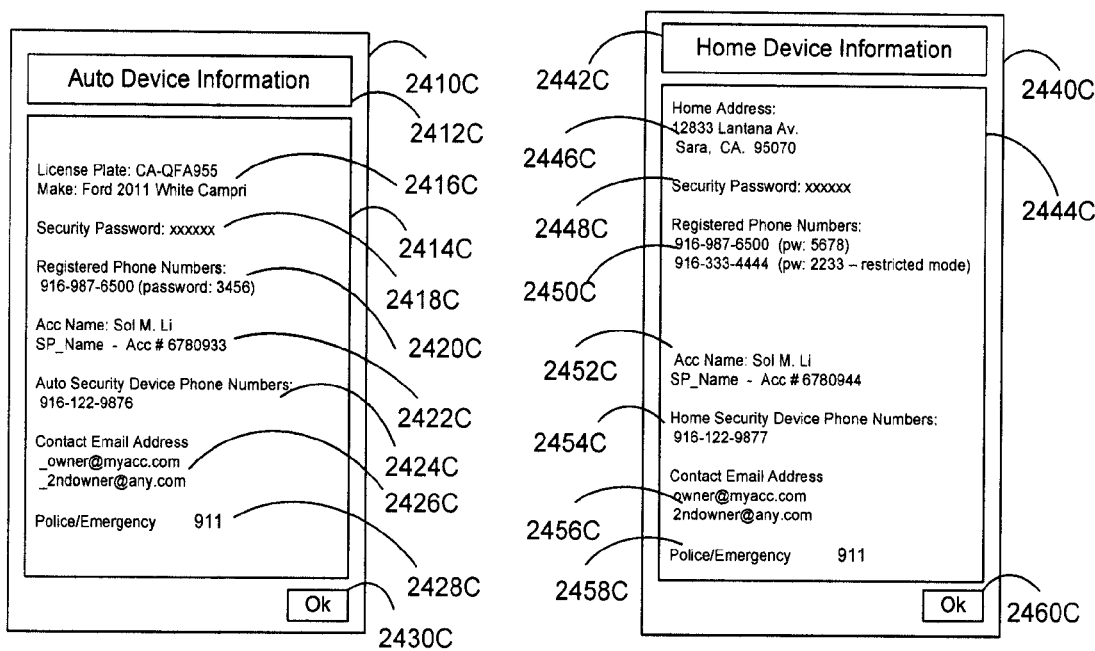
FIG. 24C shows a preferred example of handset's screen displays, presenting the Auto/Home Device/Dev Information (command) of Dev 106, relating to the present invention.

FIG. 24B illustrates a preferred application example of embodiment and 2400B of the present invention. This exemplary embodiment presents preferred steps taken by a user in his/her handset 102 to configure the Dev 106 with any changes in personal and or handset information.

It presents the continuation of screen 2402A/2422A, where in this case the user entered the correct account security password 2408A/2428A which was transmitted by the handset 102 to the Dev 106 as described previously in FIG. 24A. The Dev 106 transmits back 2464B (in diagram 2460B) its device configuration data to the handset 102 which displays it on screen 2402B/2422B. Some preferable information (not all) is shown, such as: vehicle ID information (A 1 )/home address (B 1 ), account security password (A 2 /B 2 ), registered handset phone numbers and its passwords (A 3 /B 3 ), user name and account number (A 4 /B 4 ), Dev phone number (A 5 /B 5 ), email address (A 6 /B 6 ), and emergency center phone number A 7 /B 7 . The user preferably can edit to change information on screen 2402A/2422A (also shown in step 2466B) any information but the registered handsets' phone numbers (A 3 /B 3 ) and Dev's phone number (A 5 /B 5 ). Let us assume that the user edit changes (step 2466B) by adding a second email address 2404B/2424B and executes Exe icon 2408B/2428B making the handset 102 transmit the command and data to the Dev 106 (step 2468B). The Dev 106 then processes the data and sends it back (step 2472B) to the handset 102 for user confirmation (screen 2412B/2432B and step 2470B) showing a second email address (2ndowner@any.com) has been added (2414B/2434B) into the configuration/device file. The user then confirms 2418B/2438B making the handset 102 transmit the confirmed data back (step 2474B) to the Dev 106 which saves it in its memory (step 2476B).

FIG. 24C illustrates a preferred application example of embodiment 2400C of the present invention. This exemplary embodiment presents preferred steps taken by a user in his/her handset 102 to retrieve and view the Dev 106's device information.

Figure 25:
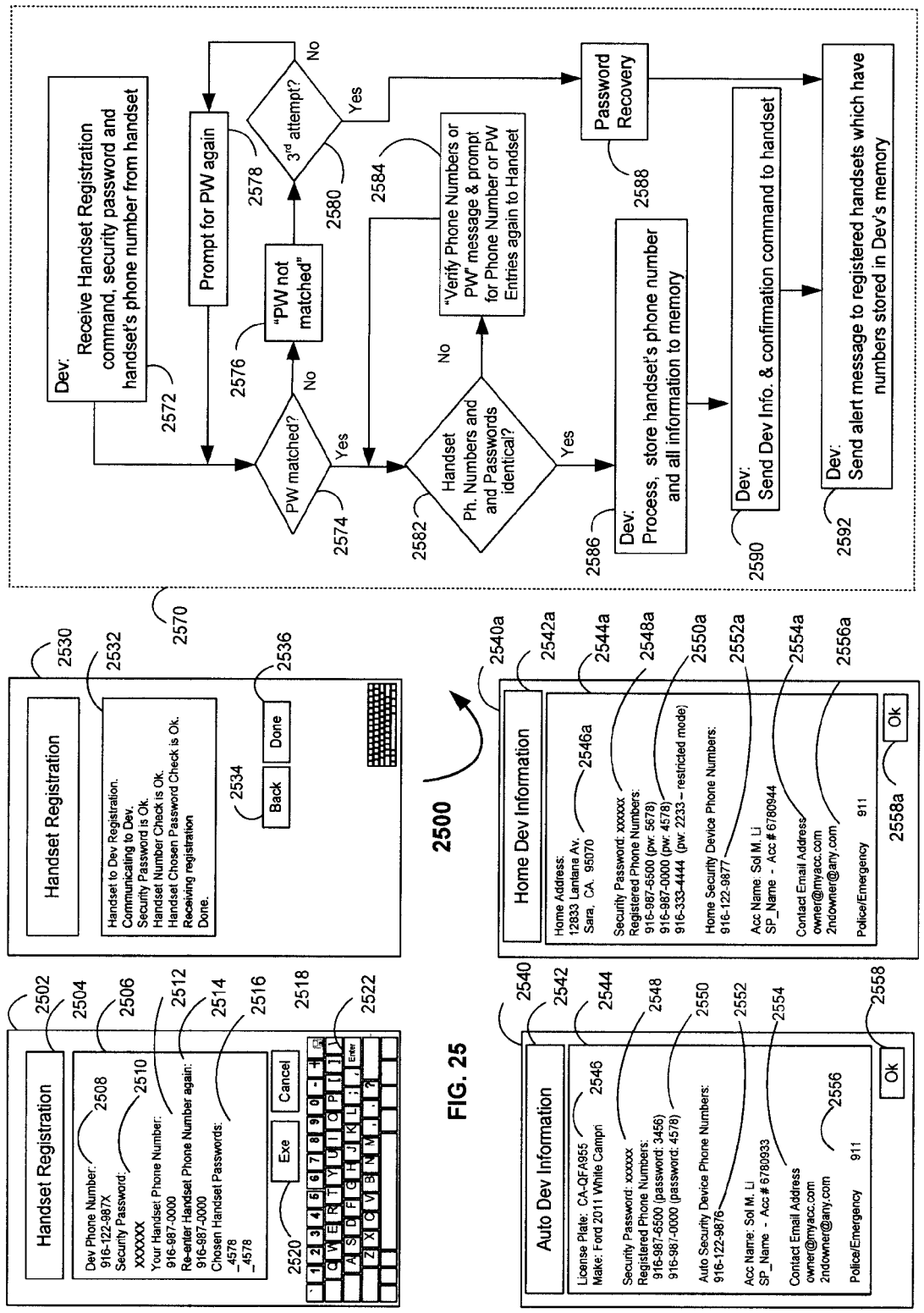
FIG. 25 shows a preferred example of handset's screen displays and a flow diagram, presenting the Handset Registration of a new handset 102 to Dev 106, relating to the present invention in the auto/home application.

The user executes the Dev Info icon 1166/1366 in the Auto/Home Dev Facility Menu 1150/1350 (FIG. 11/13), making his/her handset 102 transmit the device information query command to the Dev 106 which processes said command and sends the response back to said handset 102, which displays the Auto/Home Device Information as shown on its screen 2410C/2440C. It shows the Dev type Car ID information/Home address 2416C/2446C, account security password 2418C/2448C, registered phone numbers 2420C/2450C and passwords, account name and number 2422C/2452C, Dev's phone number 2424C/2454C, email addresses 2426C/2456C, and Emergency center phone number 2428C/2458C, FIG. 25 illustrates a preferred example of embodiment 2500 of the present invention. This exemplary embodiment presents preferred steps taken by a user in his/her new handset 102 to register said handset 102 to the Dev 106.

This feature allows the user to register a new handset 102 if he/she lost his/her only registered handset. Let us suppose that the user lost his/her old handset (phone number 916-987-6500 in 2410C/2440C) and bought a new one (phone number 916-987-0000). The user then registers the new handset 102 into the Dev 106. This feature thus allows a new handset 102 to be registered into the Dev 106 in case the old registered one is no longer available. With the newly registered handset 102, the user can use it to remove (deregister) the lost handset 102 as was previously described in FIG. 23. Also as mentioned earlier, he/she needs to download the application (and activation) online in order to run the application and uses the related commands/icons to register his/her handset 102 into the Dev. He or she does not have to be in the vicinity (within the SRC range) of the Dev 106 since it already registered with the network. The requirement is that the user knows the Dev's phone number and its security password in order for his/her handset 102 to transmit the command and data to the Dev 106 to begin the registration. The person who has the possession of the lost handset, if it is the case, will be notified of the registration as shown in step 2592, and on the handset's screen 2650 (of FIG. 26) but will not be able to prevent it since he/she does not have the account security password to enter as shown at 2666 (FIG. 26).

The user executes the Handset Register icon 1158/1358 in FIG. 11/13, making his/her handset navigate to the Handset Registration menu as shown on its screen 2502. In area 2506, the user enters the Dev phone number 2508, the account security password 2510, the handset phone number twice (2512 and 2514) and the chosen handset password twice (2516). The user then executes the Exe icon 2520 making the handset 102 transmit the command and data to the Dev 106 which receives and processes said information (2572 in chart 2570).

From here on, the inventor will skip, (on occasion,) the handset screen display messages (2510) which prompt back and forth the communication between the handset 102 and the Dev 106 for the required account security password entries and retries. He also will skip, (on occasion,) the handset screen display messages, such as: the phone numbers not matched and the reentries, or the chosen handset passwords not matched and the reentries, (for ease of presentation,) as are known to those of ordinary skill in the art.

While the Dev's requirement for account security password and handset password might be overlapped for certain common functions, each type of password is required (for the user's protection) in order for the Dev to perform its separate operations. They (functions requiring the account security password) are for the Dev's structure functions such as: handset registration, handset addition or removal, device configuration, device information, handset locator, toll fee payment setup, route and speed tracking, home alarm configuration, home appliances/equipments addition and removal, and the like. And the handset password is for the Dev's operation functions such as: vehicle/home control, program, monitor and view, engine status, home appliances/equipments operations, vehicle locator, and the like.

Flow chart 2570 shows the program flow of the Dev 106 when it executes the Registration command transmitted by the handset (screen 2502). It starts at step 2572 when it receives the command and the data, then verifies that if the account security password (PW) is correct 2574. When the account security password is correct, the Dev 106 checks to see if the handset phone numbers entered two times 2512 and 2514 are identical and so are the chosen handset passwords 2516 (in step 2582). The Dev 106, at the same time, transmits the registration process status to the handset (screen 2532, to keep the user informed). If they all are, the Dev 106 proceeds to process the command and stores all information (including the handset's phone number step 2586) into its memory. It then sends a confirmation command or the Auto/Home Dev Information 2540/2540*a* (in step 2590) to the handset 102 to confirm its completion 2558/2558*a*. When the account security password does not match, the Dev 106 transmits the message "PW not Matched" (step 2576) to the handset 102 and lets it attempt 3 times (step 2580) and if it fails, the Dev 106 goes to password recovery 2588 and also sends messages to other registered handsets 102 informing them of the action (step 2592). This feature allows users to be informed if there is any illegal registration from an unauthorized source. If the handset phone numbers or handset's chosen password entries are not identical, the Dev 106 goes to step (step 2584) requiring the user to re-enter the information.

FIG. 26 illustrates a preferred example of embodiment 2600 of the present invention. This exemplary embodiment presents preferred steps taken by a user in his/her new handset 102 to register said handset 102 into Dev 106 via the SRC network.

Chart 2602 presents a new handset 102 attempting to activate/register with the Dev 106, and the screen display 2650 of a registered handset 102 receiving the alert of said attempted activation/registration. The activation/registration starts at 2604 when the Dev activation button is pushed. The Dev 106 checks to see if its current account is active 2606; and if the account is not active (either has not been activated, or has been deactivated or has not been able to register into the network for the last 30 days, for example), it sends the inquiry message to the activating/registering handset 102 (2608). If the Dev 106, within some short amount of time, is getting no response back 2610, it sends messages 2614 to said handset 102 indicating that said handset 102 user needs to download the application (app) software to activate and communicate with the Dev 106 (these steps have already been presented in FIGS. 8 and 9/10). If in step 2610 the Dev 106 gets the proper response back from the handset 102, then the activation starts 2612 (as illustrated in FIGS. 11/13, 12/14, 15A-18 which already presented one or the plurality of ways of activating the Dev 106). All the communication between the Dev 106 and the activating/registering handset 102 in this figure uses SRC (Short Range Communication), such as: either Bluetooth, wireless USB, NFC, WI-FI, infrared, wireless LAN, wireless radio frequency (RF) technology, or countless short-wave communication as are known to those of ordinary skill in the art and it is as shown in 104 FIG. 1.

If the Dev 106's account is active (in other words, it is registering/connecting to the network), it sends messages "You need the right software to run this application" (2616) to the registering handset 102. The user either downloads the application (app) online 2618 (by typing in the URL of the App Server 906/1006 on his/her handset's screen, and hits the screen keyboard return, as shown previously on screens 920/1020, 940/1040, 960/1060 and 980/1080 of FIG. 9/10), if his/her handset 102 does not contain the software. Or the user just runs his/her handset's existing application 2620 (as shown previously on the handset screen 2502 of FIG. 25 after its user executed the Handset Register icon 1158/1358 in FIG. 11/13).

At step 2621, the Dev 106 checks to see if any registered phone numbers exist in its memory. If no registered phone numbers exist in its memory, while the Dev 106 is being active, meaning it is containing a SIM card module (270 of FIG. 2/3/4) in its slot (and that was the reason it did not have to go through the normal activation process, as illustrated in FIGS. 11/13 to 12/14, and 15A to 18 in order to be able to register into a network). At step 2623, (thanks to the presence of the SIM card,) the Dev 106 is connecting to the network, but a first handset's phone number has to be registered into said Dev's memory in order for these two devices to communicate with each other. The Dev 106 prompts the user of the new handset for his/her chosen security passwords (2623) and verifies if their entries are identical step 2625. If the security password entries are identical, the Dev 106 prompts for the handset phone number entries and its chosen handset password entries at step 2627, then proceeds to verify them at step 2640.

At step 2624, (there are registered phone numbers in the Dev's memory, meaning the Dev 106 went through the normal activation and registration process,) the Dev 106 receives the handset registration command, account security password, handset numbers and chosen handset passwords from the registering handset 102. The Dev also alerts (step 2622) by sending messages 2654 to the owner of the registered handset 102 of this attempted registration (as shown on his/her handset screen 2650).

At screen 2650, the owner of the alerted handset 102 can see the nature of the alert 2652, the message 2654, time and date 2656, the registering handset/mobile phone number 2660. The owner can speed up the registering process by entering the correct password 2666 in order to be able to select Ok icon 2658 to allow it, or No icon 2662 to stop it (the password is required here preferably to make sure that he/she is the real owner of the handset). This makes his/her handset 102 transmit the command to the Dev 106, which receives it either in 2626 or in 2644 (chart 2602).

Back in chart 2602, the Dev 106 verifies if the account security password (indicated by 1936*a*/2036*a* in screen 1930*a*/2030*a* of FIG. 19/20) is ok. From this point on and thereafter, if the Dev 106 receives the "OK" command in step 2626 from one of the handsets 102 (executed by 2658 icon in screen 2650), it proceeds to verifies the handset phone number and its password entries (they were both entered twice to prevent typing mistakes) to see if they identical 2640 (without going through the account security password entry verification 2630). If the Dev 106 receives a "No OK" step 2644 from one of the handsets 102 (executed by 2662 in screen 2650), it will stop the process right away step 2636. Nevertheless, if the Dev 106 receives no messages from a registered user, it proceeds to verify the account security password 2630 (since the owner might have lost his/her only handset 102 and wanted to register a new one). If the password is not ok, the Dev 106 prompts for another entry 2628. If the entry still fails at the third attempt 2632, the Dev 106 proceeds to the password recovery process step 2634 (described in FIG. 24A) and finally to goes to stop (step 2636). If the account security password passes, the Dev goes to handset phone number entry and handset password entry verification step 2640 to verify if their twice entries and identical. If their twice entries are not identical, it prompts for re-entry step 2638; or if they are, it proceeds to allow the handset 102 to start the registration 2642; as already described in FIG. 25.

Figure 27:
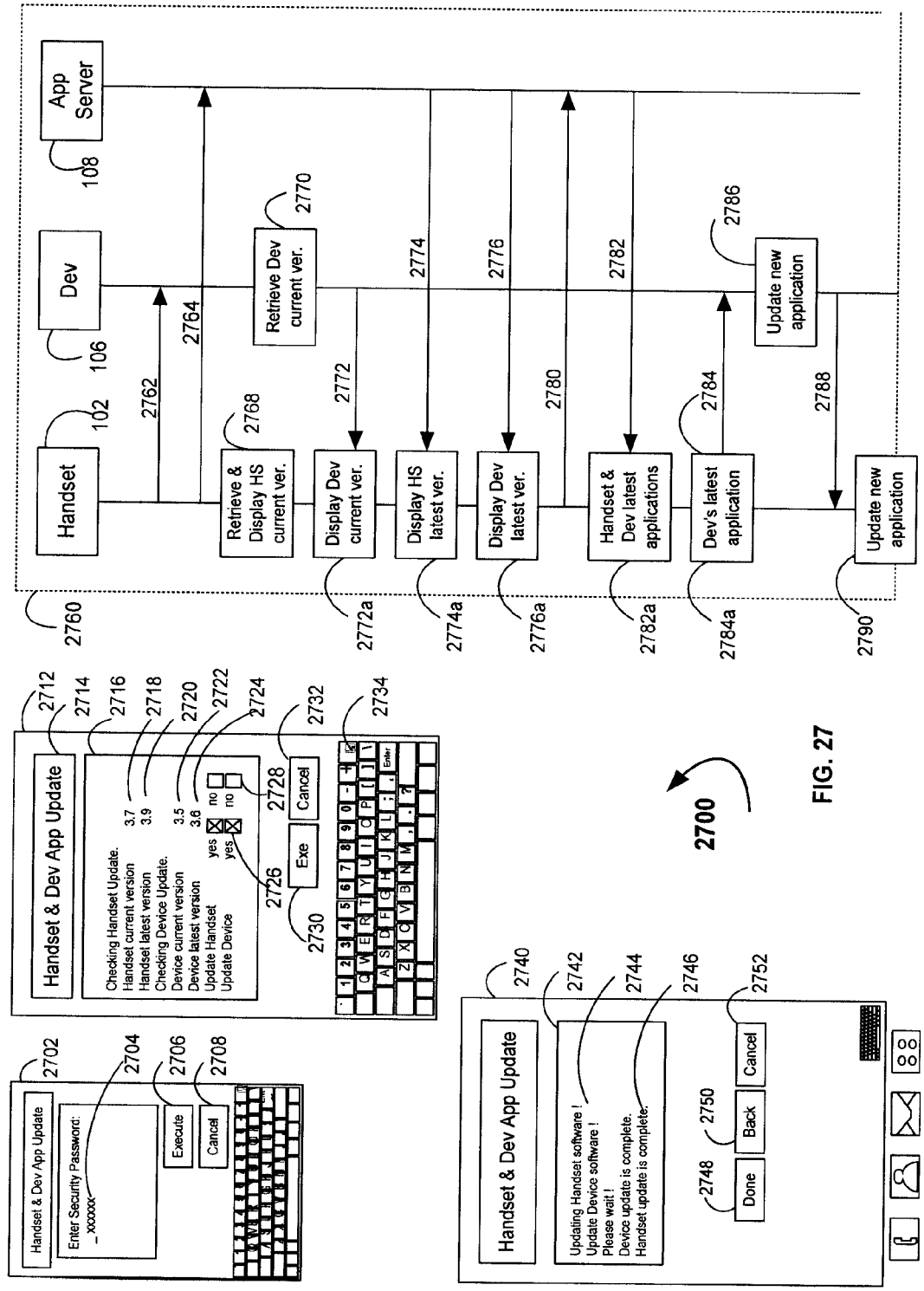
FIG. 27 shows a preferred example of handset's screen displays and a flow diagram, presenting the App Update between handset 102 and of Dev 106, relating to the present invention.

FIG. 27 illustrates a preferred example of embodiment 2700 of the present invention. This exemplary embodiment presents preferred steps taken by a user in his/her handset 102 to update said handset 102 and the Dev 106 applications.

The user executes the Handset and Dev App Update icon 1164/1364 of FIG. 11/13, making his/her handset navigate to the Handset and Dev App Update command as shown on its screen 2702. The handset prompts the user to enter the account security password (this embodiment assumes the handset already retained/stored the URL of the App Server for the convenience of the user, otherwise it will also prompt the user for the App Server' URL 906/1006 of FIG. 9/10). When the password 2704 matches (otherwise the Dev 106 proceeds to password recovery as in FIG. 24A) with the one in its memory, the handset 102 navigates to screen 2712 and transmits the app version query command to the Dev 106 (step 2762) and the App Server 108 (step 2764) which both send back the version information steps 2772, 2774 and 2776 respectively as displayed by the handset 102 in screen 2716: the handset current ver. 2718/2768, handset latest ver. 2720/2774*a*, Dev current ver. 2722/2772*a* and Dev latest ver. 2724/2776*a*. When the user wants to update to the latest app version 2726 and executes the Exe icon 2730, making the handset 102 transmit the app download command to the App Server 108 (step 2780), and receives (step 2782) the downloaded copies of the latest application (2782*a*) from the App Server 108. The handset 102 then transmits the Dev's latest version app (2784*a*) and the app update command to the Dev 106 (step 2784). When the Dev 106 receives the command and the latest version app, it updates its application to the latest version app 2786 and then sends back to the handset 102 the acknowledgement 2788. Next the handset 102 updates its application to the latest version 2790. The updated information of both the handset 102 and the Dev 106 is displayed by the handset 102 in screen 2740. Alternatively, the Dev 106 can download the latest version app directly from the App Server 108 when it receives the app update command from the handset 102.

Figure 28:
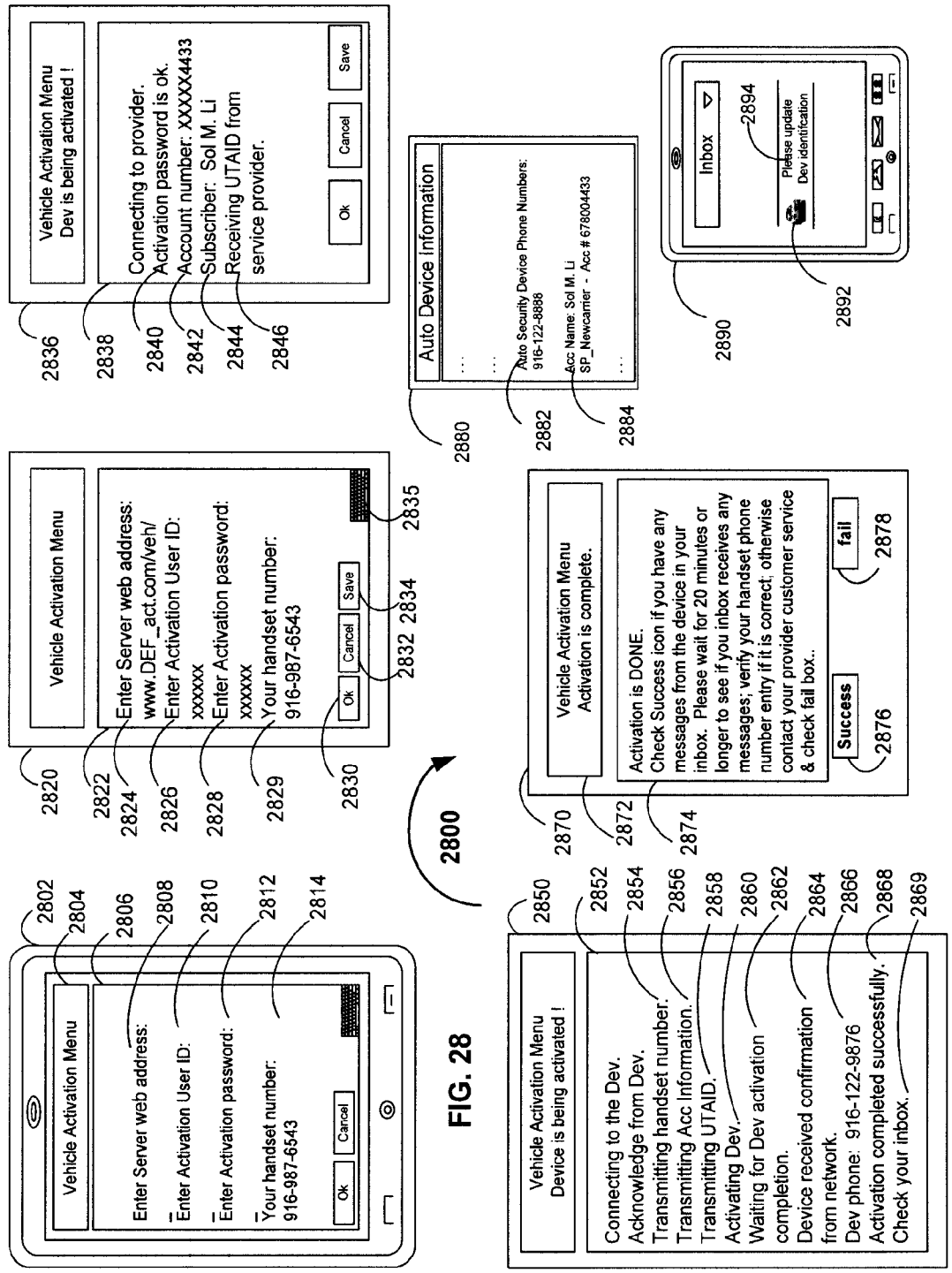
FIG. 28/29 shows a preferred example of handset's screen displays of present invention, in having the active Dev 106 activated into another network, in auto/home application (in a case where the user picks/switches cellular service to a new provider).
Figure 29:
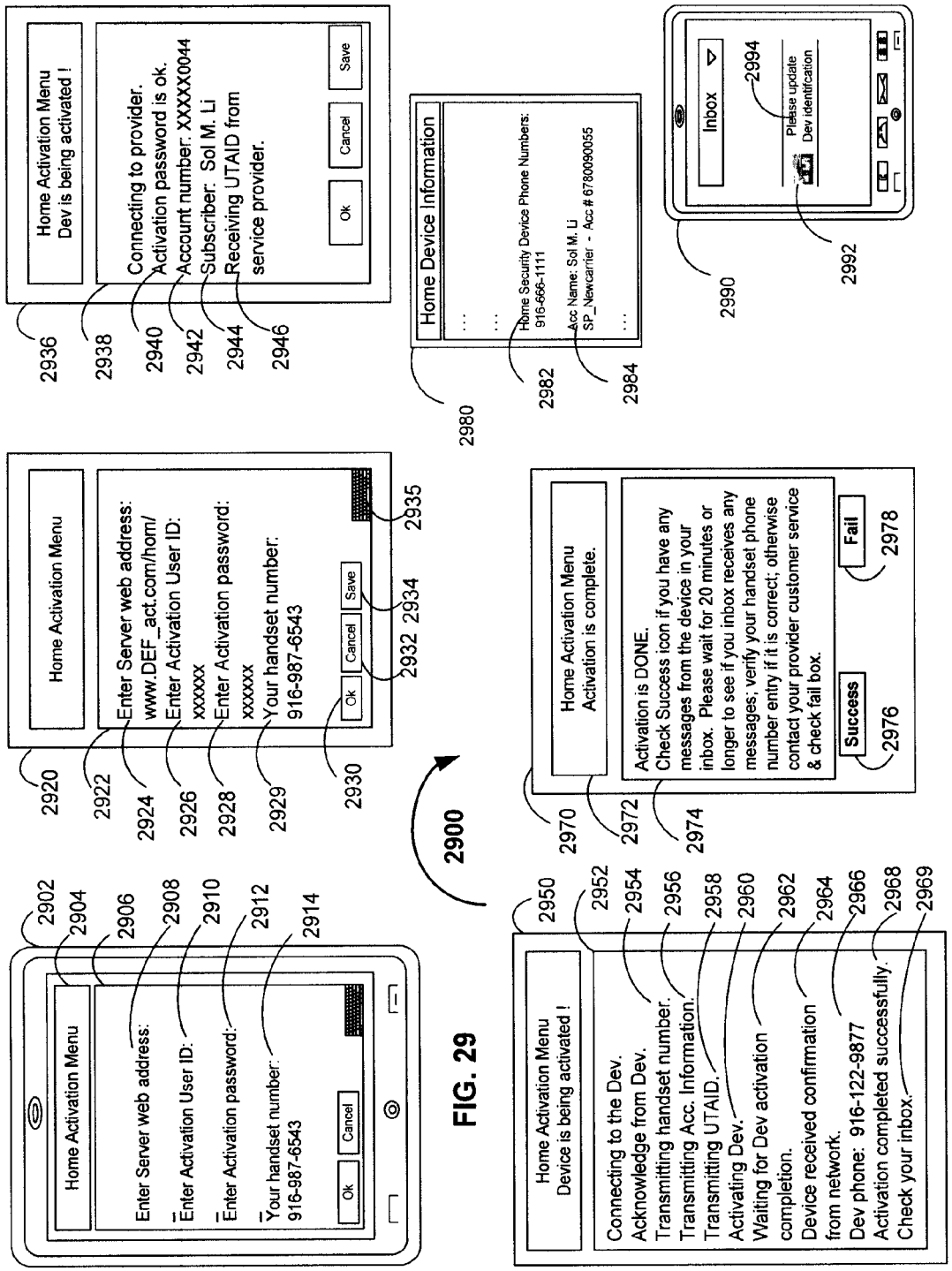

FIG. 28/29 illustrates a preferred application example of embodiment 2800/2900 of the present invention. This exemplary embodiment presents preferred steps taken by a user in his/her handset 102 to activate his/her currently registered Dev 106 into the network of a new cellular provider when he/she decides to switch to said provider.

This embodiment shows when the user decides to switch the cellular service of the Dev 106 to a different (second) cellular service provider, he/she has to have the Dev 106 activated into the new network. It is preferable that the user has his/her Dev 106 activated into the new (second) service provider's network before he/she has the Dev 106 disconnected from the existing (first) service provider's network. In other words, the Dev 106 should still have access to the current network while the user is having it (Dev 106) activated into a second network. As soon as the Dev activation into the new network is completed, the user can have the Dev 106 disconnected from the current (first) service provider's network. This allows the user to use the handset 102 in communicating with the Dev 106 during activation via cellular network instead of via the SRC 104 medium (in other words, he/she can activate the Dev 106 anywhere instead of having to be in the vicinity of the Dev 106 as done previously).

The activation process begins, after the user executes the Activate icon 1154/1354 of the Auto/Home Dev Facility Menu 1150/1350 (FIG. 11/13), making his/her handset navigate to the Vehicle/Home Activation menu, as shown its screen 2802/2902. The rest of the activation procedure is identical as shown in FIG. 28/29, which is nearly identical to FIG. 12/14 with the exception that the Dev 106 already contained handset's phone numbers 2814/2914; whereas the user had to enter it 1214/1414 in screen 1202/1402 of FIG. 12/14. As soon as the Dev is activated and able to register and connect into the new network with the user confirming command success to the Dev 106 (by executing the Success icon 2876/2976), the Dev 106 sends its Device Information (screen 2880) containing its phone number, which the handset stores and uses from then on in its communication with the Dev 106. The Dev's cellular service to the current network can then be disconnected and from here on the Dev 106 communicates with other mobile devices (handsets) 102 in the new network. The Dev's information file (screen 2880) contains the same programmed data. In other words, there is no need for the user to reinitialize or reconfigure the Dev 106. Preferably the only difference is the new account number 2884/2984 (plus the name of the new service provider) and possibly the Dev has been assigned a different phone number 2882/2982. The Dev also preferably sends command(s) to the other handset(s) as shown in the forms of the icon 2892/2992 in the inbox(es) (screen 2890/2990) along with messages 2894/2994 informing the user(s) to update his/her (their) handset(s) with the Dev's (new) number.

Figure 30:
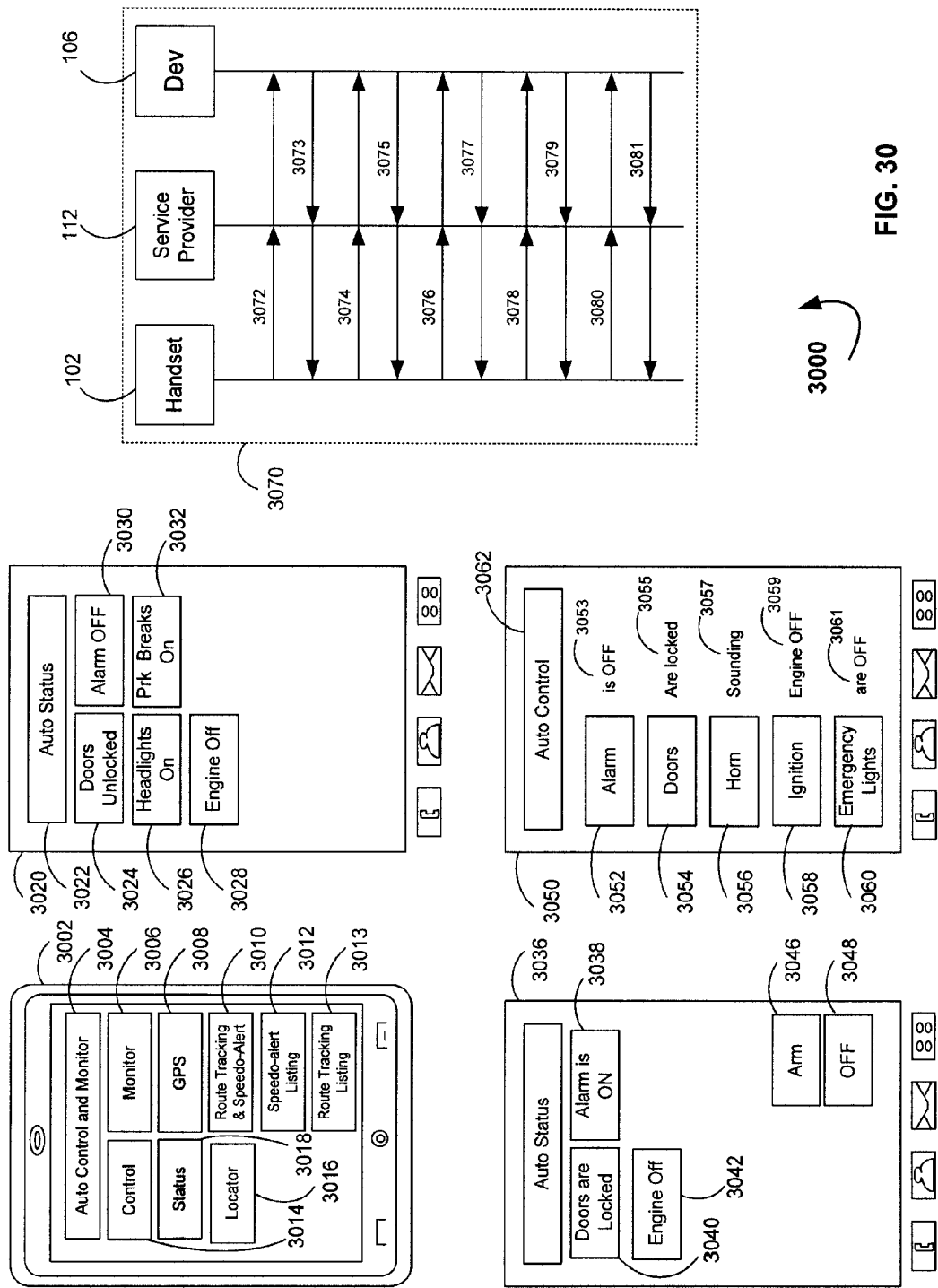
FIG. 30 shows a preferred example of handset's screen displays and flow diagram, presenting the Control and Monitor menu of Dev 106, relating to the present invention in the automobile application.

FIG. 30 illustrates a preferred application example of embodiment 3000 of the present invention. This exemplary embodiment presents preferred steps taken by a user in his/her handset 102 to program, retrieve, view and monitor the Dev Auto Control and Monitor system.

The user executes the Auto Control & Monitor icon 1132 in the Auto App Menu 1120 of FIG. 11, making his/her handset navigate to the Auto Control and Monitor Menu as shown on its screen 3002. The Auto Control and Monitor Menu 3004 presents the user with the Control icon 3014 which the user uses to control the vehicle accessories (screen 3050), such as: to turn the alarm on/off 3052, to lock/unlock doors 3054, to sound the horn 3056, to turn the ignition on/off 3058 and the emergency lights 3060. The Status icon 3018, which the user uses to view the status of the vehicle at the moment, is shown in handset screen 3020/3036. The Monitor icon 3006 is the input of the cameras (216 of FIG. 2) in the vehicle which the user can use to monitor real time of what's happening around and inside the vehicle (as shown in screens 4180B and 4190B of FIG. 4100B).

Chart diagram 3070 shows the interaction between the handset 102 and the Dev 106 as discussed in screen 3050. Take for example when Alarm icon 3052 is selected (screen touched) by the user, the handset 102 sends the alarm "toggle command" to the Dev 106 (In this example, the inventor adds the Service Provider 112 to show that as always, the Dev 106 has to have access to the network in order to communicate with the handset 102 and other devices) as shown in step 3072 of graph 3070 via the cellular network when the handset 102 is not in the vicinity within the Dev 106's SRC medium range. On the other hand, when both the Dev 106 and the handset 102 are within their SRC medium range, they preferably select to communicate with each other via the SRC communication network, which can be faster and preferably just as secure since built-in protection, such as: the handset's phone number has been encapsulated into the data streams and, if necessary, the owner's account security password has been also preferably encrypted.

If the Alarm was on before the Dev 106 receives the command from the handset 102, it will toggle and send the "Alarm is OFF" 3053 shown in step 3073. Step 3072 corresponds to the icon Alarm selection 3052; step 3073 corresponds to the message "is OFF" 3053. Step 3074 corresponds to the icon Doors selection 3054; step 3075 corresponds to the message "Are locked" 3055. Step 3076 corresponds to the icon Horn selection 3056; step 3077 corresponds to the message "Sounding" 3057. Step 3078 corresponds to the icon Ignition selection 3058; step 3079 corresponds to the message "Engine OFF" 2359. Step 3080 corresponds to the icon Emergency Lights selection 3060; step 3081 corresponds to the message "are OFF" 3061.

Figure 31:
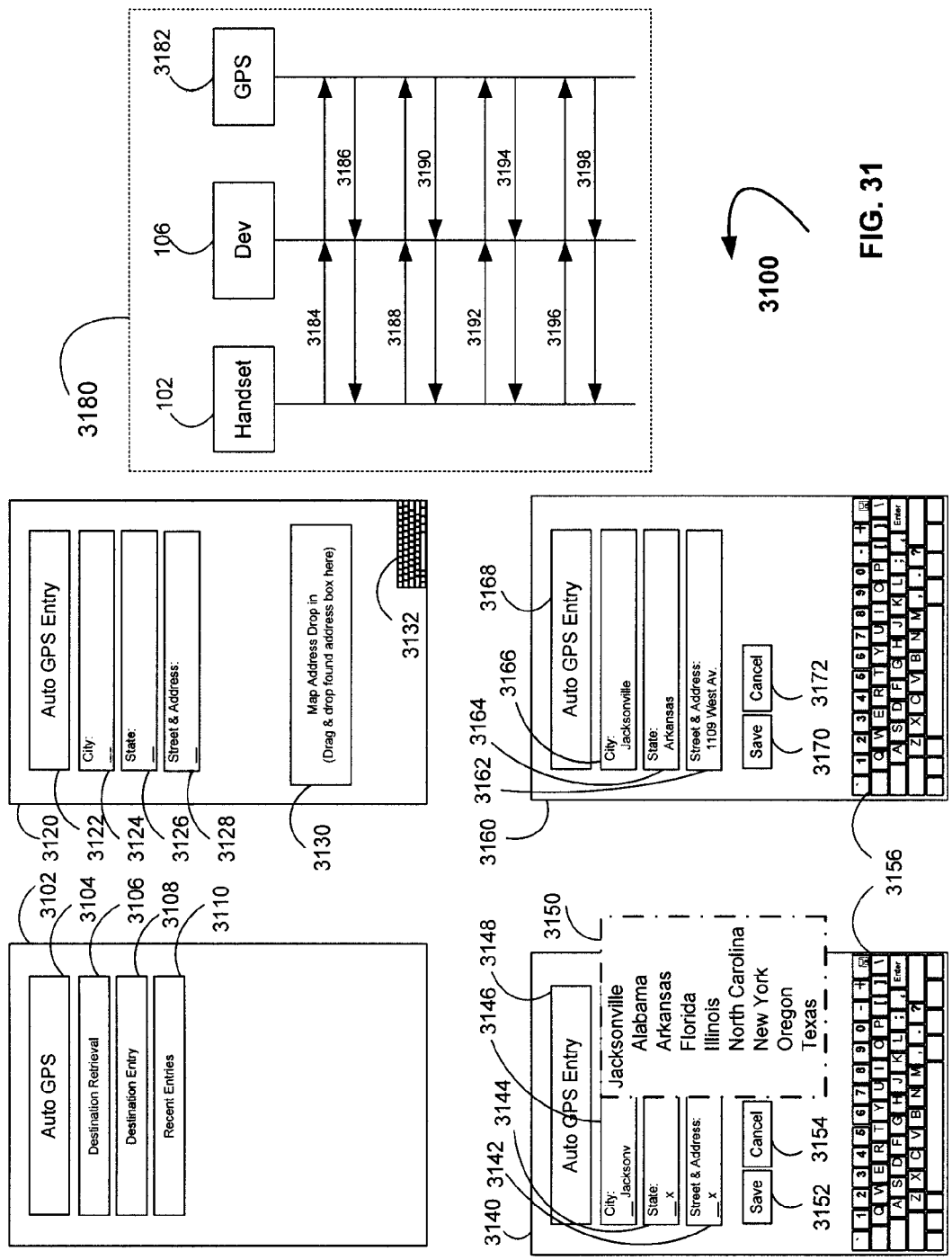
FIG. 31/32 shows preferred examples of handset's screen displays and a flow diagram, presenting the GPS entries of Dev 106, relating to the present invention in the auto application.

FIG. 31 illustrates a preferred application example of embodiment 3100 of the present invention. This exemplary embodiment presents preferred steps taken by a user in his/her handset 102 to retrieve, view, and enter information into the Dev GPS system.

The user executes the GPS icon 3008 (FIG. 30), making his/her handset 102 transmit the command to the Dev 106, which in turns processes said command and passes it to the GPS 3182, receives the response from said GPS 3182, processes said response and passes it back to the handset 102, which displays the Auto GPS menu, as shown on its screen 3102. It shows the Auto GPS menu 3104 comprising the GPS address Destination Entry 3108, the Destination Retrieval 3106, and the Recent Entries icons 3110. The GPS Destination Entry and the Destination Retrieval allow the user to enter and retrieve the GPS location addresses without seating at the driver's seat.

To enter the location addresses to the GPS, the user first selects the Destination Entry icon 3108, making the handset 102 navigate to screen 3120. The user then enters City 3124, State 3126, Street and Address 3128 using keyboard 3132 for data inputs. When the user enters the name of the city 3146, the handset 102 transmits the information preferably in real-time (IM) to the Dev 106 which passes the information to the GPS 3182 which in turn responds with a pop up hint screen 3150 (when the number of characters, making the city name narrows to dozen or less of potential matched names) via the Dev 106 as presented in screen 3140. After all the address information is done, executing the Save icon 3170 will make the handset 102 send the information and the command to the Dev 106 which passes it to the GPS 3182 to save all the information in screen 3160 to the GPS memory.

Graph 3180 shows the interaction between the handset 102, the Dev 106 and the GPS 3182 (Service Provider 112 is omitted here for ease of presentation). In graph 3180, the Dev 106 acts like a conduit, translating and passing the information back and forth between the handset 102 and the GPS 3182. Step 3184 corresponds to passing the city name 3166 from the handset 102 to the Dev 106 and to the GPS 3182. Step 3186 is the corresponding the response from the GPS 3182 to the Dev 106 and then to the handset 102. Step 3188 corresponds to passing the State name 3164 from the handset 102 to the Dev 106 and to the GPS 3182. Step 3190 (if any) is the corresponding response from the GPS. Step 3192 corresponds to passing the Street and Address 3162 from the handset 102 to the Dev 106 and to the GPS 3182. Step 3194 (if any) is the corresponding response from the GPS 3182. Step 3196 corresponds to the command Save icon 3170 from the handset 102 to the Dev 106 and to the GPS 3182. And finally step 3198 (if any) is the corresponding response from the GPS 3182. Alternatively, steps 3184, 3188, 3192 and 3196 can be combined into one single step (or all the GPS information in one packet) to the Dev 106 and gets a single response back 3198 from the Dev 106. The steps and ways presented in the present invention are one or more of many applications which accomplish the same goal and should not be limited as the only way as are known to those of ordinary skill in the art.

Figure 32:
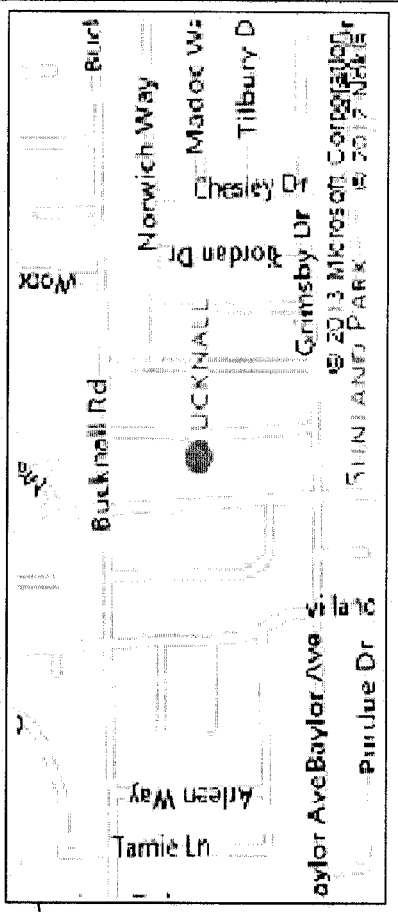

FIG. 32 illustrates a preferred application example of embodiment 3200 of the present invention. This exemplary embodiment presents preferred steps taken by a user in his/her handset 102 to retrieve, view, and enter the graphical information into the Dev GPS system.

The handset's screen display 3120 is repeated here to show an alternative way for the GPS entry using the drag and drop icon 3130. The user can use his/her handset 102 to Google search an address location 3204 and gets the search results 3206 and 3210. He/she then just copies and drags the information in 3208 over, then drops it into the icon 3130 which the handset 102 decodes and translates into Street and Address 3246, City 3242, and State 3244. The user then selects the Save icon 3252 to have the handset 102 transmitted the information to the Dev 106 which passes it over to the GPS 3182 as demonstrated in flow diagram 3180 of FIG. 31.

Figure 33:
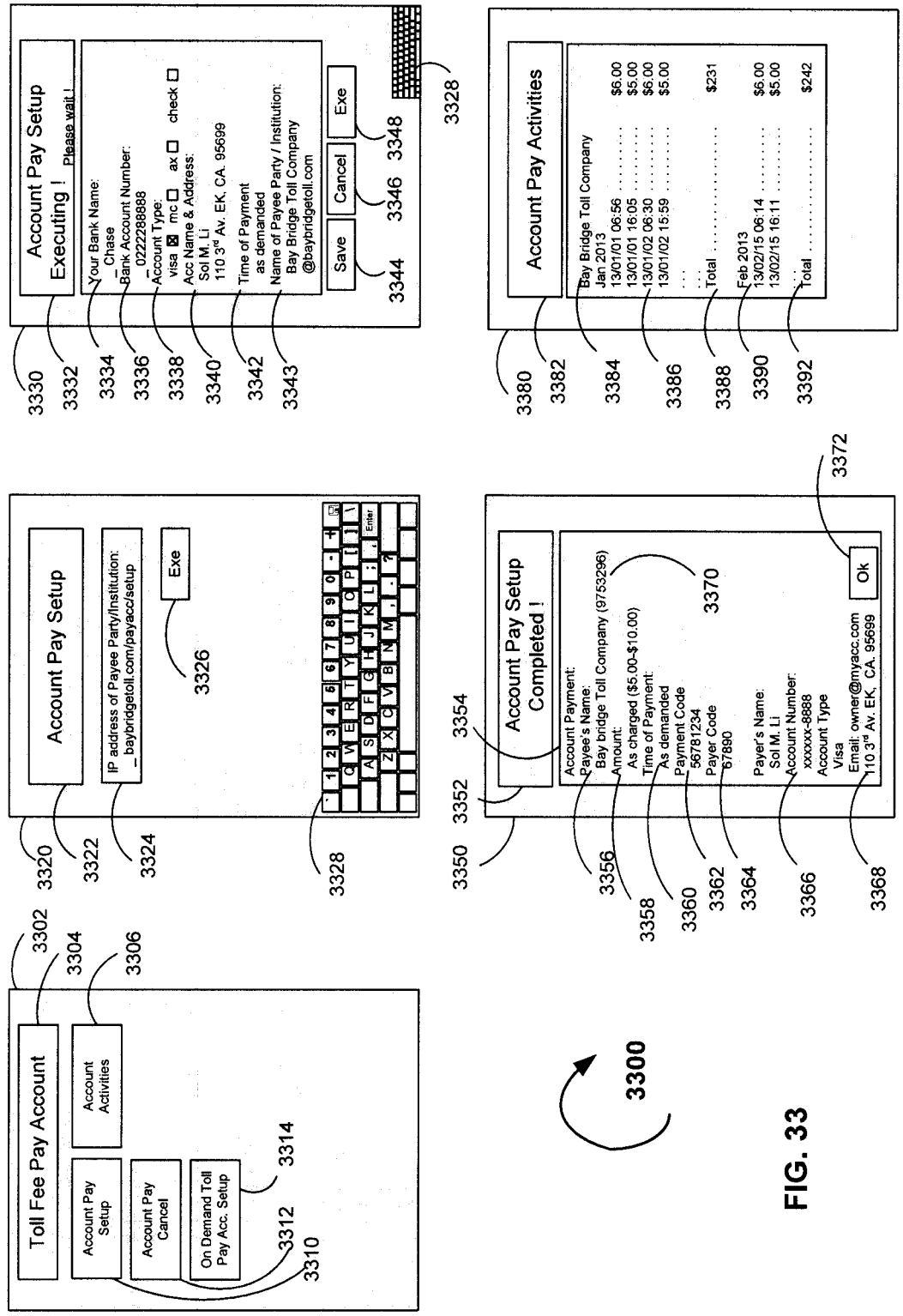
FIG. 33 shows a preferred example of handset's screen displays, presenting the toll fee account setup menu, and the account activity listing of Dev 106, relating to the present invention in the auto application.

FIG. 33 illustrates a preferred application example of embodiment 3300 of the present invention. This exemplary embodiment presents preferred steps taken by a user in his/her handset 102 to program, set up pay account and view the activity listing of the Dev Toll Fee Payment system.

The user executes the Toll Fee Pay Account icon 1134 (FIG. 11), making his/her handset 102 transmit the command to the Dev 106 which processes said command and sends the response back to said handset 102, which displays the Toll Fee Pay Account menu as shown on its screen 3302. It shows the Toll Fee Pay Account menu 3304 with the Account Pay Setup 3310 (used to set up a toll fee pay account), Account Pay Cancel 3312 (used to cancel an existing toll fee pay account), Account Activities 3306 (to display various existing toll fee pay accounts and activities), and On Demand Toll Pay Acc Setup 3314 (to pay on demand from any toll fee collector on/from this account). Of course the driver 3752 can always elect to pay in cash. Screen 3320 and 3350 show examples of how the setup is done. Just as mentioned in the preceding and proceeding figures of this invention, examples such as these are not the only one resolution since there exist many ways to accomplish the respective applications, as are known to those of ordinary skill in the art.

Screen 3320 is the result of the user selecting the Account Pay Setup 3310 which the handset 102 navigates to after transmitting the command to the Dev 106 which responds back with the Account Pay Setup 3322. The user fills out with the Payee's web page link address 3324 in the payee's Account Pay Setup 3322 and then selects the Exe icon 3326 which the handset 102 executes and opens the Payee's webpage being displayed on screen 3330. This is where the user completes the required information, such as: his/her Bank Name 3334, Account Number 3336, Account Type 3338, and Account Name & Address 3340. He/she then selects the Exe icon 3348 which makes the handset 102 transmit the information to the payee's computer/server (not shown) to process the account payment information. When the Payee' computer/server (not shown) responds back the completion (screen 3350), it shows the Payee's name 3356 and its name code 3370, the amount it will charge 3358, the payment code 3362, the payer code 3364, and the payer's payment information 3366 and 3368. The user then executes the Ok icon 3372 making the handset transmit the confirmation to payee's computer/server, and the command (including the completion data screen 3350) to the Dev 106 which processes and saves the required payment setup data in its memory. The Dev 106 preferably transmits back the completion and confirmation to the handset (not shown). Other personal information, such as: user's phone number (not shown), and the like might be required, as are known to those of ordinary skill in the art.

Screen 3380 showing the Account Pay Activities allows the use to view past account activities, when the user selects the icon 3306 which the handset 102 navigates to after transmitting the command to the Dev 106 which responds back with the information as shown. It shows Payee's name 3384, individual payments 3386 and 3390 and total monthly payments 3388 and 3392.

Figure 34:
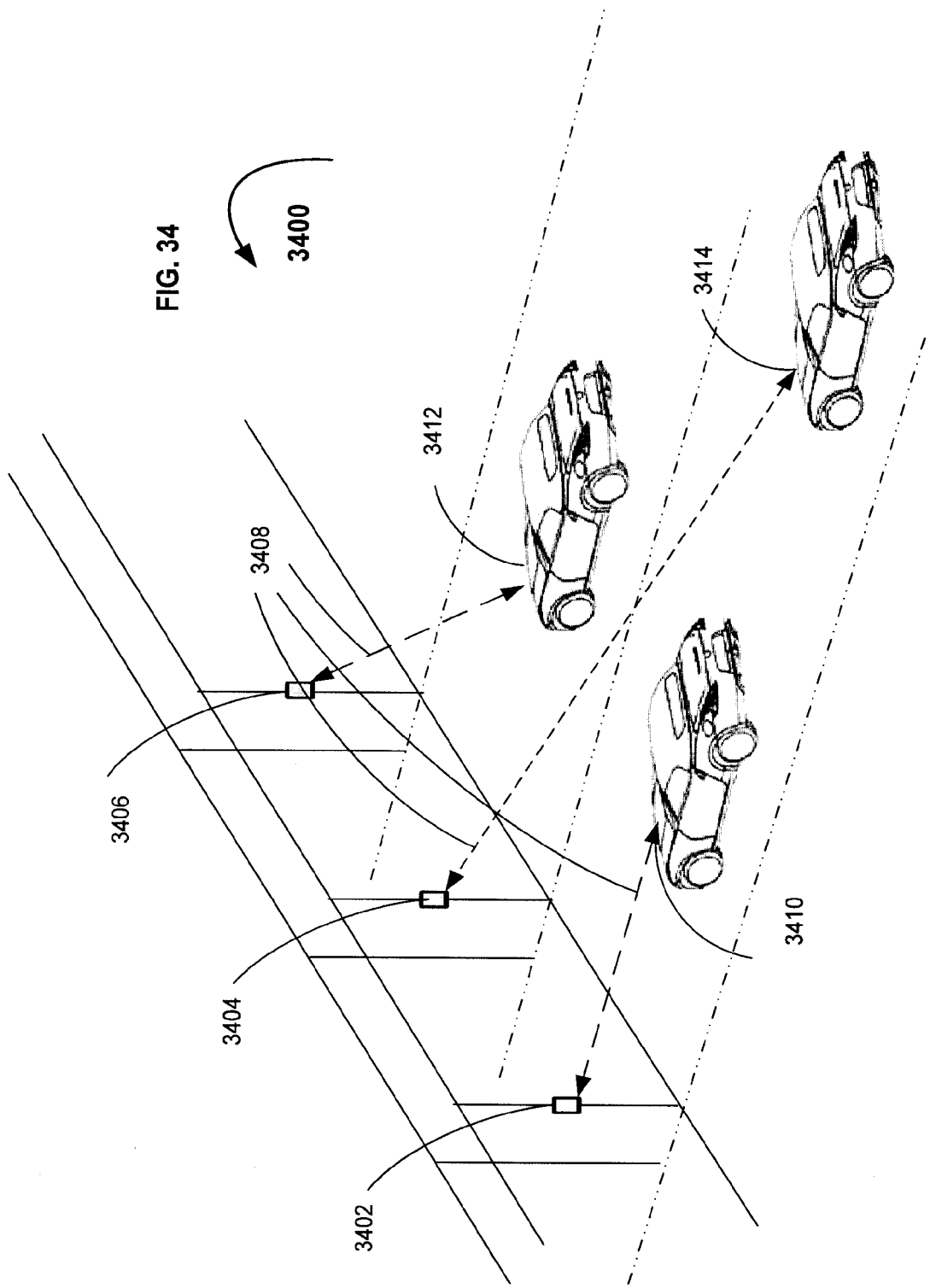
FIG. 34 shows an example of a toll collecting station with vehicles containing Devs/appliances 106, relating to the present invention in the automobile application.

FIG. 34 illustrates a preferred example of embodiment 3400 of the present invention. It shows a general view of the pay toll stations where cars 3410, 3412 and 3414 with the Devs 106 under their hoods completing the toll fee transaction with toll collectors/transceivers 3402, 3404 and 3406. The medium 3408 is preferably WiFi or SRC 104 (Short Range Communication) devices, such as: NFC 258, Bluetooth 260, wireless/wire USB 262 and other wireless radio frequency (RF) technology. The transaction data is preferably encrypted as agreed between the Dev 106 and the payee's computer/server (not shown) during setup as mentioned in 3320, 3330 and 3350 in FIG. 33.

Figure 35:
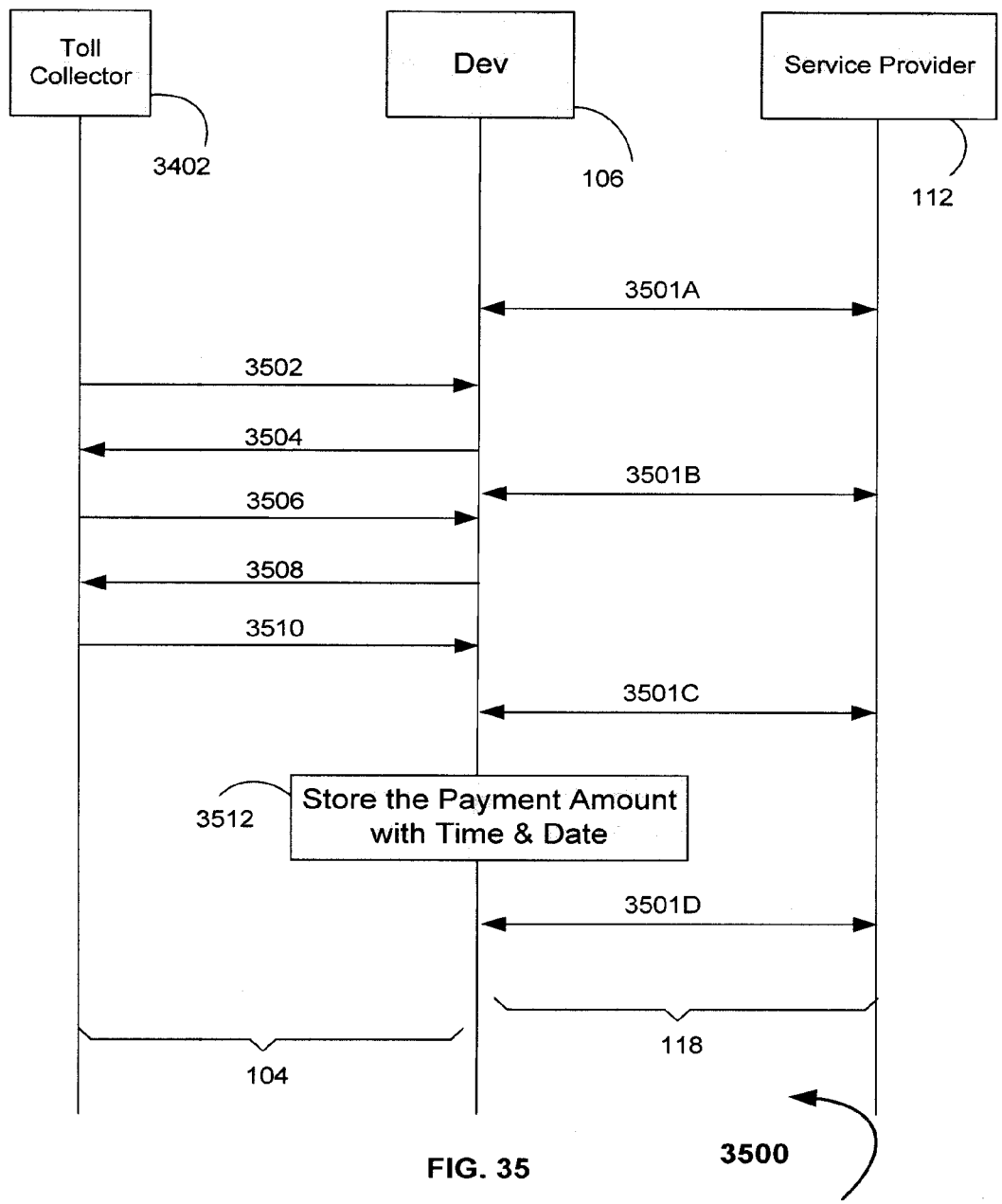
FIG. 35 shows a preferred example of a flow diagram, presenting the interaction of various devices during a toll collection, relating to the present invention in the automobile application.
Figure 36:
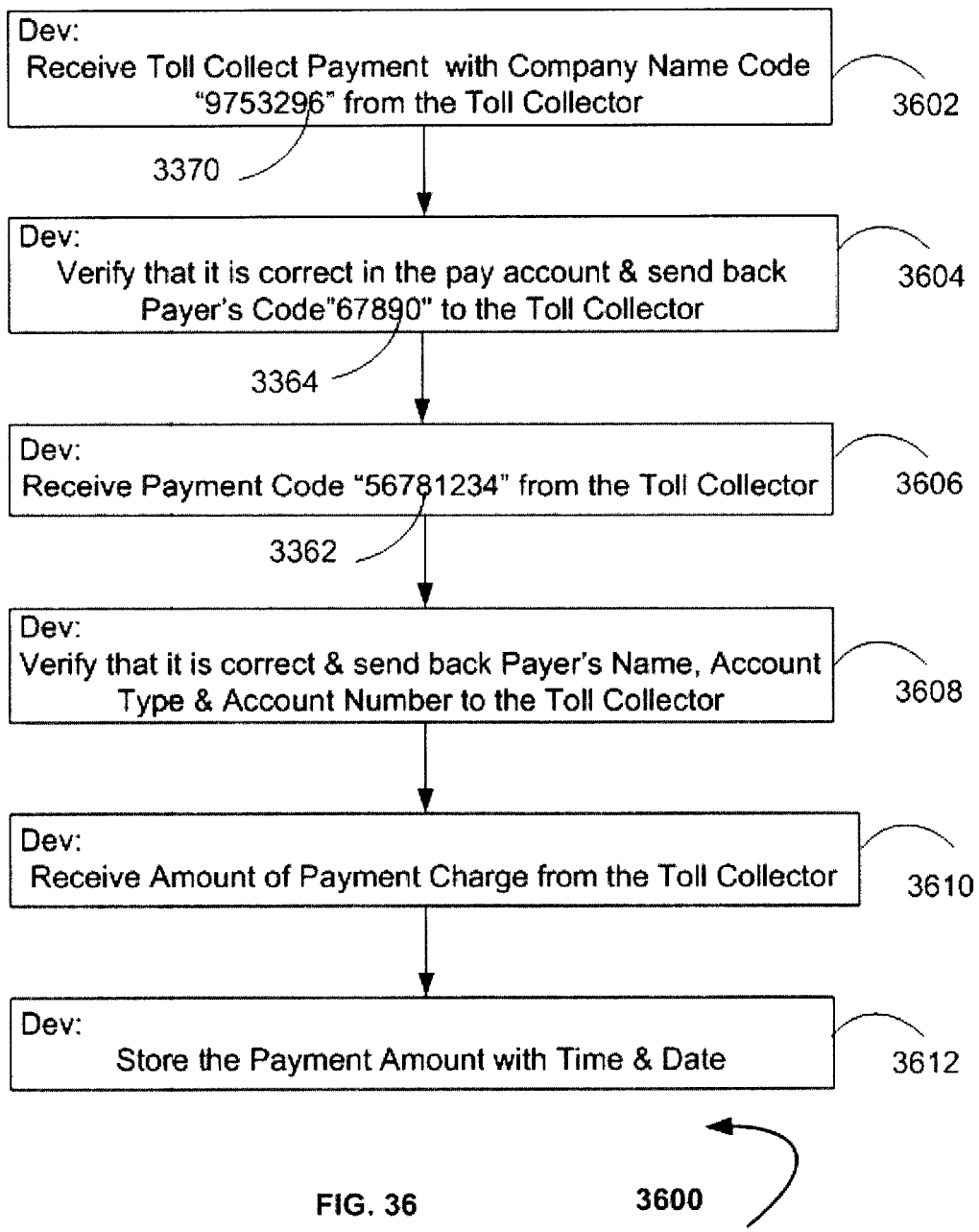
FIG. 36 shows a preferred example of a flow chart presenting the programming flow of Dev 106 during a toll fee collection, relating to the present invention in the automobile application.

FIGS. 35 and 36 illustrate preferred examples of embodiments 3500 and 3600 of the present invention. They show the transactions taking place between the Devs 106 (residing in cars 3410, 3412 and 3414) and the Toll Collector 3402, 3404 and 3406 as illustrated in FIG. 34.

As the car 3410 approaches within communicating distance of the Toll Collector 3402, the Dev 106 (in car 3410) receives data signal "Toll Collector Payment" as shown in step 3502/3602 from the Toll Collector 3402. As the Dev 106 receives the Company Name Code "9753296" 3370 of FIG. 33 and again shown in step 3602 of FIG. 36 from the Toll Collector 3402, it verifies that code "9753296" matches with one in its pay account 3370 in screen 3350 of FIG. 33. It then sends back the acknowledgement with the Payer Code "67890" (the payer transaction identifier) in 3364 (FIG. 33) and in step 3504/3604 to the Toll Collector 3402. It then receives the Payment Code (the transaction identifier) "56781234" in 3362 (FIG. 33) and again shown in step 3506/3606. The next two steps complete the transaction with the Dev 106 sending the owner's name and its pay account information in steps 3508/3608 to the Toll Collector 3402 and the Dev 106 receiving the charging payment amount in steps 3510/3610 from the Toll Collector 3402. In steps 3512/3612, the Dev 106 stores the payment with the time stamp in its memory storage after the transaction is completed. Steps 3501A, 3501B, 3501C and 3501D just show normal activities going on between the Dev 106 and the Service Provider 112 (so it can be connected to other registered handsets) while the toll collecting is taking place which use a different transmission medium.

Figure 37:
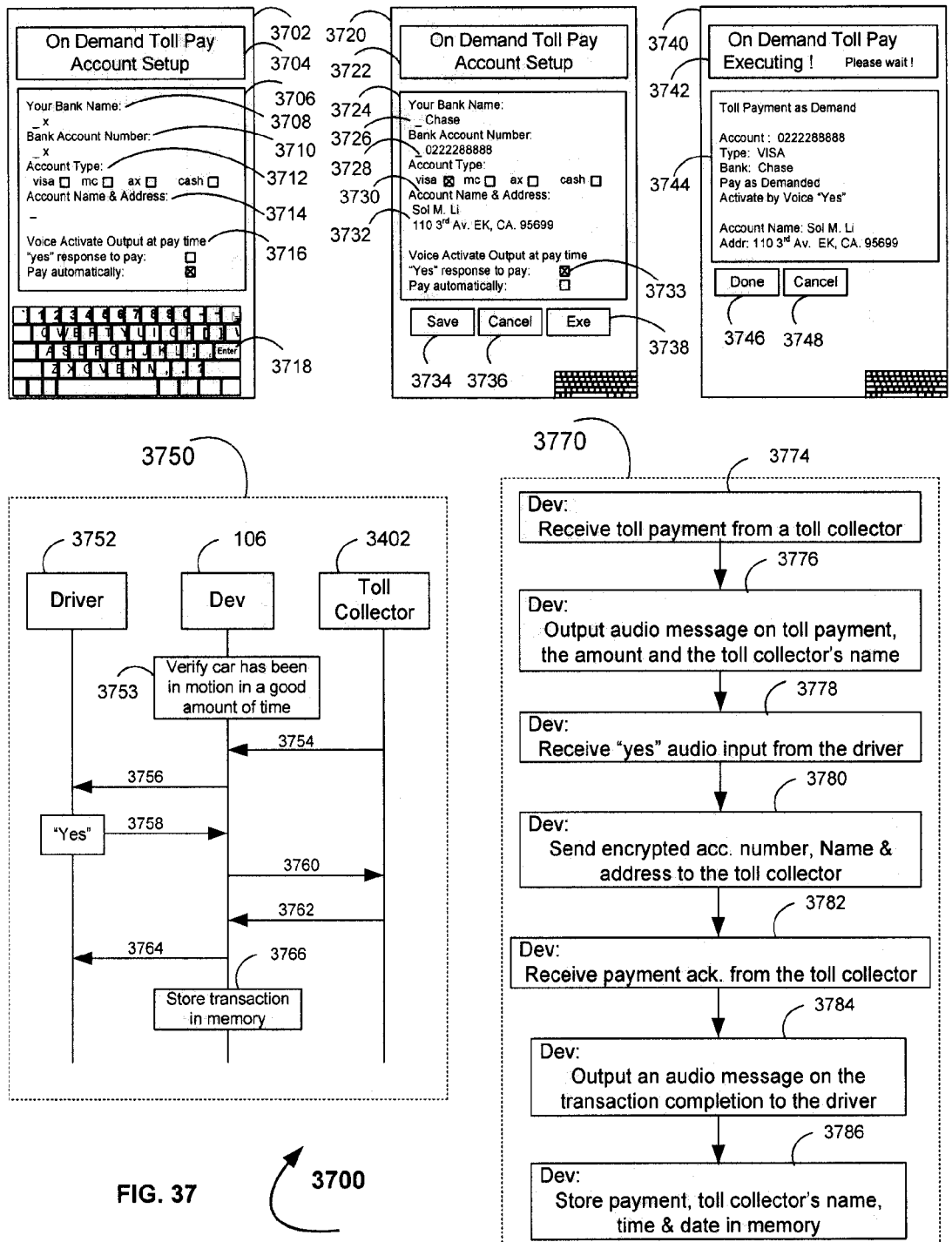
FIG. 37 shows a preferred example of handset's screen displays and flow diagram as well as a flow chart, presenting another toll fee account setup, and the interaction between various devices and program flow of Dev 106, during a toll fee collection, relating to the present invention in the auto application.

FIG. 37 illustrates a preferred example of embodiment 3700 of the present invention. This exemplary embodiment presents preferred steps taken by a user in his/her handset 102 to program and set up the pay account for on-demand payment of the Dev Toll Payment system.

The user executes the On Demand Toll Pay Acc. Setup icon 3314 in FIG. 33, making his/her handset 102 transmit the command to the Dev 106, which processes said command and sends the response back to said handset 102, which displays the On Demand Toll Pay Account Setup as shown on its screen 3702.

It shows an alternative way of how to set up another type of toll payment. It also shows how the Dev 106 conducts and allows the transaction to take place when the toll payment is demanded by any toll payment collector with the voice acknowledgement or no voice acknowledgement from the driver 3752. The user fills out in screens 3702 the information, such as: user's Bank Name 3708, Account Number 3710, Account Type 3712, Account Name & Address 3714, acknowledgement "yes" or "no" for the non-voice acknowledgement selection 3716 of the audio input (voice confirmation) from the driver 3752 and the result is as shown in 3720. The user then selects the Exe icon 3738, making the handset 102 transmit the command and all the information to the Dev 106 which responds back with its processed information as shown on the handset screen 3740 "Voice Activate Toll Pay Executing! Please wait!" 3742. When the Dev 106 is done, it transmits the setup information to the handset's screen as shown in 3744, then the user executes Done icon 3746 to complete the account set up.

Flow diagram 3750 shows the transaction taking place between the Dev 106, the Toll Collector 3402 and the Driver 3752, while the chart 3770 shows the Dev 106's programming flow. It starts out in step 3753, showing the Dev 106 verifying that some amount of driving time has already taken place before the toll collection can take place just to prevent fraud (where toll collection cannot possibly happen when the car has been stationary for quite some time). In step 3754 (also shown in step 3774), the Dev 106 receives the "toll payment demand" from a toll collector 3402. The Dev 106 then outputs an audio (via speaker) 3756 (also shown in step 3776) letting the driver know the toll fee and gets the "Yes" acknowledgement 3758 (3778) from the Driver 3752. The Dev 106 then sends the account name, account number and address to Toll Collector 3402 (steps 3760 and 3780) and receives payment acknowledgement (steps 3762 and 3782) from the Toll Collector. The Dev 106 then announces the transaction completion (steps 3764 and 3784) to the driver, and finally stores the transaction record in its memory in (steps 3766 and 3786).

Figure 38:
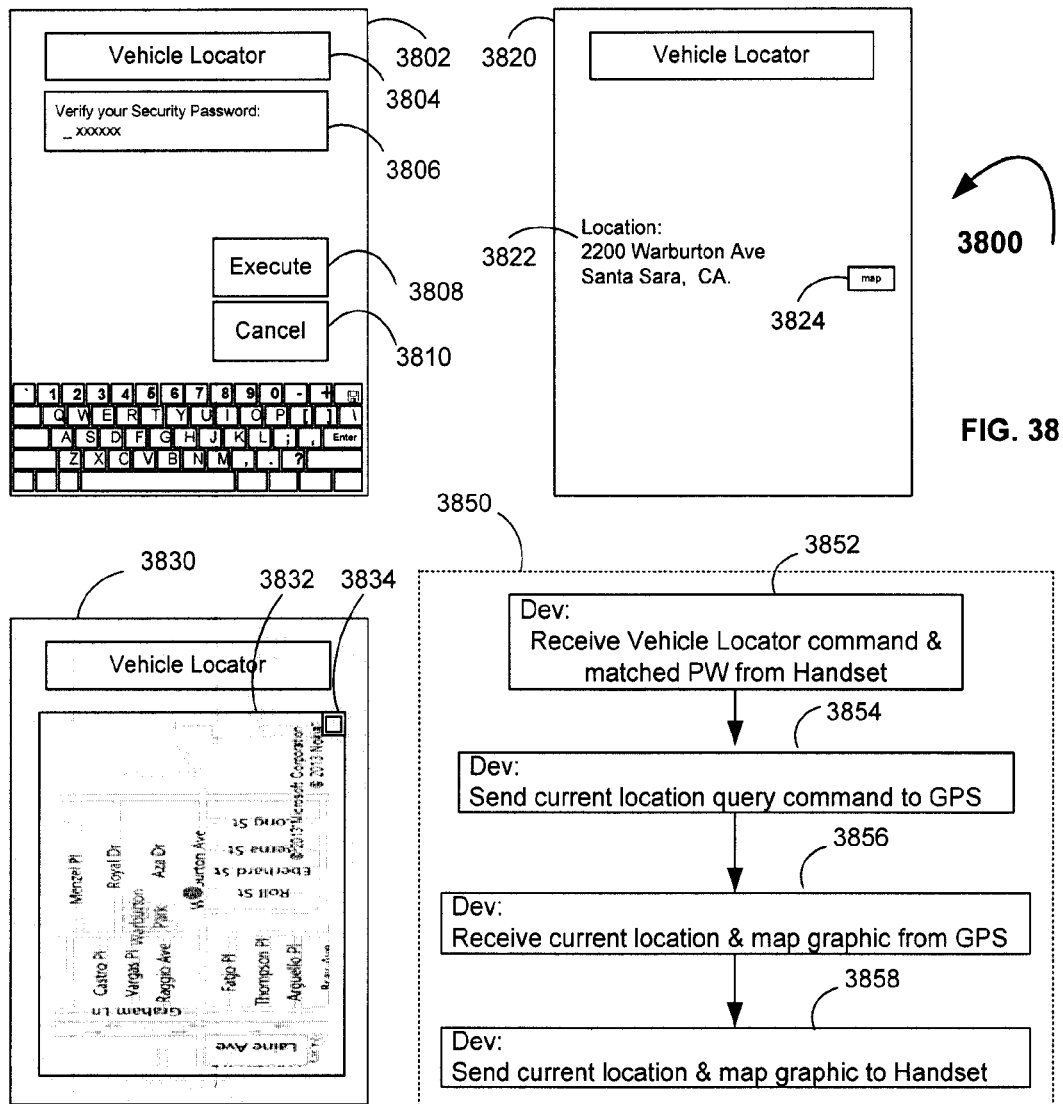
FIG. 38 shows a preferred example of handset's screen displays and a flow chart, presenting vehicle locator of Dev 106 relating to the present invention in the automobile application.

FIG. 38 illustrates a preferred example of embodiment 3800 of the present invention. This exemplary embodiment presents preferred steps taken by a user in his/her handset 102 to locate his/her vehicle (controlled by the Dev 106) remotely via his/her handset.

The user executes the Locator icon 3016 in FIG. 30, making his/her handset 102 transmit the command to the Dev 106, which processes said command and sends the response back to said handset 102, which displays the Vehicle Locator command as shown on its screen 3802. It shows the Vehicle Locator command 3804 which lets the user find the vehicle's (Dev 106) current GPS location. The user fills in the required account security password 3806, and the handset 102 transmits it to the Dev 106 after the Execute icon 3808 is selected. The Dev 106 receives the password 3806 and the command (also shown in step 3852 of chart 3850). The Dev 106 then verifies if the security password matches with the one stored in its memory, and if it does, the Dev 106 translates the command to the GPS's command format, and then sends it to the GPS 3182 (step 3854). The GPS 3182 transmits the response back to the Dev (step 3856) which translates said response and sends it to the handset 102 (step 3858) which displays the information as shown on screen 3820. Screen 3820 shows where the car is located at that moment 3822 and the graphic icon 3824, when expanded will show the detailed map 3832 as shown on screen 3830.

Figure 39:
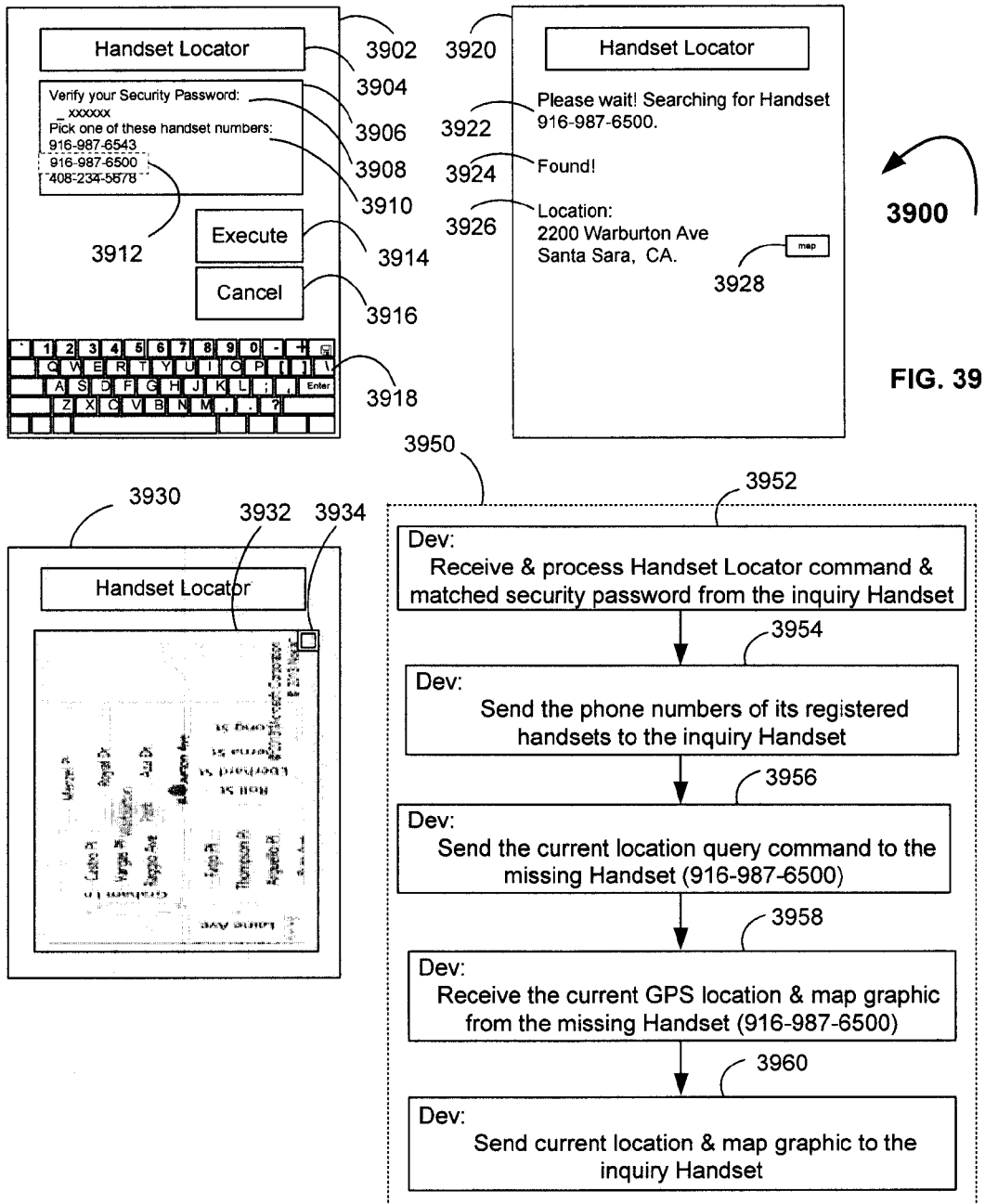
FIG. 39 shows a preferred example of handset's screen displays and flow chart, presenting an inquiry handset's (102) screen interactions with Dev 106, in locating a missing handset 102, relating to the present invention.

FIG. 39 illustrates a preferred example of embodiment 3900 of the present invention. This exemplary embodiment presents preferred steps taken by a user in his/her handset 102 to locate a missing registered handset 102 via his/her registered handset.

The user executes the Handset Locator icon 1170/1370 (FIG. 11/13), making his/her handset 102 transmit the command to the Dev 106, which processes said command and sends the response back to said handset 102, which displays the Handset Locator command as shown on its screen 3902. After the user enters the right security password 3908 and selects the Execute icon 3914 making the inquiry handset 102 send the command and the password to the Dev 106. The Dev 106 receives and processes (as shown in step 3952 of flow chart 3950) and sends back the currently registered handsets 3910 (step 3954). In this example, the user decides to search for the missing handset 102 (phone number 916-987-6500) by highlighting it 3912 in area 3906, then selecting Exe icon 3914 again, making the inquiry handset 102 (for example, whose phone number is either 916-987-6543 or 408-234-5678) transmit the handset locator command and the required data to Dev 106. The Dev 106 processes the data, then transmits the handset locator command to the missing handset 102 (phone number 916-987-6500) in step 3956, and also transmits back its searching its status 3922 to the inquiry handset 102, as shown on screen 3920. When the Dev 106 receives the GPS position of the missing handset 102 from said handset (3958), it sends the information 3960 back to the inquiry handset 102, which displays its location 3926 accompanied by the icon 3928. The inquiry handset 102 displays the graphic location of the missing handset 102 (3932 of screen 3930) after the icon 3928 is executed (expanded).

This embodiment restricts the Dev in searching and locating only its registered handsets 102, for practical and security reason. Application and operation software residing and operating in handsets (as well as in the Dev 106) preferably can also be designed and modified in the App Server (for downloading and updating into handsets 102 and Devs 106), which can render this embodiment application more general and universal; and it will allow the users of smart handsets 102 to locate their missing smart handsets 102 via another smart handset 102 as long as the missing handsets still utilize their old phone numbers.

Furthermore, there exists a unique identifier associated with each smart handset (such as—handset/device ID parameters 542/642), which is transmitted and stored in the cellular phone service provider database when said handset got activated and registered in said cellular service provider. Therefore, there exists a method when a missing handset can be traced by a search engine (i.e., software residing in the cellular service provider's computers/servers) with the aid of said missing handset's unique identifier provided by a handset 102 or a PC (computer) to the cellular service provider's computers/servers. And from said identifier, the missing handset's current (new or different phone number) can be translated (looked up) by said computers/servers, and thus said missing handset can be located.

FIG. 40 illustrates a preferred example of embodiment 4000 of the present invention. This exemplary embodiment preferably allows a user to program and set up the vehicle route tracking, and maximum speed limit at when and where, so the Dev 106 will record the data. The user then, can review the data and if the alert option is selected, he/she will be informed though his/her handset, when the maximum speed occurs. The data can also be stored into the company storage system for long term keeping.

The user executes the Route Tracking & Speedo-Alert icon 3010 (FIG. 30), making the handset 102 transmit the command (step 4076 in Chart 4070) to the Dev 106, which processes said command and sends the response back to said handset 102 (step 4078), which displays the Route Tracking and Speedo-Alert Program & Setup as shown on its screen 4002. It shows the Speedo-Alert and route tracking as being off (disabled) 4020 and 4021. In area 4006, entries such as: Mph (Mile per hour) or Kph (Kilometer per hour) 4408, network storage server destination—storage system where the Dev 106 stores the speed data (4010), over-speed-limit alert or no alert selection to the user's handset (4012), Speedo-Alert being on 4018 or off 4020, and the route tracking being off 4021 or on 4022. When the tracking is turned on 4022, the user can enter how many in minutes (4023) the tracking is sampled by the Dev, which obtains the time and date from the RTC 240 (FIG. 2), the speed from the Speedo-meter 4074 and the location from the GPS 3182. The user then enters data which are illustrated in screen 4032 where, for example, the user sets: the maximum speed limit at 70 Mph (4038), storage server destination 4040, no immediate alert 4044 to user's handset 102, Speedo-Alert being On 4048, and the route tracking On 4052 with the sample every 5 minutes 4053; then completes the programming by executing the Exe icon 4056, making the handset 102 send the command and information to the Dev 106 (step 4080 in Chart 4070).

The Dev then communicates the maximum speed (step 4082) to the Speedo-meter 4074. From now on (until the Speedo-Alert being turned off 4020 and 4050), whenever the vehicle is in motion, the Dev 106 gets interrupted by the Speedometer 4074 as soon as the speed goes over the speed threshold or under the speed threshold in step 4084. The Dev 106 keeps track of the time and day of the interruptions (via RTC 240 of FIG. 2), and obtains the GPS locations by communicating and acquiring them (step 4086) from the GPS 3182. The handset user, therefore, can retrieve and view the record of over-speed-limit, its duration, and the locations. This preferred embodiment is very useful, when the principal user of the vehicle Dev 106 wants to find out the driving habit of other drivers who may be driving too fast. It can also apply to the car rental, taxi, trucking companies and the like which can keep track of the driving route of their vehicles, by having the Dev's tracking turned on (4052). This allows the Dev to take one tracking sample every 5 minutes (as is in this case) by obtaining the speed from the Speedo-meter 4074 (step 4092 of Chart 7070*a*) and the location from the GPS 3182 (step 4094). The tracking record be can viewed later by the user (step 4096) or downloaded at the end of the day into the Storage Server 4072 (step 4098) for company's bookkeeping, as are known to those of ordinary skill in the art.

Handset 102 (whose user programmed the Dev 106) is able to view the over maximum speed history (as shown in screen 4060) by executing the Speed-alert Listing icon 3012 (in screen 3002 of FIG. 30). This feature allows the Dev 106 to build up a history of where, when, and how long each duration, the vehicle exceeded its programmed speed limit. It displays the vehicle license plate 4066, speed limits, time, date, and its duration 4068.

Route Tracking Listing 4051 allows the user or the company to view (by executing Route Tracking Listing icon 3013 in screen 3002 of FIG. 30,) the daily routing of the vehicle when its tracking is enabled 4022/4052. It shows the driving record of the vehicle, such as: license ID 4057, the date 4059, time 4061, location 4069, and speed 4065, which can be useful when the user/owner wants to know how his/her vehicle is being used (or just the driving record of his/her vehicle).

Figure 41A:
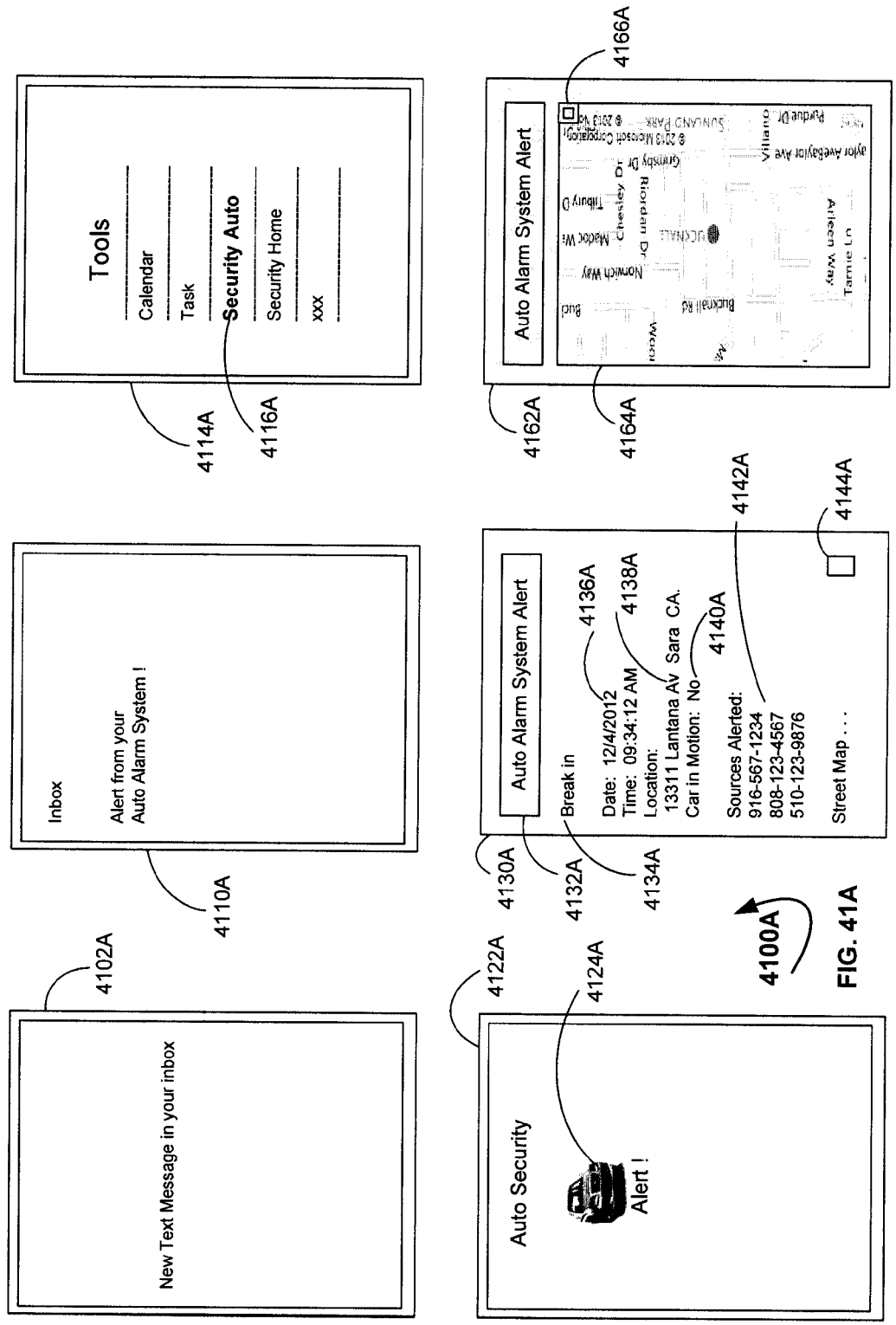
FIG. 41A shows a preferred example of handset's screen displays, presenting an alert from Dev 106 to handset 102, when an unauthorized event occurs, relating to the present invention in the automobile application.

FIG. 41A illustrates a preferred example of embodiment 4100A of the present invention. This exemplary embodiment presents preferred screen displays of the user receiving an alert in his/her handset, when an unexpected or unauthorized event happens to his/her vehicle.

The Dev 106 sends to the handset 102, a message in the handset's inbox 4102A which notifies the user that an unauthorized event happened to his/her vehicle, such as: a break-in, collision, or its removal from its parked location. The user navigates the handset 102 to the Tools screen 4114A, and selects Security Auto 4116A to find out the auto alert 4122A from the Dev 106. When the auto alert icon 4124A is executed by the user, the handset 102 navigates to screen 4130A, which contains the event information, the Dev 106 just transmitted along and among others with the alert message 4110A. Screen 4130A information includes the cause—the Break in 4134A, date and time 4136A, the location 4138A, if the car is being moved or not 4140A. It also lists the phone numbers of the registered handsets having been alerted 4142A. The icon 4144A lets the user see the graphical map where the event took place 4164A as shown in screen 4162A.

FIG. 41B illustrates a preferred example of embodiment 4100B of the present invention. This exemplary embodiment presents preferred screen displays of the user receiving an alert in his/her handset when a potentially life threatening or event may occur in his/her vehicle.

The Dev 106 sends to the handset 102, a message in the handset's inbox 4104B, which notifies the user that an abnormal and potentially dangerous situation, such as a child or pet accidentally left in his/her parking vehicle for a certain period of time. The user then can, when he/she views the message 4112B along with the Video icons 4114B and 4116B, make the appropriate decision. Video icons 4114B and 4116B let the user see the inside view of his/her vehicle 4180B and 4190B through the car interior camera, so he/she knows for sure if the situation is real or not. If there is neither a child nor a pet left in the vehicle, the user then executes the Ignore icon 4120B, which will be transmitted by the handset 102 to the Dev 106; therefore the Dev 106 stops alerting or stops sending messages (or may alert several more times every 5 minutes before completely stopping). If there is a child or a pet accidentally left inside, then the user executes the Confirm icon 4118B for confirming the alert in the alerting screen 4110B, which will be transmitted by the handset 102 to the Dev 106, which sends back the immediate actions to be taken (screen 4130B) by the user in his/her handset 102. Screen 4130B lists actions, such as: unlock the car door 4132B, lower down car windows 4134B, sound the horn 4136B, turn on the car alarm 4138B, turn the heater on 4140B, turn the A/C on 4142B, flash a light 4144B, call emergency center 4146B, and the driver is on his/her way 4148B. When the user/driver, in this example, selects the Lower down car windows and the "I am on my way" icons (4134B and 4148B) which will be transmitted by the handset 102 to the Dev 106, which sends back the statuses of said actions 4154B and 4168B being taken as shown on screen 4150*b*.

Figure 42:
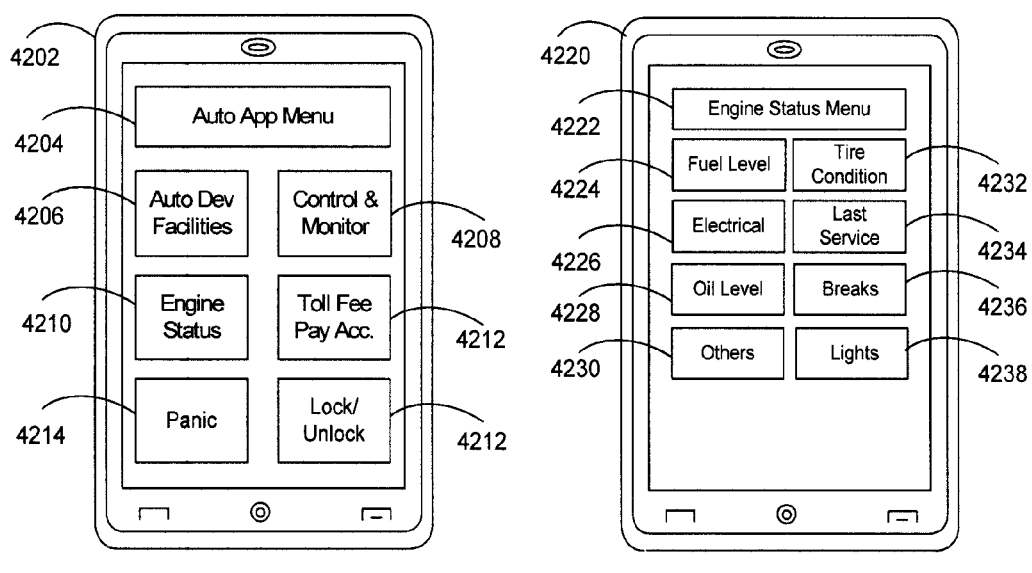
FIG. 42 shows a preferred example of handset's screen displays, presenting the engine status from Dev 106 to handset 102, relating to the present invention in the automobile application.

FIG. 42 illustrates a preferred example of embodiment 4200 of the present invention. It presents steps taken to monitor the vehicle engine status and the Dev's responses when the Panic icon or vehicle emergency button is pushed.

It illustrates the Engine Status Menu 4222 when a user executes the Engine Status icon 4210, making the handset 102 send the corresponding command to the Dev 106, which communicates with the Engine Conditions I/O 205 (FIG. 2), and reads back its engine status and passes the information back to the handset 102, as displayed in screen 4220. The handset 102 displays the vehicle engine and accessory conditions 4222 which it receives from the Dev 106.

Fuel Level icon 4224 indicates how much fuel is in the tank (not shown).

Electrical icon 4226 shows the vehicle's electrical condition (not shown).

Oil Level icon 4228 indicates if any oil needs to be added (not shown).

Tire Condition icon 4232 informs user of the tire pressure and thread thickness (not shown).

Last Service icon 4234 displays the date of the most recent service of the vehicle (not shown).

Brakes icon 4236 indicates brake-pads and if they need to be replaced (not shown).

Lights icon 4238 tells the user(s) which lights are out or not working (not shown).

When the Panic icon 4214 is selected, it makes the handset 102 transmit the command to Dev 106, which will turn on the car Alarm Speaker (220 FIG. 2) and the emergency lights immediately. The Dev 106 also sends back their statuses to the handset 102 which displays the Alarm Speaker and emergency light as being ON (not shown). The Panic icon 4214 preferable functions like a toggle input. In other words, if it is selected again, the handset 102 will transmit the command to the Dev 106, which will then turn off the car Alarm Speaker (220 in FIG. 2) and emergency lights; and also send back their statuses to the handset 102 which will display the statuses as being OFF (not shown).

Figure 43:
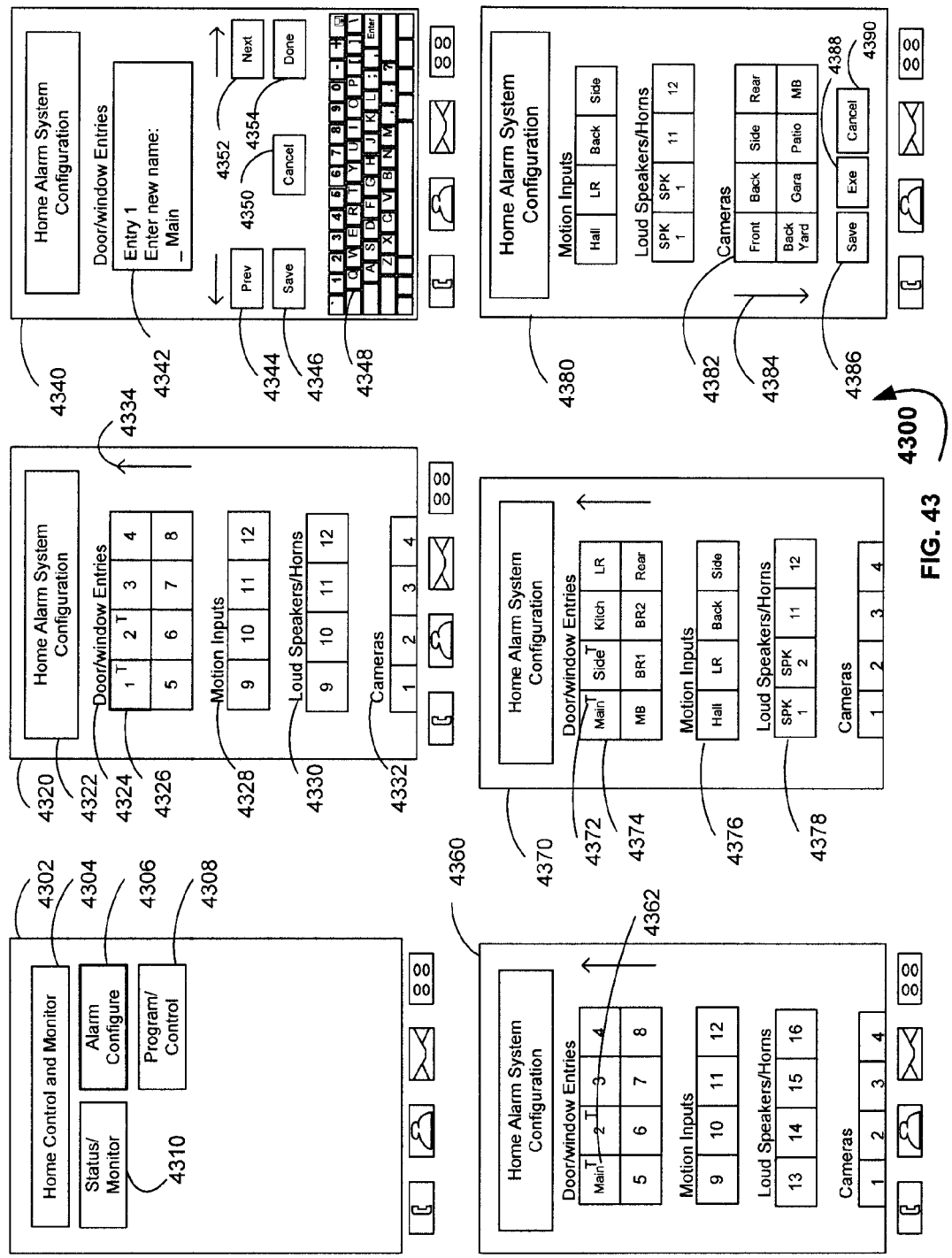
FIG. 43 shows a preferred example of handset's screen displays, presenting the configuration of home security alarm of Dev 106, relating to the present invention in the home application.

FIG. 43 illustrates a preferred application example of embodiment 4300 of the present invention. It presents steps taken to configure the various input and output connections of the Home Alarm System controlled by the Dev 106 via a handset 102 into more descriptive terms.

The handset 102 navigates to screen 4302, showing the Home Control and Monitor menu 4304 after the user screen-flips to the Home App Menu 1320 and selects the Home Control & Monitor icon 1326 (in FIG. 13). The handset 102 then navigates to screen 4320 when the user selects the Alarm Configure icon 4306, which makes the handset 102 send the command to the Dev 106 which sends back the configuration information as shown on said screen 4320. Screen 4320 presents the factory default home alarm security system configuration, showing the Door/window entries (4324), Motion Inputs 4328, Loud Speakers/Horns 4330 and Cameras 4332, which are all in numeric terms. The user then uses finger movement by slightly touching on the display to move screen up/down, left/right or uses icons to scroll up 4334, down 4384, left 4344, right 4352 to get to the configured information. When Door/windows entry #1 icon (4326) is selected for configuration, the handset 102 navigates to screen 4340 as it sends command and receives information back from the Dev 106. Using keyboard 4348, the user can edit the entry into a descriptive name in 4342, such as Entry 1 into Main (main entry), in order to make it more recognizable; and the final result is as shown in screens 4360, 4370 and 4380. (T symbol allows some timer delay in disabling the alarm when designated entry is used.)

Figure 44:
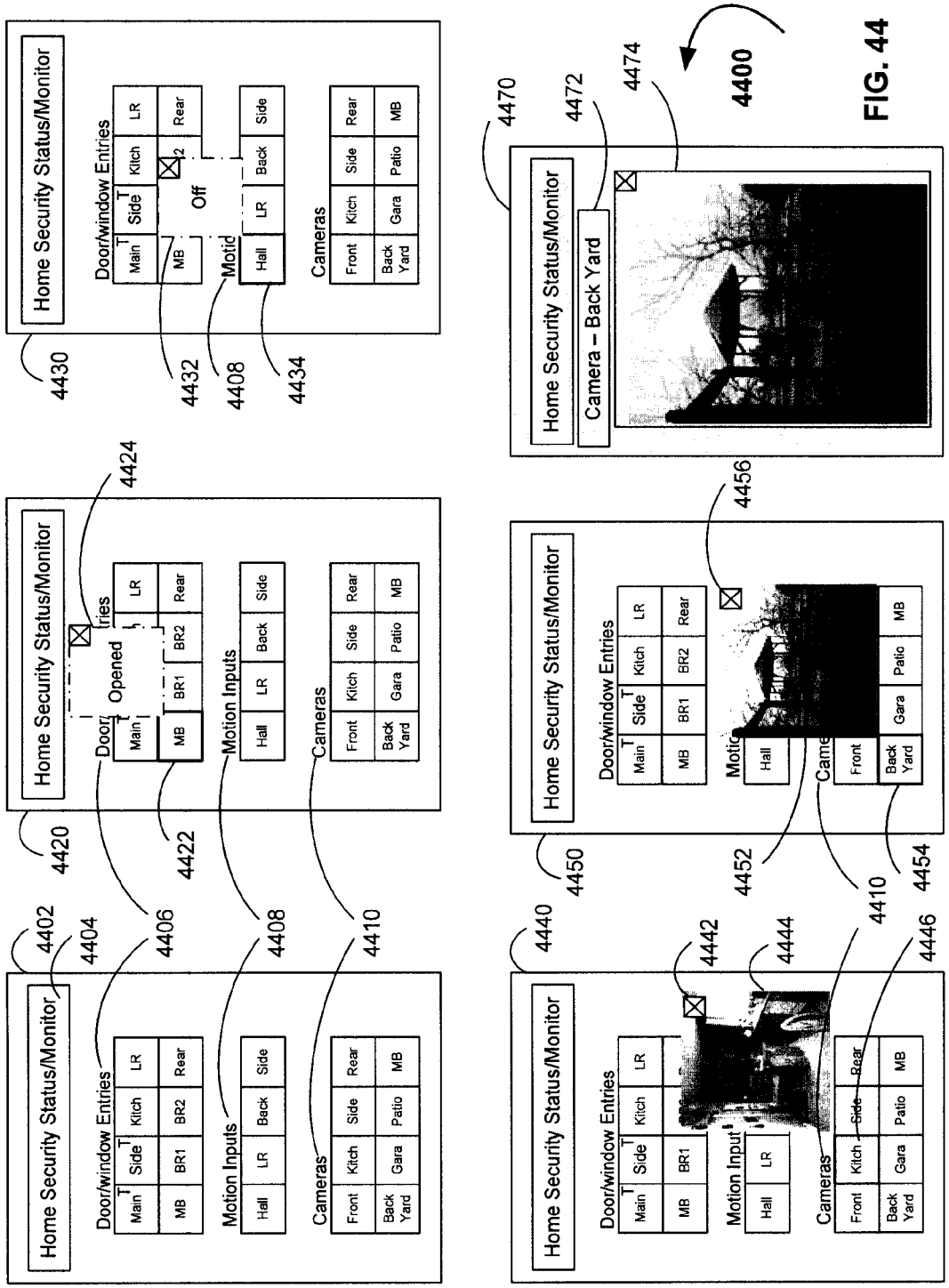
FIG. 44 shows a preferred example of handset's screen displays, presenting the status and monitoring of home alarm function of Dev 106, relating to the present invention in the home application.

FIG. 44 illustrates a preferred application example of embodiment 4400 of the present invention. This exemplary embodiment presents preferred steps taken by a user in his/her handset to monitor and view his/her home environment (controlled by the Dev 106) via his/her handset.

The user executes the Status/Monitor icon 4310 (FIG. 43), making his/her handset 102 transmit the command to the Dev 106, which processes said command and sends the response back to said handset 102, which displays the Home security Status/Monitor information, as shown on its screen 4402. The user can check the status by selecting/highlighting individual icon/entry as shown in 4422 with pop up screen 4424 saying the MB (Master Bedroom) window is opened or the Hall icon 4434 (Motion) detector is off 4432. The user can also monitor in real-time camera inputs by selecting the Kitch icon 4446, which displays it in the pop up kitchen window 4444. The Back Yard icon 4454 and its pop up window 4452 can be expanded, by the user touching the screen 4452 which the handset 102 displays as shown in full screen 4474 or closing it by executing close area 4456.

Figure 45:
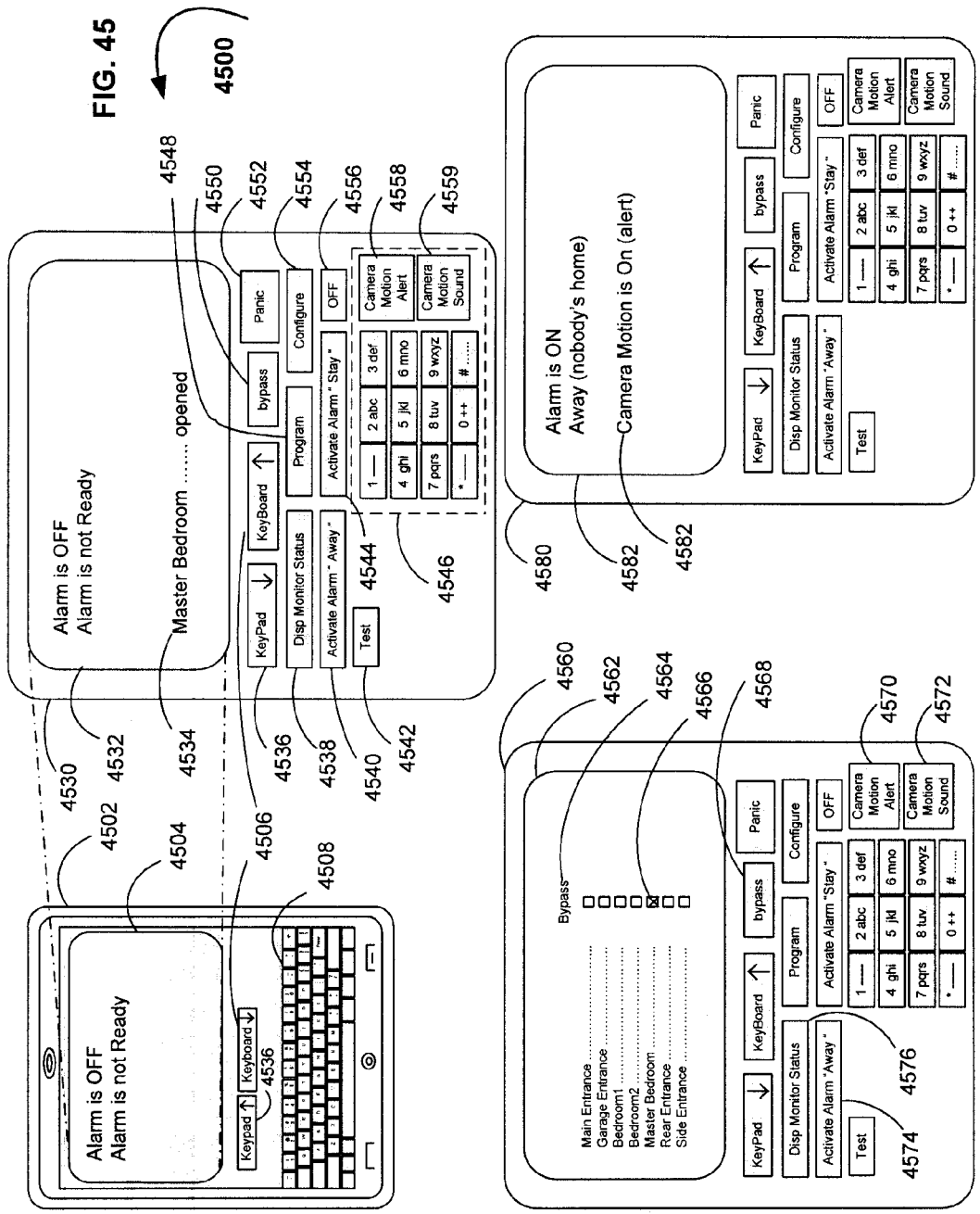
FIG. 45 shows a preferred example of handset's screen displays, presenting the program and control of home alarm function of Dev 106, relating to the present invention in the home application.

FIG. 45 illustrates a preferred application example of embodiment 4500 of the present invention. This exemplary embodiment presents preferred steps taken by a user in his/her handset to program, control and monitor his/her home security system (controlled by the Dev 106) remotely via his/her handset.

The handset 102 navigates to screen 4502 when the Program/Control icon 4308 (FIG. 43) is executed by the user, making the handset 102 transmit the command to the Dev 106, which sends back the control information to the handset 102 which displays it on 4502. This feature allows the user to use either the keyboard control key 4506 or keypad control key 4536; so either the keyboard 4508 or keypad 4546 can be used to control and program the Dev 106 for the home security functions. Screen 4502 shows that the home security system is off and not ready 4504. The user can find out more by pushing the Program icon 4548, which makes the handset 102 display the cause "Master Bedroom . . . opened" 4534 after it gets the information back from the Dev 106. The Dev 106 can bypass the Master bedroom entry when the user selects the bypass icon (command) 4568, which causes the handset 102 to display Bypass choices 4564 among which, box 4566 is selected, to bypass the Master Bedroom which makes the handset 102 send said command to the Dev 106. The user can finally turn the alarm on using his/her handset 102 by selecting the Camera Motion Alert icon 4570 and the Activate Alarm Away icon 4574, which make the handset 102 navigate to screen 4580, showing the alarm is on and away (all interior motion detection is on) plus Camera Motion detection 4582. The user can always disarm (turn the alarm off) by using either the OFF icon 4556 or the On/Off icon 1336/1338 (FIG. 13). The Camera Motion Alert icon 4570, (when enabled,) will alert user when there are any changes in any camera/video inputs 312 (FIG. 3), while the Camera Motion Sound icon 4572 also let the user make sound to scare off potential intruders. The Dev 106 will send a message and the videos of the camera input changes 4570 to user's handset 102 to alert of any activity outside of the house (as shown in FIG. 47). The Camera Motion Alert 4570 is used in cases where the owner wants to know when a truck is making a delivery, a gardener taking care of the landscape or a neighbor stopping by picking up the mail, while Camera Motion Sound 4572 will also make sound to defer any unwanted guests, while the family is being away.

FIG. 46 illustrates a preferred example of embodiment 4600 of the present invention. This exemplary embodiment presents preferred screen displays when user receives an alert in his/her handset, when an unexpected or unauthorized event happened to his/her home.

The handset 102 navigates to screen 4602 informing the user of a message and alert information data from the Dev 106 in the inbox 4606. The user scrolls to screen Tools 4612 and selects Security Home 4614 to find out said information in the home alert, screen 4622, from the Dev 106. When the home alert icon 4624 is executed by the user, the handset navigates to screen 4632 which contains event information the Dev 106 just sent along and among others with the alert message 4606. It shows BR2 (Bedroom 2) 4638 is where the break-in happened and Hall and LR (Living Room) motion detectors 4640 also detected it. Screen 4652 shows the pop-up icon 4656 when the BR2 icon 4638 is selected, detailing the time and date. Screen 4660 shows the pop-up icon 4664 when either the SPK 1 or SPK2 icon 4642 is selected, detailing the time the alarm sounded 4668, and the alerted phone numbers (4672) the alarm sent messages to.

FIG. 47 illustrates a preferred example of embodiment 4700 of the present invention. This exemplary embodiment presents preferred screen displays when user receives an alert in his/her handset when a video camera detects changes around his/her house.

The handset 102 navigates to screen 4710 informing the user of message 4712 and alert information data (video) 4722 from the Dev 106 in the inbox 4720. The user finds out by executing the House icon 4724 which contains several camera shots, showing screen changes, when user flips/scrolls through—from screen 4730 (taken Jun. 14, 2013 at 10:23 AM) to screen 4740 with an object 4744 (taken Jun. 14, 2013 at 10:24 AM) 4742. This alert takes place when the user turned the alarm on with the Camera Motion Alert icon 4570 enabled as previously done in FIG. 45.

Figure 48:
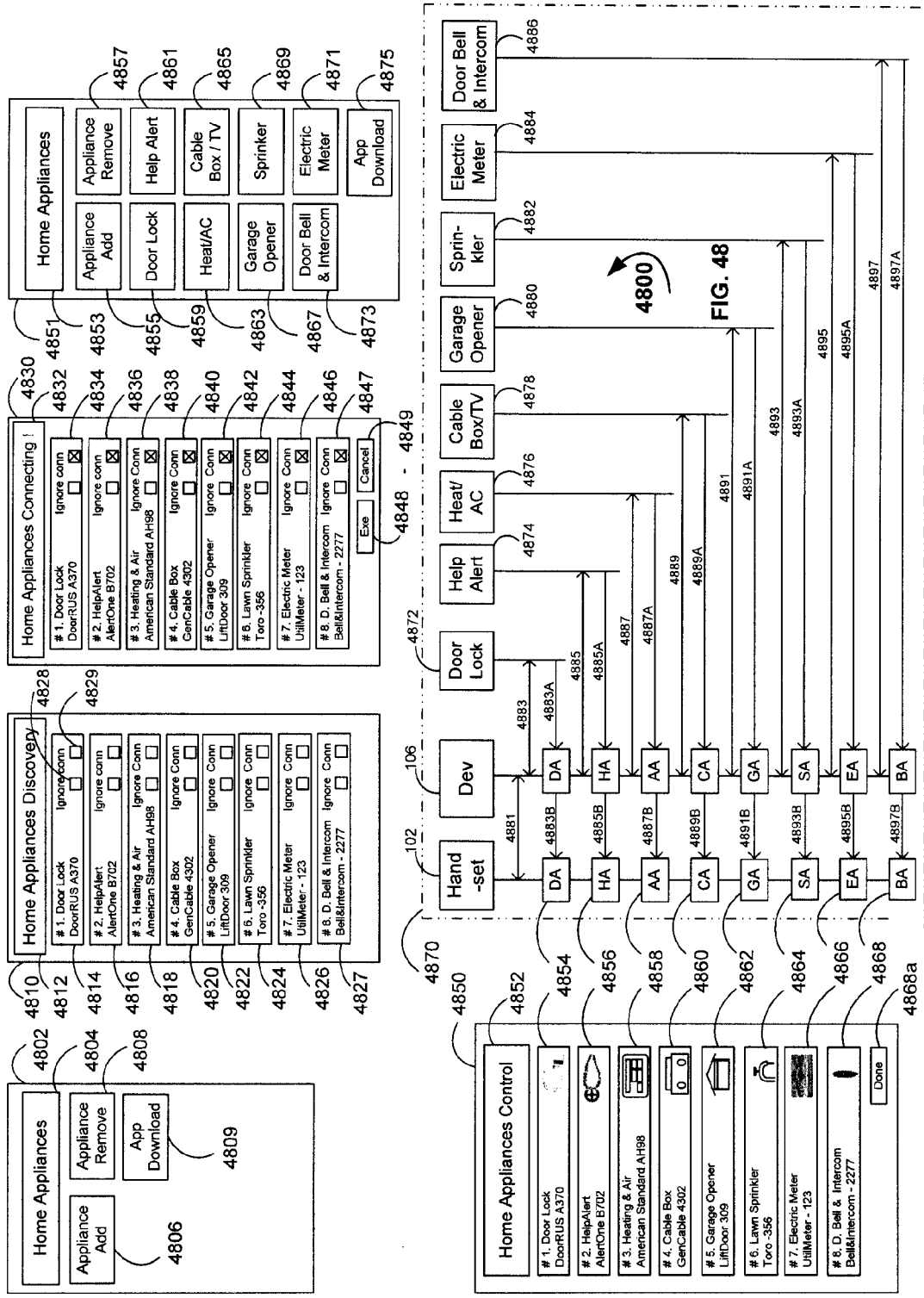
FIGS. 48-51 show preferred examples of handset's screen displays, flow charts and diagrams, presenting the household appliance addition by Dev 106, relating to the present invention in the home application.
Figure 49:
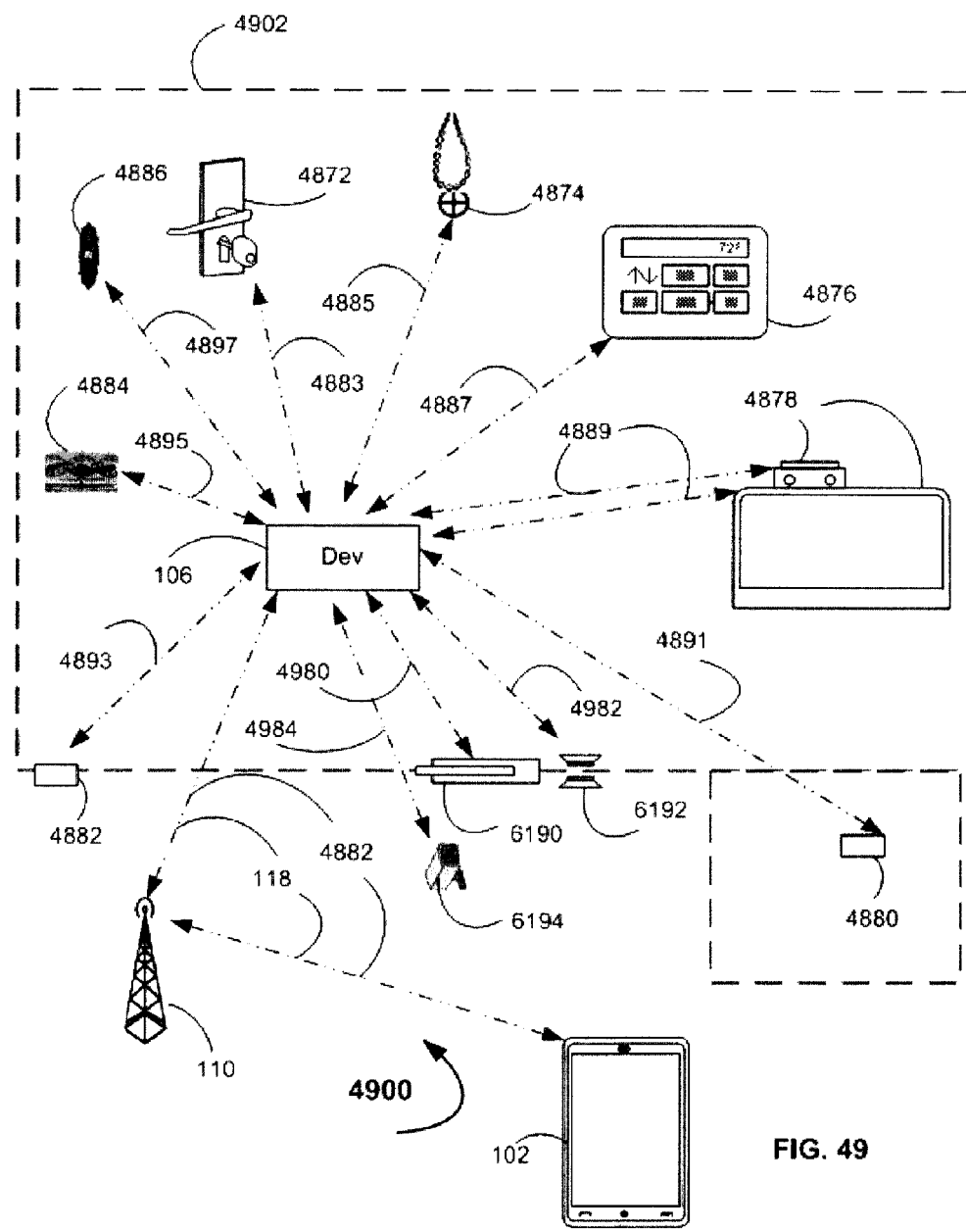

FIGS. 48 and 49 illustrate a preferred application example of embodiments 4800 and 4900 of the present invention. The exemplary embodiment 4800 presents preferred steps taken by a user in his/her handset to add household appliances/equipments into the Dev's Home Control and Monitor System, while the exemplary embodiment 4900 presents the communication interaction of these devices within the SRC network (except Wi-Fi).

The user executes the Household Appliances icon 1344 (FIG. 13), making his/her handset 102 transmit the command to the Dev 106, which processes said command and sends the response back to said handset 102, which displays the Household Appliances menu, as shown on its screen 4802. The Home Appliances menu 4804 lets the user add (4806) home appliances/equipments or accessories that he/she can control remotely using the handset 102, or remove 4808 them when they are no longer in use, when he/she is at home or away from home.

The user executes the Appliance Add icon 4806 which makes the handset 102 send the command to the Dev 106, which processes and transmits back the appliances/equipments it discovers on screen 4810. This feature allows the handset 102 to command the Dev 106 either to ignore 4828 or connect 4829 the Entry Door Lock 4814, Help Alert 4816, Heating and Air conditioning 4818, Cable Box 4820, Garage Opener 4822, Lawn Sprinkler 4824, Electric Meter 4826 and Door Bell & Intercom 4827, by selecting and checking appropriate boxes as shown in Home Appliances Discovery screen 4830. The user then executes Exe icon 4848, making the handset 102 send the command to the Dev 106, which processes and transmits back the corresponding software applications: Door Lock 4854, Help Alert 4856, Heat/Air 4858, Cable Box/TV 4860, Garage Opener 4862, Sprinkler controller 4864, Electric Meter 4866, and Door Bell & Intercom 4868, from said appliances as shown in the Home Appliances screen 4850. The user then executes the Done icon 4868a which makes the handset 102 navigate back to screen 4802, being shown as screen 4851. In screen 4851, the Home Appliances menu 4853, comprises the eight newly additional household appliances controlling icons: Door Lock 4859, Help Alert 4861, Heat/Air 4863, Cable Box/TV 4865, Garage Opener 4867, Sprinkler controller 4869, Electric Meter 4871 and Door Bell & Intercom 4873. The Door Lock 1332, Unlock 1334 and the Garage Opener icons 1340 are also copied by the Dev's Home App 604 into the Home App Menu 1322 to make it more convenient (it requires fewer screen steps) for the user to navigate to, when he/she needs to use said function.

Chart diagram 4870 and FIG. 49 show the interaction between the handset 102, the Dev 106 and all the appliances—Door Lock 4872, Help Alert 4874, AC/Heat controller 4876, Cable Box/TV 4878, Garage Opener 4880, Sprinkler 4882, Electric Meter 4884, and Door Bell & Intercom 4886 (and the like, such as: Water Meter, Heating and Cooking Gas Meter). It starts at step 4881 when the Dev 106 communicates with the handset 102, after it receives the Home Appliances Connecting command from the handset 102 and after the user executes the feature as shown in screen 4830.

The Dev 106 connects and communicates with the Door Lock step 4883 (also shown as the communication link/medium 4883 in FIG. 49), and receives its software application step 4883A which the Dev 106 also passes its copy to the handset step 4883B, showing in the form of the icon 4854 (DA).

The Dev 106 connects and communicates with the Help Alert step 4885 (also shown as the communication link/medium 4885 in FIG. 49), and receives its software application step 4885A which the Dev 106 also passes its copy to the handset step 4885B, showing in the form of the icon 4856 (HA).

The Dev 106 connects and communicates with the AC/Heat controller step 4887 (also shown as the communication link/medium 4887 in FIG. 49), and receives its software application step 4887A which the Dev 106 also passes its copy to the handset step 4887B, showing in the form of the icon 4858 (AA).

The Dev 106 connects and communicates with the Cable Box/TV step 4889 (also shown as the communication link/medium 4889 in FIG. 49), and receives its software application step 4889A which the Dev 106 also passes its copy to the handset step 4889B, showing in the form of the icon 4860 (CA).

The Dev 106 connects and communicates with the Garage Opener step 4891 (also shown as the communication link/medium 4891 in FIG. 49), and receives its software application step 4891A which the Dev 106 also passes its copy to the handset step 4891B, showing in the form of the icon 4862 (GA).

The Dev 106 connects and communicates with the Sprinkler step 4893 (also shown as the communication link/medium 4893 in FIG. 49), and receives its software application step 4893A which the Dev 106 also passes its copy to the handset step 4893B, showing in the form of the icon 4864 (SA).

The Dev 106 connects and communicates with the Electric Meter step 4895 (also shown as the communication link/medium 4895 in FIG. 49), and receives its software application step 4895A which the Dev 106 also passes its copy to the handset step 4895B, showing in the form of the icon 4866 (EA).

It is preferably that the Electric Meter 4884 is embedded or equipped with an identifier (such as S/N, location address) in its communication with any wireless device and also during the Dev's home appliances discovery phase (not shown in screen 4810) so it can be distinguished by the user from the ones of his/her neighbors.

The Dev 106 connects and communicates with the Door Bell & Intercom step 4897 (also shown as the communication link/medium 4897 in FIG. 49), and receives its software application step 4897A which the Dev 106 also passes its copy to the handset step 4897B, showing in the form of the icon 4868 (BA).

The communication medium, in this case, between the Dev 106 and the appliances (Door Lock 4872, Help Alert 4874, AC/Heat controller 4876, Cable Box/TV 4878, Garage Opener 4880, Sprinkler 4882, Electric Meter 4884, and Door Bell & Intercom 4886), is in SRC (Short Range Communication) network 104; while the communication between the Dev 106 and the handset 102 can be either through SRC or cellular network 118.

Alternatively, the software applications which were transmitted previously from the household appliances to the Dev 106 and to the handset 102 (in graph 4870), such as: Icons: DA 4854, HA 4856, AA 4858, CA 4860, GA 4862, SA 4864, EA 4866, and BA 4868 preferably can be the URLs (app download address links or hyperlinks), which the user then uses to download the appropriate online applications into his/her handset 102, which then transmits them to the Dev 106.

The user can also download the household applications online, using App Download icon 4809/4875 on handset display screen 4802/4851.

Similarly identical steps preferably can be applied to the Integrated Smart Pet Door (its Door 6190, Speakers 6192, and Cameras 6194), and a plurality of other household appliances/equipments, by the handset via the Dev 106, to discover and connect to said appliances/equipments, and receive the applications or hyperlinks from these devices. The handset user then will be able to program, control, and monitor these household appliances/equipments via his/her handset 102.

Figure 50:
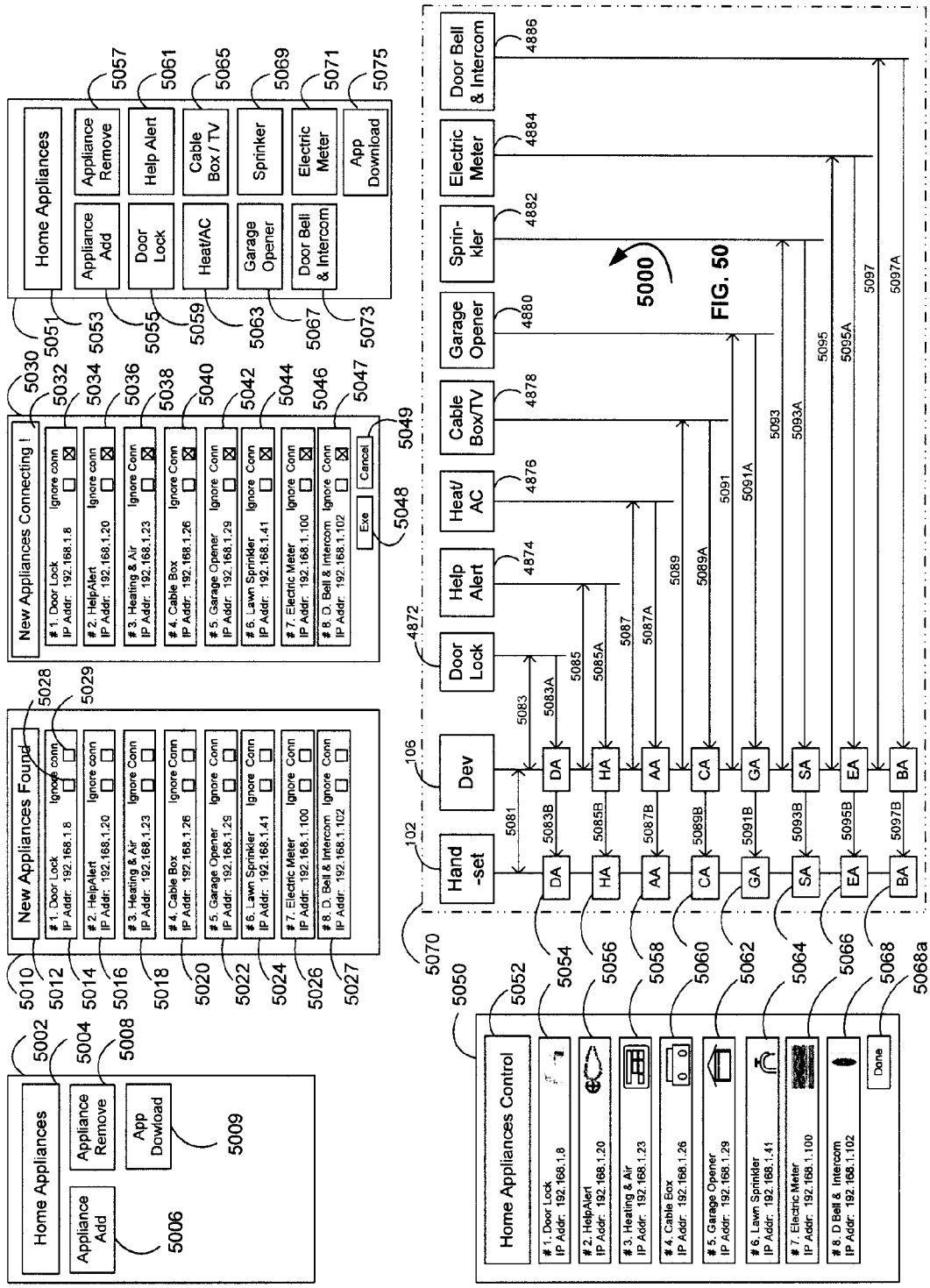
Figure 51:
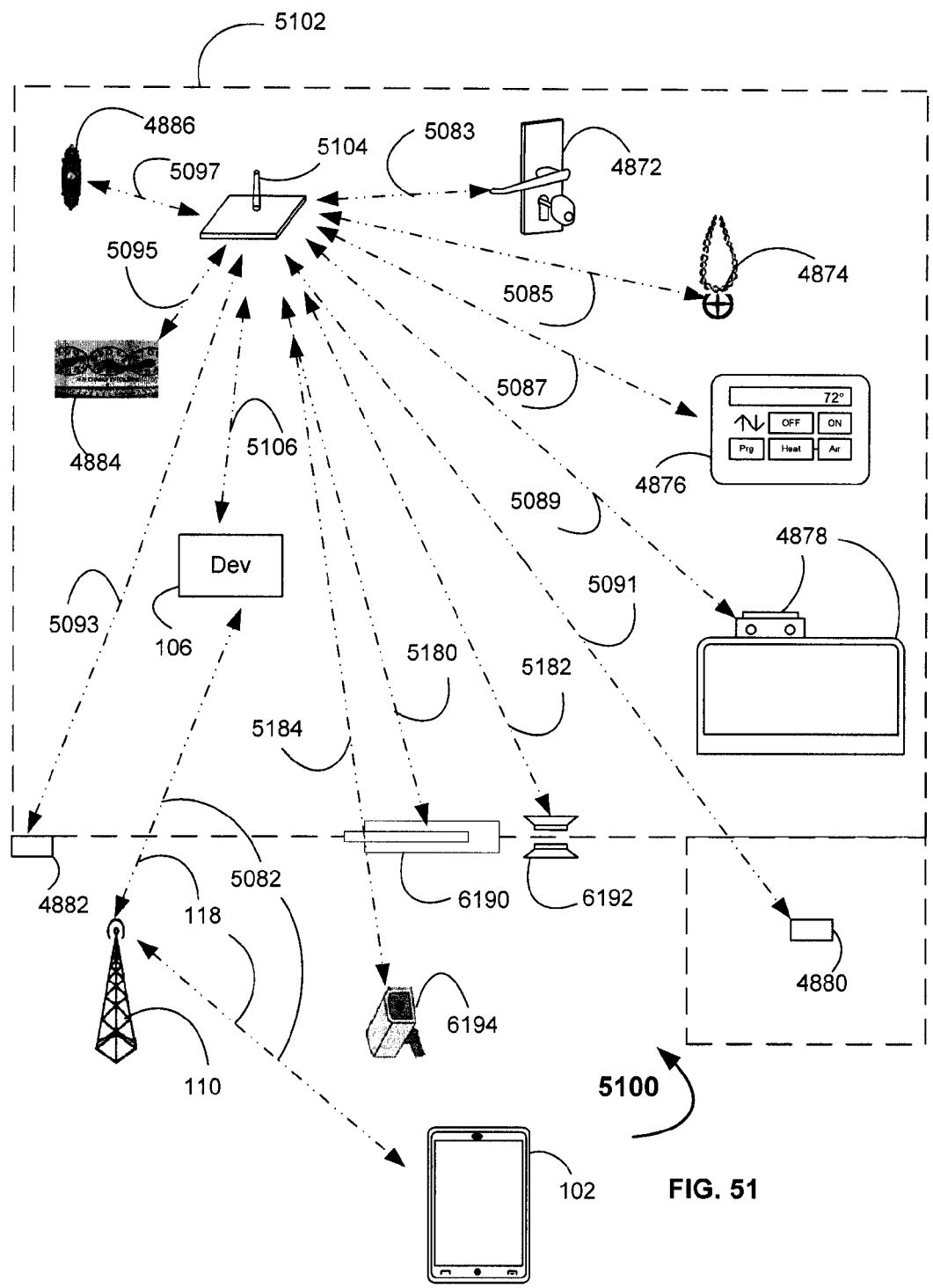

FIGS. 50 and 51 illustrate a preferred application example of embodiments 5000 and 5100 of the present invention. The exemplary embodiment 5000 presents preferred steps taken by a user in his/her handset to add household appliances/equipments into the Dev's Home Control and Monitor system while the exemplary embodiment 5100 presents the communication interaction of these devices within the Wi-Fi network.

The user executes the Household Appliances icon 1344 (FIG. 13), making his/her handset 102 transmit the command to the Dev 106, which processes said command and sends the response back to said handset 102, which displays the Household Appliances menu, as shown on its screen 5002. The Home Appliances menu 5004 lets the user add 5006 home appliances/equipments or accessories that he/she can control remotely using the handset 102 or remove 5008 them when they no longer in use, when he/she is at home or away from home.

The user executes the Appliance Add icon 5006 which makes the handset 102 send the command to the Dev 106 which processes and transmits back the appliances/equipments it discovers on screen 5010. This feature allows the handset 102 to command the Dev 106 to either ignore 5028 or connect 5029 the Entry Door Lock 5014, Help Alert 5016, Heating and Air conditioning 5018, Cable Box 5020, Garage Opener 5022, Lawn Sprinkler 5024, Electric Meter 5026, and Door Bell & Intercom 5027 by selecting and checking appropriate boxes as shown in Home Appliances Connecting screen 5030. The user then executes Exe icon 5048, making the handset 102 send the command to the Dev 106, which processes and transmits back the corresponding software applications: Door Lock 5054, Help Alert 5056, Heat/Air 5058, Cable Box/TV 5060, Garage Opener 5062, Sprinkler controller 5064, Electric Meter 5066, and Door Bell & Intercom 5068, from said appliances as shown in the Home Appliances screen 5050. The user then executes the Done icon 5068a which makes the handset 102 navigate back to screen 5002, being shown as screen 5051. In screen 5051, the Home Appliances menu 5053, comprises the eight newly additional household appliances controlling icons: Door Lock 5059, Help Alert 5061, Heat/Air 5063, Cable Box/TV 5065, Garage Opener 5067, Sprinkler controller 5069, Electric Meter 5071 and Door Bell & Intercom 5073. The Door Lock 1332, Unlock 1334, and the Garage Opener icons 1340 are also copied by the Dev's Home App 604 into the Home App Menu 1322 to make it more convenient (it requires fewer screen steps) for the user to navigate to, when he/she needs to use said function.

Chart diagram 5070 and FIG. 51 show the interaction between the handset 102, the Dev 106 and all the appliances—Door Lock 4872, Help Alert 4874, AC/Heat controller 4876, Cable Box/TV 4878, Garage Opener 4880, Sprinkler 4882, Electric Meter 4884, and Door Bell & Intercom 4886 (and the like, such as: Water Meter, Heating and Cooking Gas Meter . . . ). It starts at step 5081 when the Dev 106 communicates with the handset 102 after it receives the Home Appliances Connecting command from the handset 102 and after the user executes the feature as shown in screen 5030.

The Dev 106 connects and communicates with the Door Lock step 5083 (also shown as the communication link/medium 5083 in FIG. 51), and receives its software application step 5083A which the Dev 106 also passes its copy to the handset step 5083B, showing in the form of the icon 5054 (DA).

The Dev 106 connects and communicates with the Help Alert step 5085 (also shown as the communication link/medium 5085 in FIG. 51), and receives its software application step 5085A which the Dev 106 also passes its copy to the handset step 5085B, showing in the form of the icon 5056 (HA).

The Dev 106 connects and communicates with the AC/Heat controller step 5087 (also shown as communication link/medium 5087 in FIG. 51), and receives its software application step 5087A which the Dev 106 also passes its copy to the handset 102 step 5087B, showing in the form of the icon 5058 (AA).

The Dev 106 connects and communicates with the Cable Box/TV step 5089 (also shown as the communication link/medium 5089 in FIG. 51), and receives its software application step 5089A which the Dev 106 also passes its copy to the handset step 5089B, showing in the form of the icon 5060 (CA).

The Dev 106 connects and communicates with the Garage Opener step 5091 (also shown as the communication link/medium 5091 in FIG. 51), and receives its software application step 5091A which the Dev 106 also passes its copy to the handset step 5091B, showing in the form of the icon 5062 (GA).

The Dev 106 connects and communicates with the Sprinkler step 5093 (also shown as the communication link/medium 5093 in FIG. 51), and receives its software application step 5093A which the Dev 106 also passes its copy to the handset step 5093B, showing in the form of the icon 5064 (SA).

The Dev 106 connects and communicates with the Electric Meter step 5095 (also shown as the communication link/medium 5095 in FIG. 51), and receives its software application step 5095A which the Dev 106 also passes its copy to the handset step 5095B, showing in the form of the icon 5066 (EA).

It is preferably that the Electric Meter 4884 is embedded or equipped with an identifier (such as S/N, location address) in its communication with any wireless device and also during the Dev's home appliances discovery phase (not shown in screen 5110) so it can be distinguished by the user from the ones of his/her neighbors.

The Dev 106 connects and communicates with the Door Bell & Intercom step 5097 (also shown as the communication link/medium 5097 in FIG. 51), and receives its software application step 5097A which the Dev 106 also passes its copy to the handset step 5097B, showing in the form of the icon 5068 (BA).

The communication medium, in this case, between the Dev 106 and the appliances (Door Lock 4872, Help Alert 4874, AC/Heat controller 4876, Cable Box/TV 4878, Garage Opener 4880, Sprinkler 4882, Electric Meter 4884, and Door Bell & Intercom 4886), is in Wi-Fi (wire/wireless LAN) network 104; while the communication between the Dev 106 and the handset 102 can be either through Wi-Fi or through cellular network 118.

Alternatively, the software applications which were transmitted previously from the household appliances to the Dev 106 and to the handset 102 (in graph 5070), such as: Icons: DA 5054, HA 5056, AA 5058, CA 5060, GA 5062, SA 5064, EA 5066, and BA 5068 preferably can be the URLs (app download address links or hyperlinks), which the user then uses to download the appropriate online applications into his/her handset 102, which then transmits them to the Dev 106.

The user can also download the household application online using the App Download icon 5009/5075 on the handset display screen 5002/5051.

Similarly identical steps preferably can be applied to the Integrated Smart Pet Door (its Door 6190, Speakers 6192 and Cameras 6194), and a plurality of other household appliances/equipments, by the handset via the Dev 106, to discover and connect to said appliances/equipments, and receive the applications or hyperlinks from the devices. The handset user then will be able to program, control, and monitor these household appliances/equipments via his/her handset 102.

Figure 52:
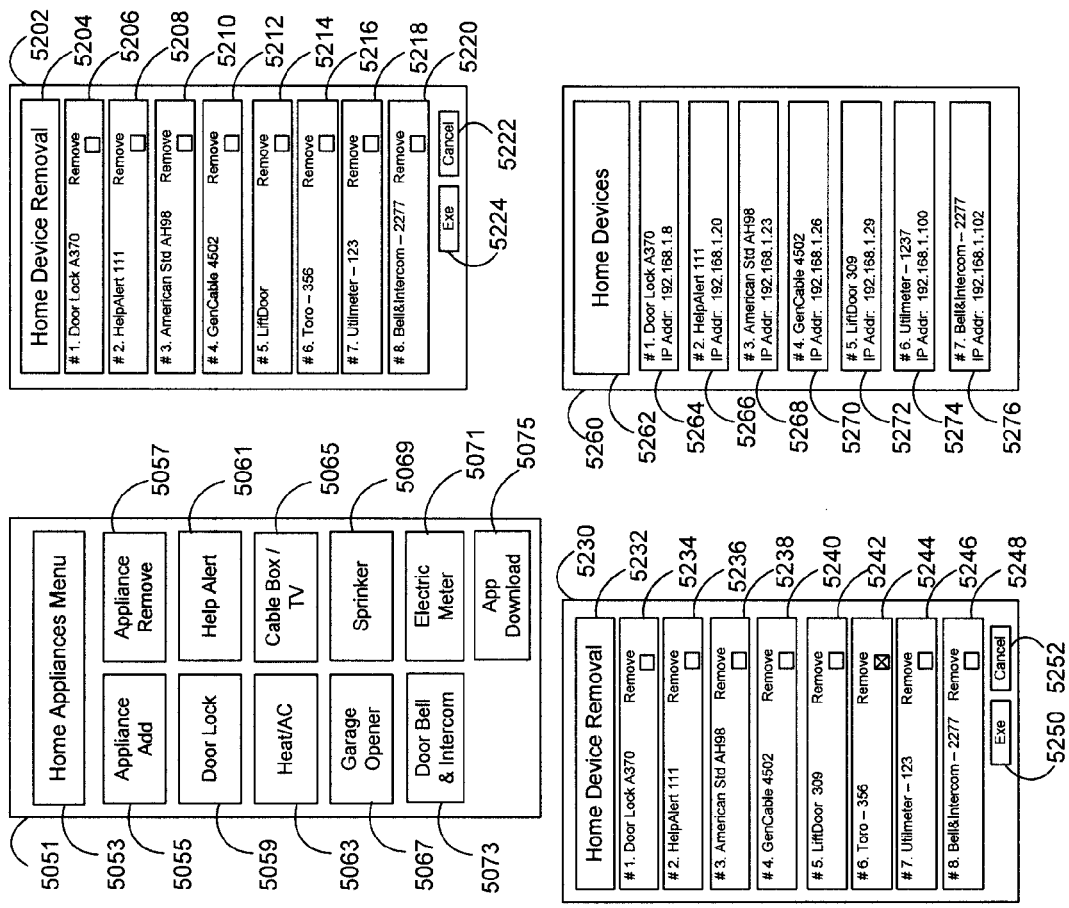
FIG. 52 shows preferred examples of handset's screen displays, presenting a house-hold appliance removal by Dev 106, relating to the present invention in the home application.

FIG. 52 illustrates a preferred application example of embodiment 5200 of the present invention. This exemplary embodiment presents preferred steps taken by a user in his/her handset to remove a household appliance/equipment from the Dev's Home Control and Monitor system This feature allows user to remove appliance devices from the menu as selected by highlighting the Appliance Remove icon 5057, which makes the handset 102 navigate to screen Home Device Removal 5202. The user then can select devices to be removed by screen touching appropriate remove boxes such as: Door Lock 5206, Help Alert 5208, Heating and A/C 5210, Cable Box 5212, Garage Door Opener 5214, Sprinkler 5216, Electric Meter 5218, and Door Bell & Intercom 5220. The handset screen "Home Device Removal" 5230 shows Device #6—Sprinkler 5244 (Toro-356) being selected to be removed. When user executes the Exe icon 5250, making the handset 102 transmit the command to the Dev 106 and wait for the Dev's completion response. When the handset 102 receives the response back from the Dev 106, it means the lawn sprinkler (application software) has been removed from the Dev 106. The handset 102 then removes the sprinkler application software from its memory. The Home Appliances menu 5282 shows its updated content with the sprinkler no longer the listed as a house-hold device. (The handset software preferably will not remove the device software application until the Dev 106 completes its removal function—thus prevent partial removal of the application software and maintain synchronization between the Dev 106 and the handset 102).

Figure 53:
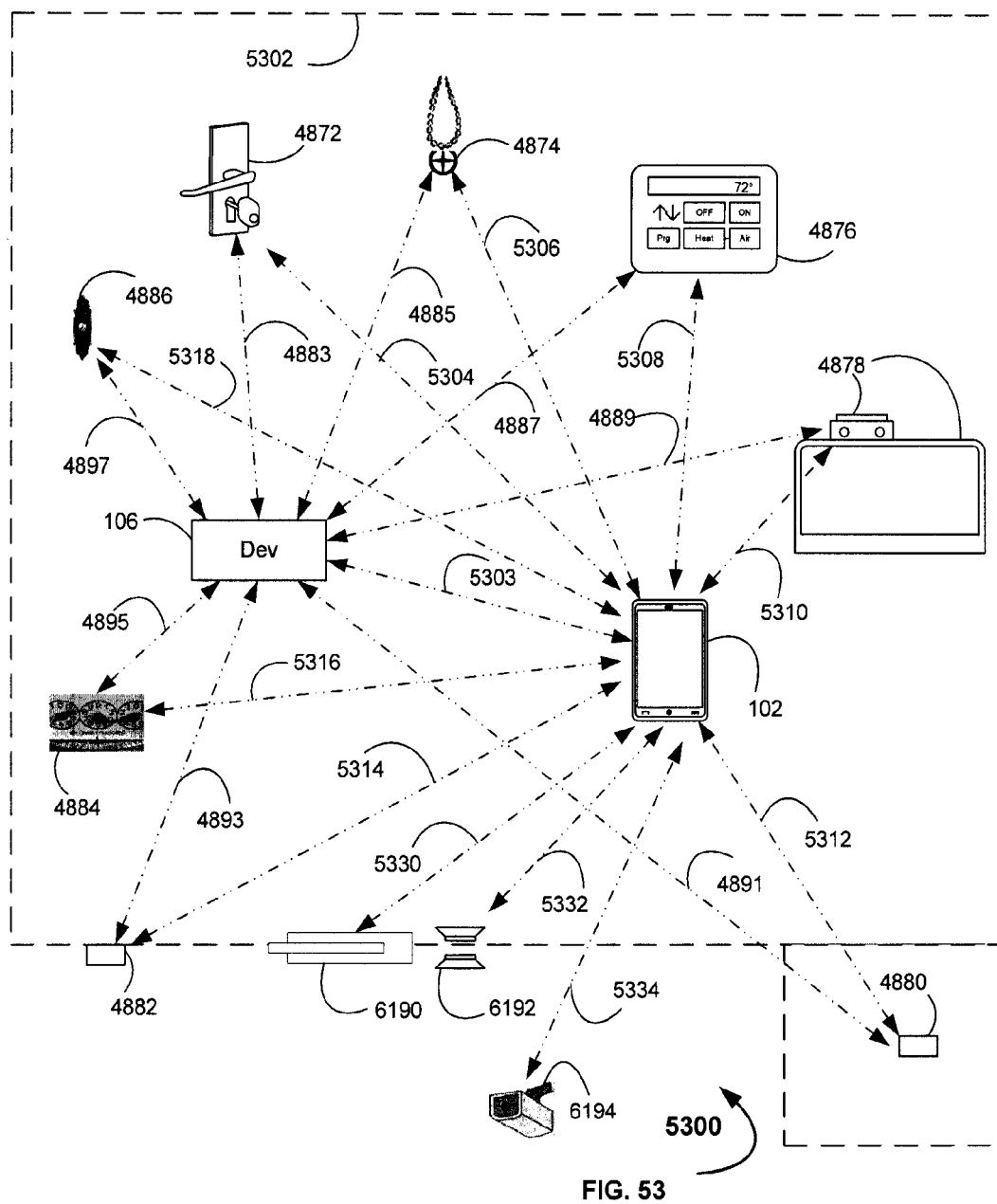
FIGS. 53-54 show preferred examples of the interaction between various devices (Dev 106, handset 102 and other house-hold appliances), when handset 102 communicates with Dev 106 and other appliances through the SRC (Short Range Communication), when at home or on the premises, relating to the present invention in the home application.

FIG. 53 illustrates a preferred application example of embodiment 5300 of the present invention. The exemplary embodiment 5300 presents the communication interaction when both the handset and the Dev communicate with the household appliances/equipments within the SRC network (except Wi-Fi).

It illustrates the interaction between the handset 102, the Dev 106, and various house-hold appliances/equipments: Door Lock 4872, Help Alert 4874, AC/Heat controller 4876, Cable Box/TV 4878, Garage Opener 4880, Sprinkler 4882, Electric Meter 4884, Door Bell & Intercom 4886 (plus the Integrated Smart Pet Door 6190, its Speaker 6192 and its Camera 6194, and the plurality of other devices with supporting apps not shown) when the user is at home. The Dev 106 and the handset 102 detect and communicate with each other via SRC 5303 and therefore the handset 102 also communicates directly to all the above house-hold appliances and control them via SRC media: Door Lock 5304, Help Alert 5306, AC/Heat controller 5308, Cable Box/TV 5310, Garage Opener 5312, Sprinkler 5314, Electric Meter 5316 and Door Bell & Intercom 5318 while (previously) the Dev 106 also communicated with them: Door Lock 4883, Help Alert 4885, AC/Heat controller 4887, Cable Box/TV 4889, Garage Opener 4891, Sprinkler 4893, Electric Meter 4895 and Door Bell & Intercom 4897 (FIGS. 48, 49 and 53).

Figure 54:
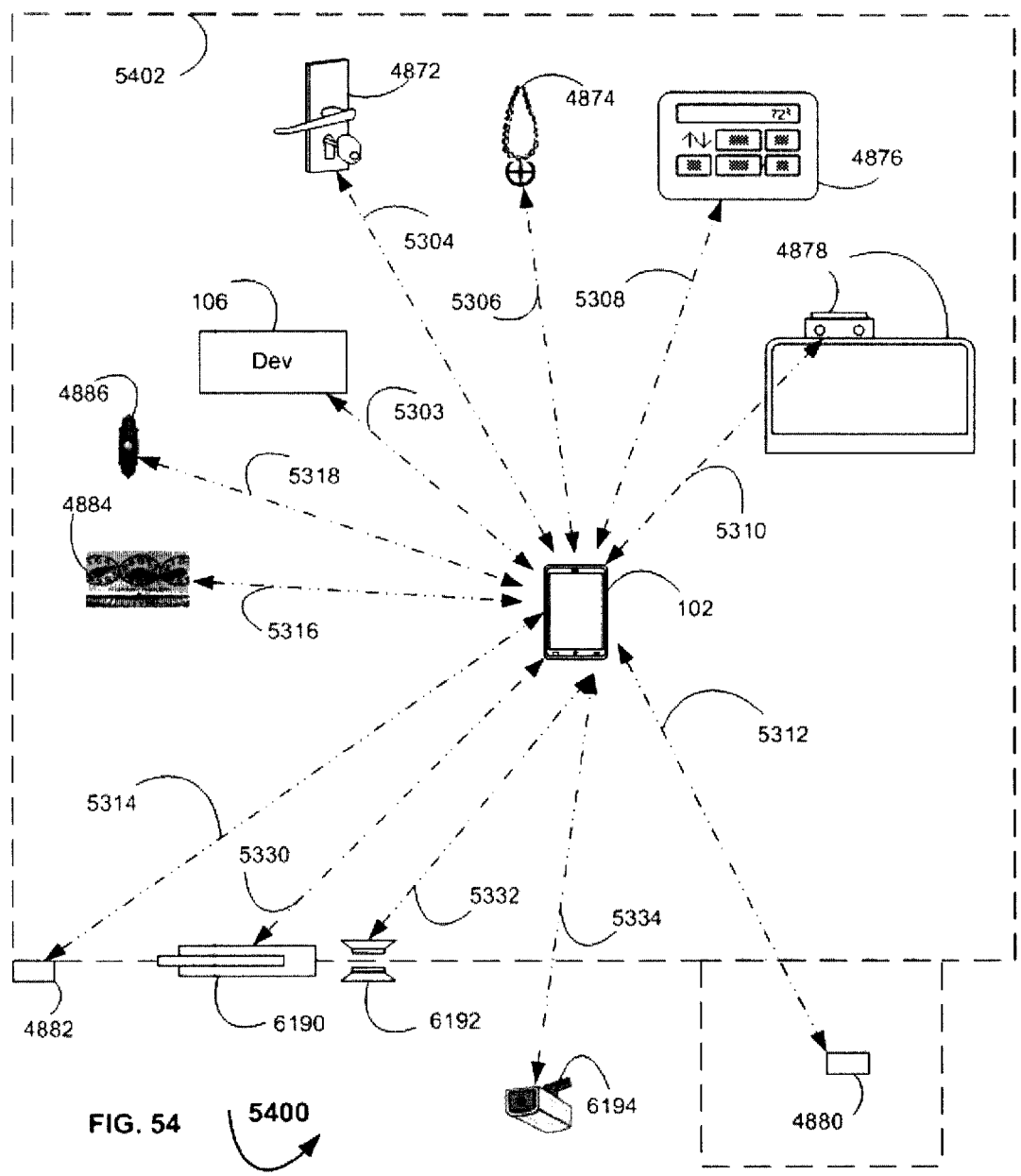

FIG. 54 illustrates a preferred application example of embodiment 5400 of the present invention. The exemplary embodiment 5400 presents the communication interaction when only the handset communicates actively with the household appliances/equipments within the SRC network (except Wi-Fi).

It illustrates the interaction between the handset 102 and various house-hold appliances/equipments: Door Lock 4872, Help Alert 4874, AC/Heat controller 4876, Cable Box/TV 4878, Garage Opener 4880, Sprinkler 4882, Electric Meter 4884, Door Bell & Intercom 4886 (and multiple other devices with supporting software not shown) when the user is at home. The Dev 106 and the handset 102 detect and communicate with each other via SRC 5303 but the Dev 106 ceases communicating with the household appliances because it detects the presence of the handset within its SRC medium. It only responds to the commands from the handset 102 if it detects no responses from the corresponding household appliances for said commands.

FIG. 55A illustrates a preferred example of embodiment 5500A of the present invention. This exemplary embodiment presents preferred steps taken by a user in his/her handset to program, control, record, and view the Cable Box/TV of the Dev's Home Control and Monitor system.

When the Cable Box/TV icon 4865/5065 in the Home Appliances menu 4851/5051 (FIG. 48/50) is executed, the handset 102 transmits the command to the Dev 106, which in turns processes said command and passes it to the Cable/Satellite TV 4878 (FIG. 48), receives the response from said Cable/Satellite TV 4878, and processes said response and passes it back to the handset 102, which displays the information, as shown on its screen 5502.

Remote control 5516 and Channel surfing screen 5504 are controlled by CA software 4860/5060 in FIG. 48/50, which has been transmitted from the Cable/Satellite TV 4878 (or downloaded from the web), with one copy in the Dev 106 and one in the handset 102. Every selection (icon highlighted/screen button touched) in 5504 and 5516 makes the handset 102 transmit commands to the Dev 106, which in turn, transmits them to the Cable/Satellite TV 4878, and if any response required, will be transmitted back from the Cable/Satellite TV 4878 via the Dev 106, to the handset 102, which displays it on screen 5502. The news (News icon 5510) on channel 4 KYON can be watched on screen by touching it as shown or highlighting and then by touching the OK icon 5520.

When the Record icon 5518 is selected, the handset 102 sends commands to Cable/Satellite TV 4878 via the Dev 106, which passes back the response from the Cable/Satellite TV 4878 to the handset 102, which displays it as Recorded Programs (screen 5530). Remote control 5518 reduced in size 5518A, since at that moment it is not needed. The user can watch recorded program such as: Cops icon 5536, as shown by highlighting it and selecting (executing) the Play icon 5540 in the action menu 5538.

FIG. 55B illustrates a preferred example of embodiment 5500B of the present invention. This exemplary embodiment presents preferred steps taken by a user in his/her handset to open or close the Garage Opener of the Dev's Home Control and Monitor system.

The handset 102 navigates to screen 5560 when the user hovers over the handset's Garage Opener icon 4867/5067 for a second or more (until the handset 102 changes screen) presenting remotely the status of the Garage Door Opener 5560. The user then can open/close the garage when he/she is far away from home, and also knows if it is opened or closed as displayed on screen 5562.

Button control 5570 and the display 5562 are controlled by GA software (4862/5062 in FIG. 48/50) which has been transmitted from the Garage Opener 4880 (or downloaded from the web), with one copy into the Dev 106 and one into the handset 102.

On the other hand, the user can open/close the garage door (short range via SRC) by slight touching the Garage Opener icon 4867/5067, or by touching the icon 1340 to open or close the garage, just like the regular garage opener.

FIG. 56A illustrates a preferred example of embodiment 5600A of the present invention. This exemplary embodiment presents preferred steps taken by a user in his/her handset to program, control, and view the Central Heating and Air Conditioner of the Dev's Home Control and Monitor system.

When the handset Heat/Air icon 4863/5063 in Home Appliances 4851/5051 (FIG. 48/50) is executed, the handset 102 transmits the command to the Dev 106, which in turns processes said command and passes it to the Heat/Air system 4876 (FIG. 48/50), receives the response from said Heat/Air system 4876, and processes said response and passes it back to the handset 102, which displays the information, as shown on its screen 5602.

Keypad control 5606 and display status 5604 are controlled by AA software 4858/5058 in FIG. 48/50 which has been transmitted from the Heat/Air 4876 (or downloaded from the web), with one copy into the Dev 106 and one into the handset 102. Every selection (icon highlighted/screen button touched) in 5606 (5608, 5610 and 5612) makes the handset 102 transmit command to the Dev 106, which in turn transmits it to the Heating/Air conditioner 4876 and if any response required, will be transmitted back from the Heating/Air conditioner 4876 via the Dev 106 to the handset 102 which displays it on screen 5602. The screen 5604 shows the H/A fan is on, in automatic mode, and the house is at 72 degrees F. The handset 102 navigates to screen 5630, when the user programs the heater (by keying in Prog icon 5614, Heat icon 5620, Time icon 5616, keypad icon 5612 and Set icon 5618) to turn on Heat/Air Conditioner 4876 from 10 AM to 6 PM to 78 Degrees F., as are known to those of ordinary skill in the art.

FIG. 56B illustrates a preferred example of embodiment 5600B of the present invention. This exemplary embodiment presents preferred steps taken by a user in his/her handset to open or close the House Entry of the Dev's Home Control and Monitor system.

When the handset Door Lock icon 4859/5059 in Home Appliances 4851/5051 (FIG. 48/50) is executed, the handset 102 transmits the command to the Dev 106, which in turns processes said command and passes it to the Door Lock 4872 (FIG. 48/50), receives the response from said Door Lock 4872, and processes said response and passes it back to the handset 102, which displays the information, as shown on its screen 5650.

Screen 5650 shows the status of the door lock every time icon 5656 is touched; it toggles between unlocked (message 5654) and locked (message 5664). Screen touch control icon 5656/5666 and the display screen 5652/5662 are controlled by DA software 4854/5054 in FIG. 48/50 which has been transmitted from the Door Lock 4872 (or downloaded from the web), with one copy into the Dev 106 and one into the handset 102.

Figure 57:
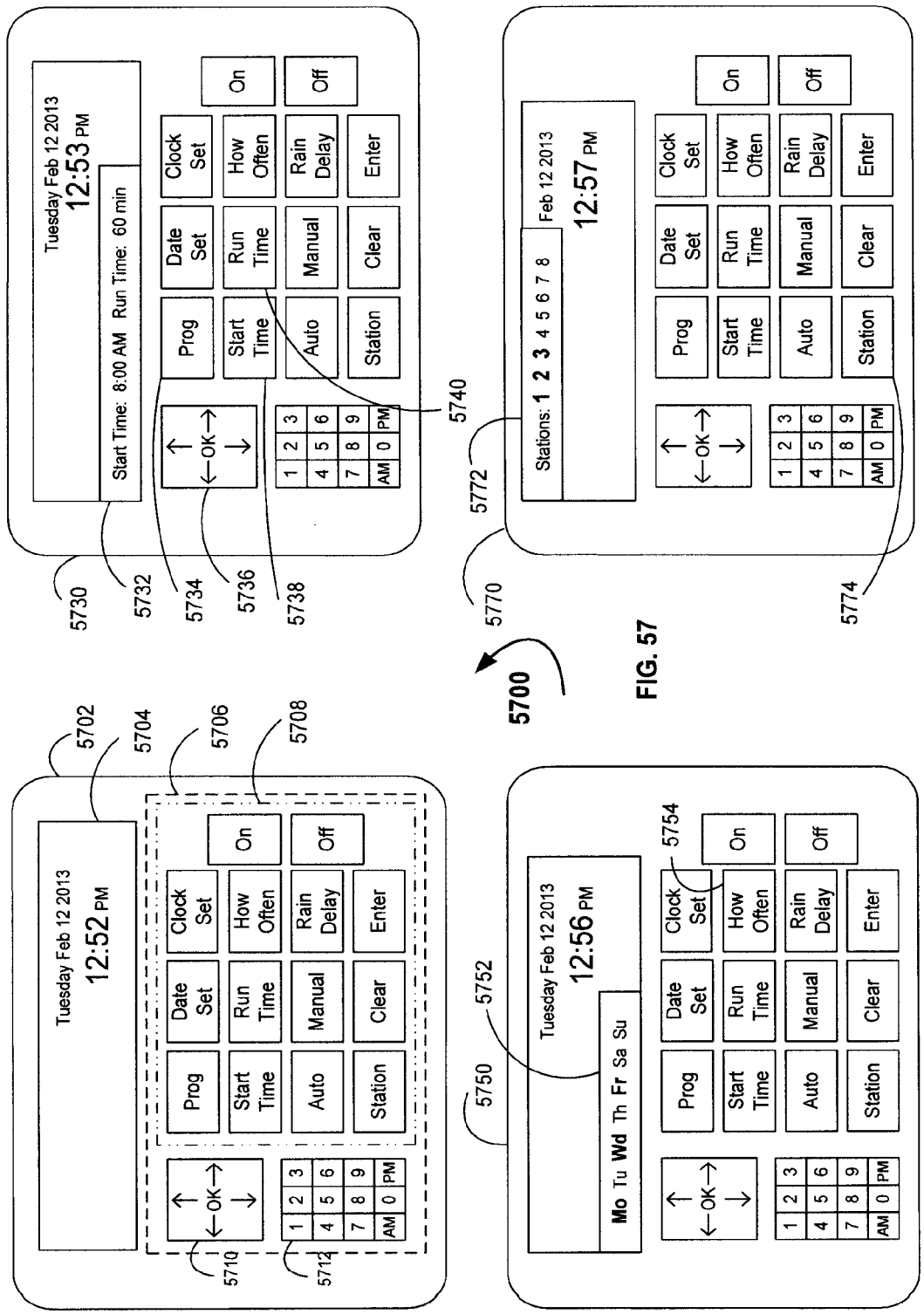
FIG. 57 shows preferred examples of handset's screen displays, presenting the communication between handset 102 and Dev 106, when user uses his/her handset 102 to control and program (via the Dev 106) the landscaping sprinkler system, relating to the present invention in the home application.

FIG. 57 illustrates a preferred example of embodiment 5700 of the present invention. This exemplary embodiment presents preferred steps taken by a user in his/her handset to program, set up and view the indoor/outdoor watering control of the Dev's Home Control and Monitor system.

When the handset Sprinkler icon 4869/5069 is executed, the handset 102 transmits the command to the Dev 106, which in turns processes said command and passes it to the Sprinkler 4882 (FIG. 48/50), receives the response from said Sprinkler 4882, and processes said response and passes it back to the handset 102, which displays the information, as shown on its screen 5702.

Keypad control 5706 and the display 5704 are controlled by SA software 4864/5064 in FIG. 48/50 which has been transmitted from the Sprinkler 4882 (or downloaded from the web), with one copy into the Dev 106 and one into the handset 102. Every selection (icon highlighted/screen button touched) in 5706 (5708, 5710 and 5712), makes the handset 102 transmit command to the Dev 106 which in turn transmits it to the Lawn Sprinkler controller 4882 and if any response required will be transmitted back from the Lawn Sprinkler controller 4882 to the Dev 106 and from the Dev 106 to the handset 102 which appears on its display screen 5702. The handset 102 navigates to screen 5730 when the user programs to turn the sprinkler system on starting at 8 AM duration 60 minutes; to screen 5750 on Monday, Wednesday and Friday 5752; and to screen 5770 for stations 1, 2 and 3 (screen 5772).

Figure 58:
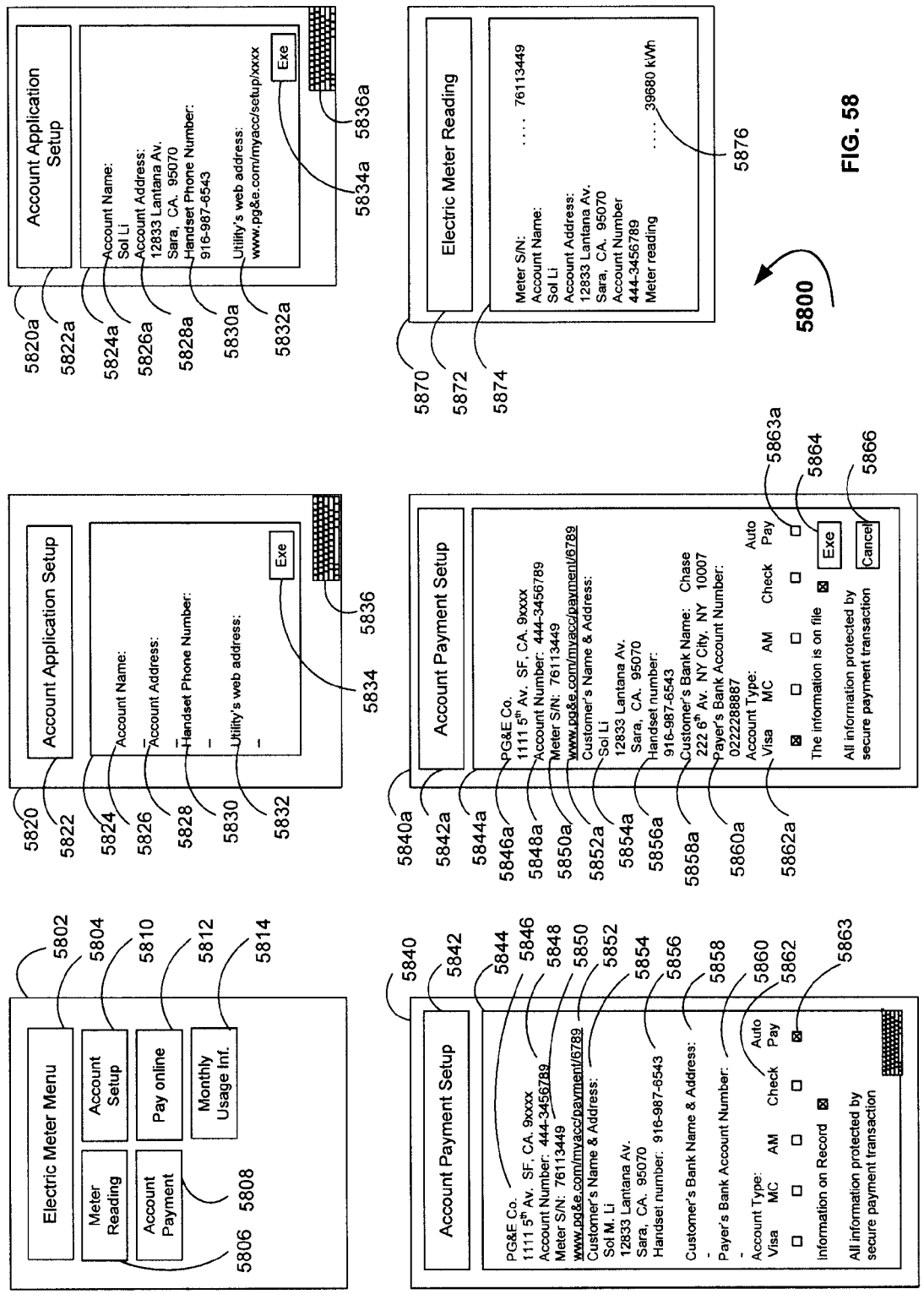
FIGS. 58 and 59 show preferred examples of handset's screen displays and a flow diagram, presenting the communication between handset 102, utility company 5982, Dev 106 and Electric Meter 4884, of the user receiving the monthly invoice and paying the electricity bill, to the utility company 5982, relating to the present invention in the home application.
Figure 59:
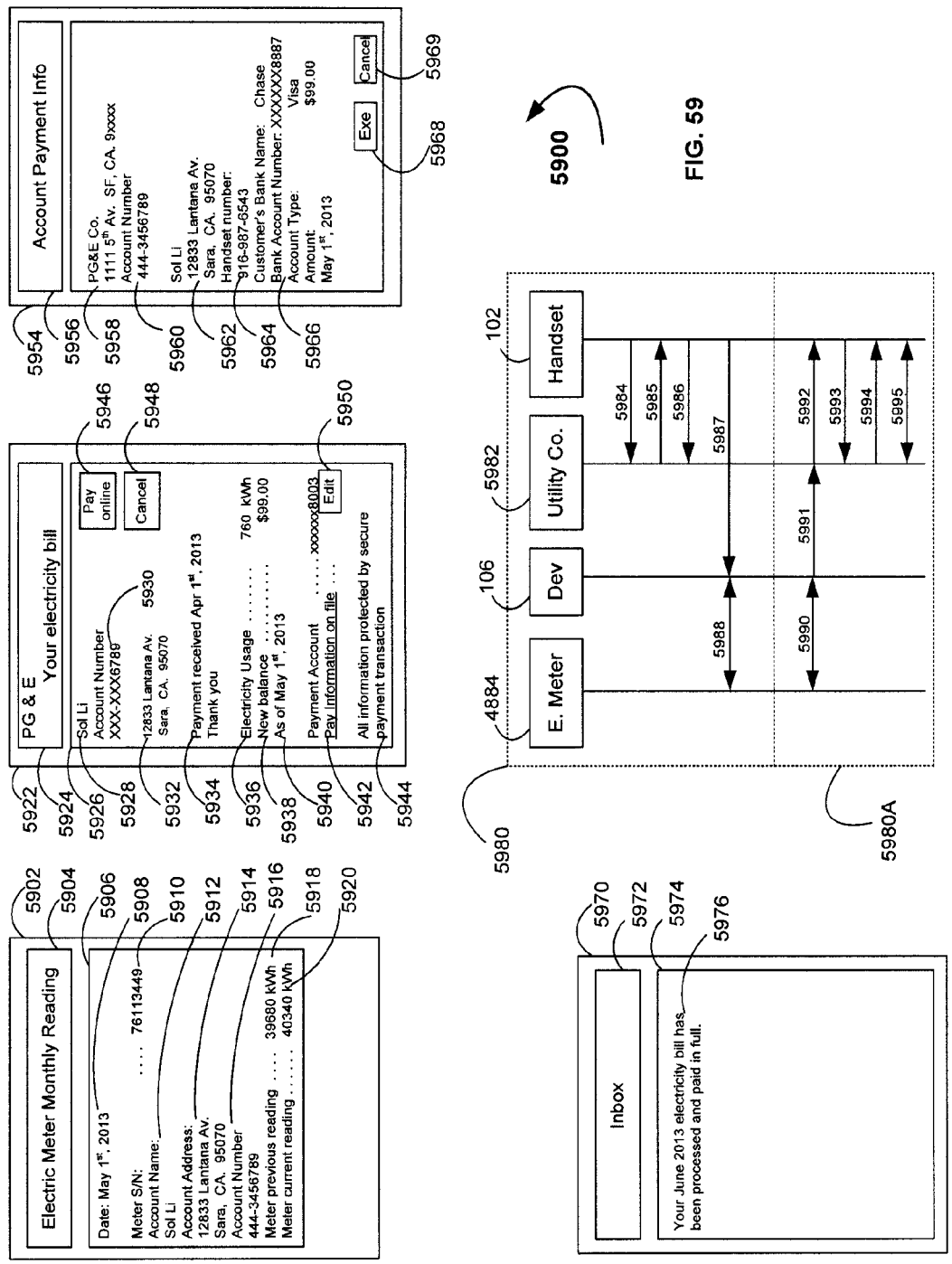

FIGS. 58 and 59 illustrate preferred examples of embodiments 5800 and 5900 of the present invention. The exemplary embodiment 5800 presents preferred steps taken by a user in his/her handset to set up the payment account, view the meter reading, and program the Electric Meter of the Dev's Home Control and Monitor system.

When the user executes the Electric Meter icon 4871/5071 in Home Appliances 4851/5051, which makes the handset 102 navigate to Electric Meter Menu 5804, as shown on its screen 5802. The Electric Meter Menu 5804 contains Account Setup 5810, which when programmed, allows the interaction between the Dev 106, the handset 102, the electric meter 4884, and the utility company 5982. The user then can pay the electricity bill online using the handset 102 or the utility company 5982 will be paid automatically every month. Meter Reading 5806 and Account Payment 5808 let user view current electric meter reading and past account billings (screen 5954). The Pay online icon 5812 lets user pay any account outstanding and the Monthly Usage Inf. Icon 5814 let user view past account usage activity 5822.

The user selects the Account Setup icon 5810 which makes the handset 102 navigate to screen 5820 showing the Account Application Setup 5822. It requires the user to fill out user's name 5826, address 5828, handset phone number 5830 and Utility's web address 5832 (Utility web address 5832 preferably came pre-filled with electric meter application EA 4866/5066 in FIG. 48/50; otherwise user obtains it from the said company either by phone, text message, downloading or any other means). The handset screen 5820a shows the required information filled by the user, who then executes the Exe icon 5834a, which makes handset 102 transmit the information 5824a to the Utility Company 5982 (also as shown in step 5984, flow diagram 5980). The Utility Company 5982 processes the application data, and then transmits back (step 5985) to the user's handset 102, the partially filled Account Payment Setup information 5844, as shown in the handset screen 5840. Window 5844 shows the Utility Company name 5846, the user/customer assigned account number 5848, the Electric Meter S/N 5850 (Serial Number or identification number since each meter is used to measure electricity usage and hooked to its corresponding residence/business address. It is for device identification during its communication with the Dev since there might be a plurality of devices in close proximity i.e., apartment or high rise building) and the utility company payment web address (URL) 5852.

Field 5844 also shows customer's name, address, and phone number 5854 and 5856 (filled out previously in screen 5820*a*). The user fills out the remainder information, such as: Bank Name 5858, Payer's Bank Account Number 5860 and type of payment 5862. When the user finishes as shown in screen 5840*a*, with the Auto Pay icon 5863*a* unchecked, and executes Exe icon 5864 which makes the handset 102 transmit back (step 5986) to the Utility Company 5982 the information as shown in field 5844*a*. The handset 102 also transmits a copy of it 5844*a* to the Dev 106 as shown in step 5987 and the Dev 106 in turn communicates with the Electric Meter 4884 as shown in step 5988 using the S/N 5850*a* to make sure it communicates with and reading from the right device. The Dev 106 also uses the utility company URL 5852*a* to send the month electricity reading to the utility company 5982 account payment department. Auto payment box 5863 (checked) allows user to pay automatically every month.

On the first of each month (reading from RTC 240), the Dev 106 communicates and reads (step 5990) the electricity usage from the Electric Meter 4884 and transmits the reading information 5920 (screen 5902) as shown in step 5991 to the Utility Co. 5982. The utility company 5982 processes and sends (step 5992) the bill 5924 to user's handset 102 as shown in screen 5922. The field 5926 outlines the user's monthly electricity usage 5936 and the required payment 5938 for the month 5940. It also shows that the payment information is on file 5942 (URL link to the utility company database server) and can be edited 5950 if there are any changes in the payment information. The payment information also is hyper-linked to the Pay online icon 5946, which when executed by the user, makes the handset 102 transmit the information (step 5993) to the Utility Co. 5982, which transmits back (step 5994) the payment information screen 5954. The user then can make the payment by executing 5968, which makes the handset send the payment command, and receives (step 5995) the confirmation 5970 in the inbox from the Utility Co. 5982.

The application software allows the Dev 106 to communicate with the Electric Meter 4884 and the handset 102 is controlled by EA software 4866/5066 in FIG. 48/50 which has been transmitted from the Electric Meter 4884 (or alternatively downloaded from App Server whose URL provided by the Electric Meter 4884) with one copy into the Dev 106 and one into the handset 102.

This embodiment can also be similarly applicable to the Water Meter, Cooking & Heating Gas Meter and the like.

FIG. 60A illustrates a preferred activation example of embodiment 6000A of the present invention. This exemplary embodiment presents preferred steps taken by a user in his/her handset to monitor, and talk with the Help Alert wearer, via the Dev's Home Appliances system remotely.

It illustrates one aspect of the invention when handset user or help alert wearer needs to communicate with each other. The Dev 106 communicates with Help Alert device 4874, so the user can monitor (via his/her handset) the well being of the person who wears said device. The device 4874 preferably consists of a wireless camera and the voice recognition integrated circuit so the Help Alert 4874 connects to the Dev 106, which transmits a message and rings up the user's handset 102, in order for its wearer to communicate with the handset user. When the device wearer says a sentence, such as: "Hi Dave (i.e., name of handset's user), I want to talk to you", the Help Alert device 4874 transmits the command to the Dev 106, which in turn rings up the user's handset, and also preferably transmits a text message. When the user answers the call, then the conversation takes place. As soon as the user hangs up or if there is no audio variation for 5 minutes, the Dev 106 will stop the audio communication to the Help Alert device 4874.

When the user selects the Help Alert icon 6061, the handset 102 navigates to screen 6002 where the Help Alert Menu 6004 consists of the Talk icon 6008 and the Monitor icon 6006. When the user selects the Monitor icon 6006, the handset will transmit the command to the Dev 106 which connects to the Help Alert device 4874 camera and transmits back to the handset 102 what the camera sees and thus allows the user to monitor what is in front of the wearer (to monitor the well-being of his/her elder parent for instance). When the user selects the Talk icon 6008, the handset will transmit the command to the Dev 106 which then answers and connects to the Help Alert device 4874 audio, and thus allows the conversation to take place. The Help Alert device 4874 also preferably is able to detect vibration, such as a fall so that it can send commands to the Dev 106, which alerts the user of such an event, and he/she can immediately monitor and talk to the wearer.

The application software allows the Dev 106 to communicate with the Help Alert 4874 and the handset 102 is controlled by the HA software 4856/5056 in FIG. 48/50, which has been transmitted from the Help Alert 4874 (or alternatively downloaded from App Server whose URL provided by the Help Alert 4874), with one copy in the Dev 106 and one in the handset 102.

FIG. 60B illustrates a preferred activation example of embodiment 6000B of the present invention. This exemplary embodiment presents preferred steps taken by a user in his/her handset to answer, talk, and monitor the visitor, who rings the door bell and intercom via the Dev's Home Control and Monitor System remotely.

When a visitor rings the door bell (step 6082 in flow diagram 6080), the Bell & Intercom 4886 transmits command (step 6084) to the Dev 106 which alerts (step 6086) the user via his/her handset screen 6020. The user then scrolls to the inbox 6040 and sees the Door Bell ringing message 6042. The user then executes the Talk icon 6044 (in order to answer to door), which makes the handset 102 navigate to the Door Bell Intercom menu 6052 in screen 6050. This makes the handset 102 establish the cellular connection (step 6088) to the Dev 106, which conducts the audio duplex transmission (6090) with the front door intercom (Door Bell & Intercom 4886 in FIG. 48/50), thus allows the user to talk to the bell ringer, through his/her handset. The Door Bell Intercom menu 6052 allows the user and the visitor to communicate with each other, through the front door speaker and microphone, without the visitor realizing that the user (i.e., the house owner) may not be at home, at the moment. The user can also put the conversation on speaking phone 6054, make it mute 6056, or put it temporarily on hold 6058. This embodiment makes the unexpected visitor believe that somebody is at home, and any intention of breaking into the house therefore hopefully can be avoided.

The application software which allows the Dev 106 communicate with the Door Bell & Intercom 4886 and the handset 102 is controlled by the BA software 4868/5068 in FIG. 48/50 which has been transmitted from the Door Bell & Intercom 4886 (or alternatively downloaded from the App Server whose URL provided by the Door Bell & Intercom 4886) with one copy into the Dev 106 and one into the handset 102.

Figure 61:
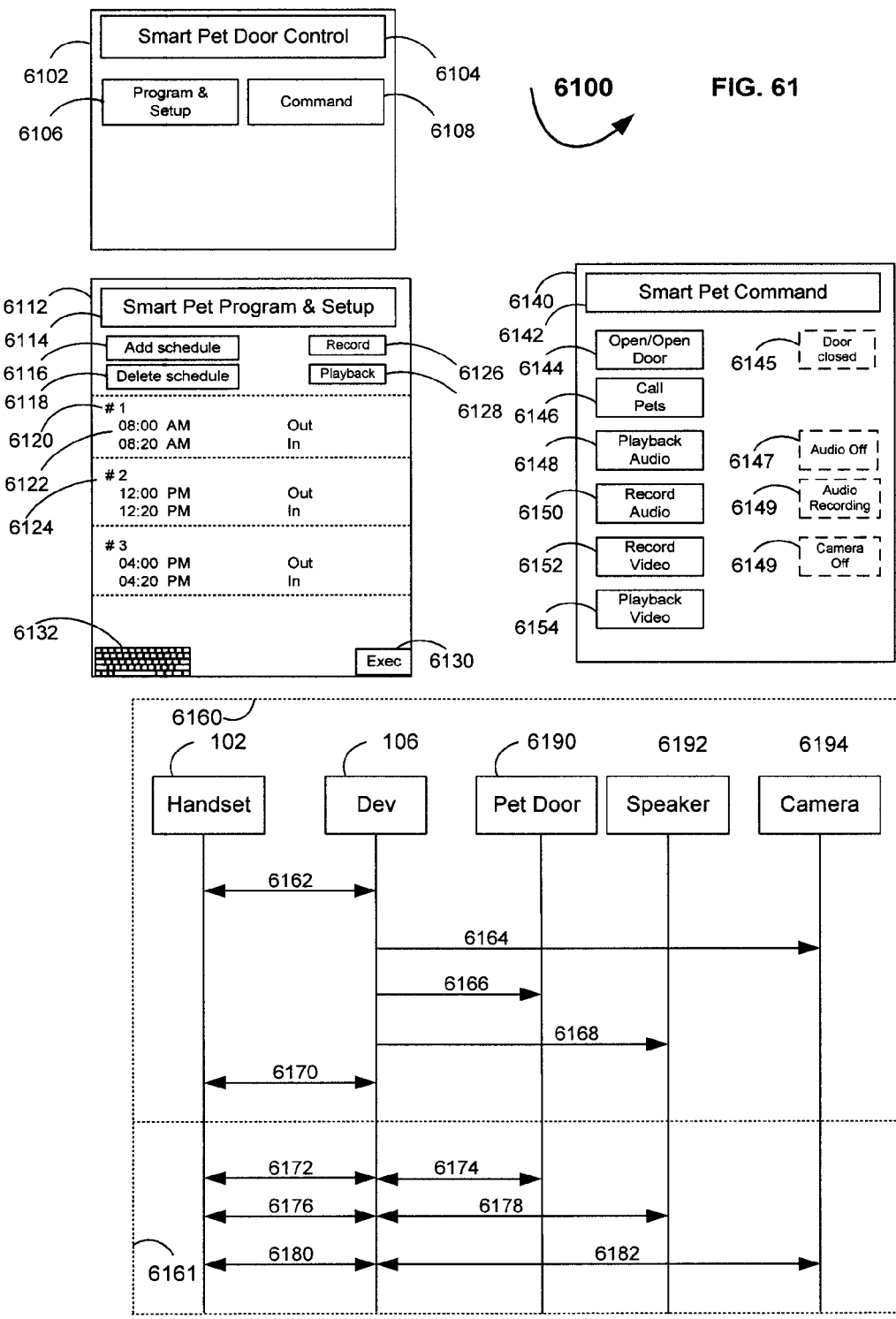
FIG. 61 shows a preferred example of handset's screen displays and a flow diagram, presenting the communication of handset 102 and Dev 106, when user uses his/her handset 102 to program, set up and control (via the Dev 106) the integrated smart pet door control system, relating to the present invention in the home application.

FIG. 61 illustrates a preferred activation example of embodiment 6100 of the present invention. This exemplary embodiment presents preferred steps taken by a user in his/her handset in order to program, set up, and control the Integrated Smart Pet Door (its door, speakers and cameras), via the Dev's Home Control and Monitor System remotely.

The user sets up the Pet Program and Monitor system by executing the Smart Pet Door icon 6077 (in screen 6051 of FIG. 60), making the handset 102 navigate to the Smart Pet Door Control menu 6102. The Program & Setup icon 6106 will let the user schedule his/her pets' need to go out doing their things and the Command icon 6108 allows the user to command its accessories to do certain task relating to their daily needs in real time.

The Program and Setup control (screen 6112 after the user executes icon 6106) lets the user schedule (Add schedule icon 6116), such as: schedule #1 (6120) and schedule #2 (6124) showing the time for the pets to go out of the house and back in (6122). It also lets user delete old schedules (Delete schedule icon 6118). The user has the option of recording the scene in order to play back if he/she needs to verify that the schedule meets their needs. This exemplary embodiment shows that the user schedules the pets do go out three times a day, and each lasts 20 minutes (8:00 AM-8:20 AM, 12 PM-12:20 PM and 04:20 PM-04:20 PM). Chart 6160 illustrates the actions taken by the Dev 106 at schedule time. At the starting time (i.e., 8:00 AM), the Dev 106 sends the Open Door command to the Pet Door 6190 (step 6166), transmits the audio recording the owner's calling the pets on the speaker 6192 (step 6168) to trick them out of the house and optionally turns on the camera (step 6164). At the end time (i.e., 8:20 AM), the Dev 106 transmits the audio recording the owner's calling the pets on the speaker 6192 (step 6168) to induce them back into the house, sends the Close Door command to the Pet Door 6190 (step 6166) and turns off the camera (step 6164).

The Smart Pet Command menu (screen 6140 after the user executes icon 6108) allows the user to open or close the pet door icon 6144 (steps 6172 and 6174) in real time, and let him/her view its status icon 6145. The user can try calling the pet through the speaker 6192 while holding on Call Pets icon 6146 (also shown in steps 6176 and 6178). He/she can record his/her audio (his/her voice onto the Dev 106) call icon 6150 calling to the pets, to play it on the speaker, or play it back to listen to it (icon 6148). The user can record the video and play it back (icons 6152 and 6154, and also in steps 6180 and 6182). This allows the owner the peace of mind on the daily needs of his/her pets and there is no urgency about getting home on time, or asks somebody to do the task.

Similarly the Dev 106 can be programmed to transmit commands to the Smart Pet Feeder (6079 in screen 6051 of FIG. 60A)) and schedule it of the pet feeding time, the right amount of food and alert the handset 102 when the feeder needs to be refilled. Preferably the owner can also program the Dev 106 via the handset 102 to cancel these tasks when they are no longer needed; and remove their software applications from both the handset 102 and the Dev 106, as previously described in FIG. 52, regarding other house-hold devices.

Figure 62:
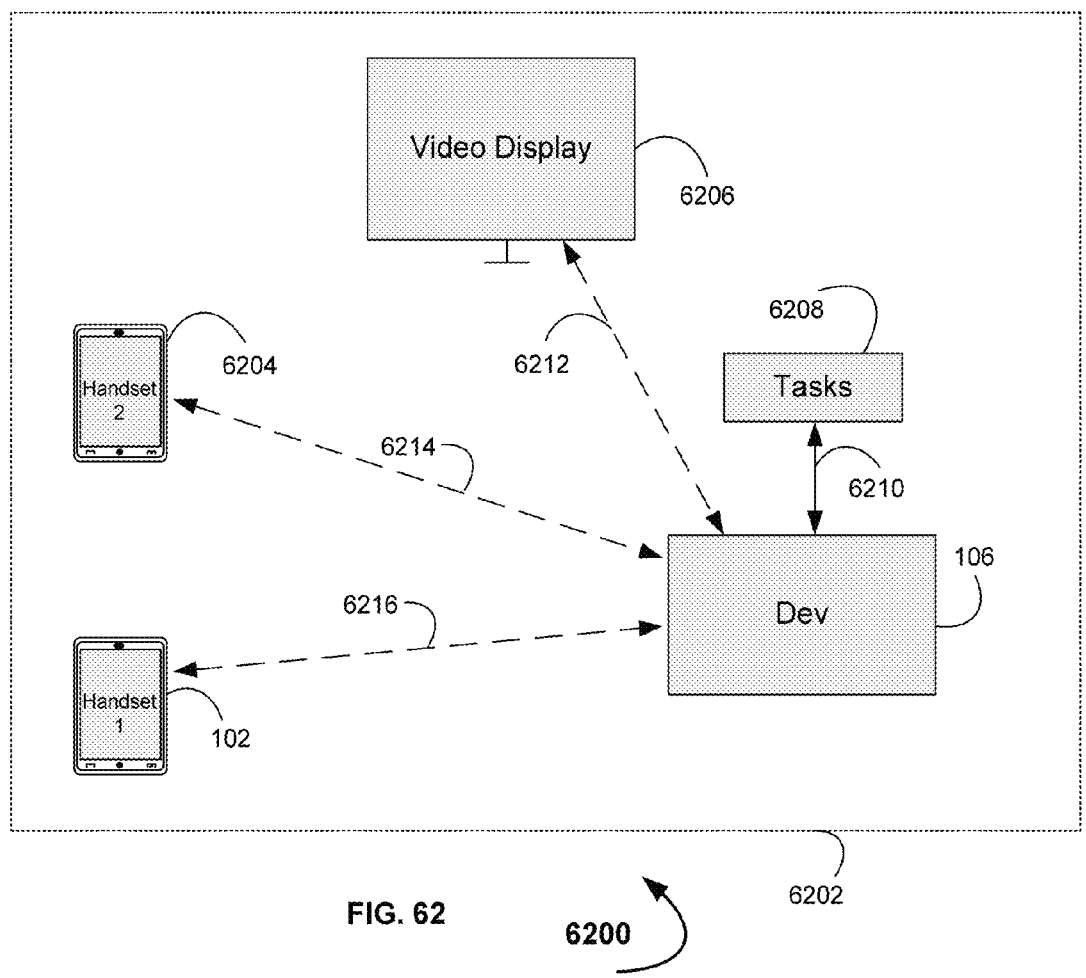
FIG. 62 shows a preferred example of the interaction of various devices, relating to the present invention in the robotic application.

FIG. 62 illustrates a preferred activation example of embodiment 6200 of the present invention for robotic application. This exemplary embodiment presents the communication interaction between the Dev 106, and the plurality of other mobile devices in the robotic application, where a plurality of users (handsets) can program, control and monitor said Dev in fulfilling its task.

It illustrates the operation performed or carried out by the Dev 106 regarding the tasks or functions 6208 through the communication link/connector 6210 connecting to its I/O interface 438 (FIG. 4). The Dev 106 performs the task 6208 using its I/O control 401 (FIG. 4), such as: Lighting Control 410 on behalf of the handset 102 (user) for brightness, Temperature sensors 404 to check the environment reading, Audio I/O 408 for voice/sound, Video I/O 406 for seeing and General I/O 412 for performing and controlling various steps and procedures in order to complete a task. The Video screen 6206 projects images from the video I/O 406 so a third party can observe and participate in. An unregistered handset 6204 (which as mentioned earlier in FIG. 1, can be a smart phone, tablet PC, laptop PC, iPad-like device, PDA [Personal Digital Assistant] or any portable electronic device) user can be invited (registered) by the handset 102 user (through the Device Configure Process in FIG. 19/20) to actively participate in carrying out the task 6208. Connections 6214 and 6216 are preferably cellular 118 and 6212 is preferably wired/wireless LAN but they can also be any wireless network. Task 6208 can be a robotic device on medical surgery, robotic moving, flying and steering devices on rescue operation inside a collapsed building, houses on fire or a rescue operation where human cannot have access to.

While this invention has been described in terms of several embodiments, there are alterations, modifications, permutations, and substitute equivalents, which fall within the scope of this invention. It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. A computerized method for identifying and registering a new appliance, useful in association with a mobile device associated with an owner, the method comprising:
    receiving a one-time and time-limited activation code at a new appliance from a mobile device associated with the owner, the one-time and time-limited activation code provided to the mobile device by a cellular service provider;
    transmitting by the new appliance via a cellular network the one-time and time-limited activation code and a unique appliance identifier of the new appliance to the cellular service provider; and
    receiving at the new appliance via the cellular network an assigned phone number and activation acknowledgement from the cellular service provider.

2. The method of claim 1 wherein the one-time and time-limited activation code is received via at least one of a short range wired communications channel, a short range wireless communications channel and a portable memory module medium.

3. The method of claim 1 further comprising receiving appliance data associated with the new appliance, associating the appliance data with the mobile device, associating the appliance data with the cellular service provider, and associating the appliance data with the owner.

4. The method of claim 1 wherein the one-time and time-limited activation code is based on at least one of:
    personal information associated with the owner;
    a mode of financial payment associated with the owner;
    an activation key assigned by the cellular service provider;
    an activation type;
    an activation methodology; and
    an encryption key.

5. The method of claim 1 wherein the unique appliance identifier includes at least one of an International Mobile Subscriber Identity (IMSI), an Electronic Serial Number (ESN), a Mobile Equipment Identifier (MEID), an International Mobile Subscriber Identifier (IMEI), a Serial Number (SN), a model number and a manufacturer name.

6. The method of claim 1 further comprising receiving and registering a unique identifier associated with the mobile device and thereby limiting communications to the mobile device.

7. The method of claim 6 further comprising registering a second mobile device by:
receiving from the mobile device associated with the owner an identifier of the second mobile device;
transmitting a registration acknowledgement to the mobile device; and
transmitting registration instructional information to the second mobile device.

8. The method of claim 7 further comprising deregistering the second mobile device by:
receiving from the mobile device the identifier of the second mobile device;
transmitting a deregistration acknowledgement to the mobile device;
transmitting a deregistration command to the second mobile device; and
ceasing communication with the deregistered second mobile device.

9. The method of claim 6 further comprising registering a second mobile device by:
receiving from the mobile device an identifier of the second mobile device;
transmitting a registration acknowledgement to the mobile device;
transmitting registration instruction information to the second mobile device; and
restricting functionality of the second mobile device to an entry and exit of a house associated with the owner.

10. The method of claim 6 further comprising registering a second mobile device by:
receiving from the mobile device an identifier of the second mobile device;
transmitting a registration acknowledgement to the mobile device;
transmitting registration instruction information to the second mobile device;
restricting functionality of the second mobile device by not allowing it to register; and
ceasing communication of the second mobile device on a programmed time and date.

11. The method of claim 1 further comprising receiving from the mobile device a unique identifier associated with a second mobile device and providing a download link of an appliance communication application to the second mobile device.

12. The method of claim 1 further comprising soliciting a second mobile device to register with the new appliance to enable future communications between the second mobile device and the new appliance.

13. The method of claim 12 further comprising deregistering the second mobile device to disable communications between the second mobile device and the new appliance.

14. The method of claim 12 further comprising receiving at the second mobile device at least one of a user security password and an email address, thereby enabling the second mobile device to add the user security password and the email address and associating the new appliance with the second mobile device.

15. The method of claim 7 further comprising receiving a disable command and the unique identifier associated with the second mobile device from the mobile device, thereby disabling communications between the appliance and the second mobile device.

16. The method of claim 1 further comprising:
receiving a registration solicitation from an unregistered third party mobile device;
sending at least one alert message to the mobile device;
receiving a positive/negative confirmation from the mobile device; and
registering/not registering the unregistered third party mobile device.

17. The method of claim 1 further comprising:
receiving a registration solicitation from an unregistered third party mobile device;
sending at least one alert message to the mobile device;
receiving a matched password from the unregistered third party mobile device; and
registering the unregistered third party mobile device.

18. The method of claim 1 further comprising:
detecting the presence of a Subscriber Identity Module (SIM) module.

19. The method of claim 1 further comprising:
receiving a Global Positioning System (GPS) location request from the mobile device; and
sending a current GPS location to the mobile device.

20. The method of claim 1 further comprising:
receiving a missing mobile device location request from the mobile device; and
sending a current Global Positioning System (GPS) location of the missing mobile device to the mobile device.

21. The method of claim 1 further comprising completing a toll payment by using an account set up by the mobile device and associated with a company payment receivable account of a company which owns a toll taking device;
receiving a toll-payment demand associated with toll paying account information from the toll taking device;
completing a toll-payment including transmitting to the toll-taking device the toll paying account information associated with the company which owns the toll-taking device; and
storing the toll paying account information in an appliance memory.

22. The method of claim 21 further comprising transmitting the completed toll payment to the mobile device.

23. The method of claim 1 further comprising completing a toll-payment by using an on-demand account set up by the mobile device and associated with the owner of the mobile device;
receiving a toll-payment demand from a toll taking device; and
completing, in response to the toll-payment demand, the toll-payment including transmitting toll paying account information associated with the owner of the mobile device to the toll-taking device.

24. The method of claim 1 further comprising:
receiving an alert from at least one sensor associated with the new appliance; and
transmitting the alert to the mobile device.

25. The method of claim 24 wherein the at least one sensor includes at least one of a motion detection sensor, an audio sensor, a video sensor, and a thermal sensor.

26. The method of claim 24 further comprising:
   detecting when a vehicle associated with the new appliance is in stationary position for a duration of time and detecting closed windows and doors;
   detecting at least one of a moving object and a heat source inside the vehicle; and
   transmitting a warning message to the mobile device.

27. The method of claim 26 further comprising receiving a command from the mobile device, wherein the command comprises at least one of:
   unlocking a door;
   rolling down a window;
   sounding a horn;
   triggering an alarm;
   turning on a heater;
   turning on an air-conditioner;
   flashing a light; and
   dialing an emergency center and enabling a hands-free microphone and speaker of the vehicle.

28. The method of claim 27 further comprising transmitting at least one of a video image and an audio file to the mobile device.

29. The method of claim 1 wherein the new appliance is associated with a vehicle and the method further comprises receiving at least one Global Positioning System (GPS) location with a programmed speed from the mobile device.

30. The method of claim 29 further comprising detecting and storing when the speed of the vehicle exceeds the programmed speed while the vehicle is proximate to the at least one Global Positioning System (GPS) location.

31. The method of claim 30 further comprising transmitting a corresponding alert to the mobile device.

32. The method of claim 1 wherein the new appliance is associated with a vehicle and the method further comprises receiving at least one Global Positioning System (GPS) location with a programmed timer in minute resolution value from the roistered mobile device.

33. The method of claim 32 further comprising recording route tracking data associated with the vehicle every time when the programmed timer reaches a programmed minute resolution value, the route tracking data comprising:
   a speed of the vehicle;
   the at least one GPS location;
   a time;
   a date; and
   the vehicle's identification.

34. The method of claim 6 further comprising receiving an input status query from the mobile device associated with the owner.

35. The method of claim 34 further comprising transmitting the corresponding input status to the mobile device.

36. The method of claim 6 further comprising:
   receiving a proximity query from the mobile device, wherein the proximity query is relative to a physical location;
   receiving a connection request and an appliance application code from the mobile device; and
   transmitting the appliance application code or a download link to the mobile device thereby enabling the mobile device to operate the new appliance or a house related equipment.

37. The method of claim 36 further comprising receiving a command from the mobile device, wherein the command is associated with an entertainment system.

38. The method of claim 6 further comprising receiving a command from the mobile device associated with the owner, wherein the command is associated with a vehicle.

39. The method of claim 38 wherein the command is at least one of a door lock or unlock command, a window open or close command, and an air conditioner on or off command.

40. The method of claim 1 further comprising forwarding a command from the mobile device to another device, wherein the command is at least one of a security system command, a vehicular command, and a surveillance system command.

41. The method of claim 1 further comprising forwarding a command from the mobile device to another device, wherein the command is at least one of a home entryway command, an irrigation system command, a Heating Air-conditioning & Ventilation (HAV) system command, an appliance command, an entertainment system command, a power generator command, a solar power system command, a fitness system command, a communication system command, a personal computer command, a home illumination system command, and a swimming pool or spa heating command.

42. The method of claim 40 further comprising transmitting a corresponding alert to the mobile device.

43. The method of claim 1 further comprising forwarding a command from the mobile device to another device associated with a utility service provider, wherein the command is a utility service account payment setup associated with at least one of an electric service, a water service, a gas service, a waste disposal service, and a recycling service.

44. The method of claim 1 further comprising forwarding a monthly service bill associated with at least one of an electric service, a water service, a gas service, a waste disposal service, and a recycling service to a corresponding associated utility service provider.

45. The method of claim 1 further comprising transmitting a message to the mobile device with input event associated with a doorbell and an intercom, and thereby enabling two way communications between the mobile device and the doorbell and the intercom.

46. The method of claim 1 further comprising transmitting an email address and a command to an email server for the purpose of emailing a recovered password of the owner of said email address.

47. The method of claim 1 further comprising transmitting an alert message of a location and a nature of the new appliance to the mobile device and to an emergency station when a certain event happens.

48. The method of claim 47 further indicating the certain event as being:
   an air bag being inflated; or
   an impact to a body of a vehicle.

49. The method of claim 1 further comprising receiving a panic input from the mobile device, the method comprising:
   turning on emergency lights;
   transmitting an alert message with a location of the mobile device to an emergency station;
   transmitting the alert message to another mobile device; and
   providing a two way communications on a vehicle's hands-free microphone and speaker.

50. The method of claim 1 further comprising:
   receiving from the mobile device a programming command comprising:
   programming a recording time;
   starting recording a video input;
   opening a pet utility door;
   playing an audio recorder;

running a Real-Time Clock (RTC) for a programmed period of time;
closing the pet utility door;
stop recording the video input; and
transmitting a message to the mobile device.

51. The method of claim 1 further comprising:
receiving from the mobile device a programming command comprising:
  programming a recording time;
  starting a recording video input;
  opening a pet utility door;
  playing an audio recorder;
  running a Real-Time Clock (RTC) for a programmed period of time;
  closing the pet utility door;
  stop recording the video input;
  transmitting a message to the mobile device; and
playing back the recorded video input.

52. The method of claim 1 further comprising:
receiving from the mobile device a programming command comprising:
  programming a feeding time;
  opening a feeder door;
  running a Real-Time Clock (RTC) for a programmed period of time; and
  closing the feeder door.

53. The method of claim 6 further comprising receiving a command from the mobile device associated with the owner and further receiving a second command from a second mobile device associated with the owner wherein the commands are associated with a robotic control device.

* * * * *